United States Patent [19]

Koda et al.

[11] Patent Number: 6,066,838
[45] Date of Patent: May 23, 2000

[54] MICROWAVE OVEN

[75] Inventors: Tetsuya Koda; Yumiko Hara; Yasumichi Kobayashi, all of Osaka; Emiko Ishizaki, Mie; Kenji Watanabe, Nara; Teruhiko Hiraishi, Osaka; Masaaki Sano, Kyoto; Tomozaku Ito, Nara, all of Japan

[73] Assignee: Matsushita Electric Industrial Co., Ltd., Osaka, Japan

[21] Appl. No.: 09/005,337

[22] Filed: Jan. 9, 1998

[30] Foreign Application Priority Data

Jan. 10, 1997 [JP] Japan ................................. 9-002664
Apr. 15, 1997 [JP] Japan ................................. 9-097047

[51] Int. Cl.[7] ........................................ H05B 6/66
[52] U.S. Cl. ........................ 219/703; 219/696; 219/718
[58] Field of Search ........................ 219/678, 687–689, 219/690, 702, 703, 704, 705, 707, 708, 709, 710, 715, 718–719, 750

[56] References Cited

U.S. PATENT DOCUMENTS

| 3,701,872 | 10/1972 | Levinson | 219/703 |
| 4,246,462 | 1/1981 | Meisel | 219/710 |
| 5,491,323 | 2/1996 | Mori et al. | 219/710 |
| 5,815,045 | 9/1998 | Koyanagi et al. | 331/143 |

Primary Examiner—Tu Ba Hoang
Attorney, Agent, or Firm—Pearne, Gordon, McCoy & Granger LLP

[57] ABSTRACT

A microwave oven including a defrosting step in which a target which must be heated is irradiated with microwaves which are irregular in terms of time at least when the phase of water in the target is shifted from a solid body to liquid. The microwave oven includes a magnetron for generating microwaves for dielectrically heating a target which must be heated; and a waveguide through which microwaves generated by the magnetron are propagated into a heating chamber, wherein a defrosting process is performed in such a manner that microwaves which are irregular in terms of time and which are in a chaos state are propagated through the waveguide at least when the phase of water in the target is shifted from a solid body to liquid.

18 Claims, 115 Drawing Sheets $0 \leq X \leq 1$  $F(X) = 1 - |2X - 1|$ $$P = P0 \cdot (1 - Sb \cdot \cos\theta / Sa)$$

FIG. 30
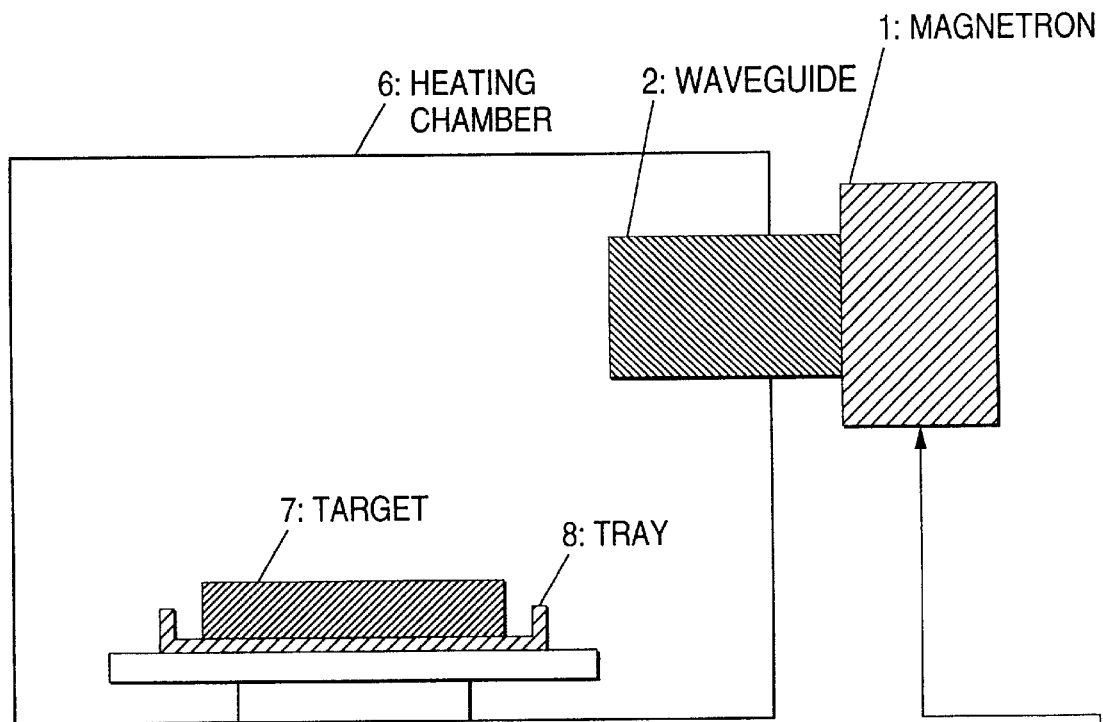
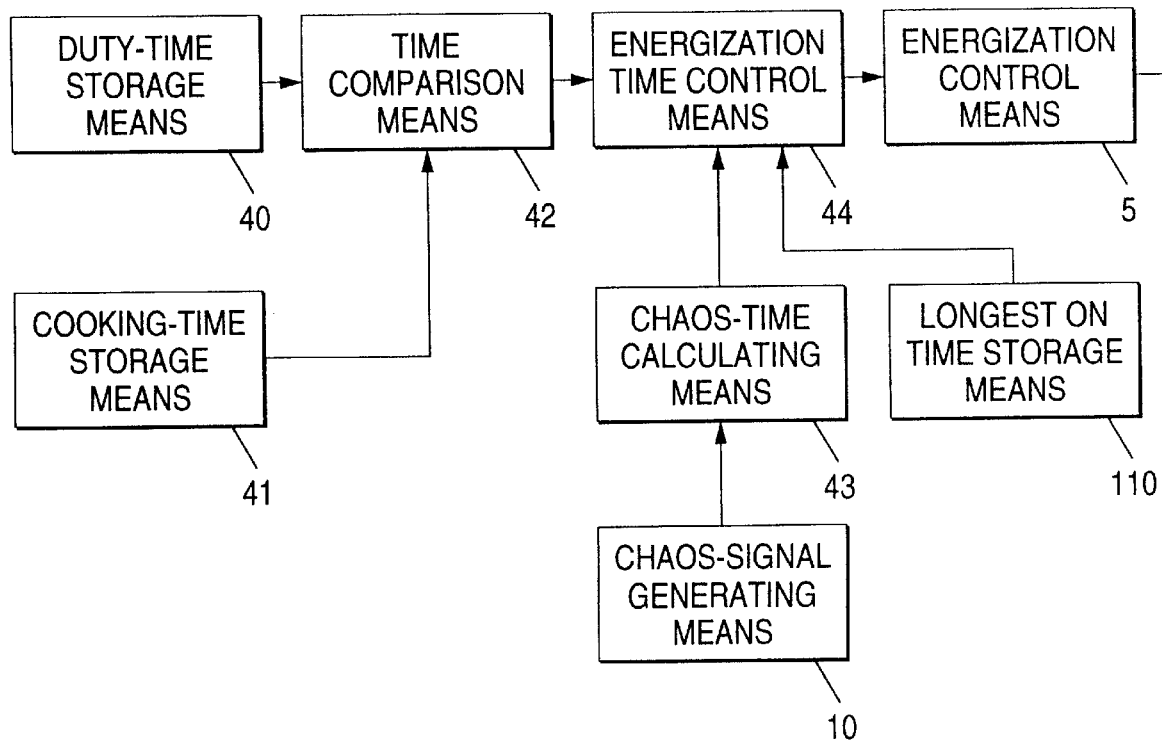

FIG. 35
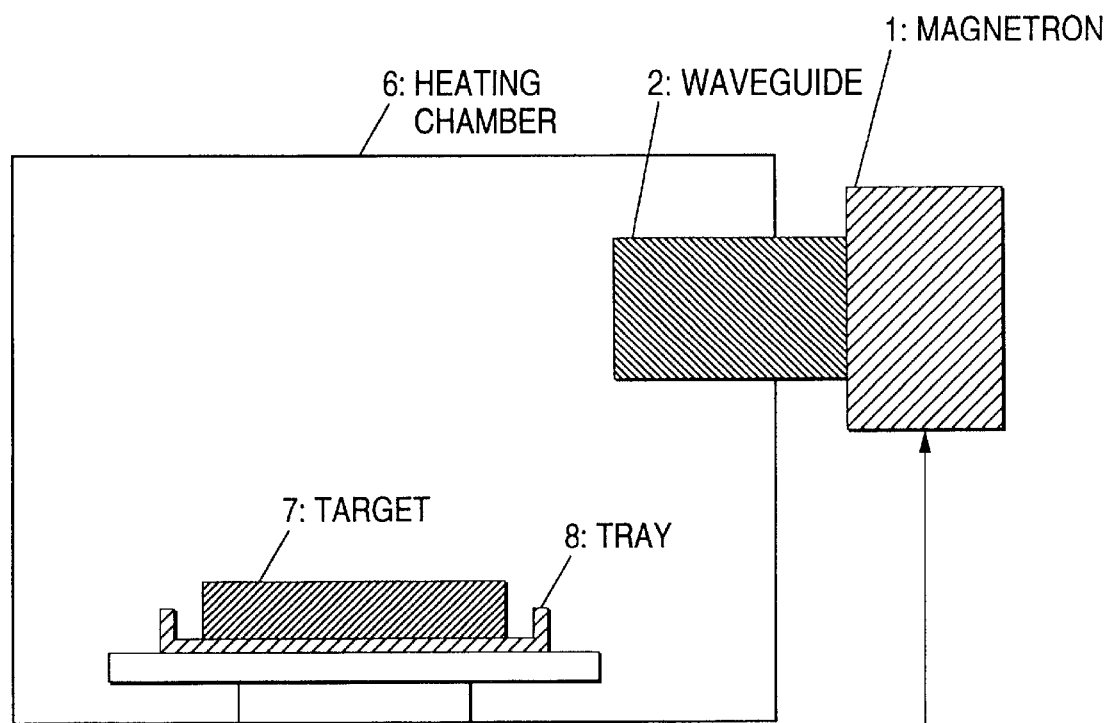
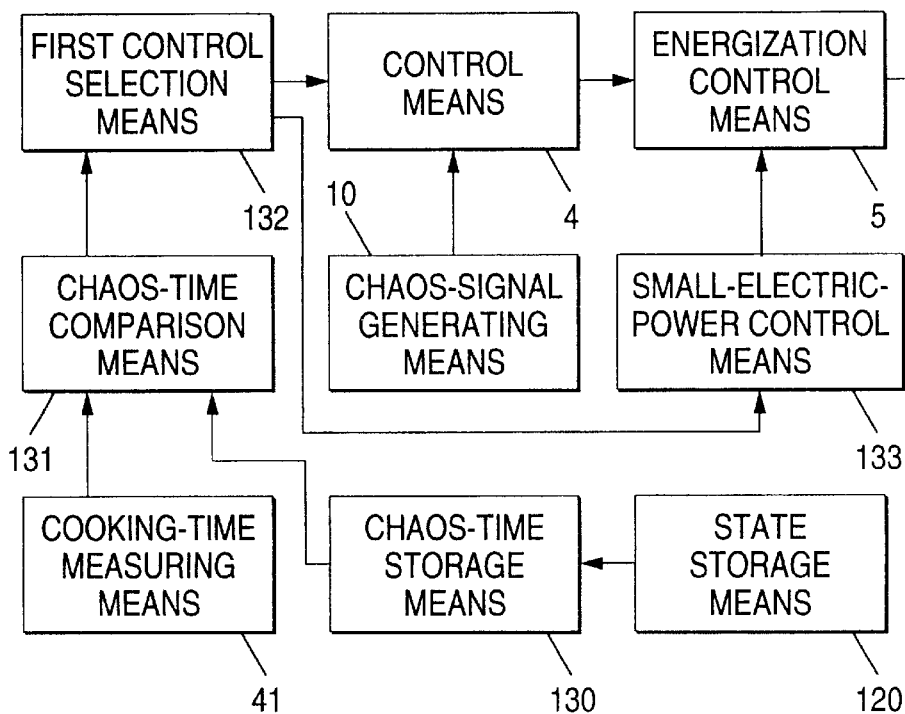

FIG. 40
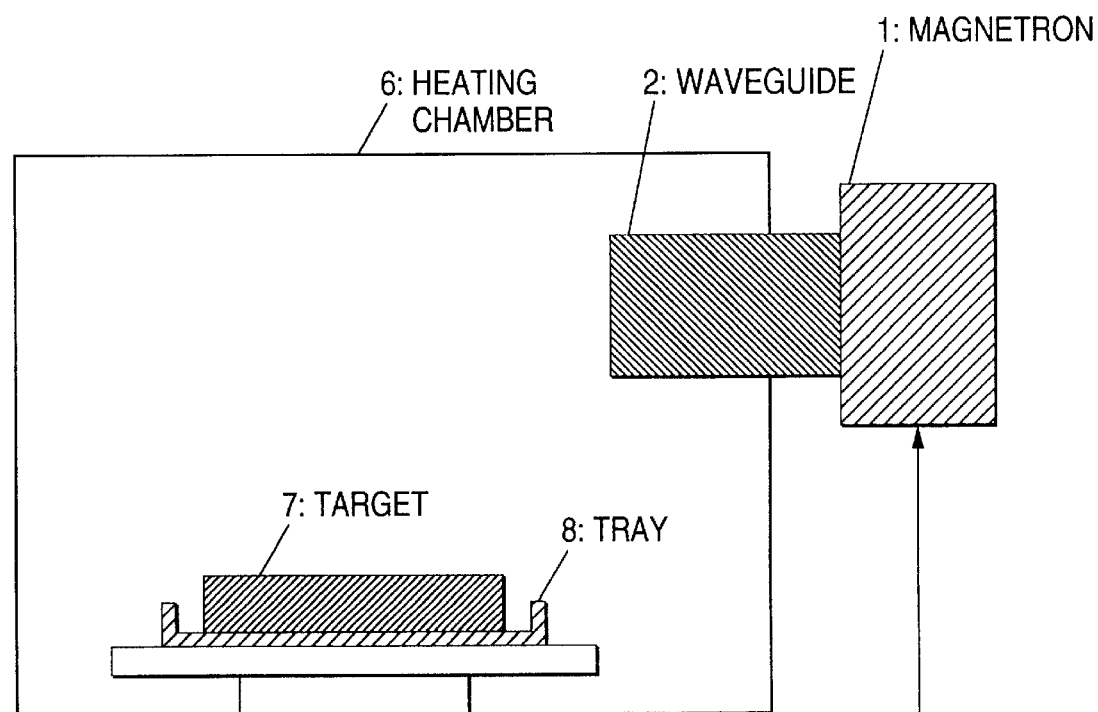
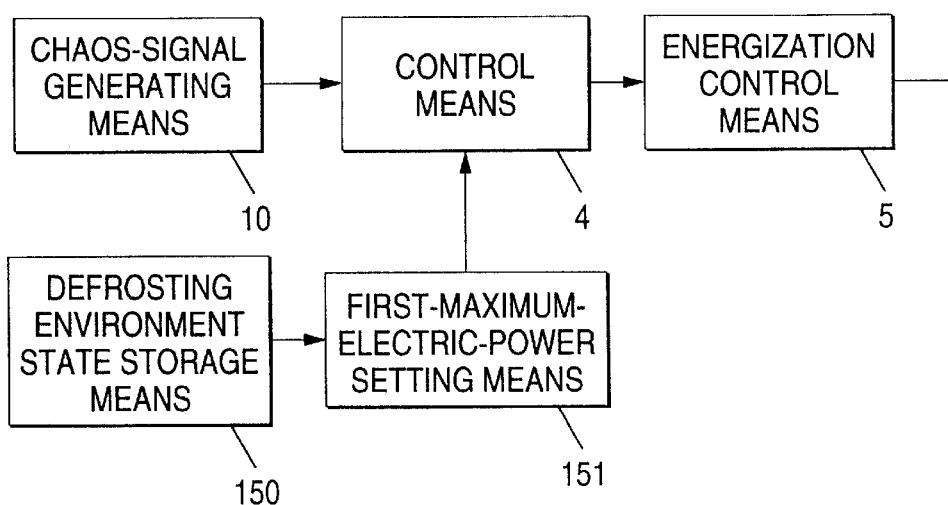

FIG. 49
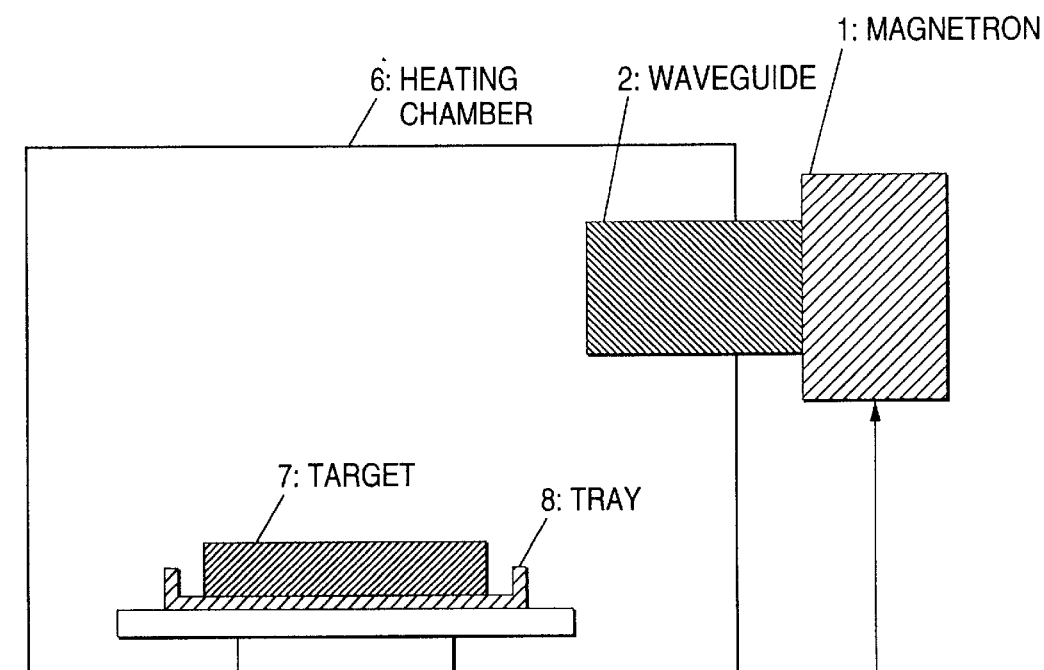
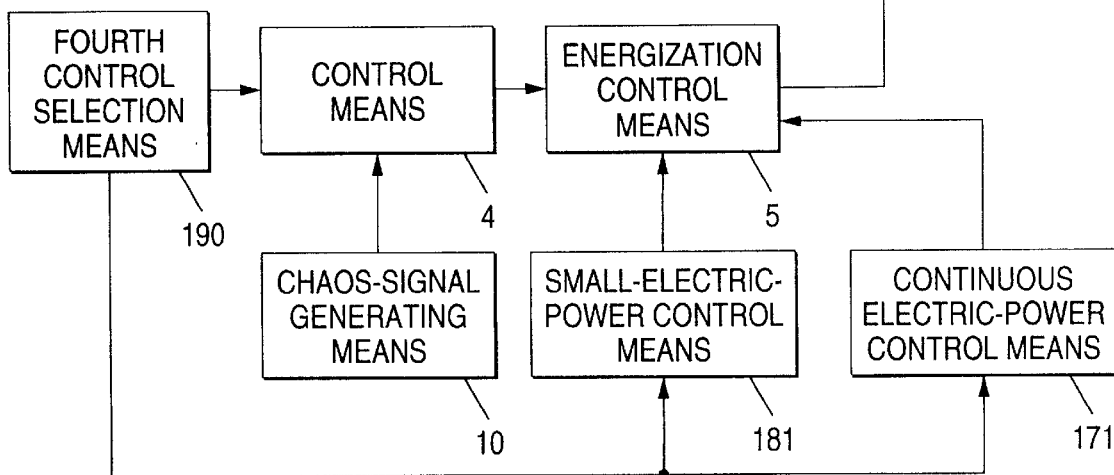

FIG. 51
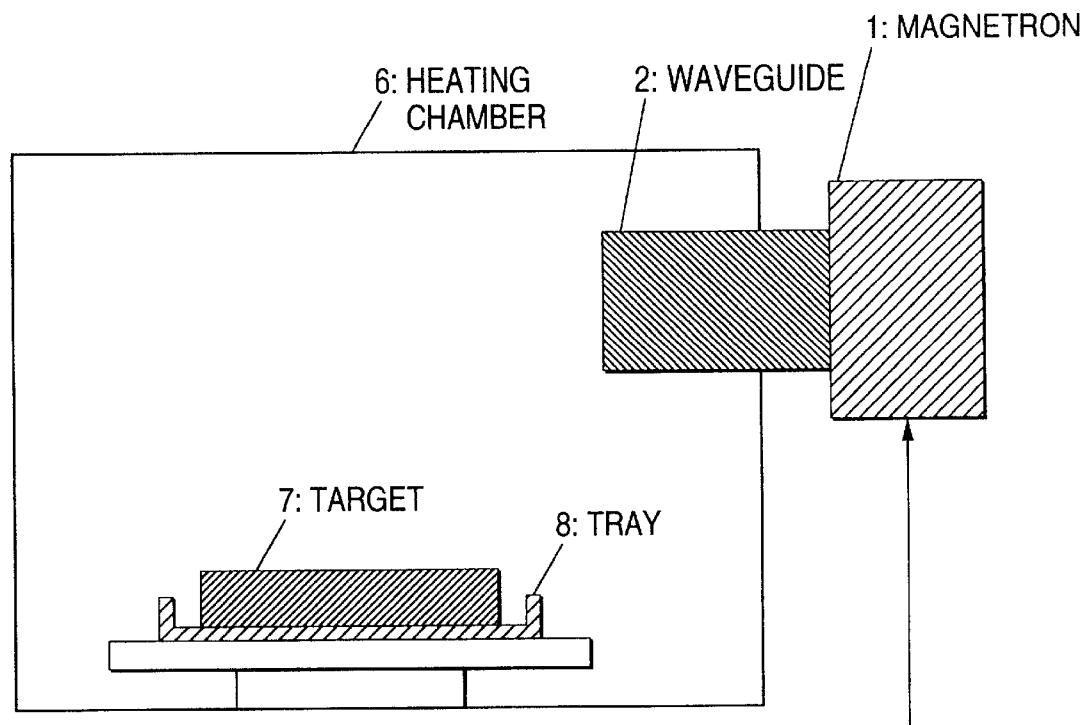
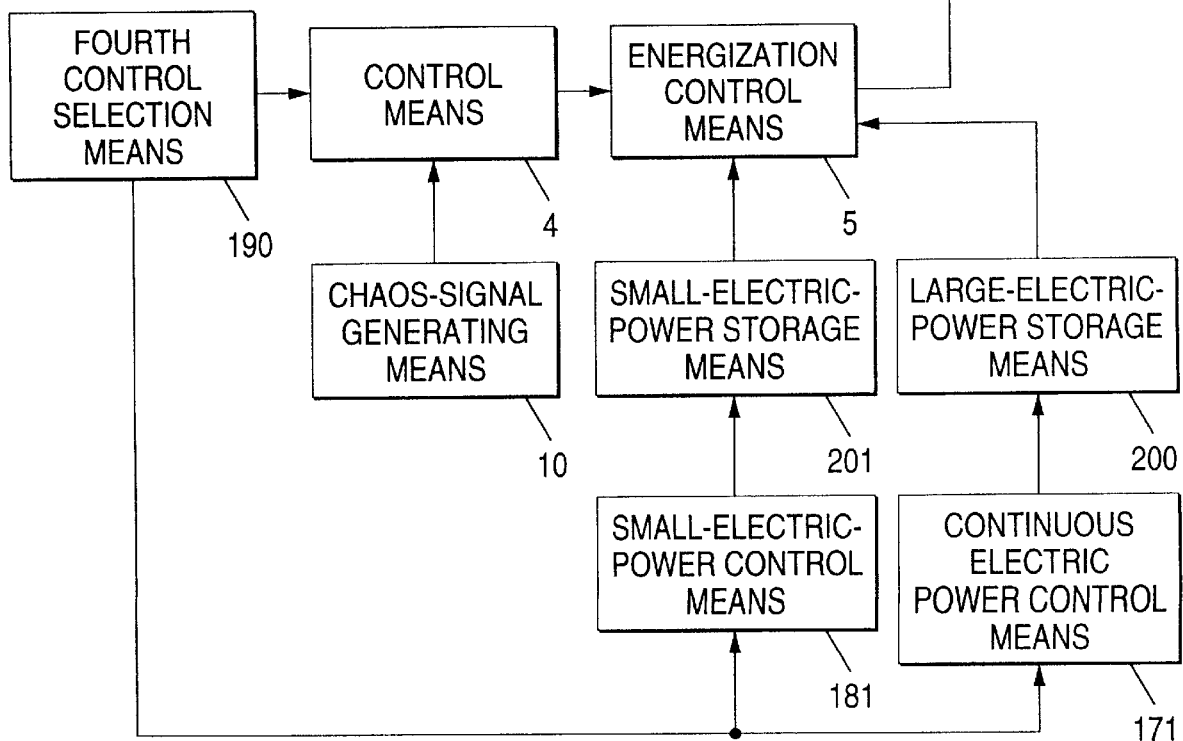

FIG. 82
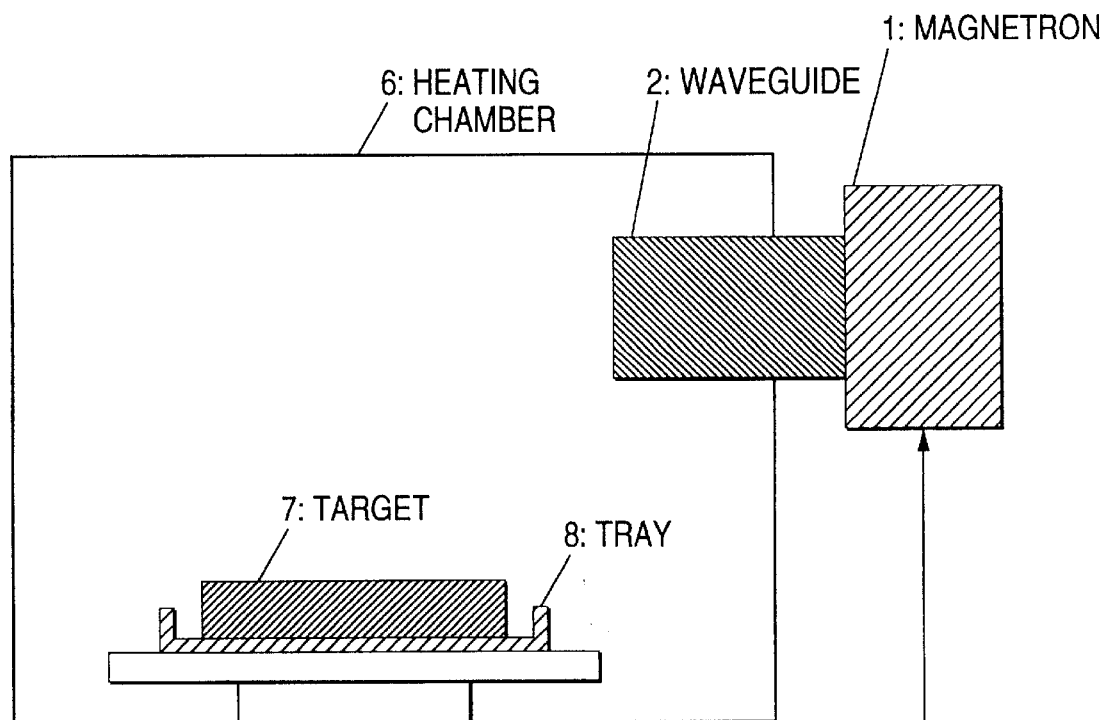
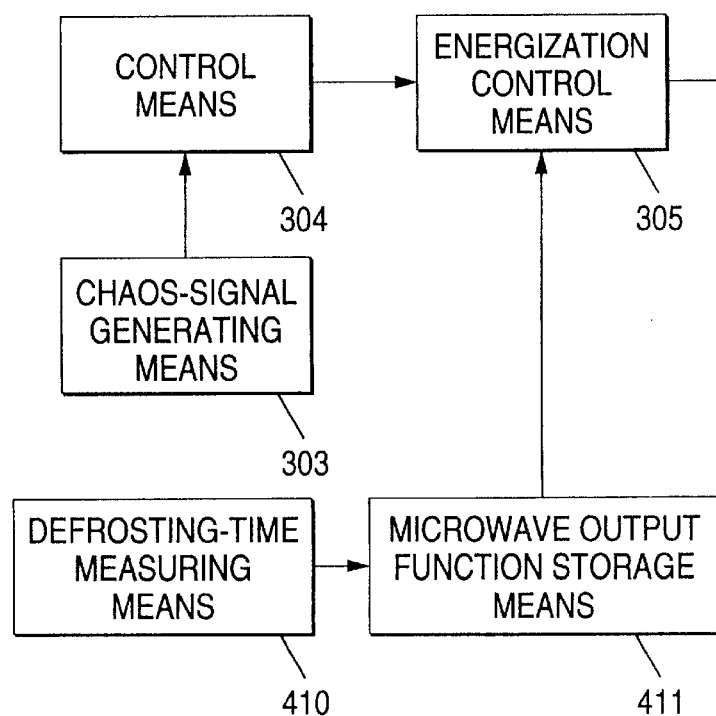

$0 \leq X_n \leq 1 \quad X_{n+1} = 1 - |2X_n - 1|$

FIG. 101
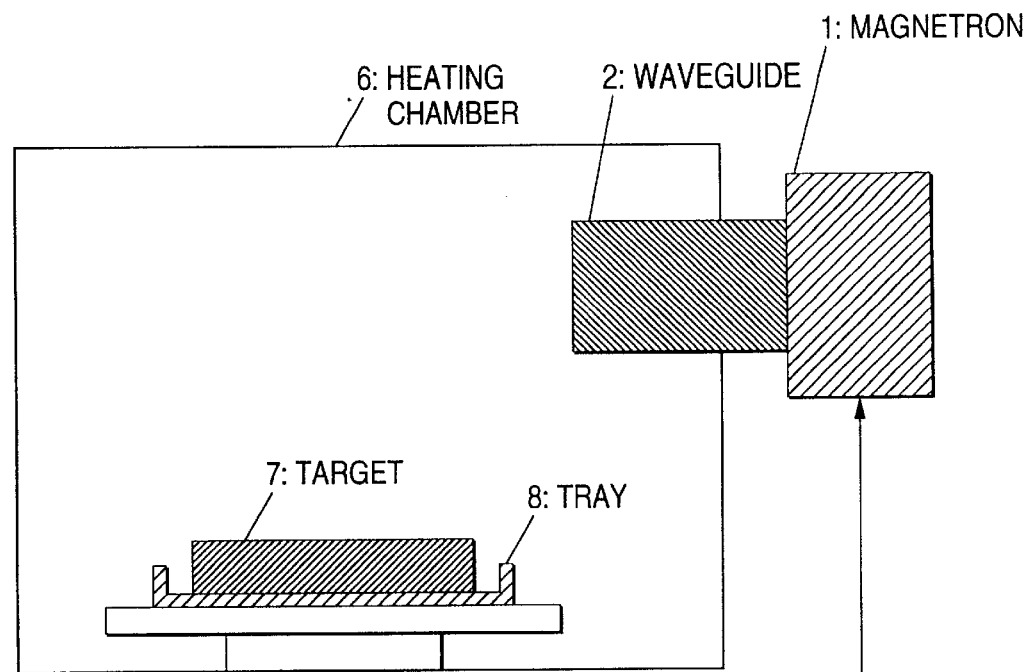
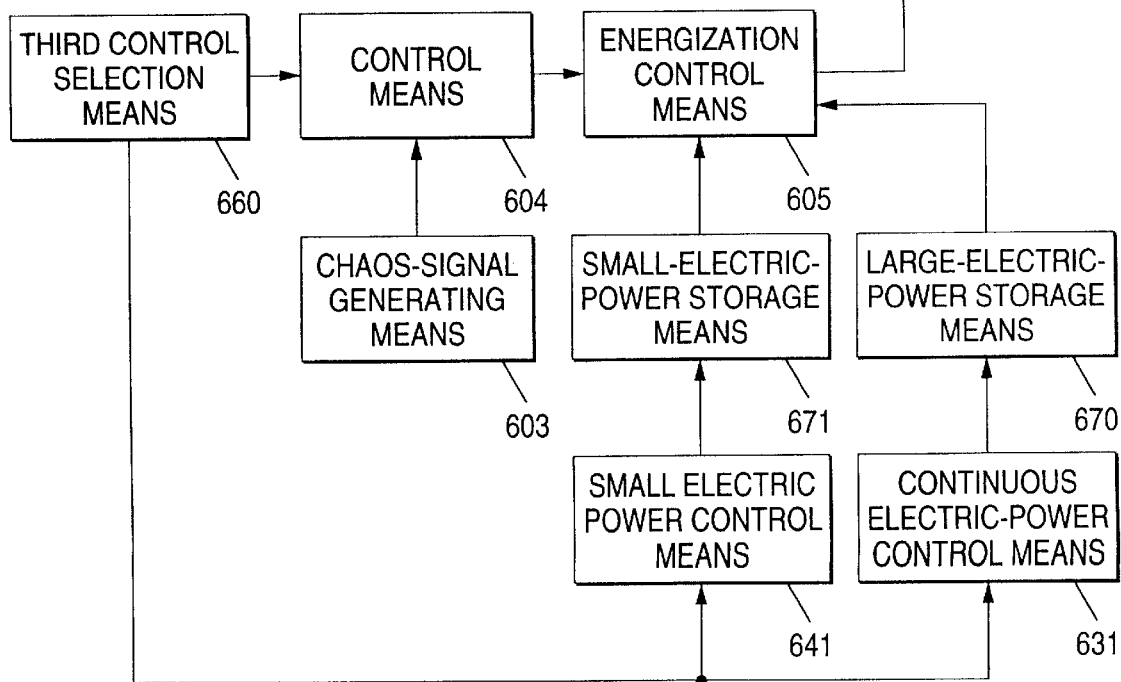

MICROWAVE OVEN

BACKGROUND OF THE INVENTION

1. Field of the Invention

The present invention relates to a microwave oven which is capable of shortening defrosting time and improving the grade of finishing of the defrosted target by improving distribution of temperatures during the defrosting process.

2. Description of the Related Art

A conventional technique will now be described with reference to FIG. 71. Reference numeral 1 represents a magnetron for generating microwaves. Microwaves generated by the magnetron 1 dielectrically heat a target 7 which must be heated so that the target is cooked with heat. A waveguide 2 guides, into a heating chamber, the microwaves generated by the magnetron 1. The target 7 which must be heated is accommodated in a heating chamber 6 so that the target is cooked with heat in the heating chamber 6.

The output of the microwaves is regularly turned on or off in accordance with the state, for example, the weight of the target 7 which must be heated so that dielectrical heating is performed for the purpose of heating and defrosting the target.

The conventional control of microwaves raises the following problems.

When a target which has been frozen in a freezing chamber or the like in a freezer is defrosted with heat generated by a dielectric phenomenon, the overall body of the target which must be heated is frozen. That is, internal water is in a solid state when irradiation with microwaves is started. When a target which must be heated is irradiated with microwaves in the state in which internal water in the solid state exists in the target which must be heated, the temperatures of the inside portions of the target which must be heated are substantially uniformly raised. When phase shift takes place causing internal water to be converted from a solid body into liquid, rise in the temperature in the internal portions, however, varies considerably because of variations of compositions of materials in the target which must be heated and the shape of the target.

That is, the variation in the components of the target which must be heated causes molar depression of the freezing point to take place variably in each portion in the target which must be heated. As a result, the defrosting temperature varies. The phase shift from the solid state to liquid requires heat of melting. When the energy of microwaves is used as the heat of melting, the temperature of the target which must be heated is not raised.

If the target which must be heated and which in in the above-mentioned state is irradiated with microwaves similarly to the state in which internal water is in the solid state, defrosted portions and non-defrosted portions appear in the target which must be heated. As a result, portions, in which solid state internal water exists and portion, in which internal water has been formed into liquid, nonuniformly exist. If the irradiation with microwaves is continued in the foregoing state, the temperatures of the portions of the target changed into water are rapidly raised as compared with the portions of the target in which internal water remains in the ice state because water in the liquid state can easily dielectrically be heated by microwaves by thousands times as compared with solid water, that is, ice. Therefore, in extreme cases, continuation of irradiation with microwaves causes the portions immediately after defrosted and boiled portions to exist together in the target which must be heated.

To prevent the nonuniform result of the defrosting process, the conventional control of microwaves has been performed in such a thanner that microwaves are applied with full power in a case where the overall body of water in the target which must be heated is in the solid state. Moreover, when the temperature has approached a level at which the phase is shifted, that is, when the temperature in the target which must be heated has approached zero degree, the control is performed in accordance with an on/off pattern which is a regular pattern in terms of time. As an alternatively to this, a method of adjustment has been employed in which the output of microwaves is rapidly reduced so that the phase shift is completed slowly. Another adjustment has been employed in such a manner that water in the target, which must be heated, is uniformly converted into water having a uniform temperature level. As a result, a considerably long time takes place for the microwave oven to complete the defrosting process.

An optimum cycle of the on/off pattern is determined for collectively shifting the phase of the target which must be heated as a result of experiments of cooking operations. The foregoing adjustment, however, is a too delicate operation. Therefore, the optimum cycle cannot easily be determined.

Thus, partial dispersion inevitably takes place when the phase of water is changed in the target which must be heated. As a result, the temperatures of the portions in which ice has been changed to water are rapidly raised. Thus, the temperatures in the target which must be heated are made to be nonuniform. Moreover, the degree of nonuniform temperatures realized after the defrosting process varies depending upon the state of the target which must be heated, the structure of the microwave oven and the like. Thus, a constant state of defrosting cannot easily be realized.

SUMMARY OF THE INVENTION

The present invention is attempted to solve the above-mentioned problems experienced with the conventional technique and an object of the present invention is to provide a microwave oven which is capable of shortening defrosting time, preventing nonuniform temperatures in the defrosted target and quickly realizing uniform state of defrosting.

To solve the above-mentioned problems, the present invention has a structure having a defrosting step in which a target which must be heated is irradiated with microwaves which are irregular in terms of time at least when the phase of water in the target is shifted from a solid body to liquid. The expression "irregular" means a state of superimposition of various cycles. When a target which must be heated is defrosted, irradiation with microwaves, which are irregular in terms of time including on/off periods optimum for a state of the target, is meant. Thus, dispersion in the phase shift of the target which must be heated can be minimized during the defrosting process. As a result, the delicate adjustment of the on/off period is not required to defrost the target having a grade of finishing exceeding a predetermined level.

Moreover, nonuniform temperatures of the target which must be heated can be minimized and simultaneously enlargement of the quantity of microwaves for use to dielectrically heat the target per time is permitted. As a result, time required to defrost the target which must be heated can significantly be shortened.

An aspect claimed in claim 1 has a structure that a defrosting step is performed in such a manner that a target which must be heated is irradiated with microwaves which are irregular in terms of time at least when the phase of water in the target in shifted from a solid body to liquid. As a result, in the final stage of the defrosting process, the temperature of the target which must be heated can be set to be in a range from a temperature suitable to malt the target to an upper temperature for preventing boiling. Moreover, the temperature of the target which must be heated is made to be lower than the above-mentioned upper temperature during the defrosting process. Moreover, the target can quickly be defrosted in a period of time shorter than a predetermined period of time. To achieve the foregoing purposes, respective processes for microwave irradiation are combined with each other and microwaves are made to be irregular in terms of time. That is, the quantity of microwaves which are applied in each irradiation process is varied and also the intervals among the irradiation are varied. The above-mentioned irradiation processes are combined with each other to effectively defrost the target which must be hented. As a result, the shift of the overall body of the target which musit be heated can efficiently be performed in a short time.

Specifically, restraint, to a predetermined range, is performed, the restraint being restraint of the width between the temperature level to which the target which must be heated is heated with applied microwaves per each operation and the temperature level to which the target is cooled in each time in which irradiation is turned off. Moreover, the irradiating intervals of microwaves are combined with one another in such a manner that the overall upper and lower limits for the temperatures which are raised and lowered are in a predetermined range (in a range between the temperature suitable for melting the target and the temperature for preventing boiling). Thus, the target can efficiently be defrosted.

More specifically, if a regular quantity of heat is added as has been performed in the conventional method, the temperature of the target which must be heated can easily be raised in accordance with a substantially linear function. Therefore, even if any quantity of heat generated by a heating means which realizes the inclination of a linear function is used, the temperature of the target which must be heated cannot easily be controlled to be in a predetermined temperature range within a predetermined period of time. If signals, which are irregular in terms of time and which follow a non-linear function, are used to realize a state of temperature rise of a target which must be heated in a non-linear form having an upper limit, a target which must be heated can efficiently be heated so as to be defrosted in a short time, the non-linear forming being permitted to a parabola shape, an exponential curve or a curve moved vertically.

That is, the defrosting process has been performed in such a manner that the heating means is non-linearly controlled when the phase of water in the target which must be heated is converted from a solid body to liquid. Therefore, restraint of the temperature of the target which must be heated to satisfy the range from the melting temperature to the boiling level has been very difficult depending on the type of the target and a state in the heating chamber. On the other hand, the control according to the present invention is performed in such a manner that the temperature of the target is restrained to satisfy a predetermined range within a predetermined time while the quantity of irradiation added in one irradiation process is non-linearly controlled and sometimes the temperature of the target which must be heated is changed. As compared with the conventional method in which the control is performed linearly, a large quantity of microwaves can be applied in a short time without a necessity of greatly considering the upper and lower limits of the temperatures of the target determined in accordance with the weight and type of the target. As compared with the conventional defrosting process, the defrosting time can be shortened with performance as well as or better than the performance of the conventional process.

In accordance with the present invention a structure that chaos is employed as microwaves which are applied as microwaves which are irregular in terms of time. When a target which must be heated is irradiated with microwaves which conform chaos which is characterized by a baker's transformation effect, the temperature distribution in the target which must be heated can furthermore be uniformed. moreover, nonuniformity of temperature in the defrosted target can furthermore be reduced. The fact that irradiation which is irregular in terms of time can be realized in accordance with a chaos state has been achieved by the inventors of the present invention as a result of an effort of the inventors and a multiplicity of experiments.

In further accordance with the present invention, a microwave oven comprises: a magnetron for generating microwaves for dielectrically heating a target which must be heated; and a waveguide through which microwaves generated by the magnetron are propagated into a heating chamber, wherein microwaves in the chaos state are propagated through the waveguide. The quantity of microwaves, which are applied in the state in the microwave oven, can be brought to the chaos state only by a simple change. Therefore, only a simple structure is requtired to shorten time required to defrost a target and the temperature distribution in the defrosted target can be improved.

In further accordance with the present invention, microwaves are propagated through the waveguide by dint of electric power which is, in the chaos state, supplied to the magnetron. The target which must be heated can be irradiated with microwaves which are irregular in terms of time only by changing a program for a microcomputer without a necessity of changing the structures of the heating chamber and the waveguide of the microwave oven. Therefore, any change of the physical layout in the microwave oven and the structure of the same are not required to shorten time required to defrost a target. Moreover, the temperature distribution in the defrosted target can be improved.

The present invention also a structure comprising chaos-signal generating means for generating a chaos signal, wherein microwaves are emitted in accordance with DUTY-output having on or off period of time corresponding to the chaos signal generated by the chaos-signal generating means. Even it the quantity of microwaves cannot be changed to have continuous values attributable to the structure of the microwave oven, control of the quantity of microwaves with binary values indicating on and off enables the effect of the chaos to be attained in the defrosting process. As a result, even if the outputs of microwaves from the microwave oven are not continuously changed, only a simple change in the structure is required to shorten time required to def rost a target. Moreover, the temperature distribution in the dcxros-ted target can be improved.

In accordance with another aspect of the present invention, microwaves are emitted when the level of the chaos signal generated by the chaos-signal generating means is higher than a predetermined threshold value. Since the control method with which the operation is turned on or off in accordance with the level of the threshold value can considerably easily be realized, any great change of the conventional control means is not required to attain the effect of the chaos.

The present invention further has a structure that a limitation of a shortest on-time is provided. Since the limitation of the shortest on-time is provided, average electric power which must be supplied to the magnetron can be enlarged. Thus, the defrosting time can furthermore be shortened without deterioration in the grade of finishing of the defrosted target.

The present invention further has a structure that limitation of a longest on-time is provided. Since electric power which must be supplied to the magnetron is restrained, the portion which has been first converted into water is not excessively heated and the temperature distribution in the target which must be heated can be uniformed. Therefore, the grade of finishing of the defrosted target can furthermore be improved.

According to another feature of the invention, a structure is provided such that the quantity of application of microwaves is changed in accordance with a state of the phase shift of the target which must be heated. Since the quantity of irradiation, which is performed by the chaos manner corresponding to the state of the target which must be heated, is determined, waste of time can be prevented and the effect of the chaos can be obtained in an optimum state for the target.

In accordance with another aspect, the present invention a structure that change is perforimed in accordance with a result of a selection of a chaos state from a plurality of chaos states. In accordance with the selected chaos, electric power which must be supplied to the magnetron is adjusted. Thus, control of dielectric heating in a chaos state optimum for the state of a target which must be heated can be performed. Thus, the temperature distribution in the defrosted target can furthermore be improved.

In further accordance with the present invention, the quantity of microwaves which must be applied is changed in accordance with a defrosting environment including the size of a defrosting chner and a fact whether or not a reflecting plate is provided. Since the quantity required to defrost a target is determined in accordance with the environment for the defrosting process, excessive energy of microwaves is not applied during the defrosting process.

Further according to the present invention, the quantity of microwaves which must be applied is changed in accordance with an environment of a target which must be heated including the type and weight of the target. Since the quantity required to defrost a target is determined to correspond to the environment of the target, excessive energy of microwaves is not applied during the defrosting process.

In accordance with another aspect of the invention, microwaves are applied in a large quantity and regularly before the phase of water in the target which must be heated is shifted from a solid body to liquid as compared with microwaves which are applied after the shift of the phase. Since a great effect of the chaos signal is not required before the phase of water in the target which must be heated is shifted from a solid body to liquid, the target can dielectrically be heated with a large quantity of electric power. As a result, deterioration in the grade of finishing of the defrosted target can be prevented and the defrosting time can furthermore be shortened.

In further accordance with the present invention, microwaves are applied in a small quantity and regularly in a latter period in which the phase of water in the target which must be heated is shifted from a solid body to liquid as compared with microwaves which are applied before the latter period. Since excessive heating of the portion which has been first converted into water can be prevented and the temperature distribution in the target which must be heated can furthermore be uniformed, the grade of finishing of the defrosted target can furthermore be improved.

The present invention also provides a structure that time for which microwaves are applied in changed in accordance with the state of the shift of the phase of the target which must be heated, the defrosting environment or the environment of the target. Since time is determined in accordance with the state or the environment of the target which must be heated, waste of time can be prevented when a purpose of the process is achieved.

In further accordance with the present invention, microwaves are regularly applied in accordance with on/off output. Even if the structure of the microwave oven does not permit change of the quantity of microwaves with continuous values, the structure in which the quantity of microwaves is controlled with binary values indicating turning on and off enables the effect of the chaos to be realized in the defrosting process. Therefore, even if the output of microwaves in the microwave oven cannot continuously be controlled, only a simple structure is required to perform the process.

In further accordance with the present invention has a structure that a heating process using a heater is added. Since the heater is employed, frost on the surface of the target which must be heated can be melted, the appeaarnce of the defrosted target can be improved.

BRIEF DESCRIPTION OF THE DRAWINGS

FIG. 30 is a block diagram showing a microwave oven according to a ninth embodiment of the present invention;

FIG. 35 is a block diagram showing a microwave oven according to the tenth embodiment of the present invention;

FIG. 40 in block diagram showing a microwave oven according to a thirteenth embodiment of the present invention;

FIG. 51 is a block diagram showing the microwave oven according to the twenty-first embodiment of the present invention;

FIG. 82 is a block diagram showing a microwave oven according to a thirty-third embodiment of the present invention;

FIG. 101 is a block diagram showing a microwave oven according to a twenty-fourth embodiment of the present invention;

DETAILED DESCRIPTION OF THE PREFERRED EMBODIMENTS

Embodiments of the present invention will now be described with reference to the drawings.

First Embodiment

Figure 1:
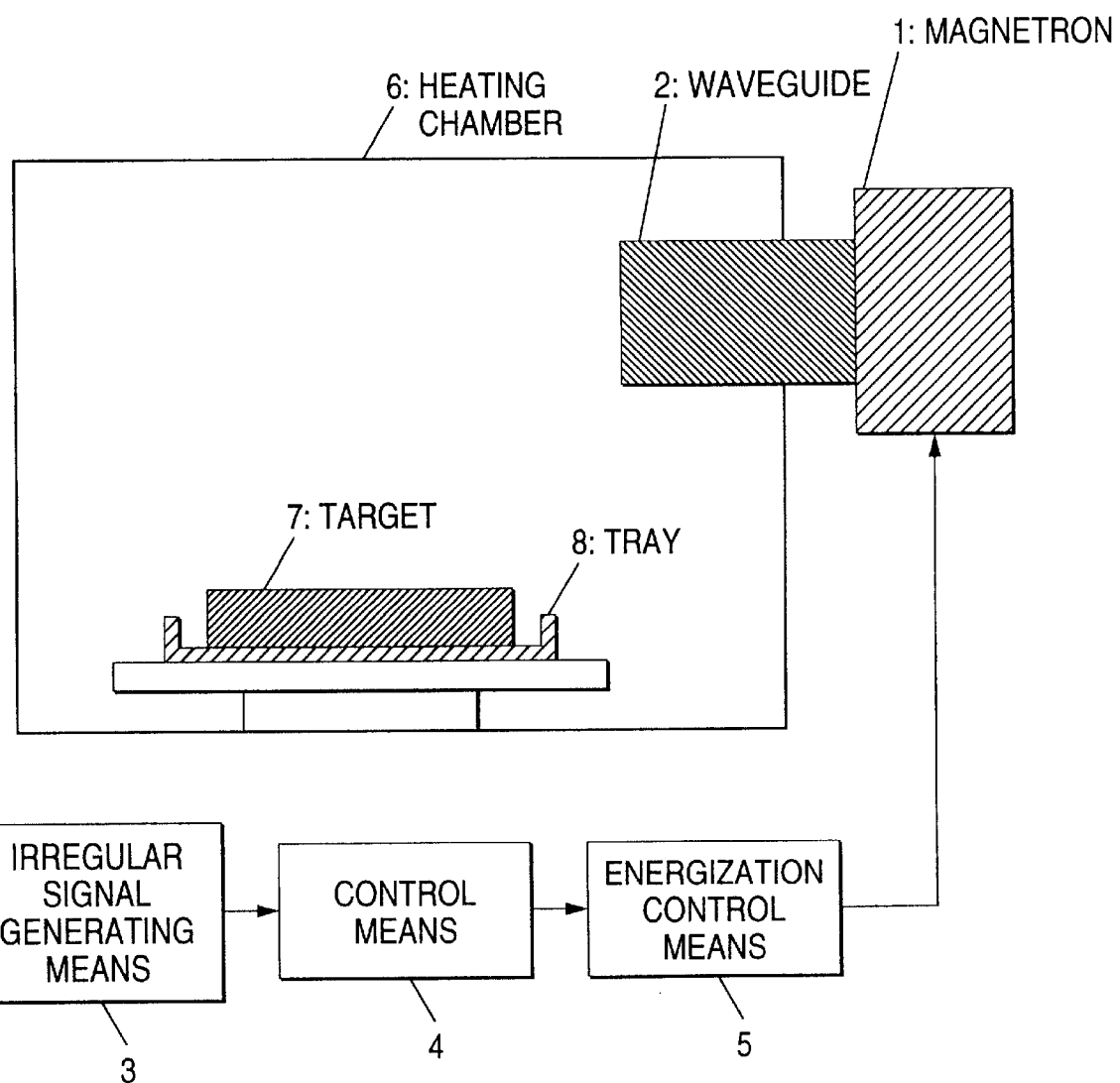
FIG. 1 is a block diagram showing a microwave oven according to a first embodiment of the present invention.

A first embodiment of the present invention will now be described with mainly reference to FIG. 1. Referring to FIG. 1, reference numeral 1 represents a magnetron. When electric power is supplied to the magnetron 1, the magnetron 1 outputs microwaves having a frequency of thousands of MHz. Microwaves output from the magnetron 1 propagate through a waveguide 2 so that the inside portion of the heating chamber 6 is irradiated with the microwaves. The microwaves with which the inside portion of the heating chamber 6 have been irradiated heat a target 7 which must be heated by dielectric heating.

Reference numeral 3 represents an irregular-signal generating means on which signals irregular in terms of time are stored and which transmits the irregular signal. A control means 4 adjusts electric power which must be supplied to the magnetron 1 in accordance with the irregular signal transmitted from the irregular-signal generating means 3. An onergization control means 5 generates high voltage which must be supplied to the magnetron 1, and adjusts electric power which must be supplied to the magnetron 1 in accordance with the control signal transmitted by the control means 4.

Figure 3:
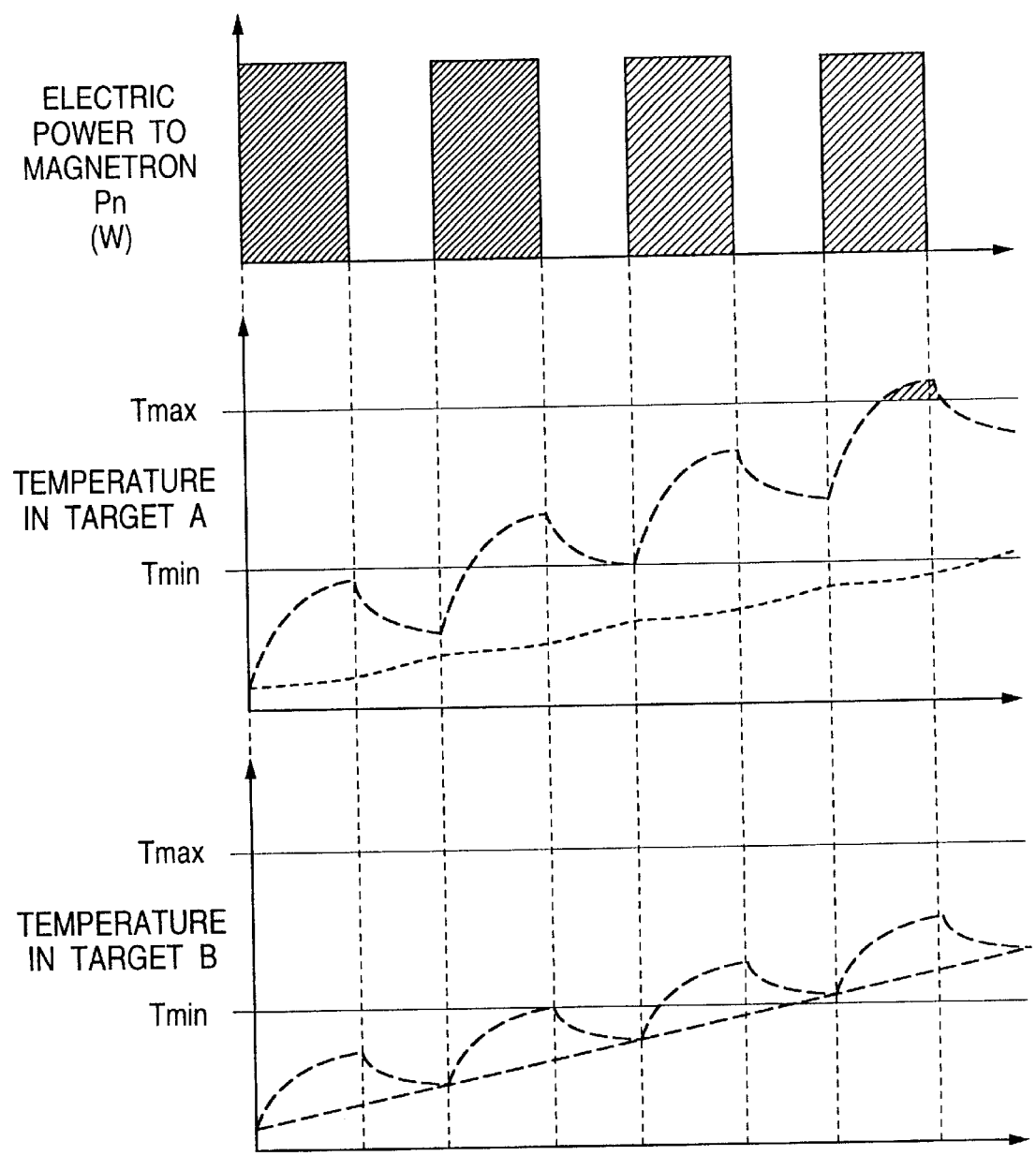
FIG. 3 is a (second) graph showing the relationship between electric power which must be supplied to the magnetron and internal temperatures in the targets A and B which must be heated.
Figure 4:
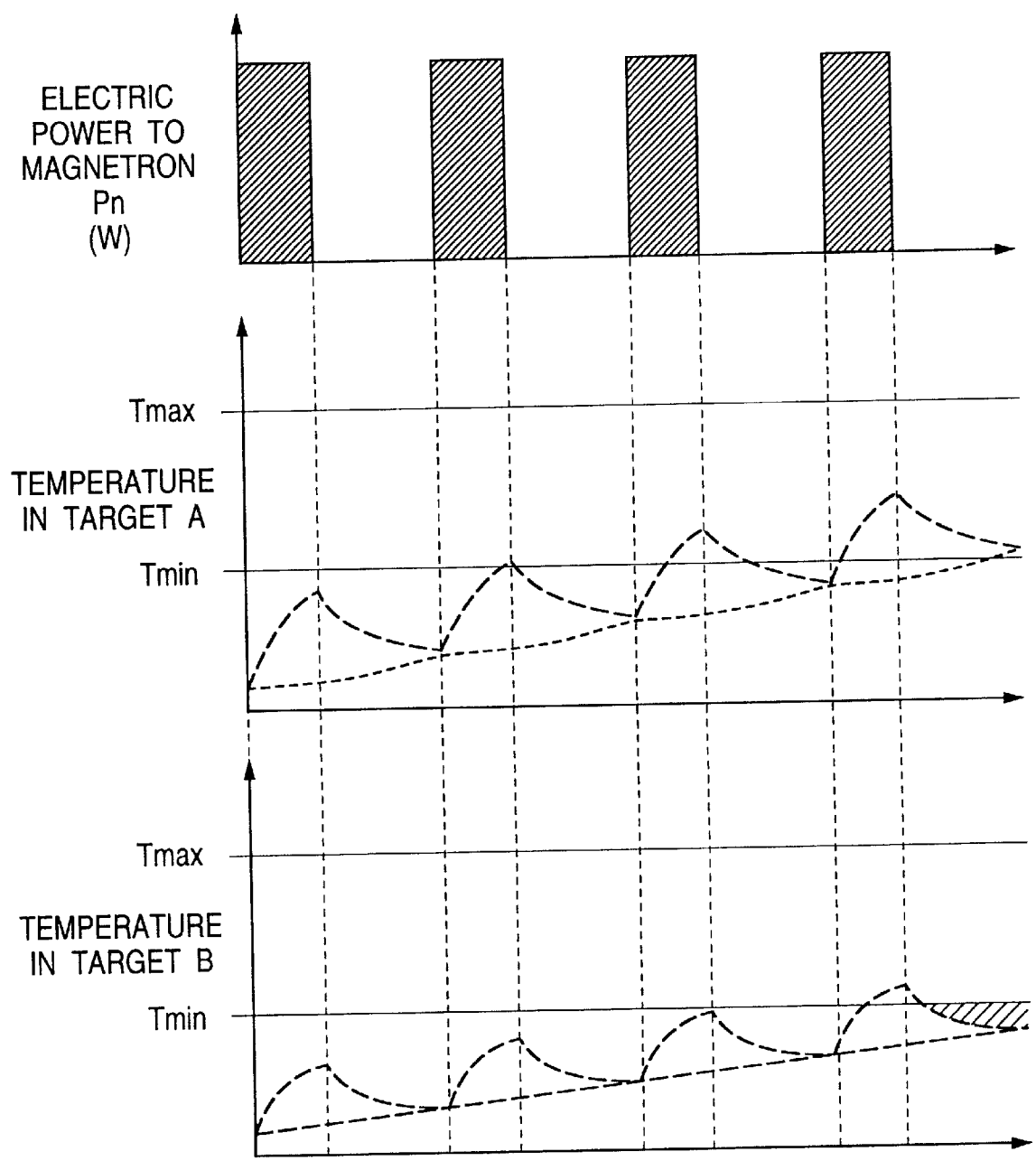
FIG. 4 is a (third) graph showing the relationship between electric power which must be supplied to the magnetron and internal temperatures in the targets A and B which must be heated.

The operation of the first embodiment will now be described. FIGS. 2 to 5 show the relationship between electric power Pn which must be supplied to the magnetron and temperatures in targets A and B which must be heated in such a manner that each axis of abscissa stands for cooking time t. In this caner assumptions are made that the target A which must be heated has a small thermal capacity and the target B has a large thermal capacity. A conventional defrosting process has a problem as shown in FIG. 3 or FIG. 4. Specifically, the defrosting process shown in FIGS. 3 and 4 is arranged in such a manner that microwaves are regularly applied to a target which must be heated regardless of a state of the shift of the phase of the target from a solid body to liquid. Referring to the drawings, Tmin is a lowest temperature at which the target can be defrosted and which is a temperature suitable for melting the target and Tmax is a temperature at which boiling can be prevented and discoloration of the target which must be heated can be prevented. Although the foregoing temperature somewhat varies depending on the type of the target which must be heated and the like, Tmin is usually about −1 degree and Tmax is usually about 30 degrees. To prevent boiling of the target which must be heated and insufficient defrosting as have been experienced with the conventional defrosting process, irradiation with microwaves is performed for a sufficiently long time. Since the loss factor of microwaves with which a target which must be heated, for example, frozen meat varies between ice and water by about 5000 times as described above, a portion of the frozen meat which has starting melting is boiled as if microwaves are concentrated to the foregoing portion.

Hitherto, a variety of contrivances have, therefore, been required to defrost frozen meat. For example, variations of the thermal capacity of frozen meat raise a difficulty to select a process suitable for defrosting the same. If a defrosting sequence is determined in order to defrost frozen meat having a standard thermal capacity, the conventional method, in which the control to regularly turn the supply of microwaves on or off, cannot prevent a partial and rapid propagation of the phase shift if the portion of the frozen meat starts shifting the phase thereof.

Figure 2:
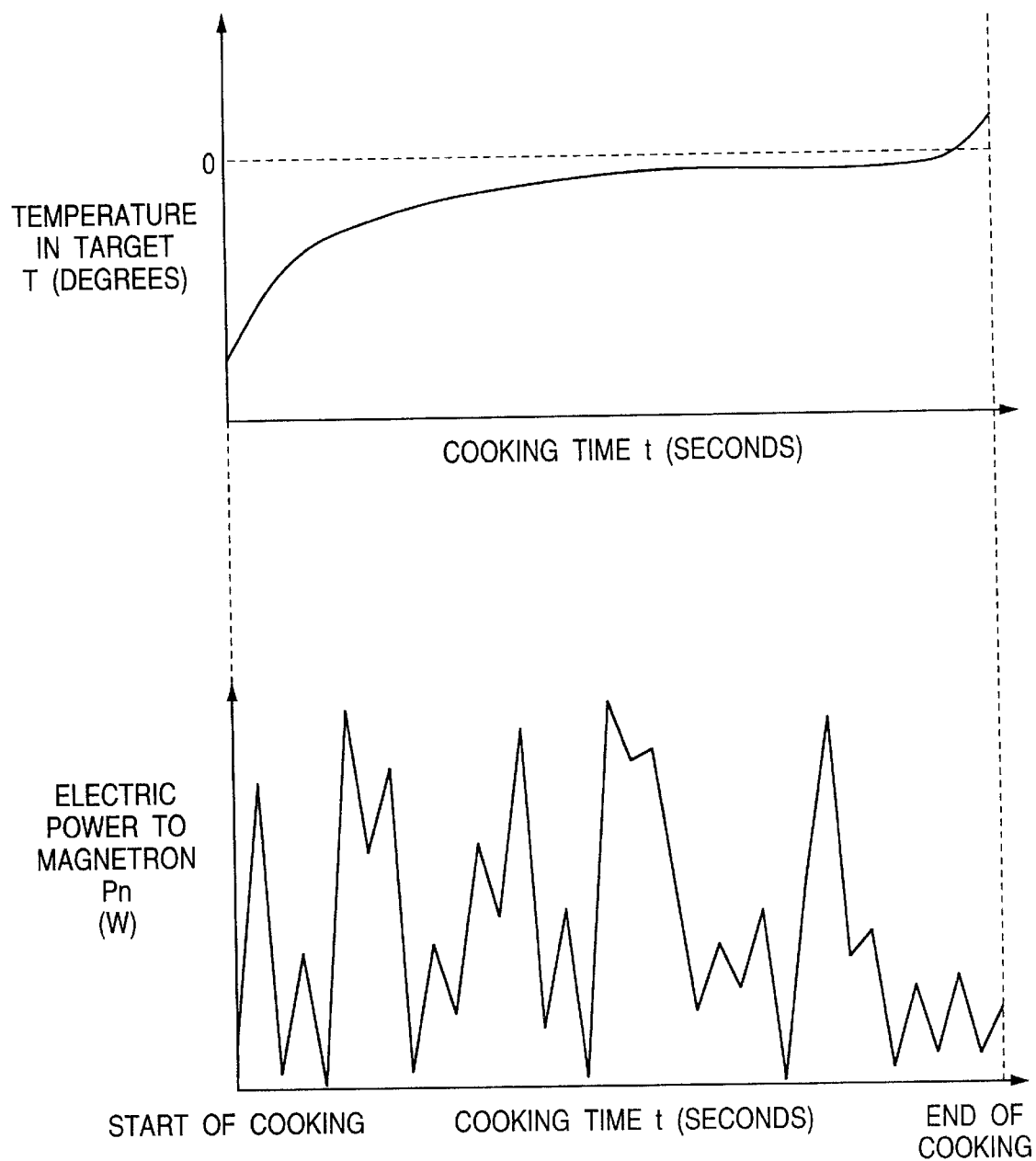
FIG. 2 is a (first) graph showing the relationship between electric power which must be supplied to a magnetron and internal temperatures in targets A and B which must be heated.

Specifically, the average temperature of frozen meat is gradually raised with respect to cooking time (defrosting time) t, as shown in FIG. 2. When the temperature has reached a level near the melting point, a major portion of irradiation heat generated by microwaves is used as melting heat required to melt the frozen meat. Thus, the average temperature maintains the equilibrium temperature for a while. From a microscopic viewpoint of each portion of the frozen meat, the average temperature is raised when the frozen meat is irradiated with microwaves and the average temperature is lowered when the irradiation is turned off, as shown in FIGS. 3 and 4. As can be understood from results of the microscopic observation of the temperatures of the target which must be heated, the average temperature sometimes, and though momentarily, exceeds a predetermined temperature (a regenerative temperature) depending upon the quantity of applied microwaves or time for which irradiation is performed. The reason why the raised temperature can be lowered attributable to irradiation with microwaves lies in a simple fact that heat is absorbed by the adjacent ice portions and, thus, the raised temperature is lowered. The inventors of the present invention focused attention on the above-mentioned fact. Since the temperature raised attributable to the irradiation with microwaves is lowered during a period in which the irradiation is turned off or because the temperature is again lowered when the quantity of irradiation is reduced, irregular irradiation with microwaves is expected to prevent boiling of a portion of frozen meat. Since the conventional structure is arranged in such a manner that microwaves are regularly applied, the cycle of the rise and lowering of the temperature is constant from a microscopic view point of a portion of frozen meat. Therefore, the temperature curve finally reaches the regenerative temperature. That is, the envelope curve of the temperature is linearly raised. It leads to a fact that the temperature finally reaches the level higher than the regenerative temperature. If the quantity of microwaves which must be applied is reduced in order to prevent the foregoing fact, the frozen meat cannot sufficiently be defrosted as shown in FIG. 4. Therefore, irradiation with microwaves is performed irregularly so that the upper limit of the envelope curve in made to be a level not higher than the regenerative temperature. Moreover, the lower limit of the same is made to be a level not lower than the melting temperature. To perform the irradiation as described above, time for which microwaves are applied and the quantity of microwaves which must be applied to frozen meat are made to be irregular.

Figure 5:
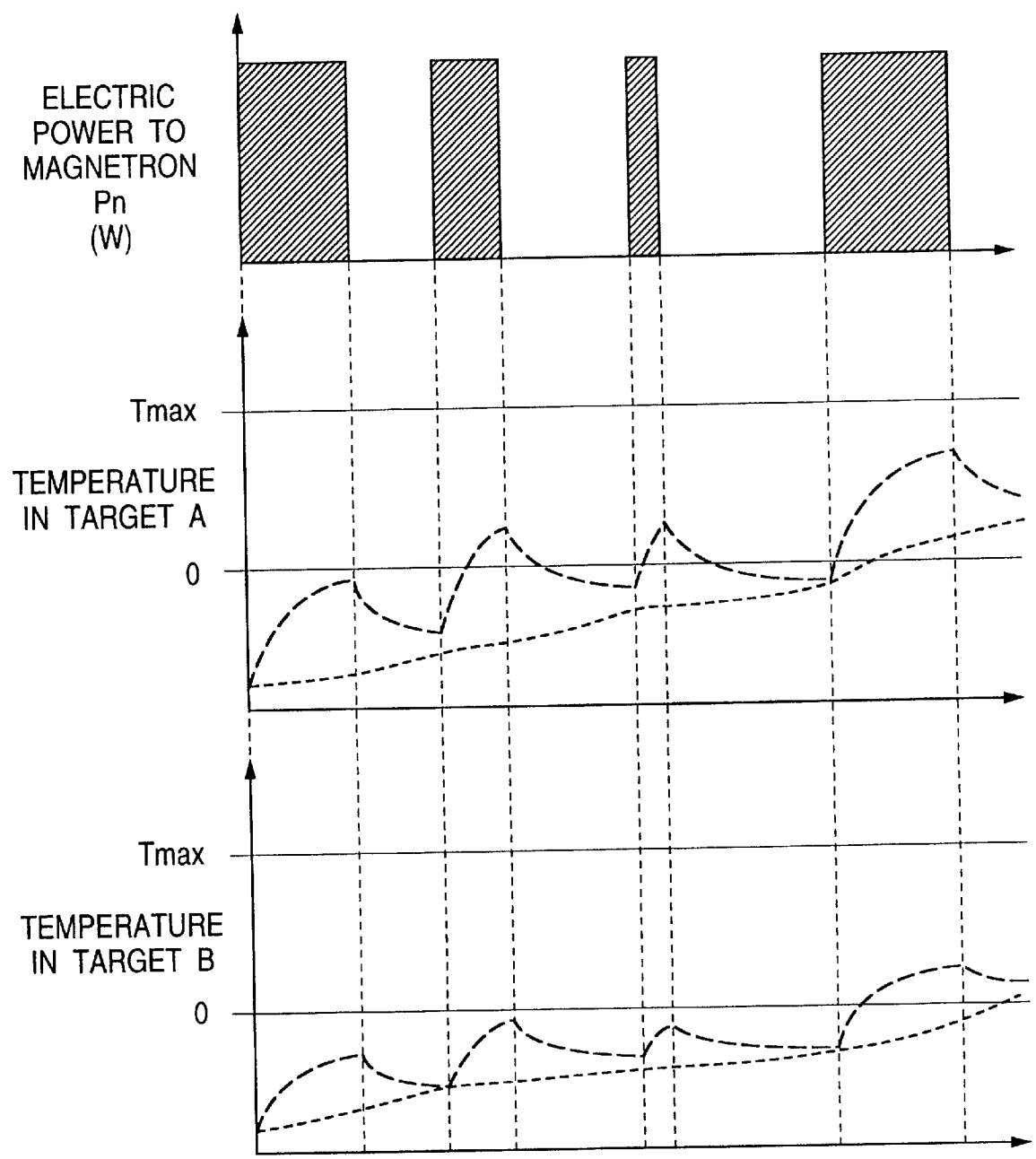
FIG. 5 is a (fourth) graph showing the relationship between electric power which must be supplied to the magnetron and internal temperatures in the targets A and B which must be heated.

Specifically, the temperature of a portion of the frozen meat which has been irradiated with microwaves (at time T) is raised. However, a degree of lowering of the temperature of the above-mentioned portion realized in a next time in which irradiation in turned off is required to be larger than a degree of rise in the temperature realized attributable to a next irradiation operation (at time T+1) to prevent rise of the temperature to a level not higher than the boiling level. The foregoing fact also applied to next time T+2. Thus, the temperature is not regularly raised. That is, the temperature is irregularly raised or lowered. Even if the foregoing change in the temperature is repeated, combination of irradiation with microwaves is determined in such a manner that the temperature of a target which must be heated satisfies the following condition. In the defrosting process, the temperature of the target which must be heated satisfies the range from the temperature suitable for melting the defrosted portion and the upper limit of the temperature for preventing boiling. Moreover, the temperature of the target which must be heated is made to be lower than the above-mentioned highest temperature during the defrosting process. In addition, the target can quickly be defrosted within a predetermined period of time. To achieve the foregoing requirements, methods of irradietion with microwaves are combined and the irradiation is performed in an irregular manner in terms of time. That is, the quantity of microwaves which must be applied in each irradiation operation varies and periods of time for which irradiation is performed vary. The foregoing irradiation methods are combined to effectively defrost a target which must be heated. Restraint, to a predetermined range, is performed, the restraint being restraint of the width between the temperature level to which the target which must be heated is heated with applied microwaves per each operation and the temperature level to which the target is cooled in each time in which irradiation is turned off. Moreover, the irradiating intervals of microwaves are combined with one another in such a manner that the overall upper and lower limits for the temperatures which are raised and lowered are in a predetermined range (in a range between the temperature suitable for melting the target and the temperature for preventing boiling). If a regular quantity of heat is added as has been performed in the conventional method, the temperature of the target which must be heated can easily be raised in accordance with a substantially linear function. Therefore, even if any quantity of heat generated by a heating means which realizes the inclination of a linear function is used, the temperature of the target which must be heated cannot easily be controlled to be in a predetermined temperature range within a predetermined period of time. If signals, which are irregular in terms of time and which follow a non-linear function, are used to realize a state of temperature rise of a target which must be heated in a non-linear form having an upper limit, a target which must be heated can efficiently be heated so as to be defrosted in a short time, the non-linear forming being permitted to a parabola shape, an exponential curve or a curve moved vertically. That is the defrosting process has been performed in such a manner that the heating means is non-linearly controlled when the phase of water in the target which must be heated is converted from a solid body to liquid. Therefore, restraint of the temperature of the target which must be heated to satisfy the range from the melting temperature to the boiling level has been very difficult depending on the type of the target and a state in the heating chamber. On the other hand, the control according to the present invention is performed in such a manner that the temperature of the target is restrained to satisfy a predetermined range within a predetermined time while the quantity of irradiation added in one irradiation process is non-linearly controlled and sometimes the temperature of the target which must be heated is changed. As compared with the conventional method in which the control is performed linearly, a large quantity of microwaves can be applied in a short time as shown in FIG. 5 without a necessity of greatly considering the upper and lower limits of the temperatures of the target determined in accordance with the weight and type of the target. As compared with the conventional defrosting process, the defrosting time can be shortened with performance an well as or better than the performance of the conventional process.

The reason why a target, which must be heated, cannot be irradiated with microwaves which are irregular in terms of time will now be described.

There are two main reasons, one of which lies in a fact that research and development of the irregular signal has not been advanced and the other one of which lies in a lack of communication between engineers for performing experiments for the purpose of obtaining a control sequence for controlling the defrosting process and engineers for analyzing the control system.

The first fact that the research and development of the irregular signal has not been advanced to enable application of the foregoing signal to a defrosting process will now be described.

The inventors have analyzed fluctuations of the temperatures of flames of charcoal which is frequently used in cooking with heat to detect a cause of a fact that flames of charcoal "enable a target to easily and uniformly be heated". As a result, the following facts were found. That is, fluctuations of the temperature of the flame of charcoal are in a chaos state to be described later. A variety of chaos states have been found in the natural world and the chaos states are considered to be a factor realizing conformability And efficiency of the natural phenomena.

The inventors have considered that the overall body of a target which must be cooked can uniformly be heated as can be realized when heating with a flamae of charcoal is performed when the output from a heating portion of a heat cooking apparatus is allowed to fluctuate in accordance with chaos signals. The idea can be confirmed from a variety of experiments. That is, it can be said that the chaos state and the uniformity of temperature distribution in a target which must be heated have a clone relationship.

The application of the foregoing results to the control of the output of microwaves in a microwave oven has enabled the temperature distribution in a target which must be heated to be uniformed As a result of a further analysis of the results, use of irregular signals, which satisfy the above-mentioned condition, to control the output of microwaves, as well as use of the chaos signals, enables a target to be defrosted in such a manner that the temperature distribution of the target is made to be uniform.

Then, description will now be made about the lack of communication between engineers for performing experiments for the purpose of obtaining a control sequence for controlling the defrosting process and engineers for analyzing the control system.

Hitherto, the conventional defrosting sequence to be adapted to a microwaves oven has been determined an follows.

Initially, the engineer for development of cooking methods capable of evaluating a state of defrosting of a target temporarily determine a defrosting sequence with an intuition obtained from experience for a long time. While delicately adjusting the defrosting sequence, the engineer performs a multiplicity of experiments of the defrosting processes in such a manner as to determine a defrosting sequence. To determine the defrosting sequence, the intuition obtainable from experience for a long time and a multiplicity of experiments of the defrosting processes have been required. Therefore, only the defrosting sequences for irradiating targets with regular microwaves have been investigated in order to save labor.

On the other hand, the engineers for developing the system for controlling electronic apparatuses have not investigated the defrosting sequences to be adapted to the microwave ovens.

However, the foregoing research and developed have been performed by the inventor of the present invention in such a manner that both of the engineers for development for cooking methods and engineers for improving the control investigated the defrosting sequence and control. Thus, the conventional defrosting sequence, in which irradiation with regular microwaves is performed, was improved. As a result, a defrosting sequence was found in which irregular irradiation with microwaves is performed.

Second Embodiment

Figure 87:
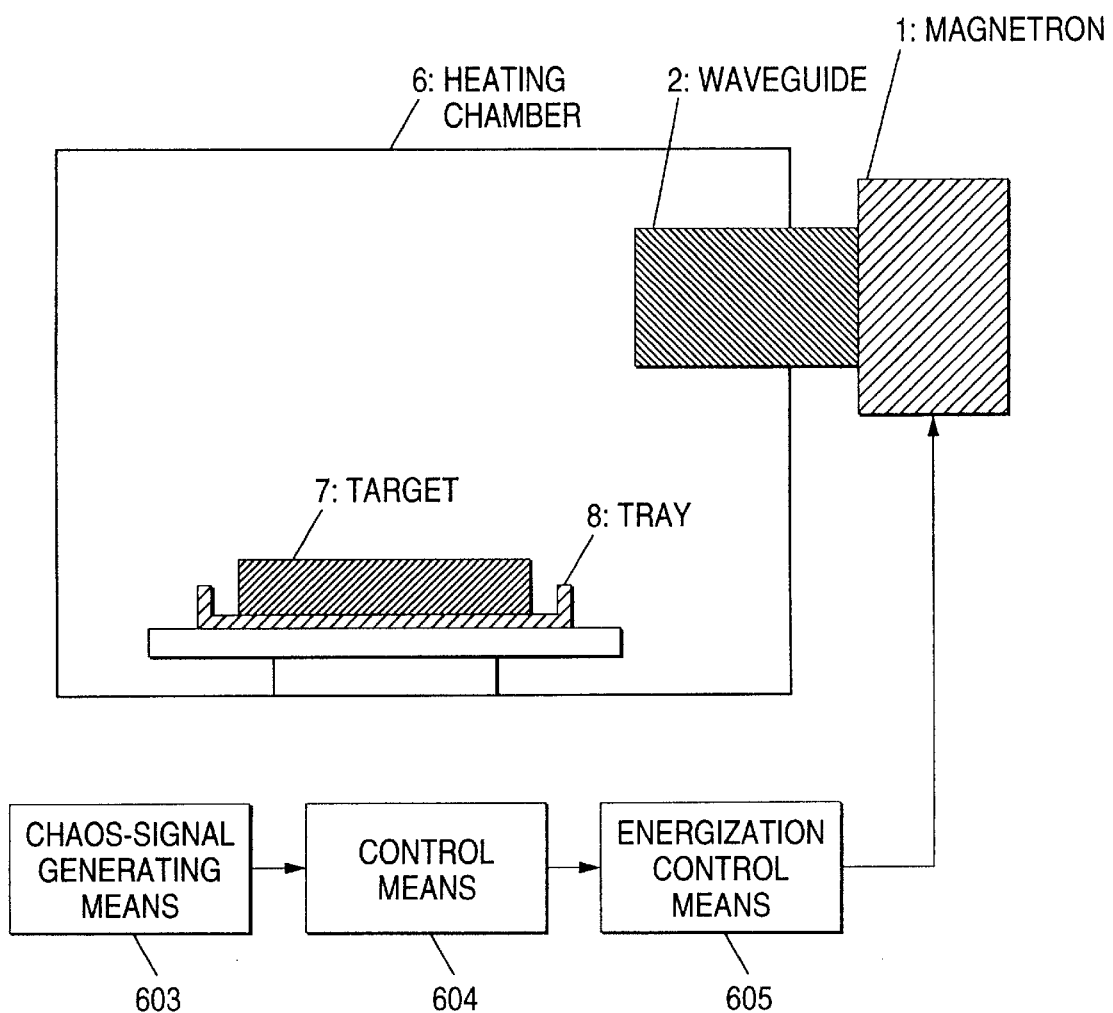
FIG. 87 is a block diagram showing a microwave oven according to a second embodiment of the present invention.

Referring to FIG. 87, reference numeral 1 represents a magnetron. When electric power is supplied to the magnetron, the magnetron emits microwaves having a frequency of thousands of MHz. Microwaves output from the magnstron 1 propagate through a waveguide 2 so that the inside portion of a heating chamber is irradiated with the microwaves. The microwaves with which the inside portion of the heating chamber has been irradiated heat a target 7 which must be heated by dielectric heating.

Reference numeral 603 represents a chaos-signal generating means for calculating a chaos signal so as to output the value of the chaos signal.

In accordance with the chaos signal generated by the chaos-signal generating means 603, a control means 604 transmits a control signal for changing electric power which must be supplied to the magnetron.

An energization control means 604 generates high voltage which must be supplied to the magnetron 1, and adjusts electric power which must be supplied to the magnetron 160 in accordance with the control signal transmitted by the control means 604.

Figure 88:
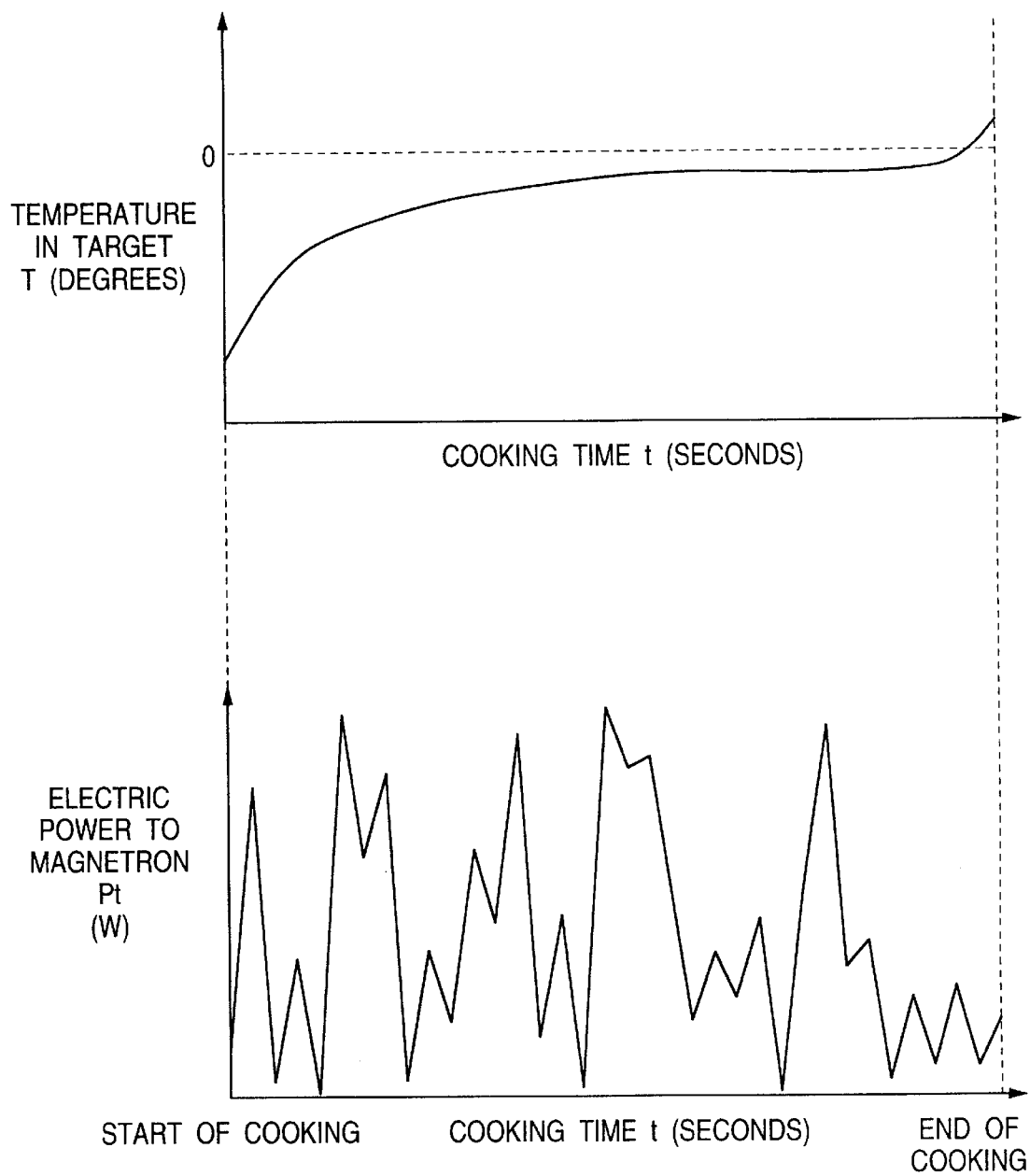
FIG. 88 is a graph showing the relationship between electric power which must be supplied to the magnetron and temperatures in a target which must be heated.

Initially, a defrosting process of the microwave oven using the chaos signal will now be described with reference to FIG. 88.

When a target frozen in a freezing chamber of a freezer is dielectrically heated, the overall body of the target which must be heated in in a state of ice. Therefore, the temperature of the target which must be heated is uniformly raised without any nonuniformity of temperatures. When the temperature of the target which must be heated has been raised to a level near zero degree which is the phase changing level at which ice is changed to water, heat applied to the target which must be heated is used as heat of melting. Therefore, the temperatures in the target which must be heated are substantially uniformed. If the temperature of the target which must be heated exceeds zero degree, the phase change is completed and thus the temperature of the target is raised.

The easiness for ice to be heated and that for water to be heated are considerably different from each other when dielectric heating is performed. Water can easily be heated by thousands of times as compared with ice. If a portion of a target which must be heated is defrosted in the defrosting process of a microwave oven and the other frozen portions are remained, the portion, which has first been defrosted, is heated rapidly. As a result, a portion of the target which must be heated has been boiled, while the other frozen portions are maintained, if the worst happens.

When the dielectric heating in accordance with the chaos signal is performed, heat generated by microwaves is agitated in the overall body of the target which must be heated attributable to the baker's tcansforation effect. Thus, temperatures can uniformly be distributed in the target which must be heated. As a result, ice in the target which must be heated can simultaneously be changed to water. Thus, temperatures can uniformly be distributed in the target which must be heated. Although the conventional microwave oven is arranged to perform the defrosting process by using a DUTY signal having a long off-time, the dielectric heating operation in accordance with the chaos signal enables average electric power to be enlarged. Thus, the defrosting time can be shortened.

The operation of the second embodiment having the above-mentioned structure will now be described.

Figure 89:
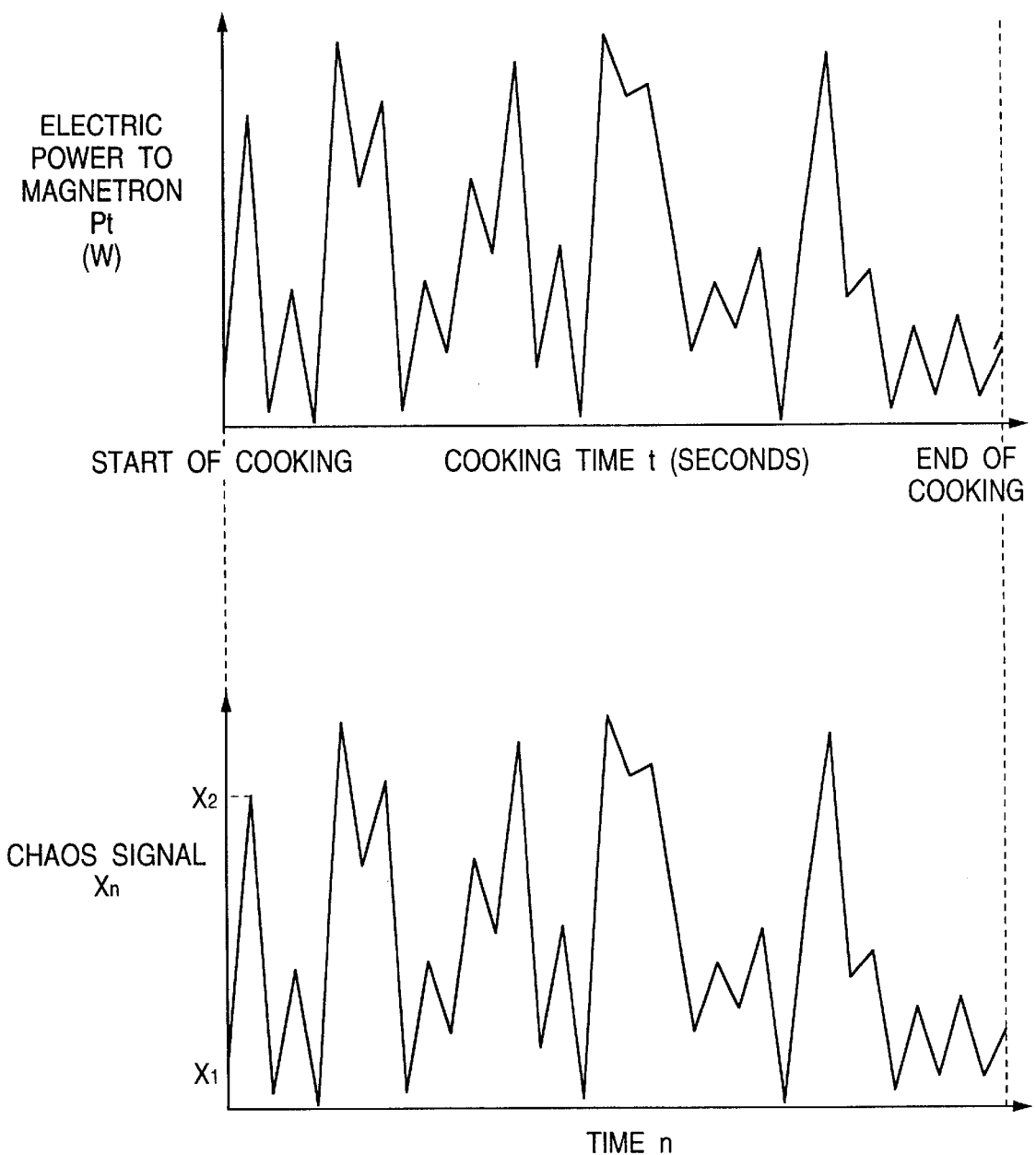
FIG. 89 is a graph showing the relationship between chaos signals and electric power which must be supplied to the magnetron.

The operation of the control means 604 will now be described with reference to FIG. 89. FIG. 89 is a graph showing the relationship between chaos signal Xn generated by the chaos-signal generating means 603 and electric power Pn which must be supplied to the magnetron 1.

When the defrosting process has been started, the control means 604 initially reads first chaos signal X1 and transmits a control signal to the energization control means 605 in such a manner that electric power Pt which corresponds to the read chaos signal X1 and which satisfies, for example, Pt=Xn * P0 is supplied to the magnetron. Then, the control means 604 reads a second chaos signal X2, and then performs a similar process so as to transmit a control signal. The control means 604 generates control signals from the chaos signals Xn until the defrosting process is completed. When the defrosting process has been completed, the control means 604 completes the process thereof.

The operation of the chaos-signal generating means 603 will now be described. An example of a function for generating the chaos signal is as follows:

$$F(X)=1-|2X-1|$$

where $$0 \leq X \leq 1.$$

Figure 90:
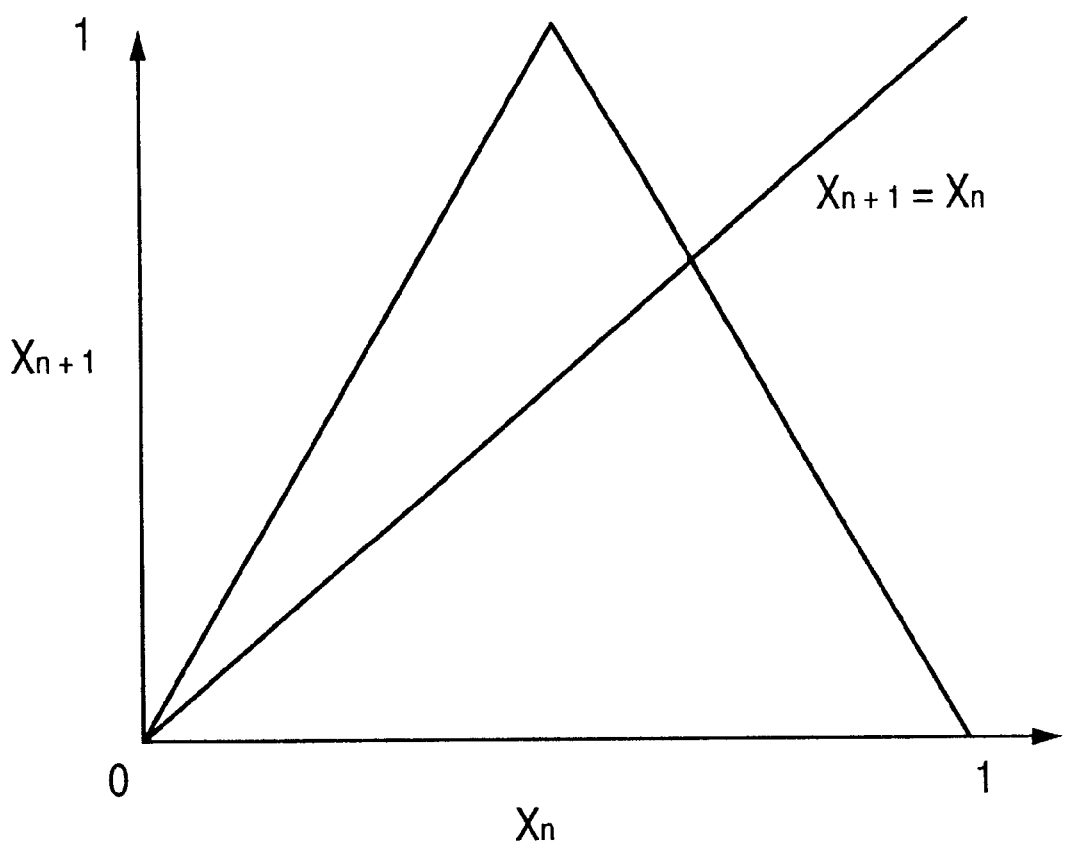
FIG. 90 shows an example of an equation for generating chaos signals.

The foregoing function is graphed as shown in FIG. 90.

A method of generating the chaos signal Xn by using the function F (X) will now be described. An assumption is made that a first value of the time sequence Xn is X0 and the value is an initial value of the time sequence Xn. Then, K0 is substituted into F (X). A result of the calculation is employed as a (n=1)-th value X1. Then, X1 is substituted into F (X) to calculate X2. Then, X3 is obtained from X2.

Figure 91:
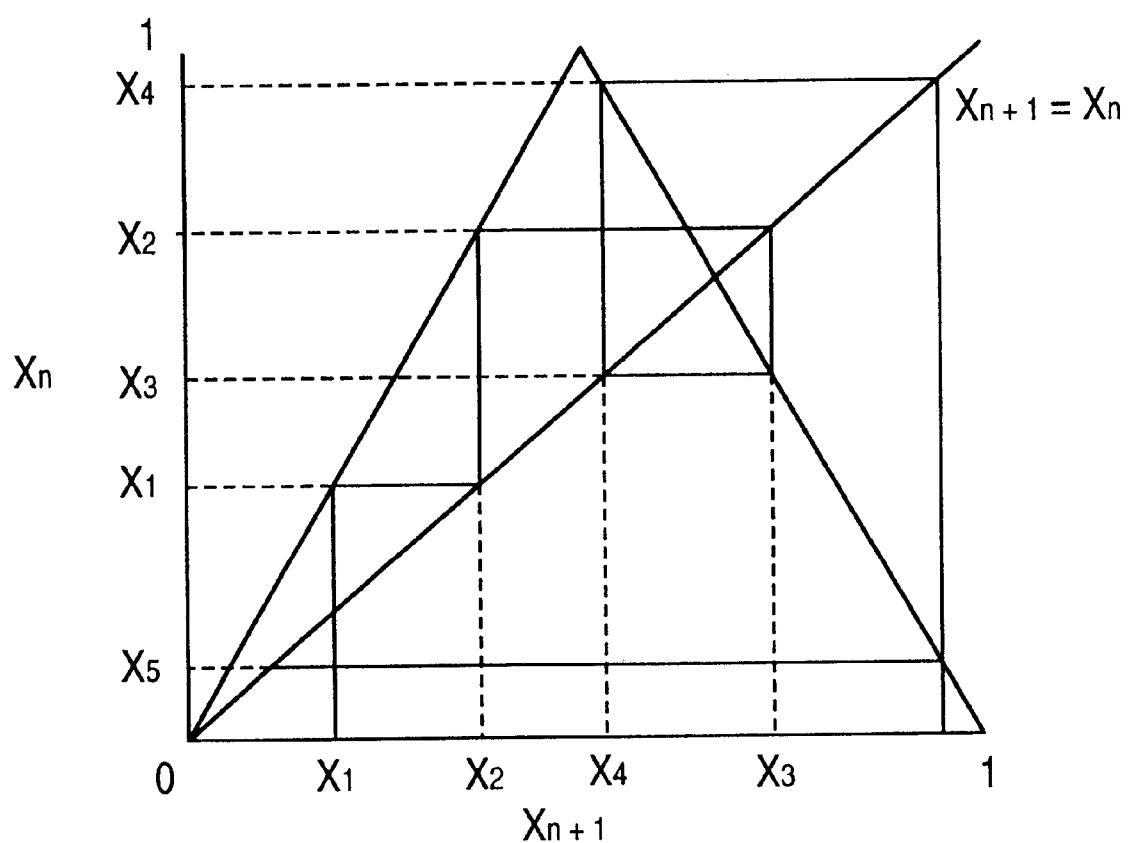
FIG. 91 shows a method of calculating chaos signals.

The foregoing procedure is repeated so that time sequence X0, X1, X2, . . . , Xn in obtained (see FIG. 91).

Although the chaos-signal generating means 603 uses the function F (X), a variety of functions including a logistic function and a henon function are capable of generating the chaos signal. In any case, the effect of the chaos signal is the same.

Figure 92:
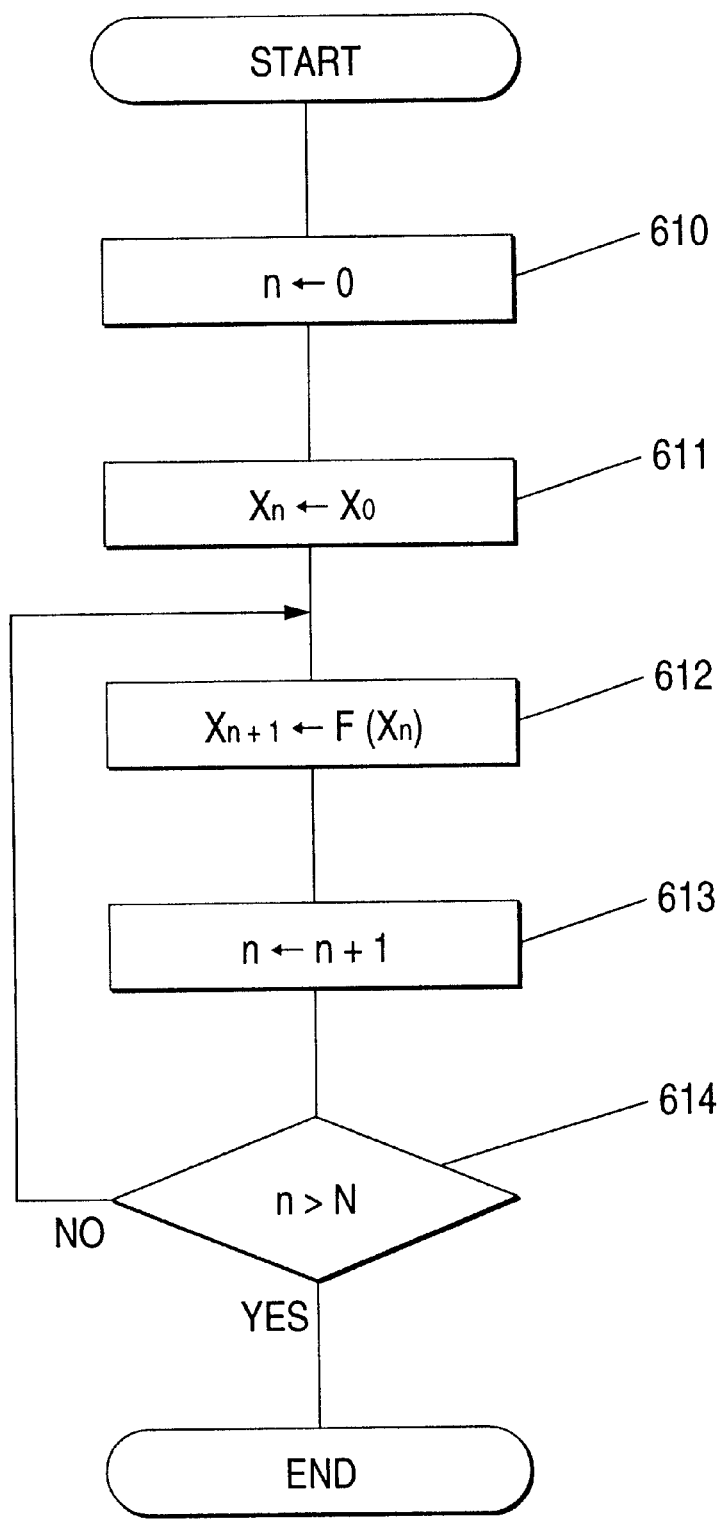
FIG. 92 is a flow chart for the chaos-signal generating means.

The operation of the algorithm of the chaos-signal generating means 603 will now be described with reference to FIG. 92. Initially, an assumption is made that a parameter indicating time is n=0 and the initial value of the chaos function P (Xn) is X0 (steps 610 to 611).

Then, F (Xn) is calculated, and then a result of this is substituted for Xn+1 which is an n+1 th value. A result of the substitution is stored (step 612). Then, 1 is added to n (step 613), and then value n and parameter N indicating the number of required chaos time sequences are subjected to a comparison (step 614). If n is smaller than N, steps 612 to 614 are repeated. If n reaches N, the program is ended.

The structure and operation of the second embodiment shown in FIG. 87 are arranged in such a manner that electric power which must be supplied to the magnetron is adjusted in accordance with the chaos signal having the baker's transformation effect. Thus, heat generated by the microwaves can uniformly be dispersed in the target which must be heated. As a result, a degree of nonuniformity of temperatures in the target which must be heated can be reduced and, thus, temperatures can satisfactorily be distributed during the defrosting process. Since average electric power which must be supplied to the magnetron can be enlarged as compared with the conventional structure, the time required to defrost a target can be shortened.

Third Embodiment

A third embodiment of the present invention will now be described.

Initially, referring to FIG. 6, an example of the third embodiment will now be described.

Figure 6:
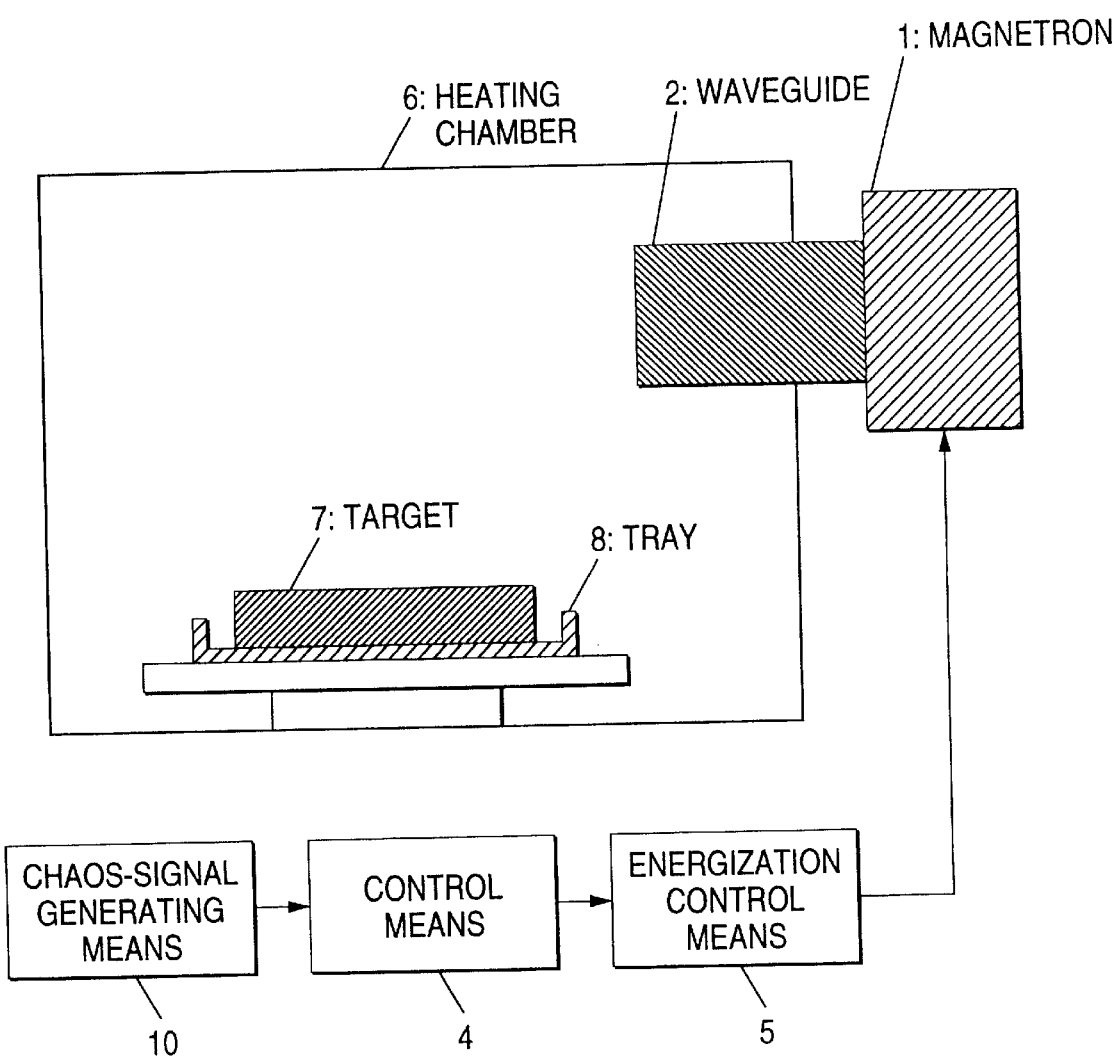
FIG. 6 is a block diagram showing a microwave oven according to a third embodiment of the present invention.

Referring to FIG. 6, reference numeral 1 represents a magnetron. When electric power is supplied to the magnetron 1, the magnetron 1 emits microwaves having a frequency of thousands of MHz.

Microwaves emitted from the magnetron 1 propagate through a waveguide 2 so that the inside portion of the heating chamber 6 is irradiated with the microwaves. The microwaves with which the inside portion of the heating chamber 6 have been irradiated heat a target 7 which must be heated by dielectric heating.

Reference numeral 10 represents a chaos-signal generating means for calculating a chaos signal so as to transmit the value of the chaos signal. In accordance with the chaos signal generated by the chaos-signal generating means 10, the control means 4 transmits a control signal for changing electric power which must be supplied to the magnetron.

An energization control means 5 generates high voltage which must be supplied to the magnetron 1, and adjusts electric power which must be supplied to the magnetron 1 in accordance with the control signal transmitted by the control means 4.

A defrosting process of the microwave oven using the chaos signal will now be described with reference to FIG. 2. When a target frozen in a freezing chamber of a freezer is dielectrically heated the overall body of the target which must be heated is in a state of ice. Therefore, the temperature of the target which must be heated in uniformly raised without any nonuniformity of temperatures* When the temperature of the target which must be heated has been raised to a level near zero degree which is the phase changing level at which ice is changed to water, heat applied to the target which must be heated is used as heat of melting. Therefore, the temperatures in the target which must be heated are substantially uniformed. If the temperature of the target which must be heated exceeds zero degree, the phase change is completed and thus the temperature of the target is raised.

The easiness for ice to be heated and that for water to be heated are considerably different from each other when dielectric heating is performed. Water can easily be heated by thousands of times as compared with ice. If a portion of a target which must be heated is defrosted in the defrosting process of a microwave oven and the other frozen portions are remained, the portion, which has first been defrosted, is heated rapidly. As a result, a portion of the target which must be heated has been boiled, while the other frozen portions are maintained, if the worst happens.

Figure 7:
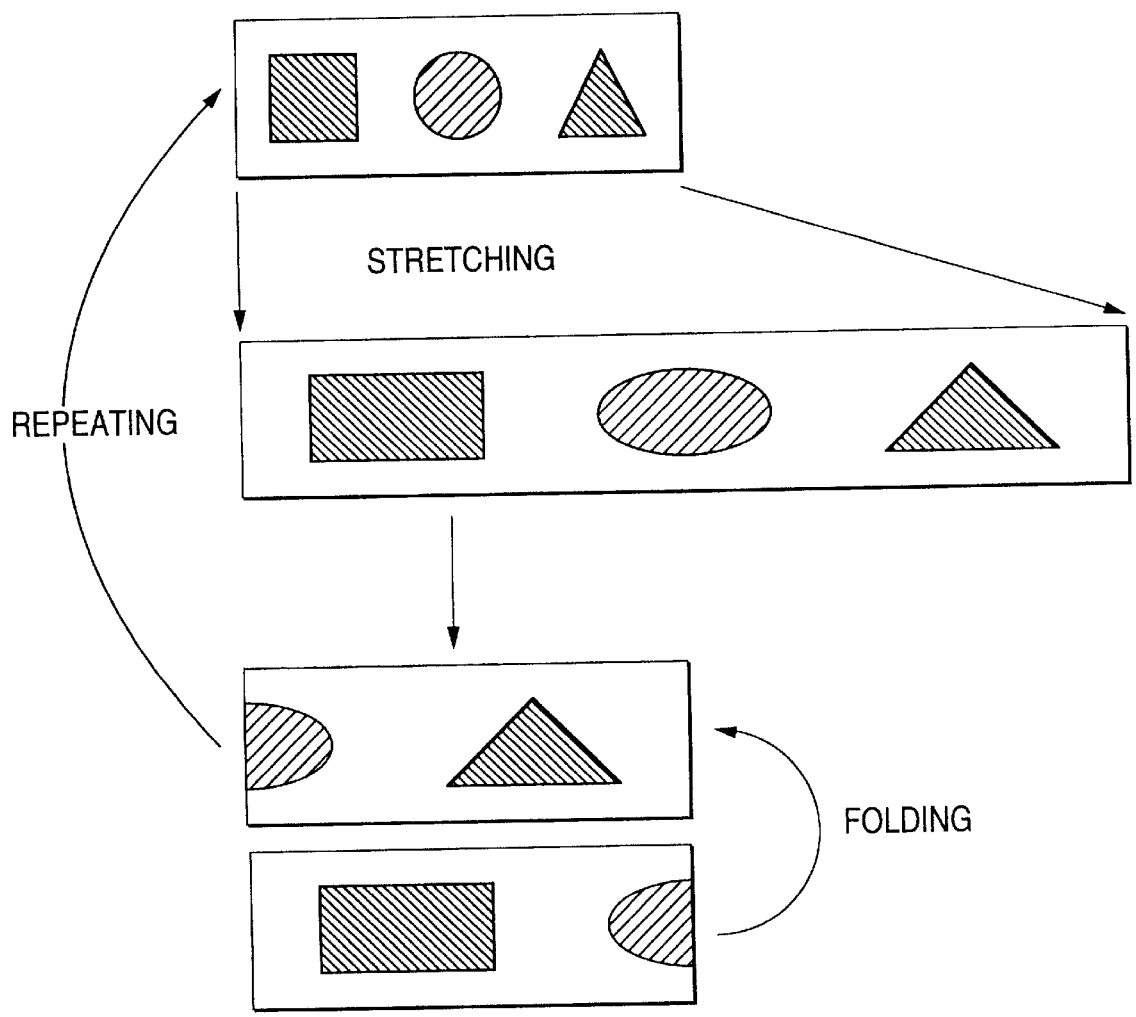
FIG. 7 is a diagram for explaining a baker's transformation effect of chaos signals.

The baker's transformation effect of the chaos signal will now be described with reference to FIG. 7. As shown in FIG. 7, the baker's transformation effect is an effect obtainable when two operations, which are stretching operations and folding operation, alternately appear. When the baker's transformation effect is used, the regions given square, circle and triangle marks can uniformly be mixed. In this embodiment, the baker's transformation effect of the chaos signal is used to uniform the temperatures in the target which must be heated.

When the dielectric heating in accordance with the chaos signal having the above-mentioned characteristic is performed, heat generated by microwaves is agitated in the overall body of the target which must be heated attributable to the baker's transformation effect. Thus, temperatures can uniformly be distributed in the target which must be heated. As a result, ice in the target which must be heated can simultaneously be changed to water. Thus, temperatures can uniformly be distributed in the target which must be heated. Although the conventional microwave oven is arranged to perform the defrosting process by using a DUTY signal having a long off-time, the dielectric heating operation in accordance with the chaos signal enables average electric power to be enlarged. Thus, the defrosting time can be shortened.

The operation of the components of the third embodiment having the above-mentioned structure will now be described.

Figure 8:
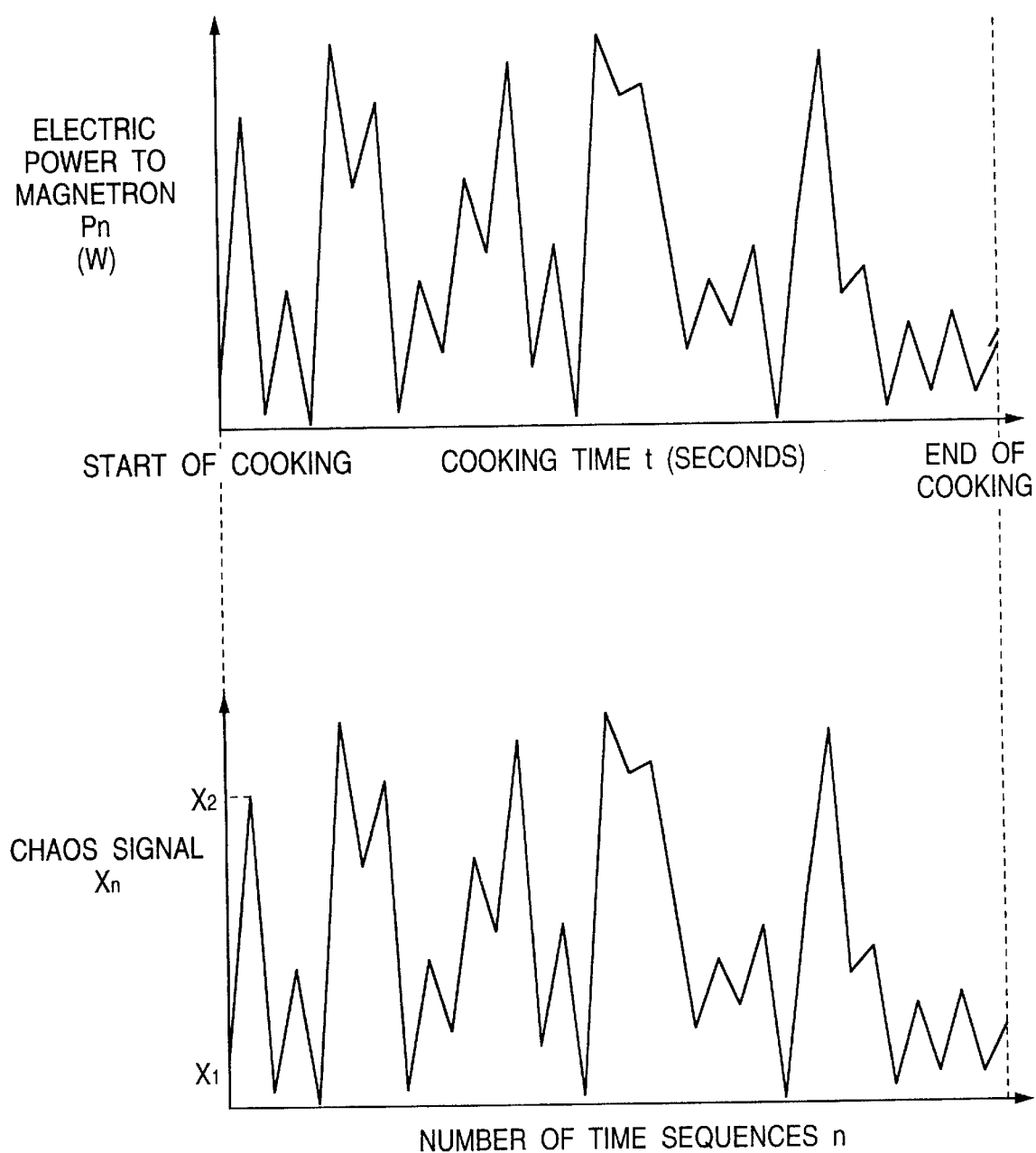
FIG. 8 is a graph showing the relationship between chaos signals and electric power which must be supplied to the magnetron.

The operation of the control means 4 will now be described with reference to FIG. 8. FIG. 8 is a graph showing the relationship between chaos signal Xn generated by the chaos-signal generating means 3 and electric power Pt which must be supplied to the magnetron 1.

When the defrosting process has been etarted, the control means 4 initially reads first chaos signal X1 and transmits a control signal to the energization control means 5 in such a manner that electric power Pt which corresponds to the read chaos signal X1 and which satisfies, for example, Pt=Xn * P0 is supplied to the magnetron. Then, the control means 4 reads a second chaos signal X2, and then performs a similar process so as to transmit a control signal. The control means 4 generates control signals from the chaos signals Xn until the defrosting process is completed. When the defrosting process has been completed, the control means 604 completes the process thereof.

The operation of the chaos-signal generating means 3 will now be described. An example of a function for generating the chaos signal is as follows:

$$F(X)=1-|2X-1|$$

where $$0 \leq X \leq 1.$$

Figure 9:
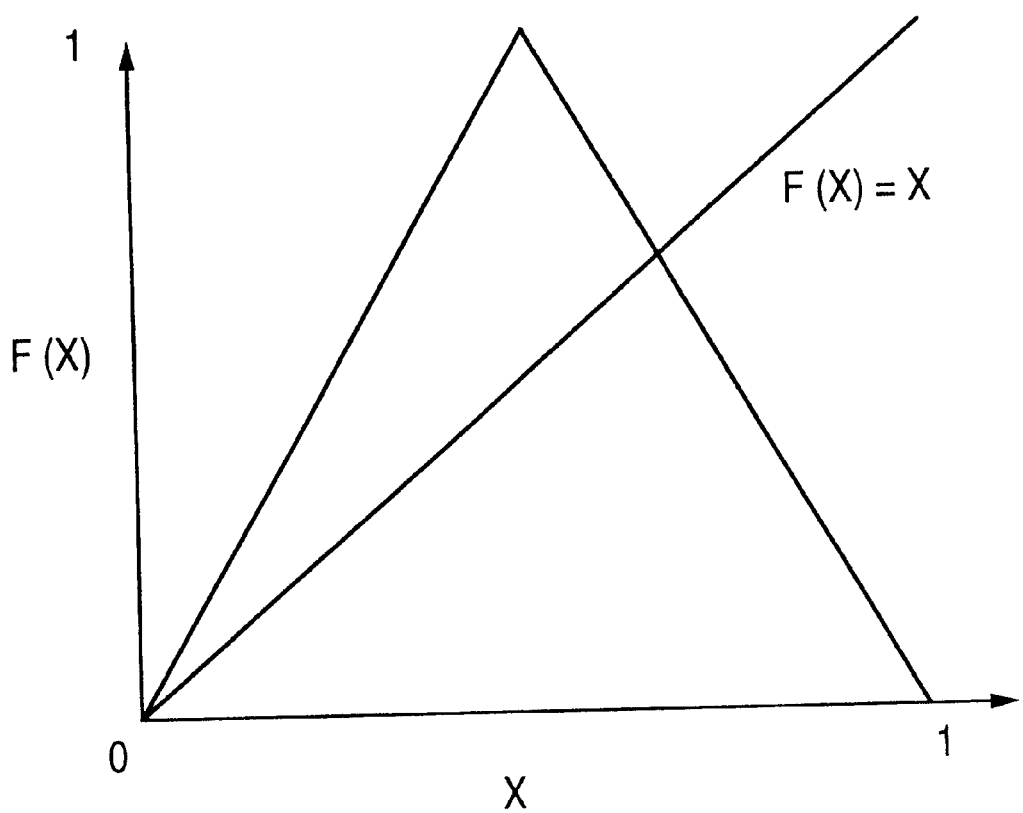
FIG. 9 shows an example of an equation for generating chaos signals.

The foregoing function is graphed as shown in FIG. 9.

A method of generating the chaos signals Xn by using the function F (X) will now be described. An assumption is made that a first value of the time sequence Xn is X0 hand the value is an initial value of the time sequence Xn. Then, X0 is substituted into F (X). A result of the calculation is employed as a (n=1)-th value X1. Then, X1 is substituted into F (X) to calculate X2. Then, X3 is obtained from X2. The foregoing procedure is repeated so that time sequence X0, X1, X2, . . . , Xn is obtained (see FIG. 10).

Although the chaos-signal generating means 10 uses the function F (X), a variety of functions including a logistic function and a henon function are capable of generating the chaos signal. In any case, the effect of the chaos signal is the same.

Figure 11:
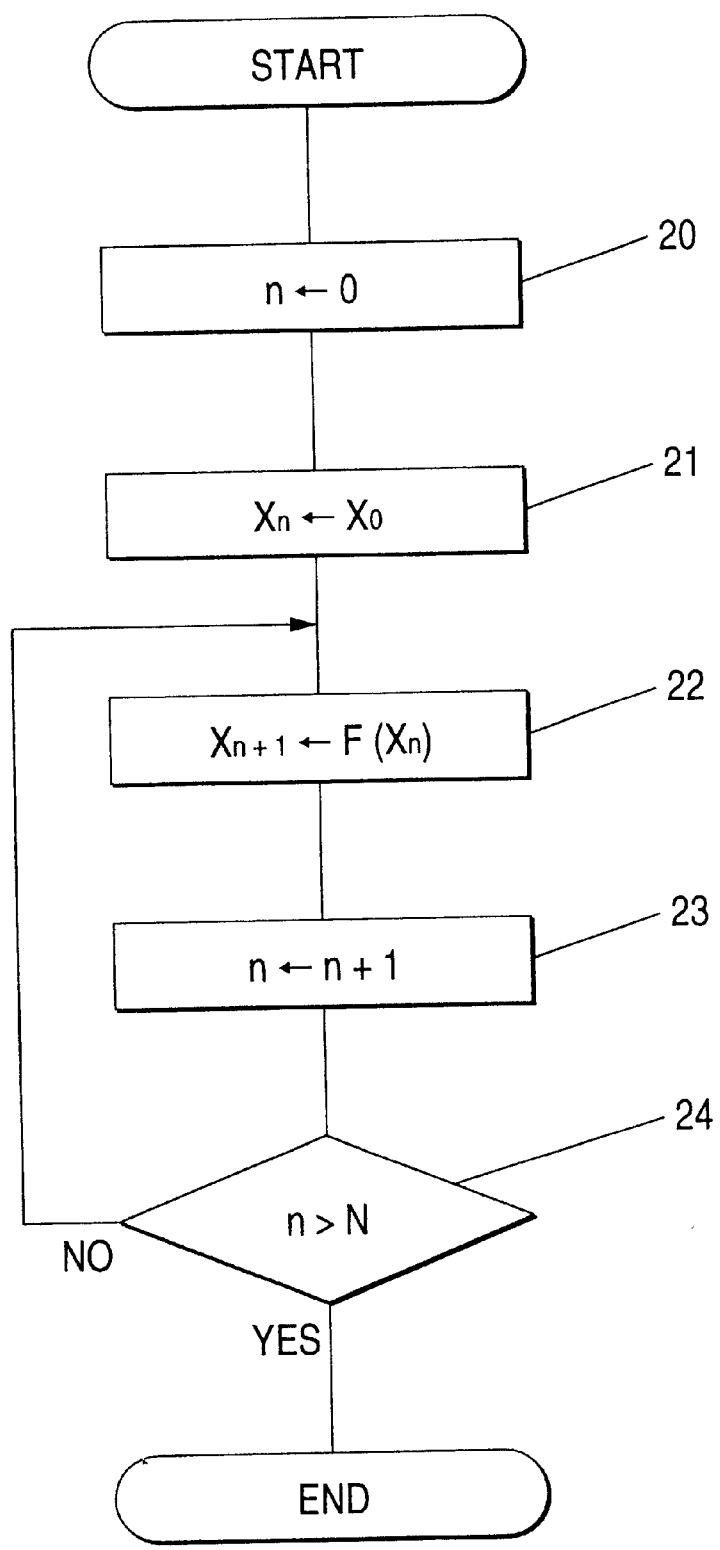
FIG. 11 is a flow chart showing a chaos-signal generating means.

The operation of the algorithm of the chaos-signal generating means 10 will now be described with reference to FIG. 11. Initially, an assumption is made that a parameter indicating time is n=0 and the initial value of the chaos function P (Xn) in X0 (steps 20 to 21).

Then, F (Xn) is calculated and then a result of this is substituted for Xn+1 which in an n+1 th value. A result of the substitution is stored (step 22). Then, 1 is added to n (step 23), and then value n and parameter N indicating the number of required chaos time sequences are subjected to a comparison (step 24). If n is smaller than N. steps 22 to 24 are repeated. If n reaches N, the program is ended.

The third embodiment has the structure that a target which must be heated in irradiated with microwaves which are irregular in terms of time and which are in a chaos state at least when the phase of water in the target is shifted from a solid body to liquid. The structure and operation of the third embodiment, having the structure that electric power which must be supplied to the magnetron is adjusted in accordance with the chaos signal having the baker's transformation effect, cause heat generated by the microwaves to uniformly dispersed in the target which must be heated. As a result, uniformity of temperatures in the target which must be heated can be prevented. Since the average electric power can be enlarged as compared with the conventional method, time required to defrost a target can be shortened.

Fourth Embodiment

The structure and operation of the fourth embodiment will now be described. The fourth embodiment is different from the second embodiment in that a lower limit is provided for the output of microwave. The structure and operation of the fourth embodiment which are different from those of the second embodiment will mainly be described. The other structures and operations are the same as those of the second embodiment.

Figure 72:
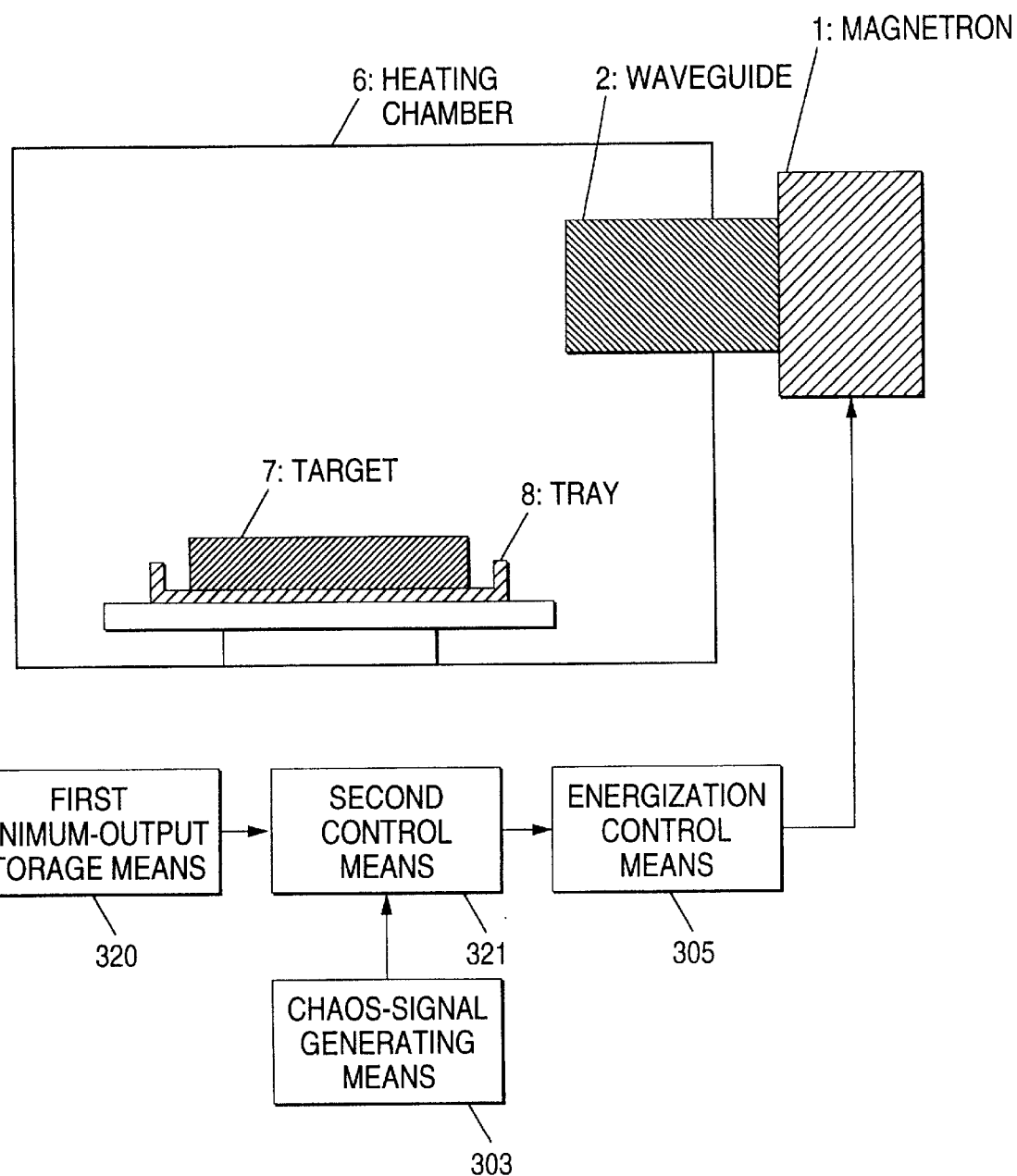
FIG. 72 is a block diagram showing a microwave oven according to a fourth embodiment of the present invention.

Referring to FIG. 72, reference numeral 320 represents a first lowest-output storage means on which a lowest output of microwaves is stored. In accordance with a chaos signal generated by the chaos-signal generating means 3 and the lowest output stored on the first lowest-output storage means 320, a second control means 321 determines electric power which must be supplied to the magnetron, and then transmits a second control signal to an energization control means.

The operation of the fourth embodiment will now be described.

Figure 73:
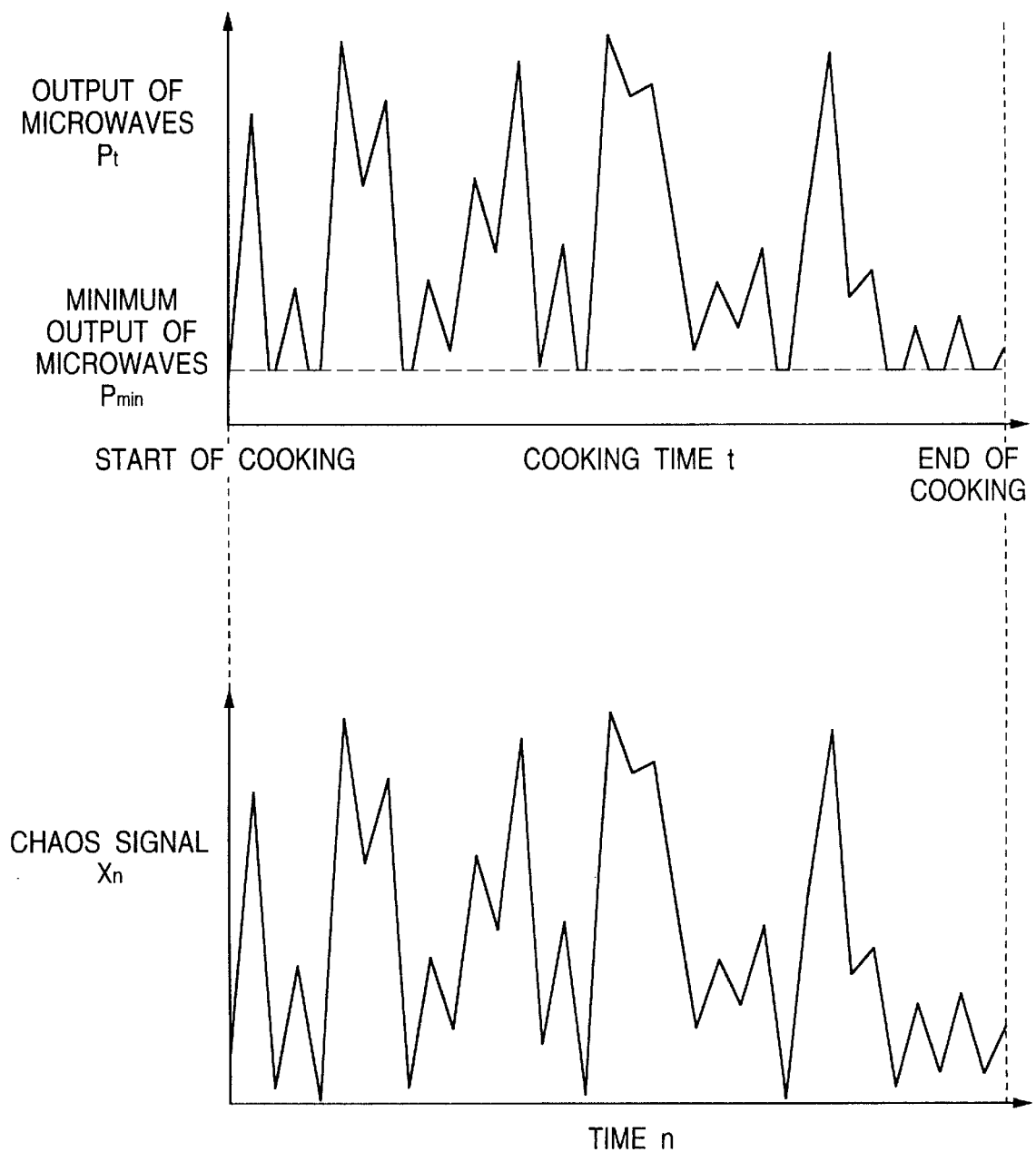
FIG. 73 is a graph showing the relationship between chaos signals and outputs of microwaves.

Referring to FIG. 73, an example of the operation of the first lowest-output stdrage means 320 will now be described. When the output Pt of microwaves which is determined in accordance with the chaos signal Xn is lower than lowest output Pmin of microwaves, the second control means 320 makes the output of microwaves to be lowest output Pmin. In other case, the second control means 321 transmits output Pt of microwaves which is determined in accordance with the chaos signal.

The structure and operation of the fourth embodiment, having the lowest output of microwaves, enable microwaves required for the cooking operation using heat. As a result, the time required to defrost a target can furthermore be shortened.

Fifth Embodiment

A fifth embodiment of the present invention will now be described.

The fifth embodiment comprises a magnetron for generating microwaves for dielectrically heating a target which must be heated; and a waveguide through which microwaves generated by the magnetron are propagated into a heating chamber, wherein a defrosting process is performed in such a manner that microwaves which are irregular in terms of time and which are in a chaos state are propagated through the waveguide at least when the phase of water in the target is shifted from a solid body to liquid.

The structure of the fifth embodiment will now be described with reference to FIG. 12.

Figure 12:
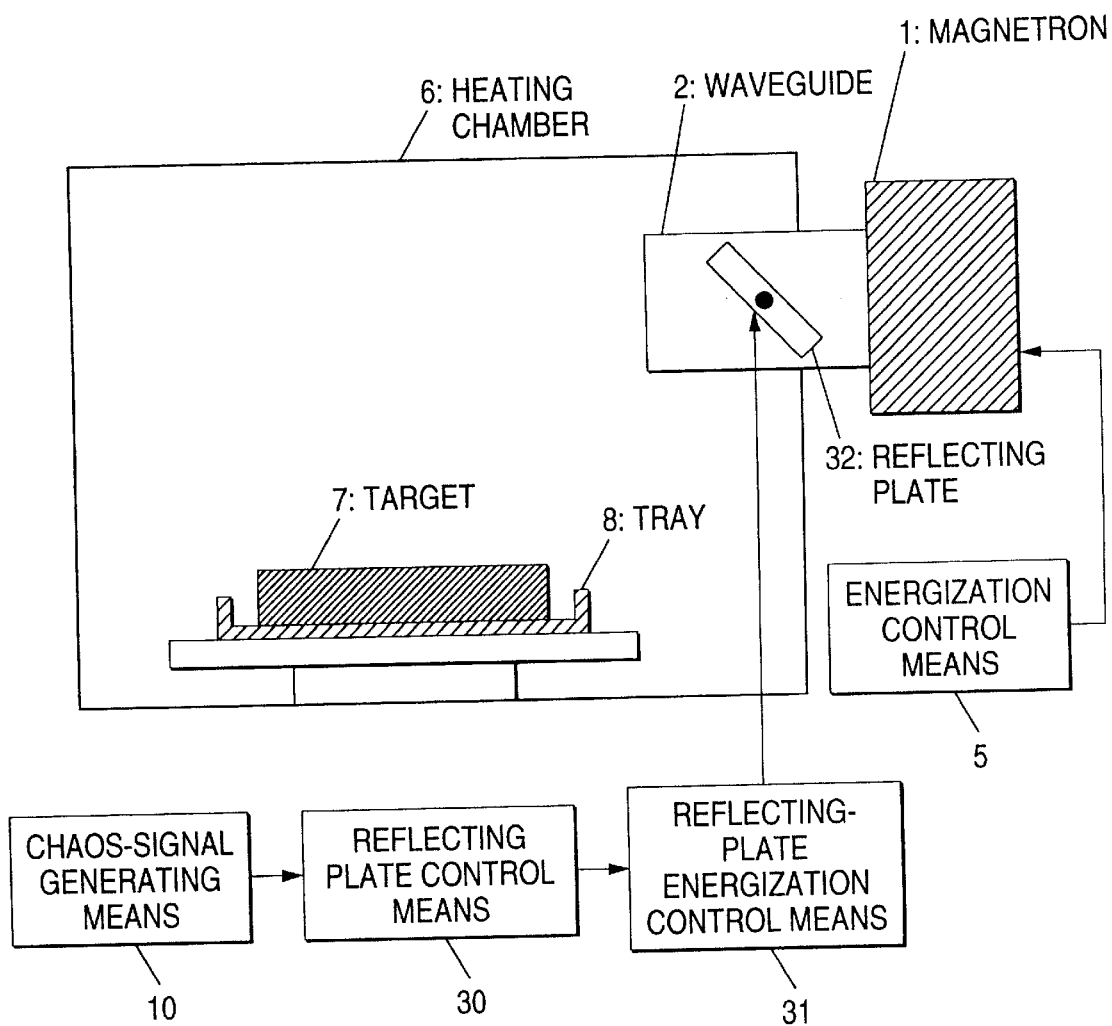
FIG. 12 is a block diagram showing a microwave oven according to a fifth embodiment of the present invention.

Referring to FIG. 12, reference numeral 1 represents a magnetron. When electric power is supplied to the magnetron if the magnetron 1 emits microwaves having a frequency of thousands of MHz. Microwaves emitted from the magnetron 1 propagate through a waveguide 2 so that the inside portion of the heating chamber 6 is irradiated with the microwaves. The microwaves with which the inside portion of the heating chamber 6 have been irradiated heat a target 7 which must be heated by dielectric heating.

An energization control means 5 generates high voltage which must be supplied to the magnetron 1, and supplies electric power to the magnetron 1.

Reference numeral 33 represents a reflecting plate. When an angle made from the waveguide 2 is changed, the quantity of microwaves applied through the waveguide 2 is adjusted.

Reference numeral 10 represents a chaos-signal generating means which calculates a chaos signal to transmit the chaos signal.

A reflecting-plate control means 30 transmits a control signal for adjusting the quantity of microwaves applied through the wavegulde 2 in accordance with the chaos signal calculated by the chaos-signal generating means 10.

A reflecting-plate energization control means 31 follows the control signal transmitted by the reflecting-plate control means 30 to control the angle of the reflecting plate 32.

The operation of the fifth embodiment will now be described.

Figure 13:
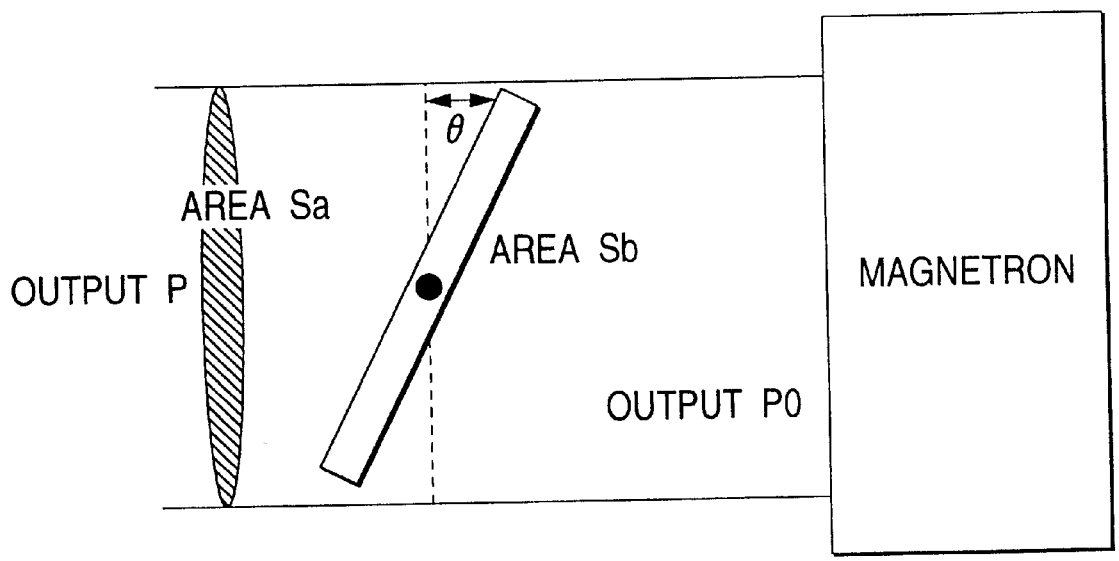
FIG. 13 is a diagram showing the structure of a waveguide including a reflecting plate.

Referring to FIG. 13, the relationship between the angles between the reflecting plate 32 and the waveguide 2 and the quantities of microwaves emitted through the waveguide 2 will now be described.

As shown in FIG. 13, an assumption is made that the angle made between the reflecting plate 32 and the waveguide 2 is θ and the quantity of microwaves emitted by the magnetron 1 is P0. Another assumption is made that the cross sectional area of the waveguide 2 is Sa and the area of the reflecting plate 32 im Sb.

When the angle made between the reflecting plate 32 and the waveguide 2 is θ, an area Sc of the reflecting plate disposed in the horizontal direction with respect to the waveguide 2 is obtained as follows:

$$Sc=Sb \cdot \cos \theta$$

Since the quantity P of microwaves which are emitted from the waveguide 1 is in proportion to a value obtained by subtracting the area Sc of the reflecting plate in the horizontal direction from the area Sb of the waveguide 2, the quantity P of microwaves is obtained as follows:

$$P=P0 \cdot (Sa-Sc)/Sa$$

Therefore, the quantity P of microwaves emitted through the waveguide 2 is obtained as follows:

$$P=P0 \cdot (1-Sb \cdot \cos \theta/Sa)$$

Figure 14:
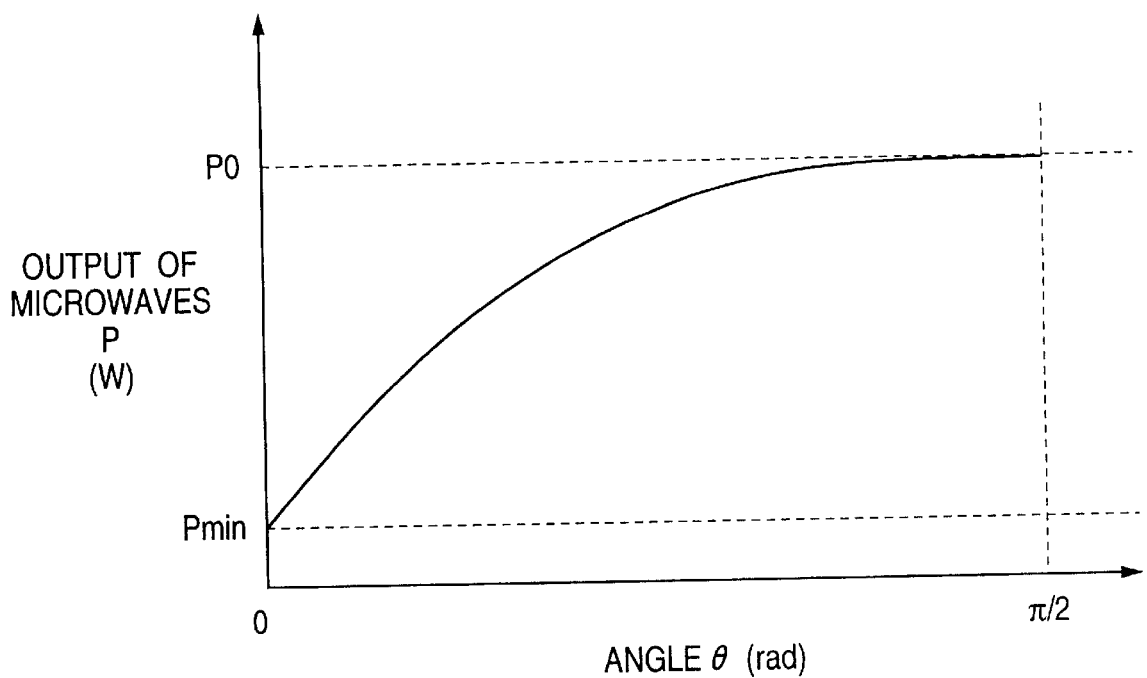
FIG. 14 is a graph showing the relationship between angles of the reflecting plate and quantities of outputs of waves from the waveguide.

FIG. 14 is a graph showing the angle θ and the quantity P of microwaves emitted through the waveguide 2. Note that Pmin is (1−Sb/Sa).

To cause the quantity of microwaves which must be emitted through the waveguide 1 to be changed in accordance with the chaos signal calculated by the chaos-signal generating means 10, the reflecting-plate control means 30 calculates the angle of the reflecting plate 32 in accordance with the above-mentioned equation to transmit a result of the calculation to the reflecting-plate onergization control means 31.

Although the above-mentioned method uses the reflecting plate 32 to adjust the quantity of microwaves which must be emitted through the waveguide 2, other methods exist which are capable of adjusting the quantity of microwaves which must be emitted through the waveguide 2. If the other method is employed, a similar effect to that obtainable when the reflecting plate is employed can be obtained.

The fifth embodiment comprises the magnetron for generating microwaves for dielectrically heating a target which must be heated; and the waveguide through which microwaves generated by the magnetron are propagated into the heating chamber, wherein the defrosting process is performed in such a manner that microwaves which are irregular in terms of time and which are in a chaos state are propagated through the waveguide at least when the phase of water in the target is shifted from a solid body to liquid. The structure and operation of the fifth embodiment enable the quantity of microwaves to be brought to the chaos state by simply changing the microwave oven. Therefore, only a simple structure is required to shorten time required to defrost a target. As a result, the temperature distribution in the defrosted target can be improved.

Sixth Embodiment

A sixth embodiment will now be described.

In addition to the structure according to the third embodiment, the sixth embodiment has a structure that microwaves are emitted in accordance with DUTY-output having on- and off-time in accordance with chaos signals generated by the chaos-signal generating mcans. The structure and operation of the sixth embodiment which are different from those of the third embodiment will mainly be described. The other structures and operations are the same an those of the third embodiment.

Figure 15:
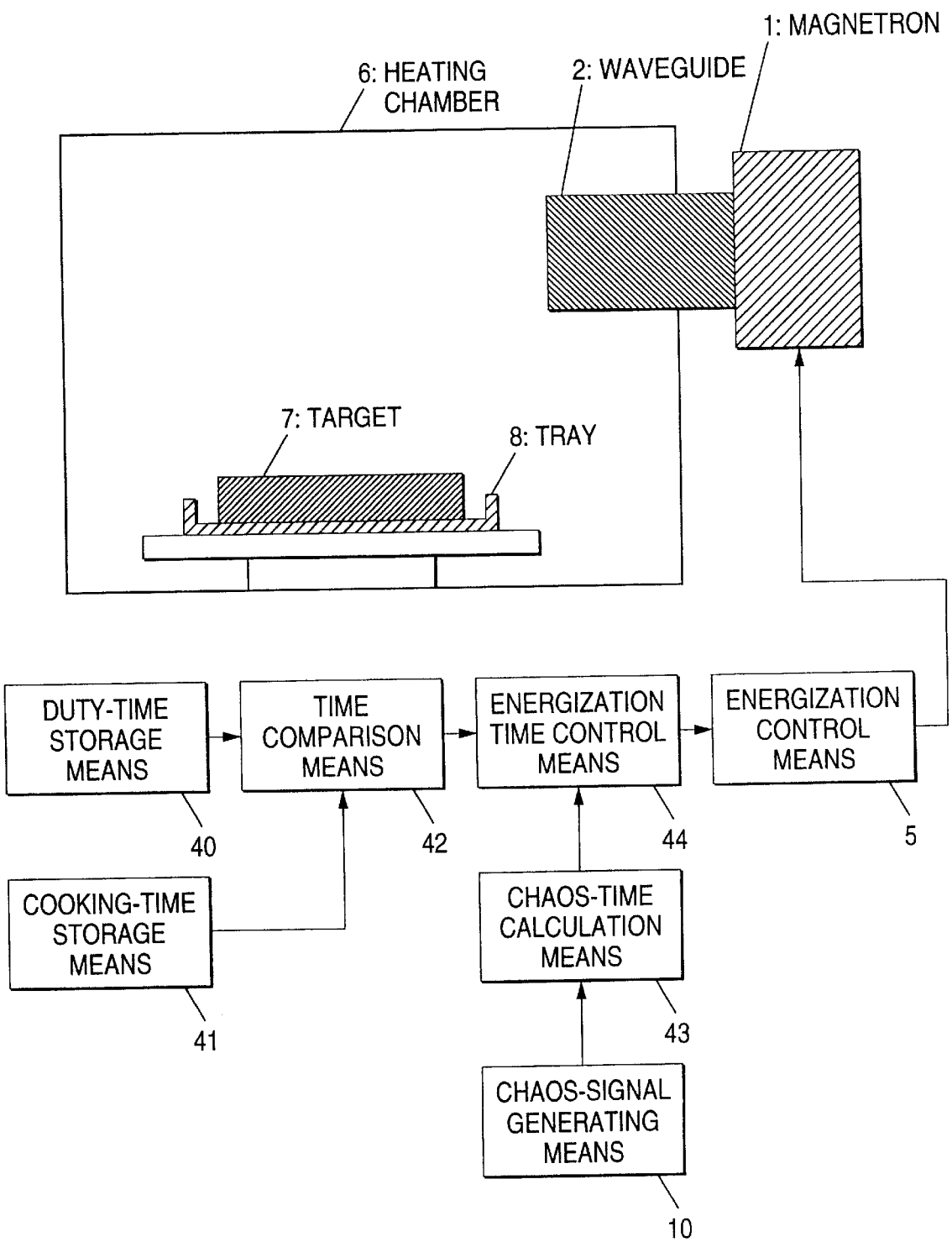
FIG. 15 is a block diagram showing a microwave oven according to a sixth embodiment of the present invention.

The structure of the sixth embodiment will now be described with reference to FIG. 15.

Reference numeral 40 represents a DUTY-time storage means on which DUTY time for use when electric power which must be supplied to the magnetron 1 is DUTY-controlled is stored. Reference numeral 41 represents a cooking-time storage means on which cooking time elapsed from start of the defrost cooking process is stored.

A time comparinon means 42 subjects DUTY time stored on the DUTY-time storage means 40 and cooking time stored on the cooking-time storage means 41 to a comparison so as to determine whether or not a DUTY cycle has started and transmit a result of the comparison as a time comparison signal.

A chaos-time calculating means 43 calculates time for which supply of electric power is turned on in one DUTY cycle from the chaos signal generated by the chaos-signal generating means 10 so as to transmit a result of the calculation as chaos time to an energization-time control means 44.

Reference numeral 44 represents the energization-time control means which determines a binary control signal from the time comparison signal transmitted by the time comparison means 42 and the chaos time calculated by the chaos-time calculating means 43 so as to transmit the determined control signal to the energization control means 5.

The operation of the sixth embodiment will now be described.

Figure 16:
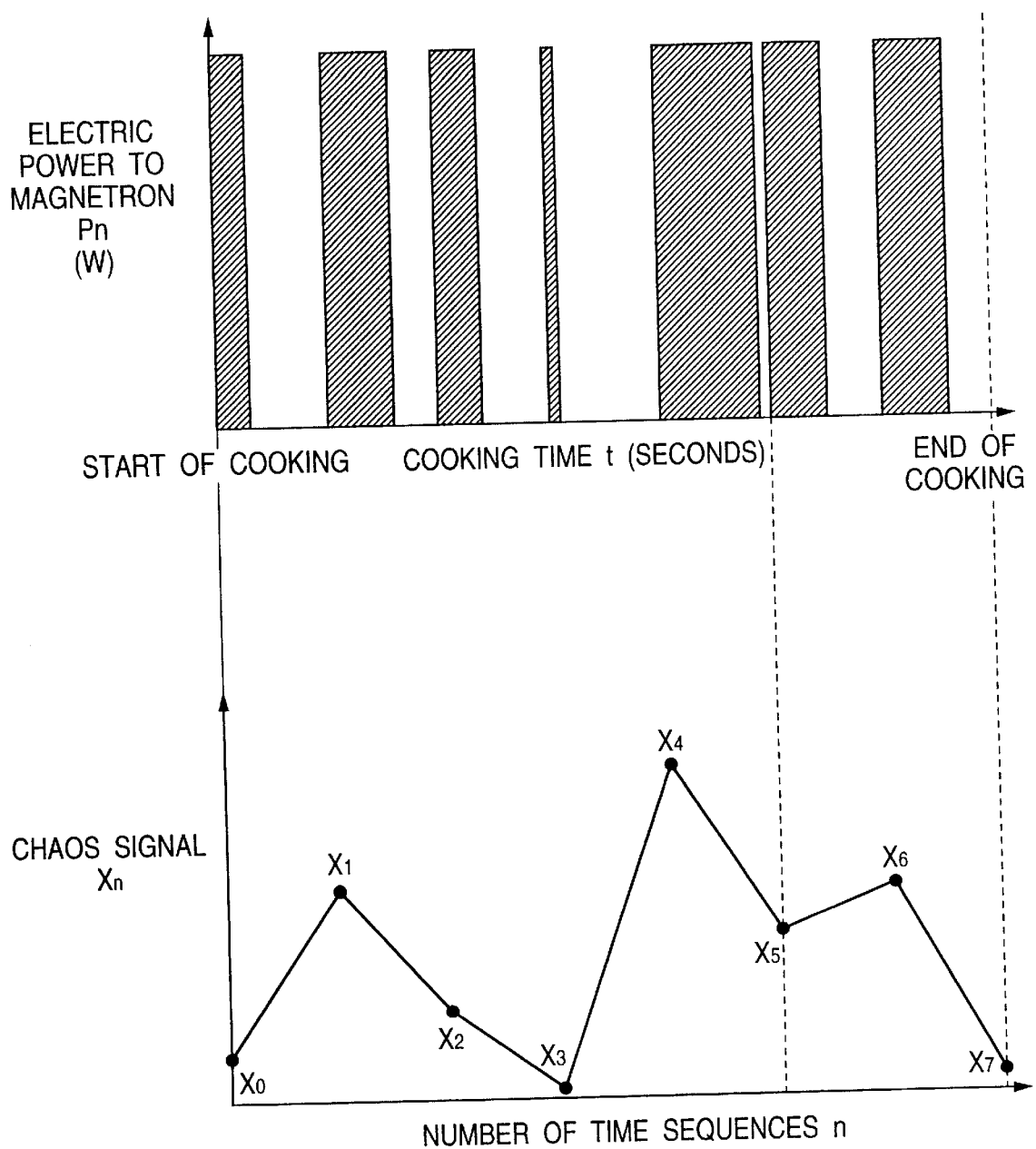
FIG. 16 is a graph showing the relationship between chaos signals and electric power which must be supplied to the magnetron.

Referring to FIG. 16, the operation of the sixth embodiment will schematically be described, and then the operation of each unit will be described.

FIG. 16 is a graph showing the relationship between chaos signal Xn and electric power Pn which must be supplied to the magnetron in such a manner that axes of abscissa stand for the number n of chaos time sequences and cooking time t.

As shown in FIG. 16, electric power which must be supplied to the magnetron 1 is DUTY-controlled for Tduty secondm in the DUTY cycle. Whenever a DUTY cycle is started, the chaos signal Xn is read and chaos time Tn is calculated in accordance with the following equation:

$$Tn=\alpha \cdot Xn+\beta$$

Thus, supply of electric power to the magnetron is turned on for time Tn.

Since electric power which must be supplied to the magnetron 1 in fluctuated in accordance with the chaos signal, the internal temperatures in the target which must be heated can be uniformed. Even if the on/off cycle for electric power which must be supplied to the magnetron 1 cannot be shortened because of flicker noise or the like, enlargement of the DUTY cycle enables a microwave oven using the effect of the chaos signal to be provided.

Although the relational equation between the chaos signal and time for which the supply in turned on is expressed by a first-degree equation, the foregoing method is an example. The essential portion lies in that time for which the supply is turned on can be calculated from the chaos signal. Therefore, any method capable of obtaining the foregoing time may be employed.

The time comparison means 42 subjects DUTY cycle time Tduty stored on the DUTY-time storage means 40 and cooking time t stored on the cooking-time storage means to a comparison to detect timing when the DUTY cycle is started.

The chaos-time calculating means 43 receives the chaos signal Xn generated by the chaos-signal generating means 10 to calculate chaos time Tn from the chaos signal Xn in accordance with the above-mentioned equation.

Figure 17:
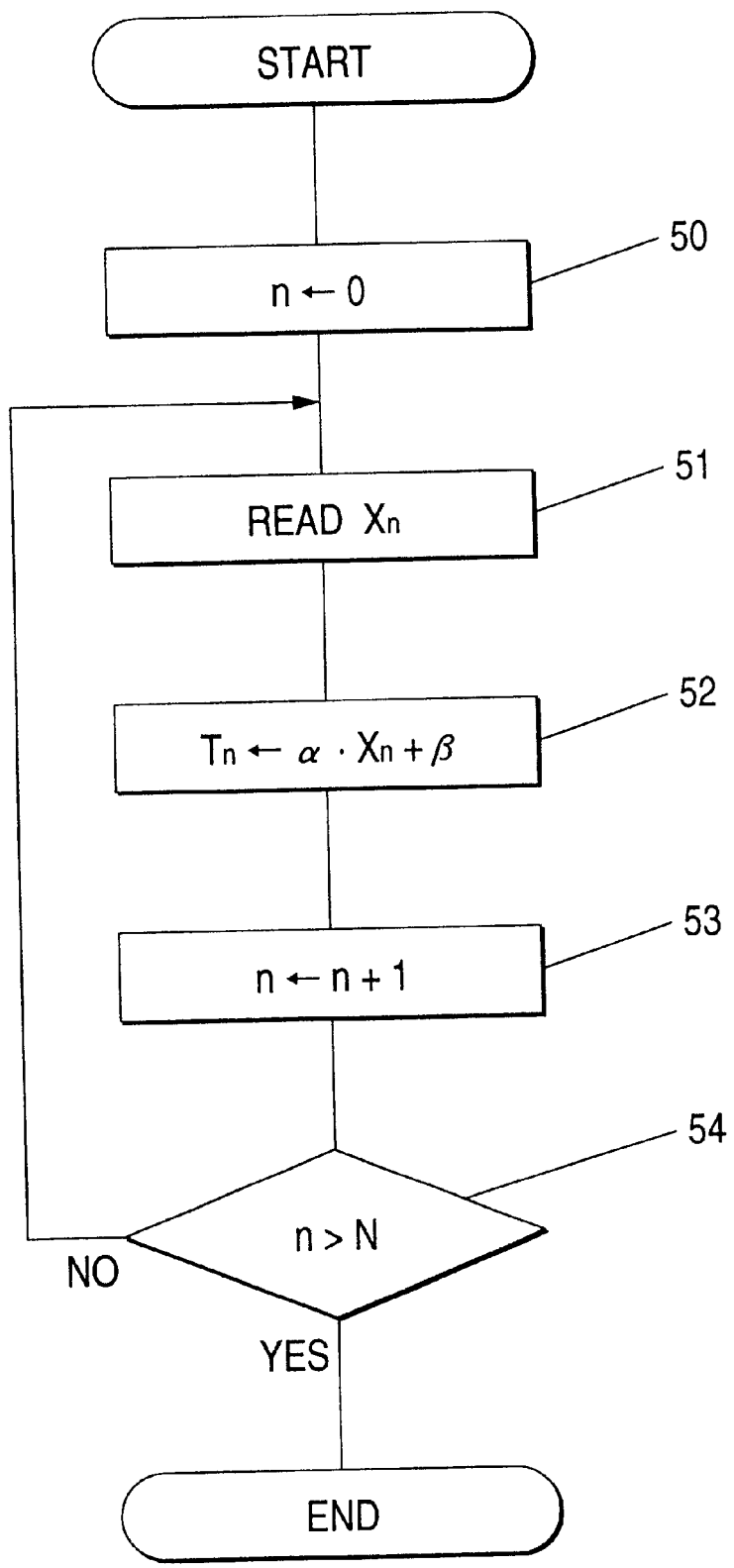
FIG. 17 is a flow chart showing a chaos-time calculating means.

The operation of an algorithm of the chaos-time calculating means 73 will now be described with reference to FIG. 17.

Initially, a parameter indicating time is made to satisfy n=0 (step 50).

Then, the chaos signal Xn is read, and then chaos time is calculated from the chaos signal Xn as follows (steps 51 and 52):

$$Tn=\alpha \cdot Xn+\beta$$

Then, one is added to n (step 53) to subject the value n and parameter N indicating required chaos time to a comparison (step 54). If n is smaller than N, steps 51 to 54 are repeated. If n reaches N, the program is ended.

When the time comparison means 42 has determined that the DUTY cycle has been started, the energization-time control means 44 turns on the supply of electric pow4r to the magnetron for chaos time Tn calculated by the chaos-time calculating means 43. Then, the energization-time control means 44 turns off the supply of electric power to the magnetron for time (Tduty−Tn).

In the above-mentioned structure, supply of electric power to the magnetron is binary-controlled in the seuqential order that the supply is turned on and then turned off in one DUTY cycle. If the supply is turned off prior to turning of the supply on, the obtainable effect in the same.

Figure 18:
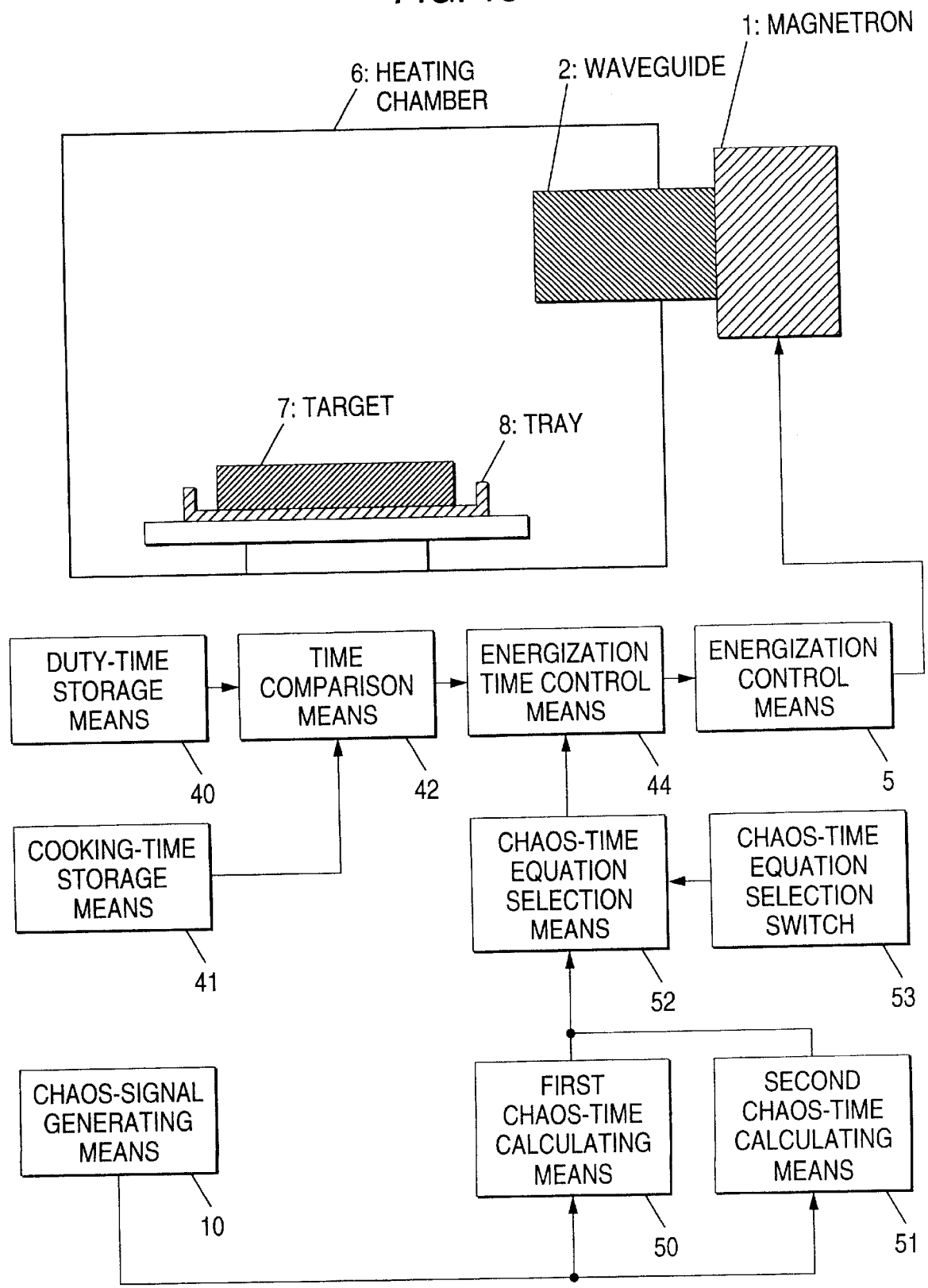
FIG. 18 is a block diagram showing the microwave oven according to the sixth embodiment of the present invention.

The sixth rodiment will furthermore be described with mainly reference to FIG. 18.

This embodiment has the structure that one chaos-time calculating means is selected from a plurality of chaos-time calculating means to cause the selected chaos-time calculating means to determine on or off time. The structure and operation of this embodiment which are different from those of the embodiment described with reference to FIG. 15 will mainly be described. The other structures and operations are the same as those of the embodiment shown in FIG. 15.

The structure of the sixth embodiment will now be described with reference to FIG. 18.

Referring to FIG. 18, reference numeral 50 represents a first-chaos-time calculating means which calculates time for which the supply is turned on in the DUTY cycle from the chaos signal generated by the chaos-signal generating means 10 so as to transmit a result of the calculation to a chaos-time-equation selection means 52 as first chaos time. Reference numeral 51 represents a second-chaos-time calculating means using an equation which is different from the equation which it used by the first-chaos-time calculating means 50 to calculate time for which the supply in turned on in the DUTY cycle from the chaos signal generated by the chaos-signal generating means 10 so as to transmit a result to the chaos-time-equation selection means 52 as second chaos time.

In accordance with information supplied from a chaos-time equation selection switch 53, the chaos-time-equation selection means 52 selects either the first chaos time obtained by the first-chaos-time calculating means 50 or the second chaos time obtained by the second-chaos-time calculating means 51. Then, the chaos-time-equation selection means 52 transmits the selected chaos time to the energization-time control means 44.

The operation of the sixth embodiment will now be described with reference to FIG. 19.

Figure 19:
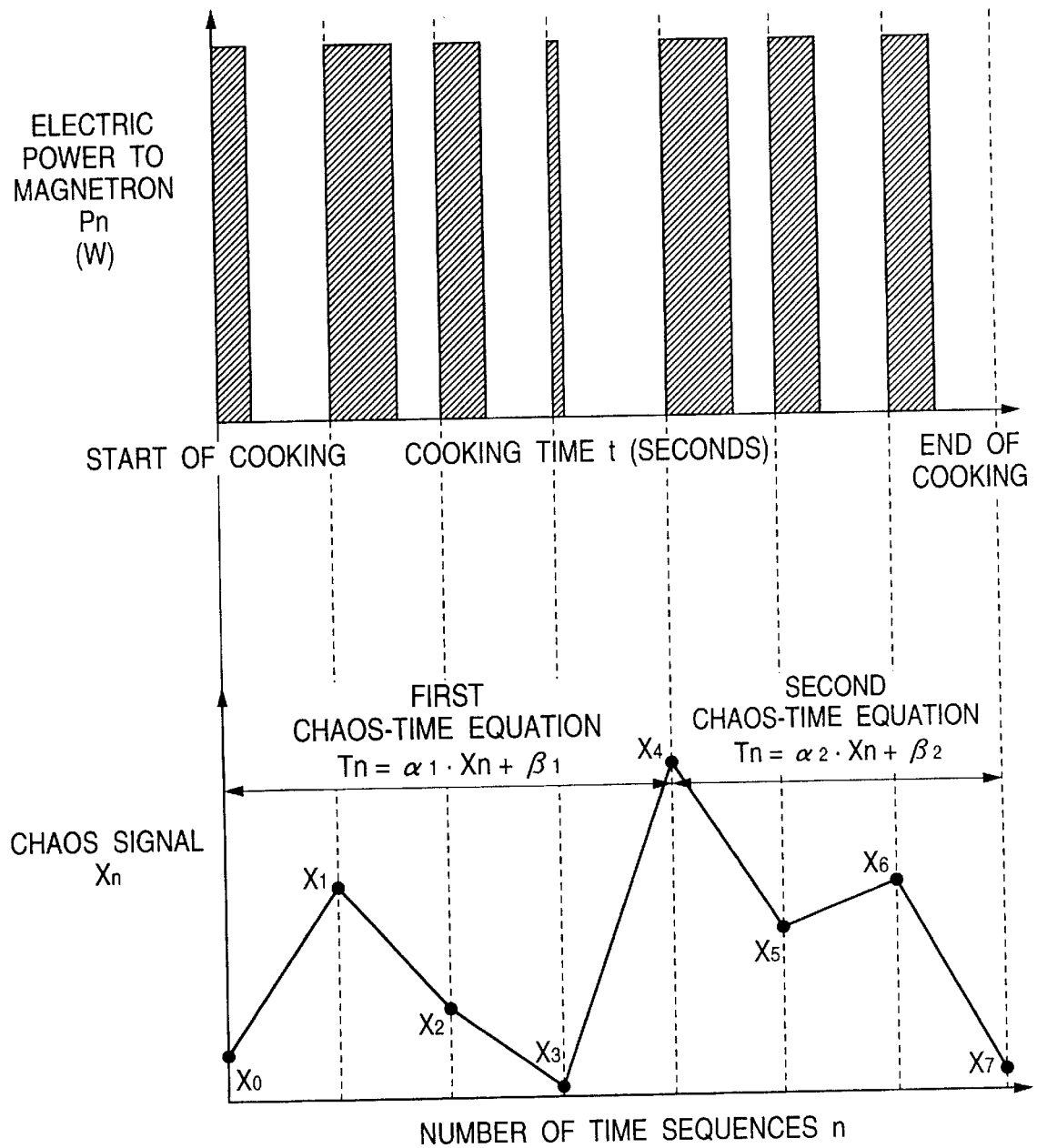
FIG. 19 is a graph showing the relationship between chaos signals and electric power which must be supplied to the magnetron.

FIG. 19 is a graph showing the relationship between chaos signal Xn and electric power Pn which must be supplied to the magnetron 1. Note that axes of abscissa stand for the number n of time sequences and cooking time t.

As described above, microwaves generated by the magnetron 1 are not substantially attenuated when they pass through the target which must be heated in a state where the overall body of the target is frozen. Therefore, the temperatures of the target which must be heated are uniformly raised. If a portion of the target which must be heated is first defrosted attributable to a disturbance, energy of the microwaves is concentrated to the defrosted portion. Thus, the temperature of the defrosted portion in rapidly raised.

To furthermore shorten the defrosting time, average electric power which must be supplied to the magnetron 1 when the defrosting process in started is enlarged by calculating chaos time in accordance with the following equation when the defrosting process is started:

$$Tn=\alpha 1 \cdot Xn+\beta 1$$

Then, chaos time in cialculated in accordance with the following equation immediately before a portion of the target which must be heated is defrosted:

$$Tn=\alpha 2 \cdot Xn+\beta 2$$

Thus, average electric power which must be supplied to the magnetron 1 is reduced to furthermore uniform the temperature distribution in the target which must be heated.

When the first-chaos-time calculating means 50 has received the chaos signal Xn transmitted from the chaos-signal generating mzeans 10, the first-chaos-time calculating means 50 calculates first chaos time in accordance with the following equations:

$$Tn=\alpha 1 \cdot Xn+\beta 1$$

When the second-chaos-time calculating means 51 has received the chaos signal Xn generated by the chaos-signal generating means 10, the second-chaos-time calculating means 51 calculates the second chaos time in accordance with the following equation:

$$Tn=\alpha 2 \cdot Xn+\beta 2$$

Initially, the chaos-time-equation selection means 52 selects the first chaos time calculated by the first-chaos-time calculating means 50 to transmit the first chaos time to the energization-time control means 44. When a switch signal is supplied from the chaos-time equation selection switch 53, a determination is made that the state is immediately before a portion of the target which must be heated is defrosted. Thus, the chaos-time-equation selection means 52 selects the second chaos time calculated by the second-chaos-time calculating means 51.

In addition to the structure according to the third embodiment, the structure according to the sixth embodiment is arranged in such a manner that microwaves are emitted in accordance with DUTY-output having on- and off-time in accordance with chaos signals generated by the chaos-signal generating means. Even if the structure of the microwave oven does not permit the quantity of microwaves to be changed to have continuous values, control of the quantity of microwaves with binary values indicating turning on and off enables the effect of chaos to be realized in the defrosting process. Therefore, even if the output of microwaves in the microwave oven cannot continuously be controlled, only a simple change in the structure is required to shorten time required to defrost a target. Moreover, the temperature distribution in the defrosted target can furthermore be improved.

When the structure is added in which one chaos-time calculating means is selected from a plurality of chaos-time calculating means to perform the DUTY output having on- or off-time, a chaos-time calculating equation corresponding to the state of the target which must be heated can be selected. Thus, time required to defrost a target can furthermore be shortened and temperature distribution in the target which must be heated can furthermore be improved during the defrosting process.

Seventh Embodiment

A seventh embodiment will now be described.

In addition to the structure according to the sixth embodiment, the seventh embodiment is arranged in such a manner that microwaves are applied if the chaos signal generated by the chaos-signal generating means is larger than a predetermined threshold value. Therefore, only different portions from the structure and operation of the third embodiment will now be described. The other structures and operations are the same as those of the third embodiment.

Figure 20:
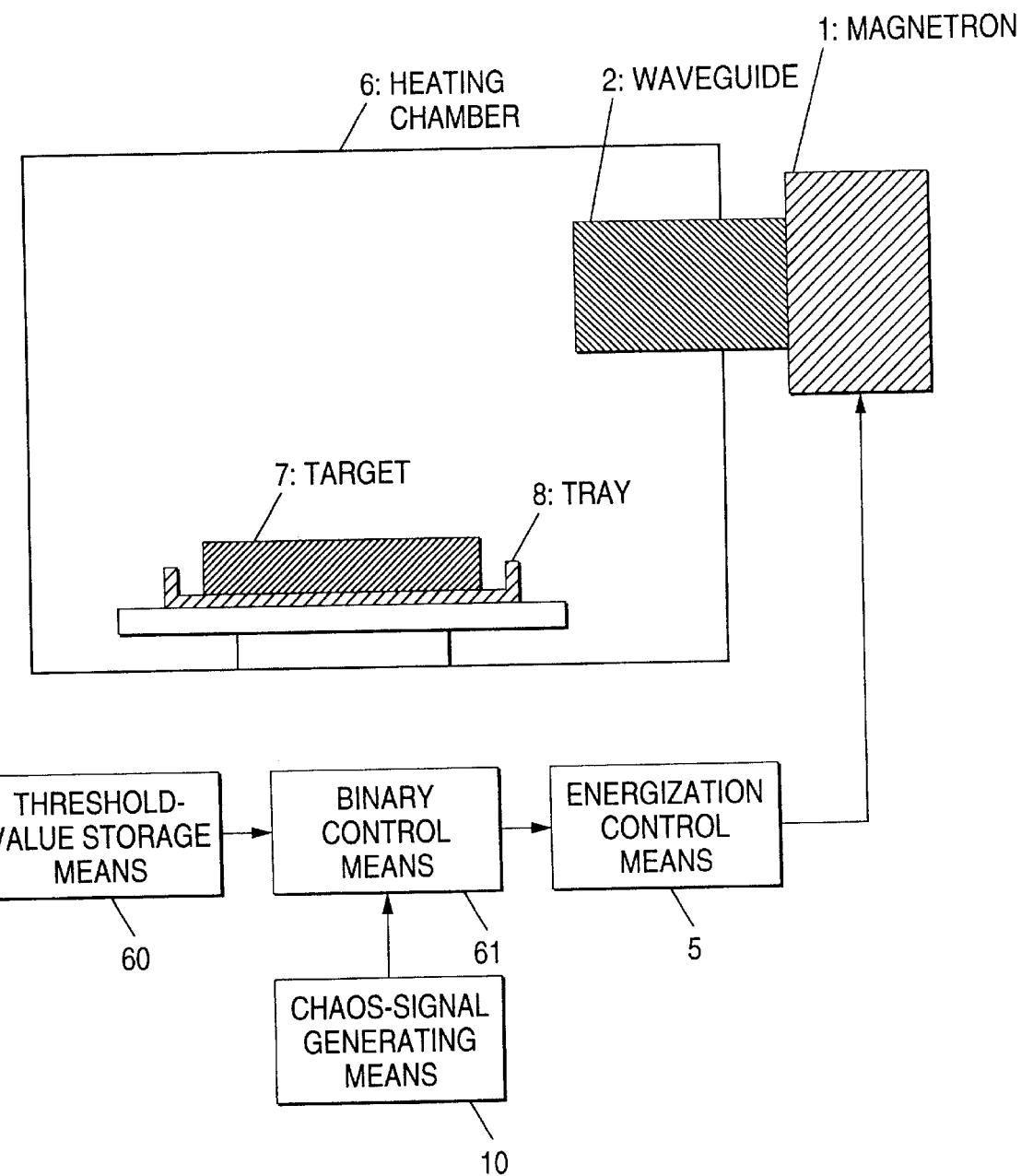
FIG. 20 is a block diagram showing a microwave oven according to a seventh embodiment of the present invention.

The structure of the seventh embodiment will now be described with mainly reference to FIG. 20.

Reference numeral 60 represents a threshold-value storage means on which a threshold value is stored which serves as a reference for the binary control for turning on or off the supply of electric power to the magnetron 1. A binary control means 61 subjects the threshold value stored on the threshold-value storage means 60 and a chaos signal transmitted from the chaos-signal generating means 10 to a comparison so as to transmit a binary control signal to the energlzation control means 5.

Figure 21:
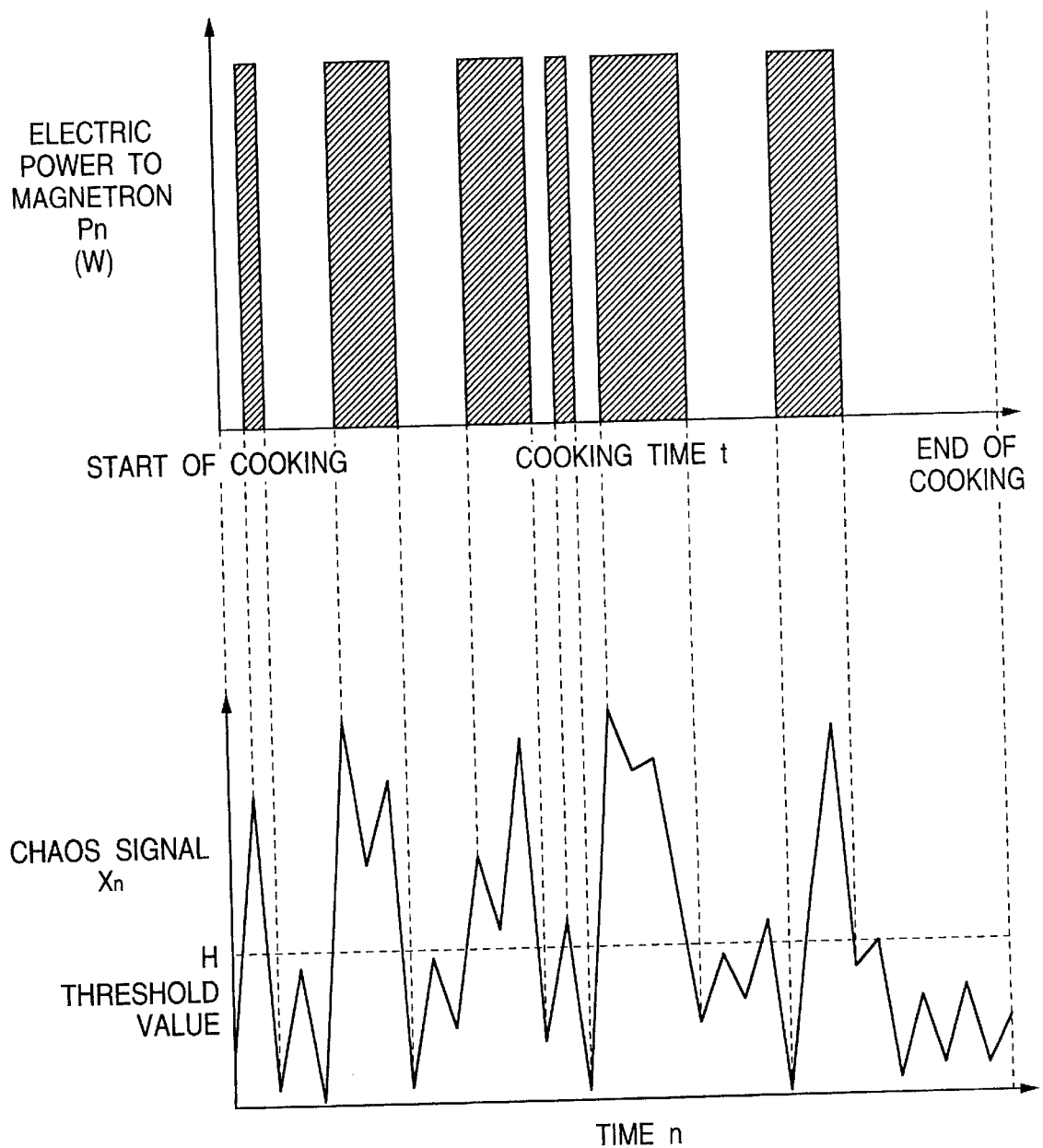
FIG. 21 is a graph showing the relationship between chaos signals and electric power which must be supplied to the magnetron.

The operation of the seventh embodiment will now be described with mainly reference to FIG. 21.

An example of the operations of the threshold-value storage means 60 and the binary control means 61 will now be described with reference to FIG. 21. FIG. 21 shows the relationship between chaos signals Xn and electric power Pn which must be supplied to the magnetron in such a manner that the axis of abscisa stands for time t.

The threshold-value storage means 60 has threshold value H stored thereon for determining binary electric power Pn which must be supplied to the magnetron.

A binary control means 61 subjects the chaos signal Xn transmitted from the chaos-signal generating means 3 and the threshold value H to a comparison. If the chaos signal Xn is larger than the threshold value H, the binary control means 61 realizes a state in which the supply is turned on. If the chaos signal Xn is emamller than the threshold value H, the binary control means 61 realizes a state in which the supply is turned off. To realize the foregoing state in which the supply is turned on or off, the binary control means 61 determines a binary control signal for turning the supply on or off.

Note that above-mentioned method is an example for determining a binary output of microwaves as a result of a comparison made between the chaos signal and the threshold value. The essential portion lies in that the binary microwaves output can be determined by using the chaos signal. Therefore, any method capable of making the foregoing determination may be employed.

The seventh embodiment will furthermore be described with reference to FIG. 22.

Figure 22:
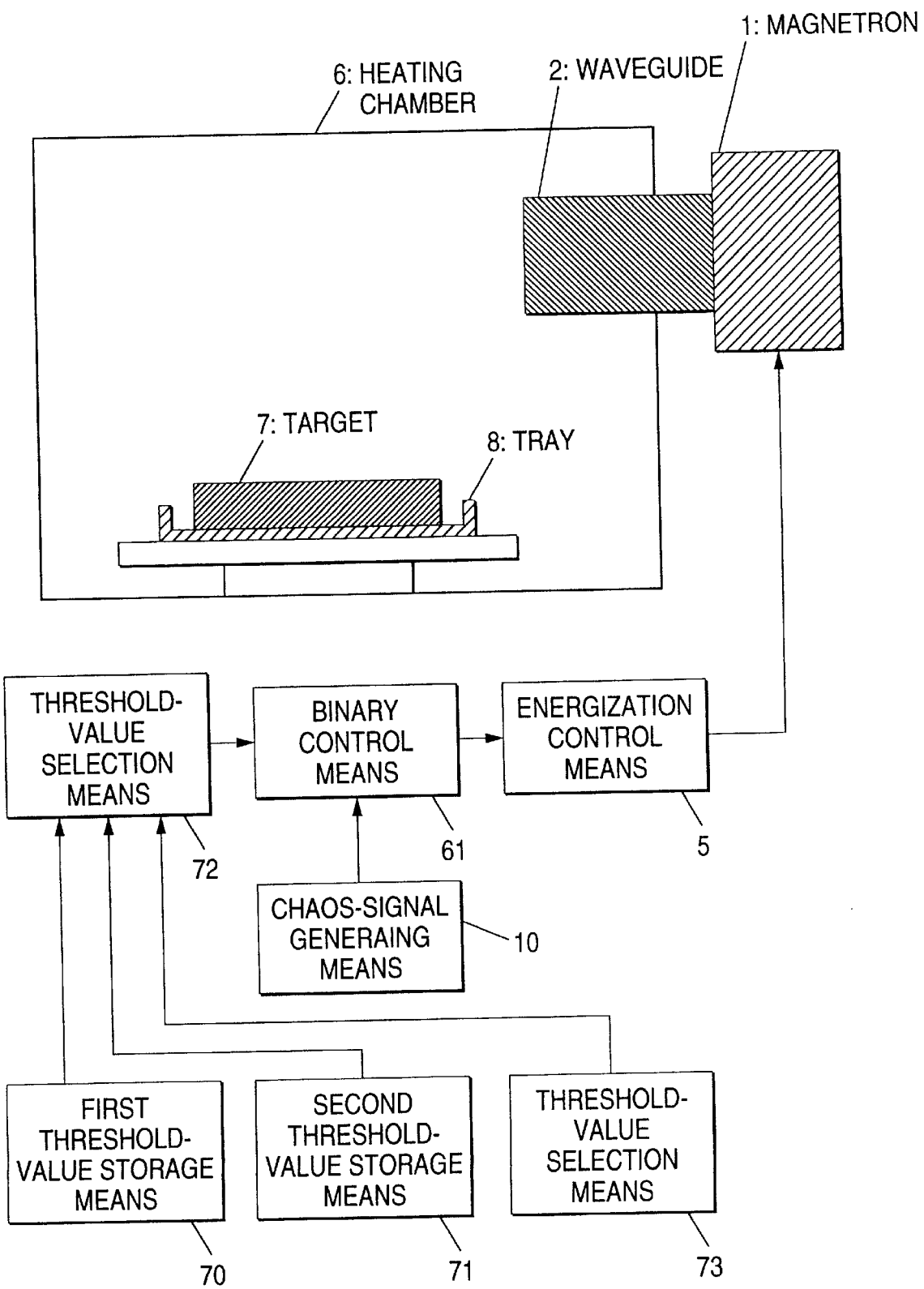
FIG. 22 is a block diagram showing the microwave oven according to the seventh embodiment of the present invention.

Referring to FIG. 22, reference numeral 70 represents a first-threshold-value storage means. Reference numeral 71 represents a second-threshold-value storage means. The first-threshold-value storage means 70 has a first threshold value stored thereon 60 as to transmit the threshold value to a threshold-value selection means 72. The second-threshold-value storage means 71 has a second threshold value which is different from the first threshold value so as to transmit the second threshold value to the threshold-value selection means 72.

In accordance with information supplied from a threshold-value selection switch 73, the threshold-value selection means 72 selects either of the first threshold value transmitted from the first-threshold-value storage means 70 or the second threshold value transmitted from the second-threshold-value storage means 71 to transmit the selected threshold value to the binary control means 61.

The operation of the seventh embodiment will now be described with reference to FIG. 23.

Figure 23:
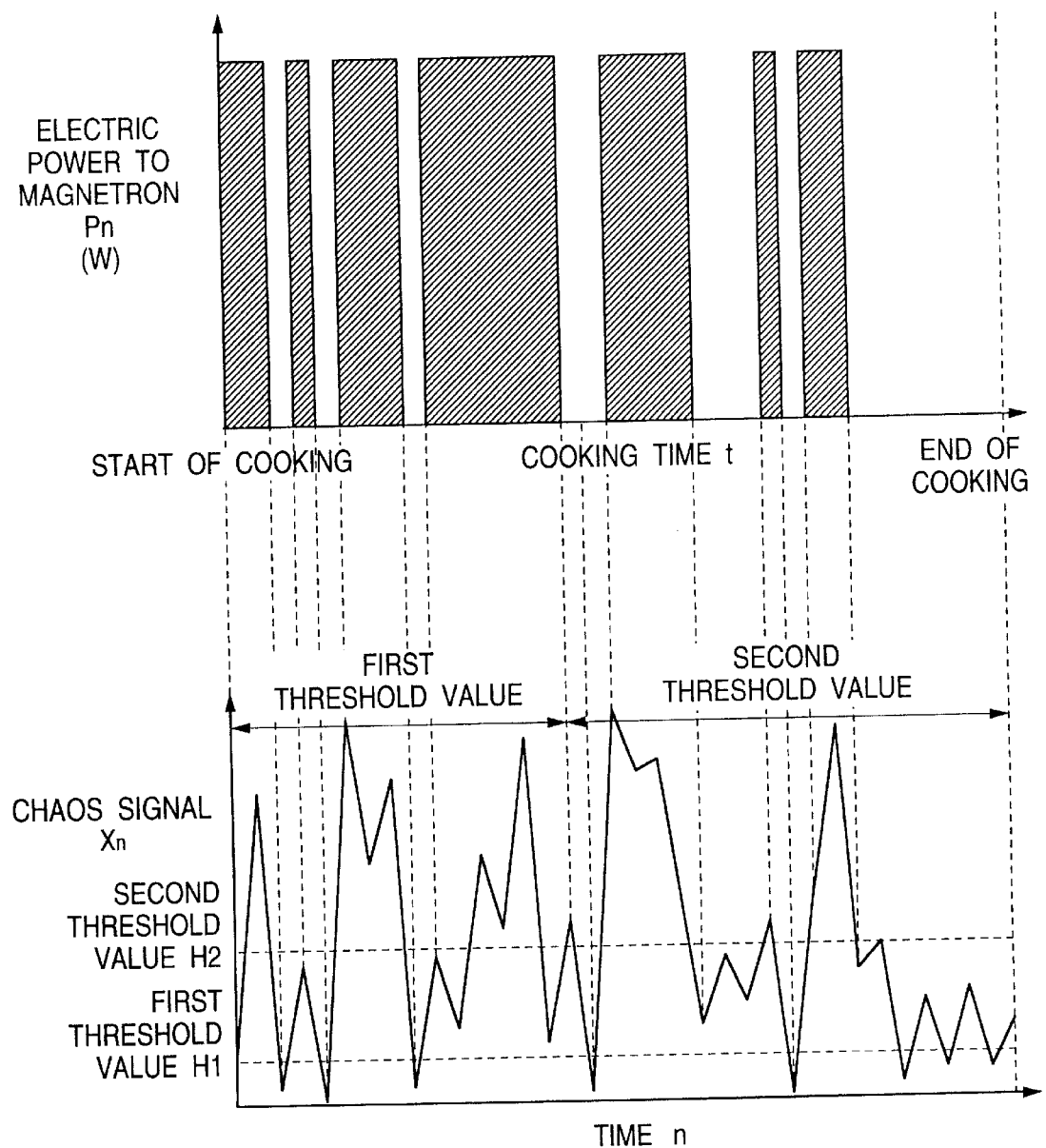
FIG. 23 is a graph showing the relationship between chaos signals and electric power which must be supplied to the magnetron.

FIG. 23 is a graph showing the relationship between chaos signal Xn and electric power Pn which must be supplied to the magnetron 1 in such a manner that the axis of abscissa stands for time t. The two threshold values, which are first threshold value H1 and second threshold value H2 are provided to adjust electric power which must be supplied to the magnetron 1.

In a state in which the overall body of the target which must be heated is frozen, microwaves generated by the magnetron 1 are not substantially attenuated and allowed to pass through the same, as described above. As a result, the temperatures of the target which must be heated are uniformly raised. If a portion of the target is defrosted, energy of the microwaves is concentrated to the defrosted portion. Thus, the temperature of the portion is rapidly raised.

Accordingly, as shown in FIG. 23, the first threshold value H1 having a small value is used when the temperature of the target which must be heated is low. Thus, average electric power which must be supplied to the magnetron 1 is enlarged so that the defrosting time is further shortened. The second threshold value H2 having a large value is selected immediately before a portion of the target which must be heated is defrosted so that average electric power which must be supplied to the magnetron 1 is reduced. Thus, temperatures are furthermore uniformly distributed in the target which must be heated.

The threshold-value selection means 72 initially selects the first threshold value stored on the first-threshold-value storage means 70. When the state of the threshold-value selection switch 73 has been changed, a determination is made that the state is immediately before the phase of ice in the target is changed to liquid. Thus, the threshold-value selection means 72 selects the second threshold value stored on the second-threshold-value storage means 41 as the threshold value.

The seventh embodiment will furthermore be described.

In addition to the structure of the embodiment described with reference to FIG. 20, this embodiment has a structure that a lower limit is provided for the threshold value. The structure and operation of this embodiment which are different from those of the embodiment shown in FIG. 20 will mainly be described. The other structures and operations are the same as those of the embodiment shown in FIG. 20.

The structure of the seventh embodiment will now be described with reference to FIG. 24.

Figure 24:
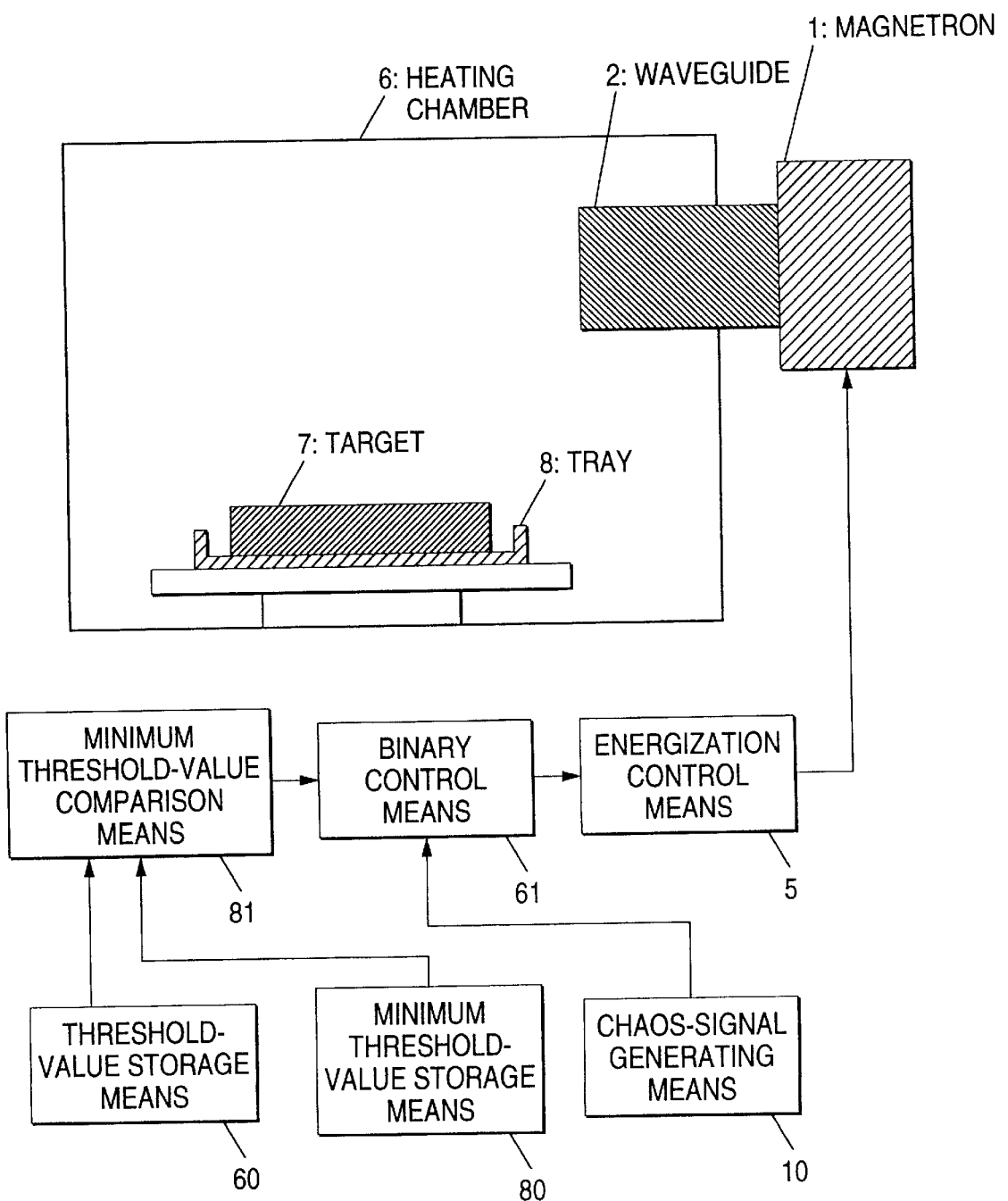
FIG. 24 is a block diagram showing the microwave oven according to the seventh embodiment of the present invention.

Referring to FIG. 24, reference numeral 80 represents a minimum-threshold-value storage means on which a minimum threshold value is stored so as to transmit the same to a minimum-throehold-value comparison means 81.

The minimum-threshold-value comparison means 81 subjects the threshold value stored on the threshold-value storage means 60 and the minimum threshold value stored on the minimum-threshold-value storage means 80 to a comparison so as to determine a threshold value. Then, the minimum-threshold-value comparison means 81 transmits the determined threshold value to the binary control means 61.

The operation of the seventh embodiment will now be described with reference to FIG. 25.

Figure 25:
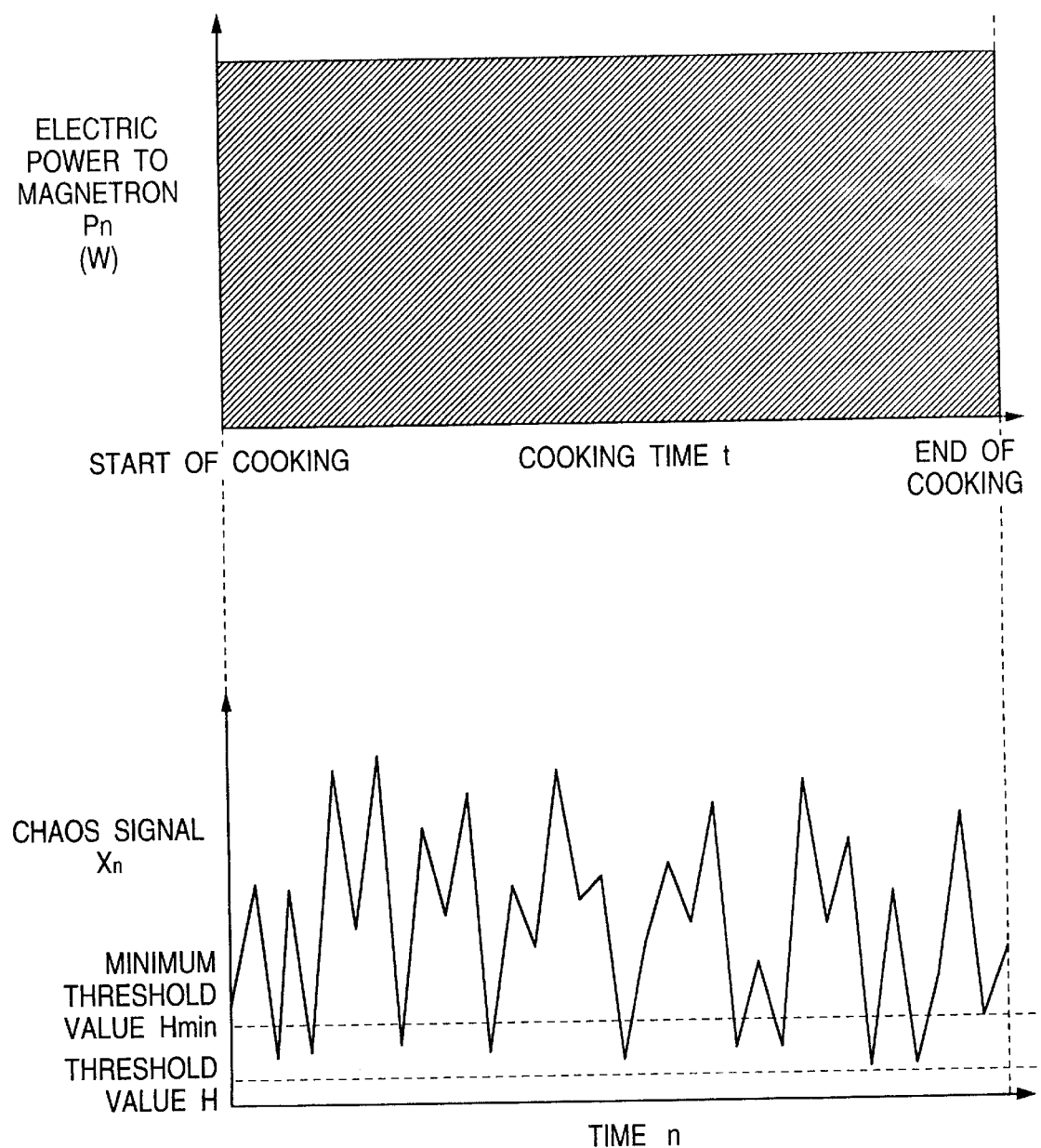
FIG. 25 is a graph showing the relationship between chaos signals and electric power which must be supplied to the magnetron.

FIG. 25 is a graph showing the relationship between chaos signal Xn and electric power Pn which must be supplied to the magnetron 1 in such a manner that the axes of abscissa stand for time n and cooking time t. Note that threshold value H and the mininum threshold value Hmin are shown together.

As shown in FIG. 25, when chaos signals Xn having large values successively appear, supply of electric power to the magnetron 1 is always turned on in extreme cases if the threshold value H is small. An a result, the defrosted target is brought to a state in which a portion has been boiled and other portions are frozen.

To further uniform the temperature distribution in the target which must be heated after the target has been defrosted, the minimum threshold value Hmin is provided for the threshold value H. When the threshold value H is smaller than the minimum threshold value Hmin, the minimum threshold value Hmin in used as the threshold value with which electric power which must be supplied to the magnetron 1 is controlled.

The minimum-threshold-value comparison means 81 subjects the threshold value H stored on the threshold-value storage means and the minimum threshold value Hmin stored on the minimum-threshold-value storage means to a comparison. If the threshold value H is larger than the minimum threshold value Hmin, the threshold value H is selected as the threshold value which is used by the binary control means 31. If the threshold value H is smaller than the minimum threshold value Hmin, the minimum threshold value Hain is selected so as to be used in the binary control means 31.

The seventh embodiment will furthermore be described.

The structure and operation of this embodiment will now be described. In addition to the structure of the embodiment shown in FIG. 20, this embodiment is arranged in such a manner that a maximum threshold value is provided for the threshold value. The structure and operation of this embodiment which are different from those of the embodiment shown in FIG. 20 will mainly be described. The other structures and operations are the same as those of the embodiment shown in FIG. 20.

The structure according to the seventh embodiment will now be described with reference to FIG. 26.

Figure 26:
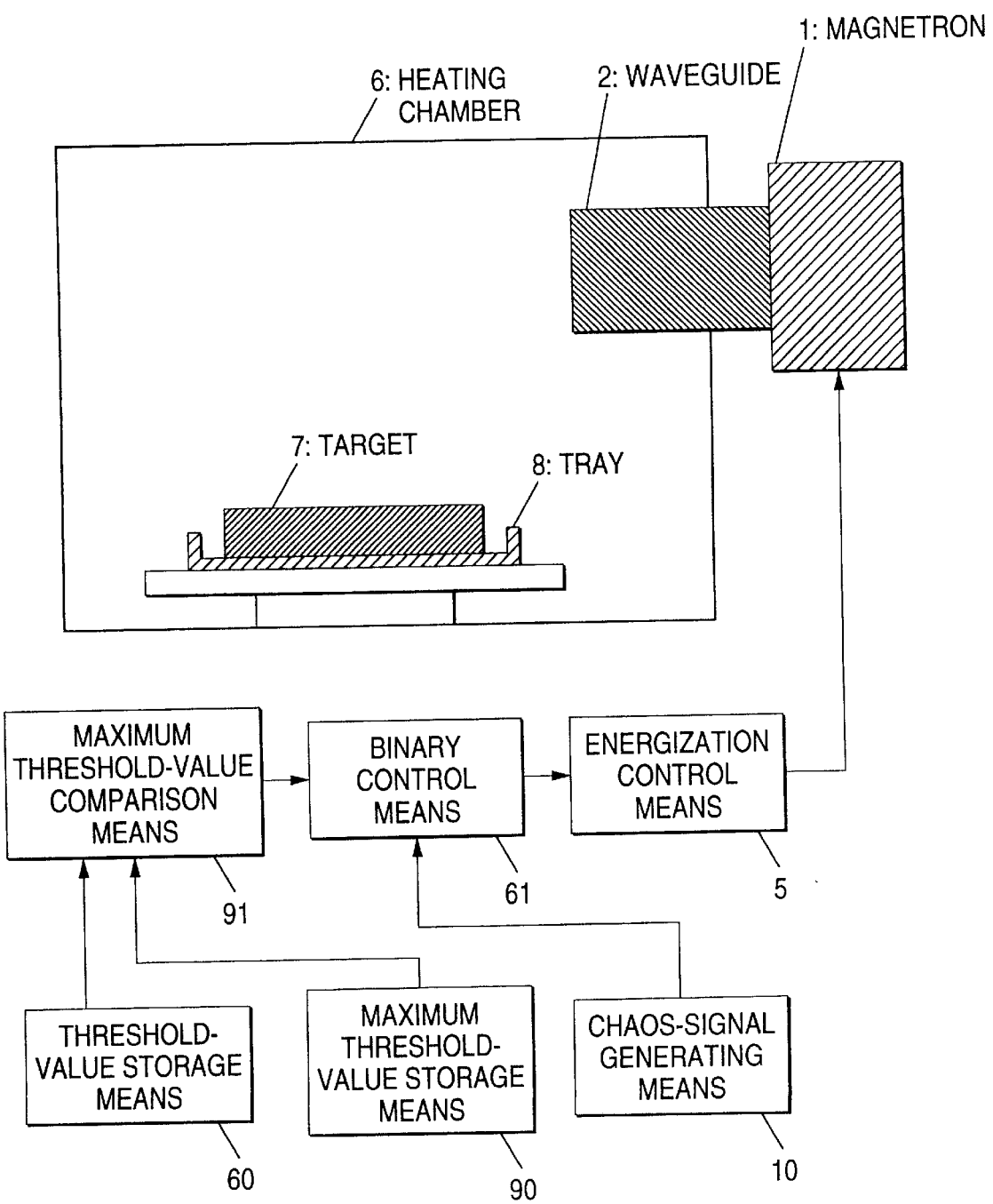
FIG. 26 is a block diagram showing the microwave oven according to the seventh embodiment of the present invention.

Referring to FIG. 26, reference numeral 90 represents a maximum-threshold-value storage means on which a maximum threshold value is stored and which transmits the maximum threshold value to a maximum-threshold-value comparison means 61.

The maximum-threshold-value comparison means 91 subjects the threshold value stored on the threshold-value storage means 60 and the maximum threshold value stored on the maximum-threshold-value storage means 90 to a comparison to determine a threshold value and transmit the determined threshold value to the binary control means 61.

The operation of the seventh embodiment will now be described with reference to FIG. 27.

Figure 27:
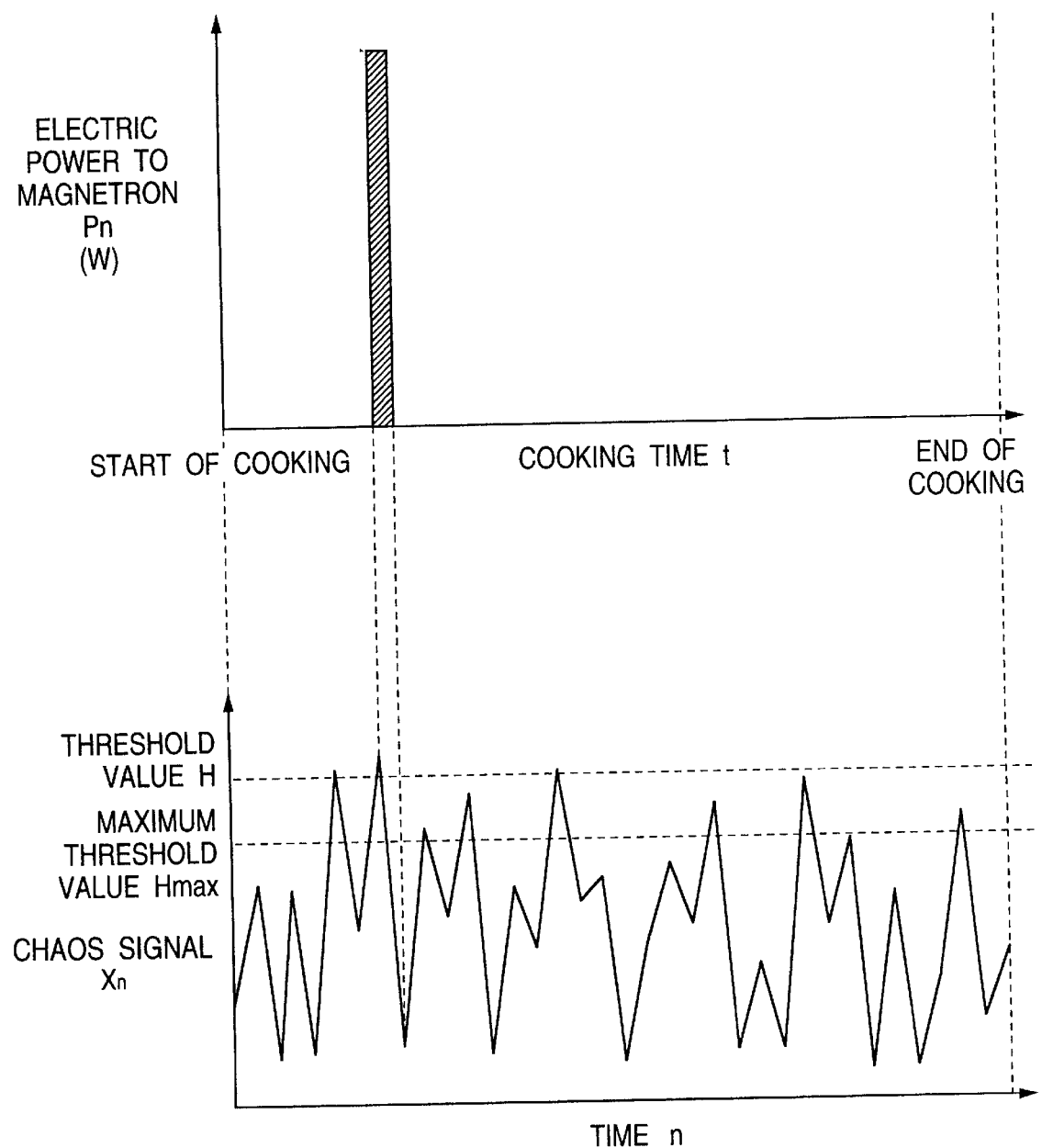
FIG. 27 is a graph showing the relationship between chaos signals and electric power which must be supplied to the magnetron.

FIG. 27 is a graph showing the relationship between chaos signal Xn and electric power Pn which must be supplied to the magnetron 1 in such a manner that the axes of abscissa stand for time n and cooking time t. Note that the threshold value H and the minimum threshold value Hmax are shown together.

If chaos signals Xn having small values successively appear as shown in FIG. 27 and if the threshold value H is large, time for which supply of electric power to the magnetron 1 is turned on is shortened. As a result, the defrosting time is elongated.

Accordinglyt the maximum threshold value Hmax is provided for the threshold value H. If the threshold value H is larger than the maximum threshold value Hmax, the maximum threshold value Hmax is used so that electric power which must be supplied to the mnagnetron 1 is on/off-controlled. Thus, time for which supply of electric power to the magnetron 1 is turned on is elongated as shown in FIG. 27 so that the defrosting time is furthermore shortened.

The maximum-threshold-value comparison means 91 subjects the threshold value H stored on the threshold-value storage means 60 and the maximum threshold value Hmax stored on the maximum-threshold-value storage means 90 to a comparison. If the threshold value H it smaller than the maximum threshold value Hmax, the threshold value H is used as the threshold value which is used by the binary control means 61. If the threshold value H in larger than the maximum threshold value Hmax, the maximum threshold value Hmax is used by the binary control means 61.

The seventh embodiment has the structure that microwaves are emitted if the chaos signal generated by the chaos-signal generating means is larger than a predetermined threshold value. Thus, the structure and operation according to the eighth embodiment enable the control method for turning on or off the irradiation in accordance with the magnitude of the threshold value to very easily be realized. Therefore, change in the conventional control means is not substantially required to attain the effect of the chaos.

The structure in added which changes the threshold value in ordor to adjust the avarage electric power which must be supplied to the magnetron to correspond to the state of the target which must be heated. Thus, when the temperature of a target which must be heated is low, average electric power which must be supplied to the magnetron is enlarged. Thus, the time required to defrost a target can furthermore be shorted. Moreover, the average electric power which must be supplied to the magnetron is reduced immediately before a portion of the target is defrosted. Thus, the temperature distribution in the target can furthermore be uniformed and the temperature distribution can furthermore be improved during the defrosting operation.

The structure in which the minimum value is provided for the threshold value is added so that a state in which supply of electric power to the magnetron is continuously turned on is prevented. Thus, the state of the target can furthermore be improved during the defrosting process.

Moreover, the structure in which the minimum value is provided for the threshold value is added so that the average electric power which must be supplied to the magnetron is enlarged even if chaos signals having small values continuously appear. Thus, the time required to defrost a target can furthermore be shortened

Eighth Embodiment

An eighth embodiment will now be described.

In addition to the structure of the sixth embodiment, the eighth embodiment has a structure that the DUTY-output is regulated to have shortest on-time. The structure and operation of the eighth embodiment which are different from those of the sixth embodiment will mainly be described. The other structures and operations are the same as those of the sixth embodiment.

The structure of the eighth embodiment will now be described with mainly reference to FIG. 28.

Figure 28:
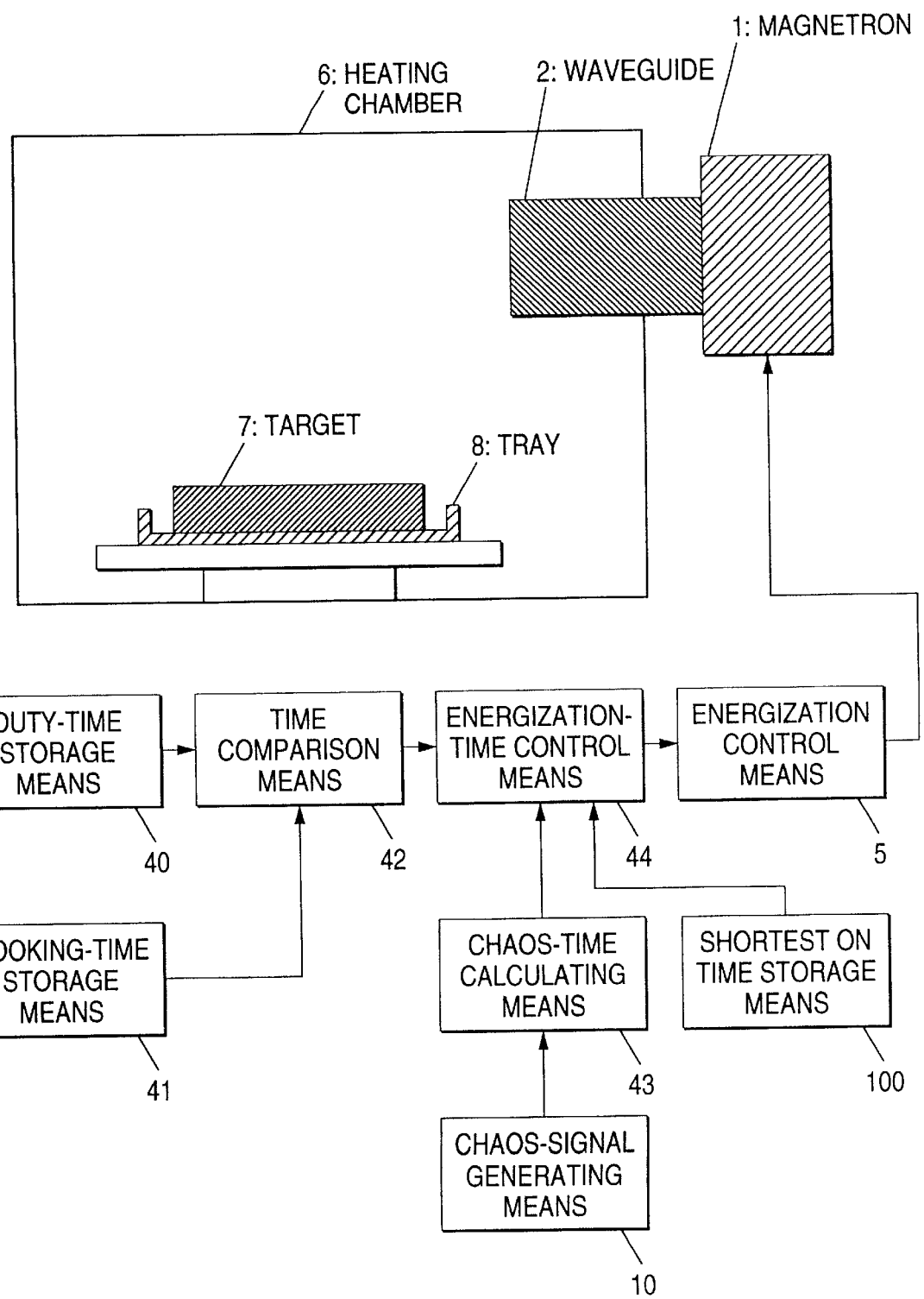
FIG. 28 is a block diagram showing a microwave oven according to an eighth embodiment of the present invention.

Referring to FIG. 28, reference numeral 100 represents a shortest on-time storage means on which shortest on-time in one DUTY cycle is stored.

The energization-time control means 44 subjects the chaos time calculated by the chaos-time calculating means 43 and the shortest on-time stored on the shortest on-time storage means 100 to a comparison so as to determine time for which the supply is turned on in the DUTY cycle.

The operation of the eighth embodiment will now be described with reference to FIG. 29.

Figure 29:
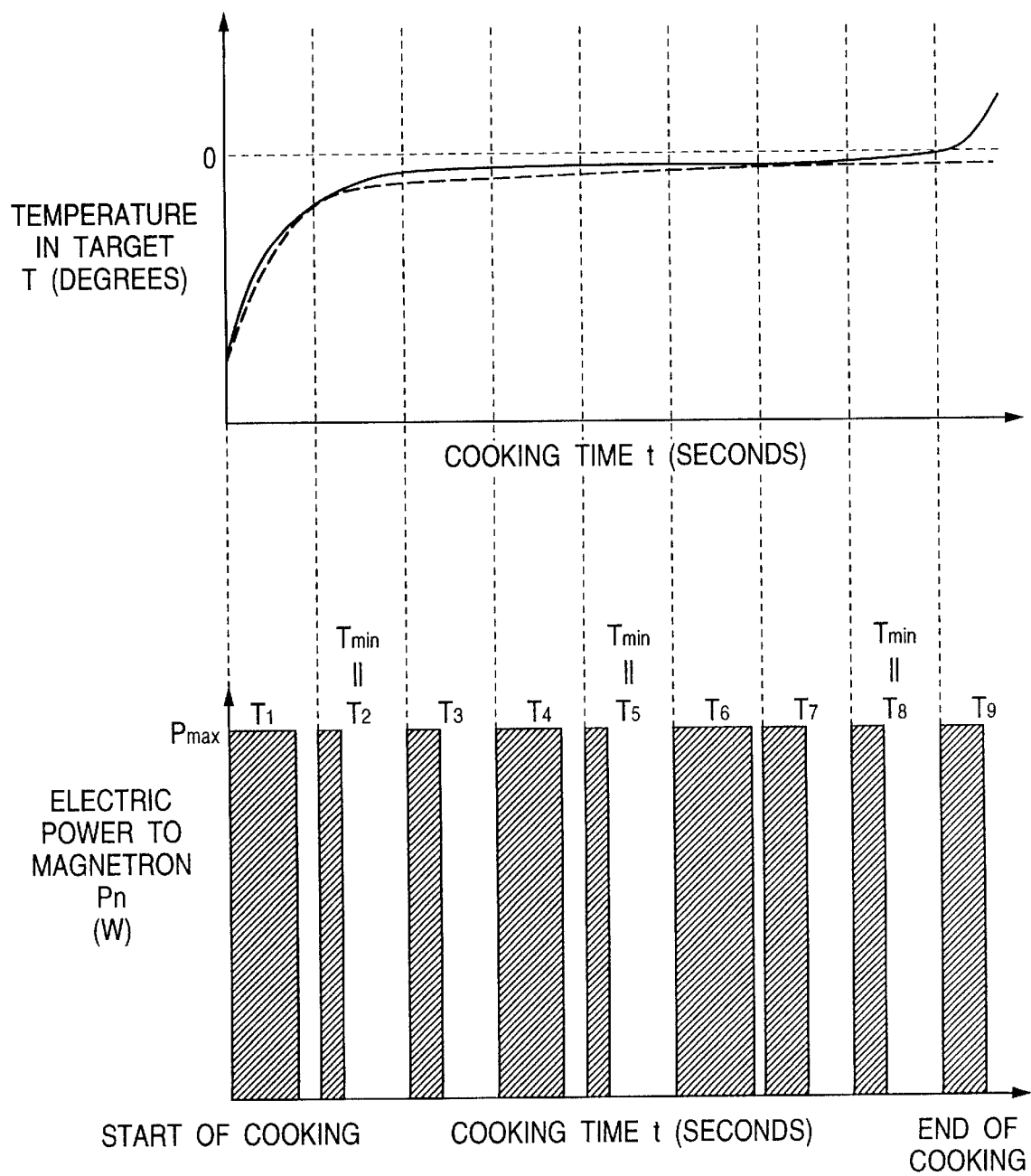
FIG. 29 is a graph showing the relationship between electric power which must be supplied to the magnetron and temperatures in a target which must be haated.

FIG. 29 is a graph showing the relationship between electric power Pn which must be supplied to the magnetron 1 and temperature T in the target which must be heated. Note that axis of abscissa of the graph stands for cooking time t.

In general, chaos time sequence has values from 0 to 1. When the chaos time Tn is calculated by the above-mentioned equation $Tn=\alpha \cdot Xn+\beta$ stored by the chaos-time calculating equation 43, chaos time Tn is shortened in a case where the chaos time sequence Xn is small. If chaos time sequences Xn having small values appear successively, average electric power which must be supplied to the magnetron 1, therefore, is reduced. As a result, time required to defrost the target which must be heated is elongated. Accordingly, shortest time Tmin is provided for the chaos time Tn. If a result of calculation from the chaos time sequence Xn is shorter than the shortest on-time Tmin, the chaos time Tn is made to be the shortest on-time Tmin.

That is, if an n-th chaos time sequence Xn is given, the chaos time Tn is determined in accordance with the following equation:

$k=\alpha \cdot Xn+\beta$ $Tn=Tmin(Tmin>k)$ $Tn=k(Tmin \leq k)$

If Tmin is made to be long time, the characteristic of dielectric heating results in a portion of the target which must be heated being excessively heated. Thus, the effect of the chaos time sequence Xn is reduced. Therefore, Tmin must be set carefully.

Note that the above-mentioned method of determining the chaos time by using the shortest on-time is an example. For example, the following method may be used to determine the chaos time:

$Tn=Tmin+\gamma \cdot Xn$ where $\gamma>0$.

If the employed method is able to determine the shortest chaos time, a similar effect can be obtained.

FIG. 29 shows change in the temperatures in the target which must be heated with respect to electric power supplied to the magnetron 1 in a case where the shortest time Tmin is provided for the chaos time Tn. Note that a solid line indicates the temperature in the target which must be heated in a case in which the shortest time Tmin is provided and a dashed line indicates the same in a case in which the shortest time Tmin is not provided.

As can be understood from FIG. 29, provision of the shortest time Tmin results in average electric power which must be supplied to the magnetron 1 being enlarged. Thus, the defrosting time can furthermore be shortened.

The energization-time control means 44 uses the shortest on-time Tmin stored on the shortest on-time storage means 100 and the chaos time Tn calculated by the chaos-time calculating means 43 to determine the time for which the supply is turned on in the DUTY-cycle in accordance with the above-mentioned equation.

The eighth embodiment has the structure that the DUTY-output is regulated to have the shortest on-time. Since the average electric power which must be supplied to the magnetron can be enlarged because the lower limit is provided for on-time, time required to defrost a target can furthermore be shortened.

Ninth Embodiment

A ninth embodiment will now be described.

In addition to the structure of the sixth embodiment, the ninth embodiment has a structure that the DUTY-output is regulated to have longest on-time. The structure and operation of the ninth embodiment which are different from those of the sixth embodiment will mainly be described. The other structures and operations are the same as those of the sixth embodiment.

The structure of the ninth embodiment will now be described with mainly reference to FIG. 30.

Referring to FIG. 30, reference numeral 110 represents a longest on-time storage means on which the longest on-time in one DUTY cycle is stored.

The energization-time control means 44 subjects the chaos time calculated by the chaos-time calculating means 43 and the longest on-time stored on the longest on-time storage means 110 to a comparison to determine time for which the power supply is turned on in the DUTY cycle.

Figure 31:
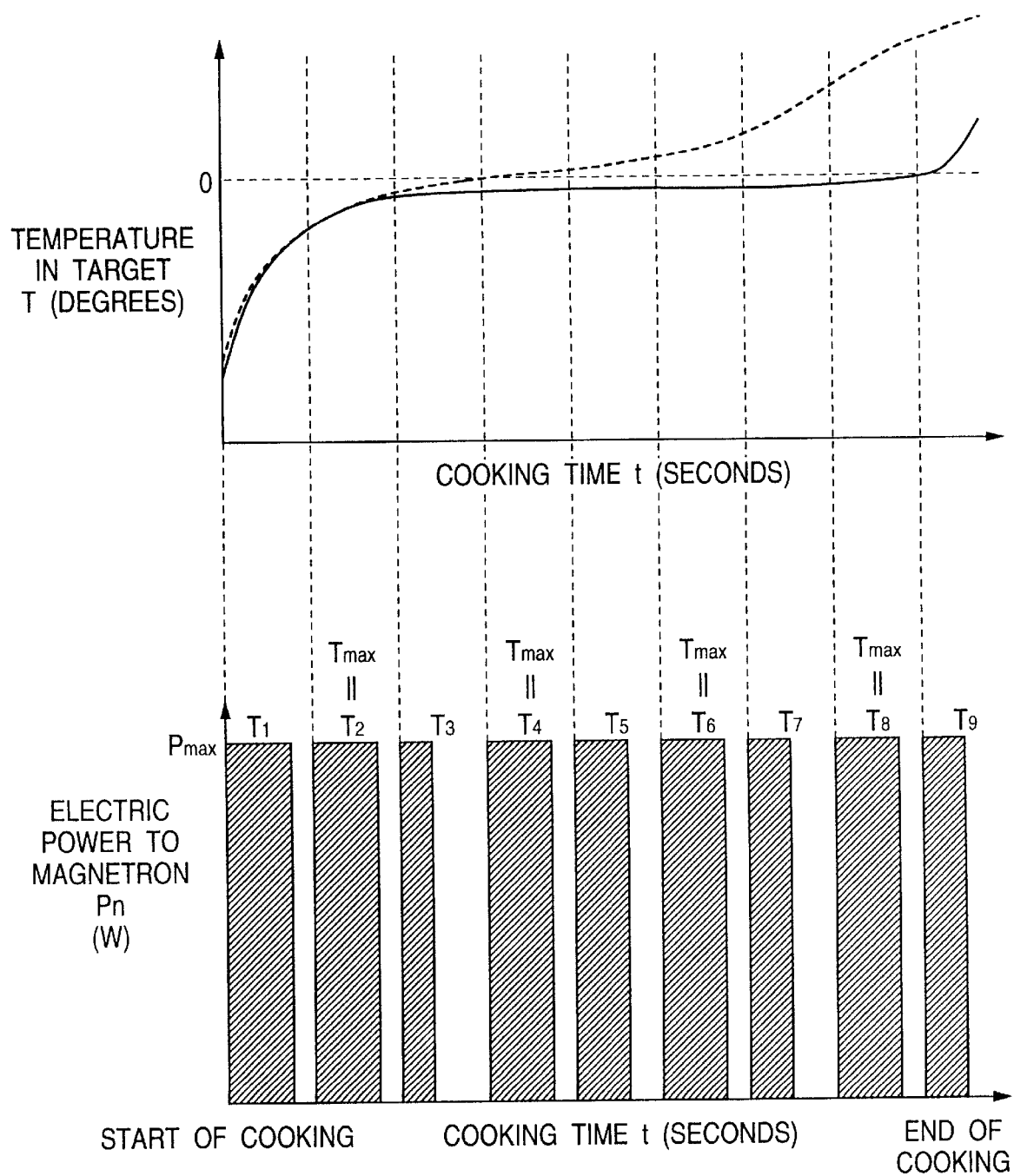
FIG. 31 is a graph showing the relationship between electric power which must be supplied to the magnetron and temperatures in a target which must be heated.

The operation of the ninth embodiment will now be described with mainly reference to FIG. 31. FIG. 31 is a graph showing the relationship between electric power Pn which must be supplied to the magnetron 1 and temperature T in the target which must be heated. Note that axis of abscissa stands for cooking time t.

A solid line indicates the temperature in the target which must be heated in a case where the longest on-time Tmax is provided and a dashed line indicates the came in a case where the longest on-time Tmax is not provided.

In general, chaos time sequence has values from 0 to 1. When the chaos time Tn is calculated by the above-mentioned equation $Tn=\alpha \cdot Xn+\beta$, chaos time is elongated in a case in which the chaos time sequence Xn is large. If chaos time sequences Xn having large values appear successively, average electric power which must be supplied to the magnetron 1 is, therefore, enlarged excessively. As a result, the temperature of a portion of a target which must be heated is raised excessively and the target is boiled. Accordingly, longest time Tmax in provided for the chaos time Tn to improve the state of the target which must be heated when the defrosting process is performed.

If an n-th chaos time sequence Xn is given, the chaos time Tn is determined in accordance with the following equation:

$$k\alpha \cdot Xn+\beta,$$

$$Tn=k(Tmax>k)$$

$$Tn=Tmax(Tmax \leq k)$$

FIG. 31 shows change in the temperatures T in the target which must be heated with respect to electric power Pn supplied to the magnetron 1 in a case where the longest time Tmax is provided for the chaos time Tn.

An can be understood from FIG. 31, provision of the longest time Tmax results in the state of the target which must be heated being improved when the same is defrosted.

The energization-time control means 44 uses the longest time Tmax stored on the longest on-time storage means 110 and the chaos time Tn calculated by the chaos-time calculating means 43 to determine the time for which the supply is turned on in the cycle in accordance with the above-mentioned equation.

The above-mentioned equation is an example of a method of calculating on-time for which supply of electric power to the magnetron 1 is turned on in such a manner that the longest time is provided for the chaos time. A variety of methods capable of calculating the on-time are available. The essential portion lies in that the longest time can be provided for time for which supply of electric power to the magnetron 1 is turned on. Any method attains the same effect.

The ninth embodiment has the structure that the longest on-time is provided for the DUTY-output. Since the longest on-time is provided, excessive supply of electric power to the target which must be heated can be prevented. Thus, the state of the target can furthermore be improved during the defrosting process.

Tenth Embodiment

The structure and operation of a tenth embodiment will now be described.

The tenth embodiment has a structure that the quantity of microwaves which must be applied is changed in accordance with the state of shift of the phase of a target which must be heated. The structure and operation of the tenth embodiment which are different from those of the third embodiment will mainly be described. The other structures and operations are the same as those of the third embodiment.

The structure of the tenth embodiment will now be described with reference to FIG. 36.

Figure 32:
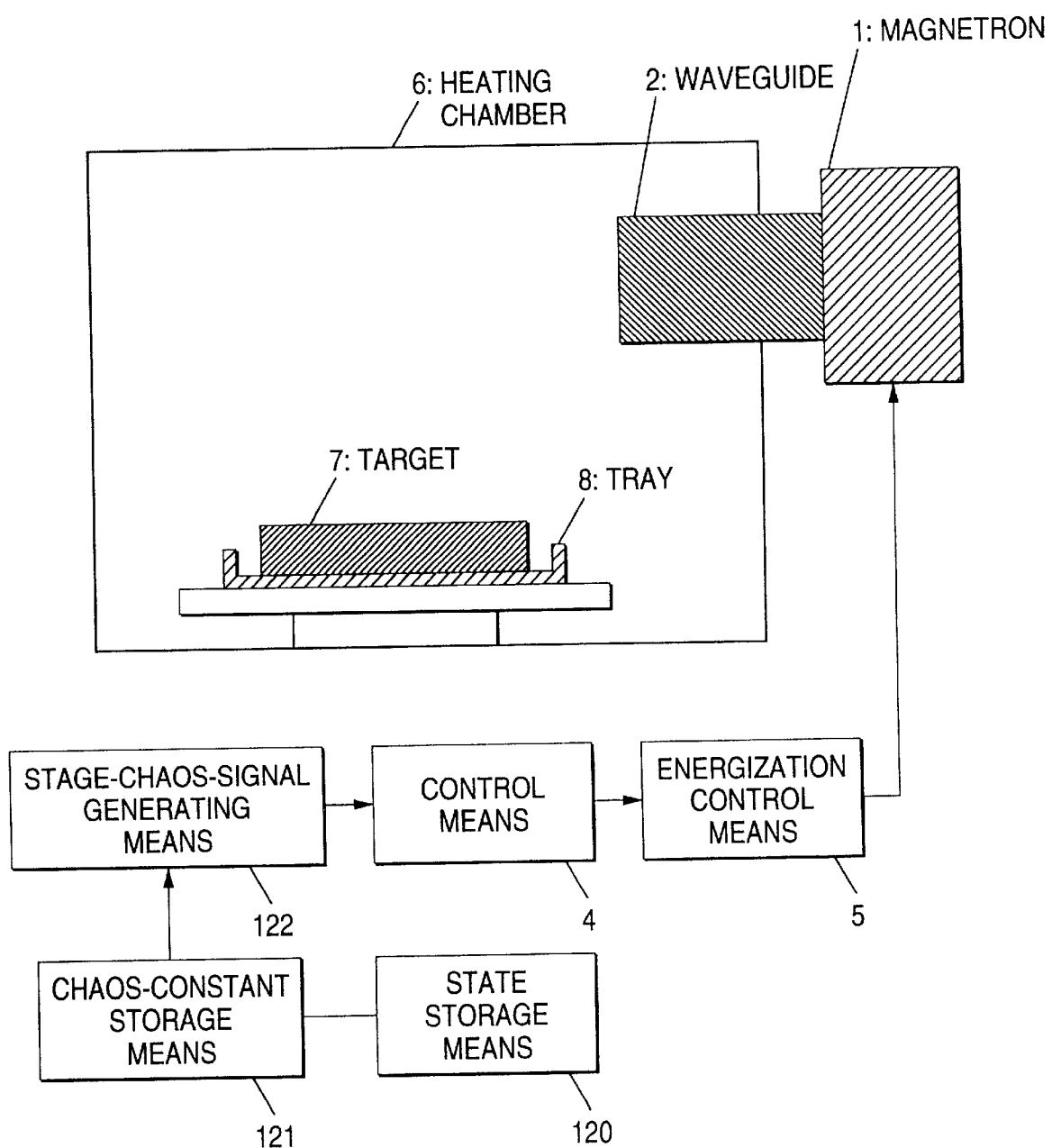
FIG. 32 is a block diagram showing a microwave oven according to a tenth embodiment of the present invention.

Referring to FIG. 32, reference numeral 120 represents a state storage means for storing a state of shift of the phase of a target which must be heated to transmit a state value to a chaos-constant generating means 121.

The chaos-constant generating means 121 has constants of the chaos signals corresponding to the states of the shift of the phase of targets which must be heated so as to transmit the constant to a state-chaos calculating means 122.

The state-chaos calculating means 122 calculates a chaos signal by using a chaos constant stored in the chaos-constant generating means 121 and optimum for the state so as to transmit the obtained chaos signal to the control means 4 as a state chaos signal.

The operation of the tenth embodiment will now be described.

An example of the operation of the state-chaos-signal generating means 122 will now be described.

As described in the third embodiment, chaos signals Xn generally have values from 0 to 1.

Therefore, the state chaos signals Yn are calculated in accordance with the following equation:

$$Yn=A \cdot Xn(0 \leq A \leq 1)$$

When constant A is changed, also the maximum value of the state chaos signal Yn is changed. Thus, it can be understood that the state chaos signals have the following maximum and minimum values:

$$0 \leq Yn \leq A$$

Although the chaos signal Xn is multiplied by the constant A to generate the state chaos signals Yn, a variety of methods are capable of changing the maximum value of the chaos signal with the constant. Any method attains a similar effect.

A method of selecting a state chaos signal in accordance with the states of shift of the phase of a target which mast be heated will now be described with reference to FIG. 33.

Figure 33:
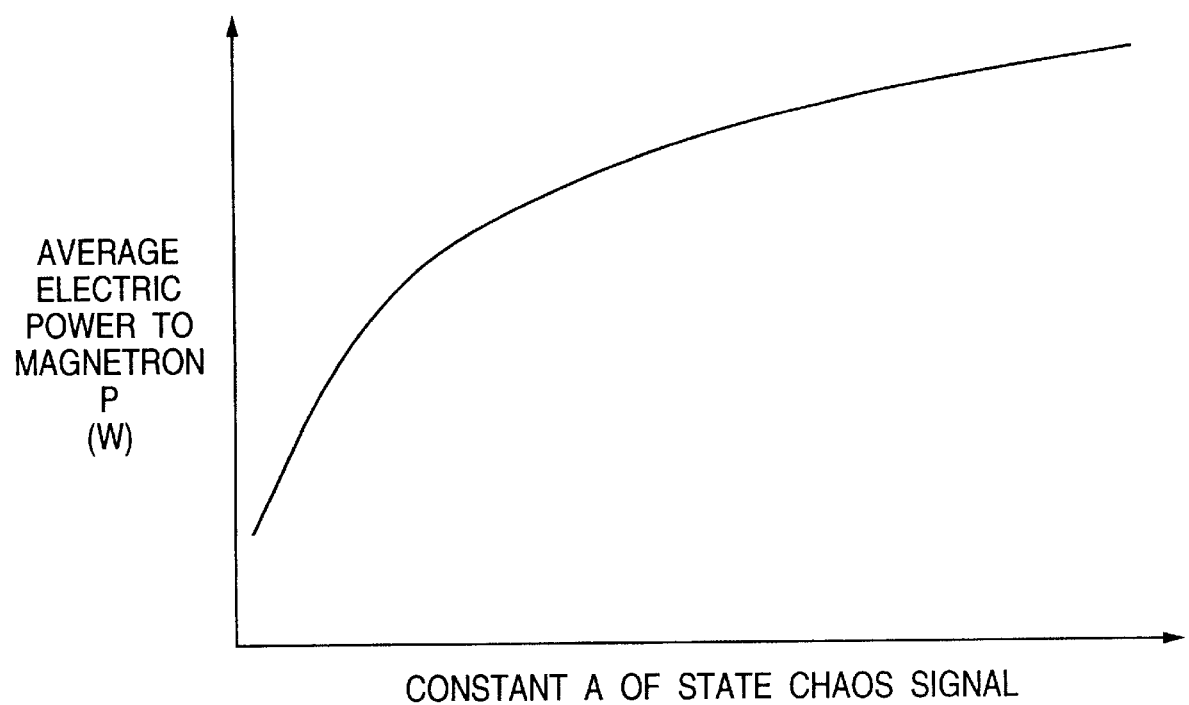
FIG. 33 is a graph showing the relationship between constants of chaos and average electric power which must be supplied to the magnetron.

FIG. 33 is a graph showing the relationship between the constant A and average electric power P which must be supplied to the magnetron 1.

As shown in FIG. 33, the constant A is enlarged when average electric power P which must be supplied to the magnetron 1 is attempted to be enlarged in accordance with the state of shift of the phase of a target which must be heated. If average electric power P which must be supplied to the magnetron 1 is attempted to be reduced, the constant A is reduced. When the constant A is changed as described above, the average electric power P which must be supplied to the magnetron 1 can easily be changed.

Figure 34:
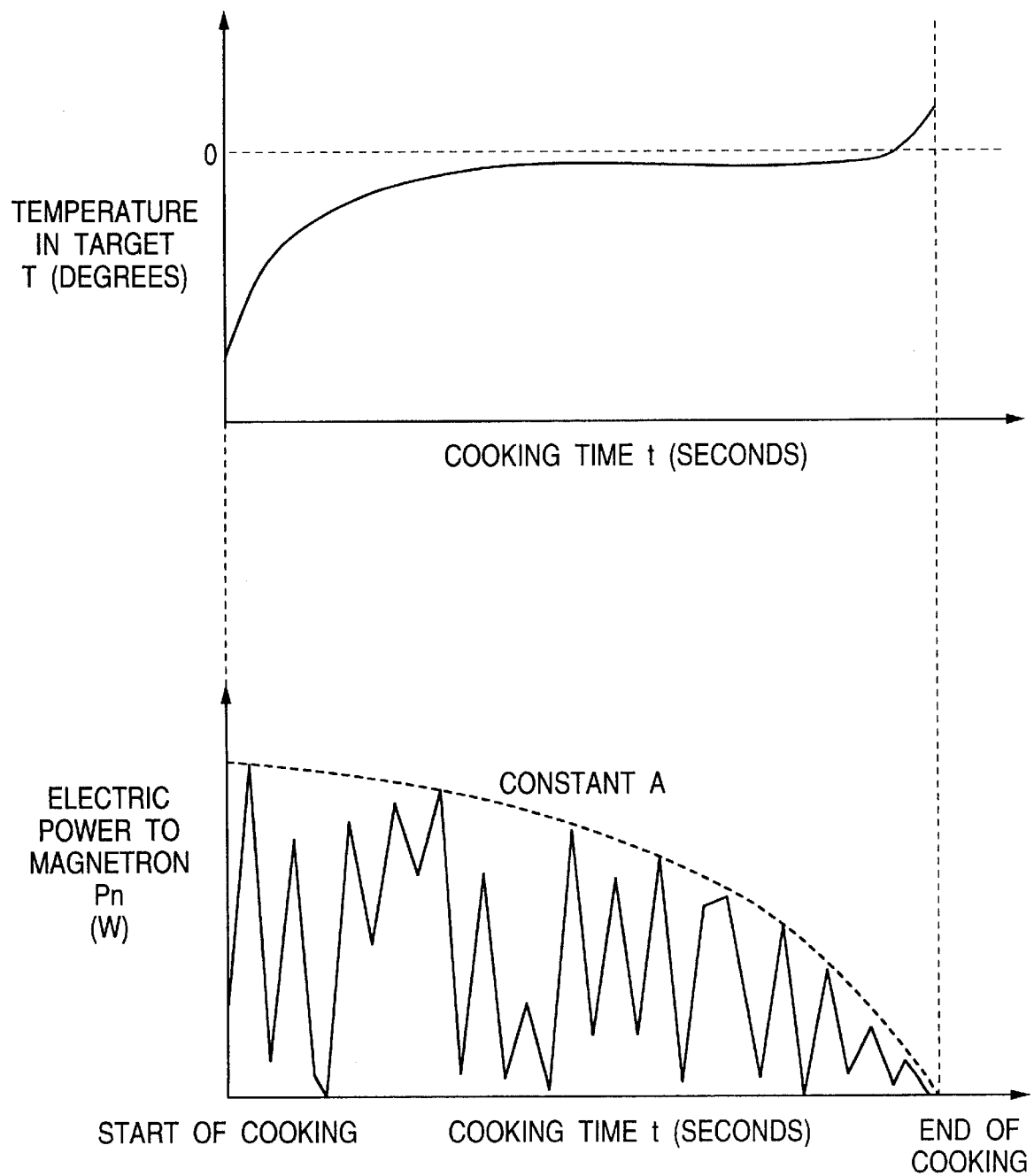
FIG. 34 is a graph showing the relationship between electric power which must be supplied to the magnetron and temperatures in a target which must be heated.

FIG. 34 is a graph showing the relationship between electric power which must be supplied to the magnetron 1 and temperatures T in the target which must be heated in such a manner that the axis of abscissa stands for cooking time t.

When a target which must be heated is attempted to be optimally defrosted, it in preferable that large electric power is supplied in the initial stage of the defrosting process and small electric power is supplied immediately before the completion of the defrosting process. Thus, average electric power P which must be supplied to the magnetron 1 is adjusted in accordance with the state of the target which must be heated, as shown in FIG. 34. Thus, the defrosting time can furthermore be shortened and the temperature distribution in the target which must be heated can furthermore be improved during the defrosting process.

The tenth embodiment will furthermore be described.

This embodiment has a structure that time is set for which control of dielectrical heating is performed in accordance with a chaos signal to correspond to the state of shift of the phase of a target which must be heated. The structure and operation of this embodiment which are different from those of the third embodiment will mainly be described. The other structures and operations are the same as those of the third embodiment.

The structure of the tenth embodiment will now be described with reference to FIG. 35.

Referring to FIG. 35, reference numeral 131 represents a chaos-time storage means on which time for which dielectrical heating is performed in accordance with a state of shift of the phase of a target obtained from the state storage means 120, that is, chaos time is stored.

The chaos-time comparison means 131 subjects the cooking time stored on the cooking-time measuring means 41 and the chaos time stored on the chaos-time storage means 130 to a comparison to determine whether or not dielectrical heating is performed in accordance with the chaos signal. The chaos-time comparison means 131 transmits a result of the determination as the chaos-time determination signal to a first control selection means 132.

When a determination has been made that the chaos time has elapsed in accordance with the chaos-time determination signal transmitted from the chaos-time comparison means 130, the first control selection means 132 selects a small-electric-power control means 133 so as to start dielectric heating control with small electric power.

Tho operation of the tenth embodiment will now be described with reference to FIGS. 36 and 37.

Figure 36:
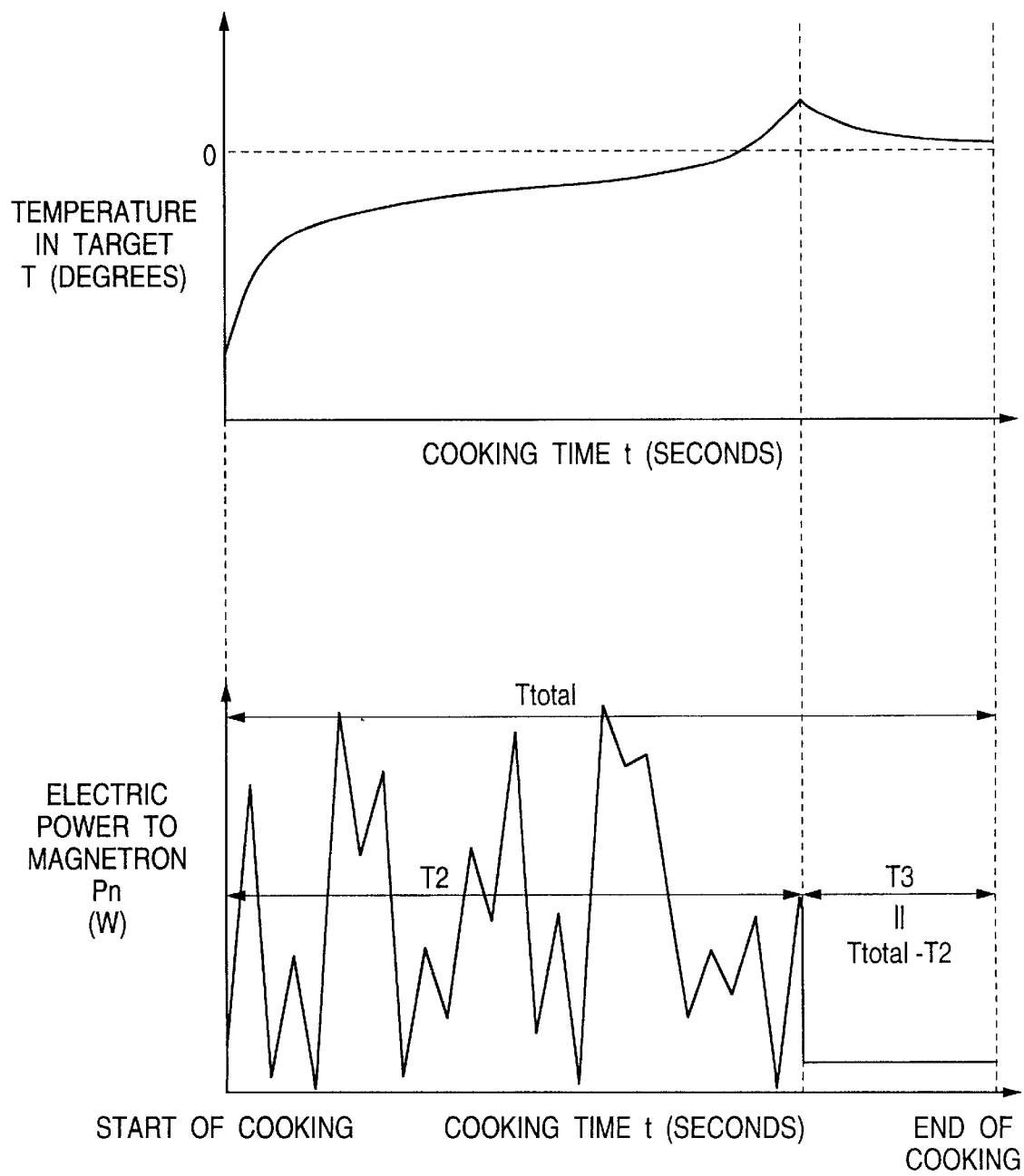
FIG. 36 is a graph showing the relationship between electric power which must be supplied to the magnetron and temperatures in a target which must be heated.

FIG. 36 is a graph showing the relationship between electric power P which must be supplied to the magnetron 1 and temperatures T of the target which must be heated in such a manner that the axis of abscissa stands for cooking time t. Note that the defrosting time is indicated with Ttotal, the chaos time is indicated with time T2 and small-electric-power time is indicated with time T3.

As described above, the temperature distribution in the target which must be heated is uniformed in accordance with the chaos signal when the target is defrosted. If a portion of the target which must be heated is first defrosted for some reason or other, energy of microwaves emitted from the magnetron is concentrated to the first defrosted portion. As a result, the temperature of the foregoing portion is sometimes rapidly raised. Accordingly, the dielectrical heating using the chaos signal performed for time T2 is ended before defrosting of a portion of the target which must be heated is started, as shown in FIG. 36. Thent dielectrical heating using small electric power is performed for time T3 so that the distribution of temperatures in the target which must be heated in furthermore uniformed.

Figure 37:
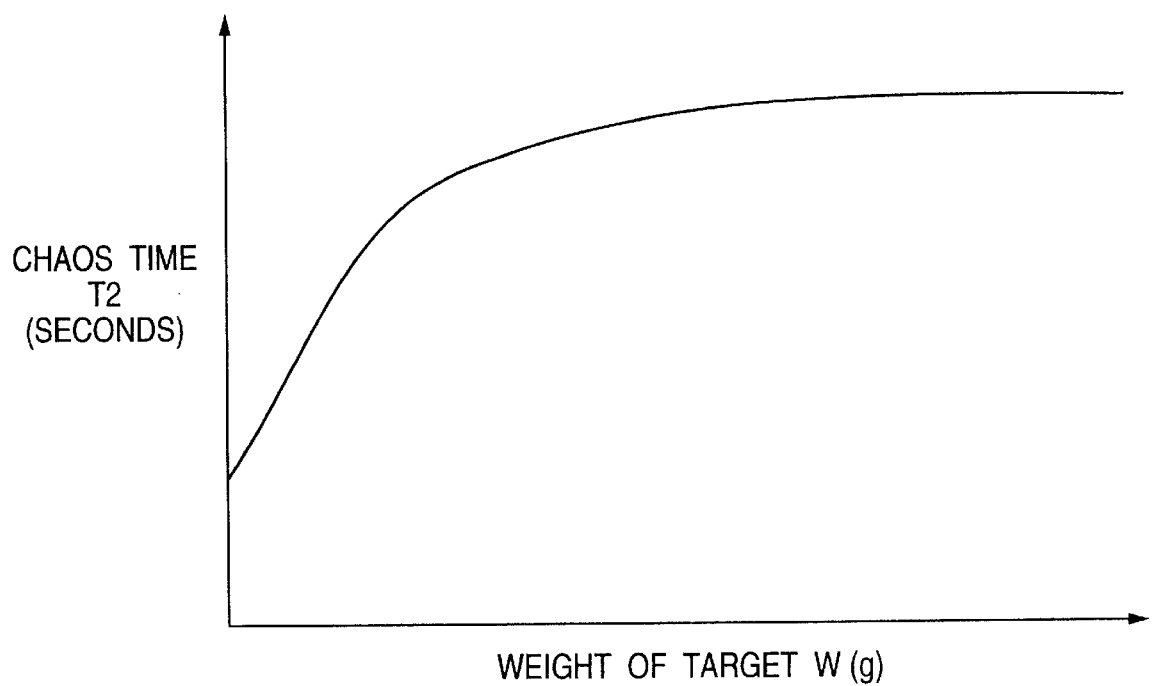
FIG. 37 is a graph showing the relationship between weights of targets which must be heated and chaos time.

FIG. 37 shows the relationship between the weight W of the target which must be heated and chaos time T2. As can be understood from FIG. 37, if the weight W of the target which must be heated in heavy, also energy required to defrost the target is enlarged. As a result, the chaos time T2 is elongated. If the weight W of the target which must be heated is small, also energy required to defrost the target is reduced. As a result, the chaos time T2 in shortened.

The chaos-time storage means 130 has the stored relationship between the weight W of the target and the chaos time T2 shown in FIG. 37. In accordance with a state of shift of the phase of a target communicated from the state switch 120, the chaos-time storage means 130 determines the chaos time T2.

Although the weight of the target which must be heated is employed as an example of the states of the microwave oven and the target which must be heated, another state for determining the chaos time may be employed because a multiplicity of states exist which include the type of the target. Even if the other state is employed, a similar effect can be obtained.

In addition to the structure of the third embodiment, the tenth embodiment has the structure that the quantity of microwaves which must be emitted is changed in accordance with the state of shift of the phase of a target which must be heated. Since the quantity of microwaves which must be applied in the chaos manner corresponding to the state of the target is determined, waste of time can be prevented and the effect of the chaos can be obtained in an optimum state for the target which must be heated.

Eleventh Embodiment

An eleventh embodiment will now be described.

In addition to the structure according to the third embodiment, the eleventh embodiment has a structure that the quantity of microwaves which must be applied is changed in accordance with a selected chaos state from a plurality of chaos states.

The structure and operation of the eleventh embodiment which are different from those of the third embodiment will mainly be described. The other structures and operations are the same as those of the third embodiment.

The structure of the eleventh embodiment will now be described with reference to FIG. 38.

Figure 38:
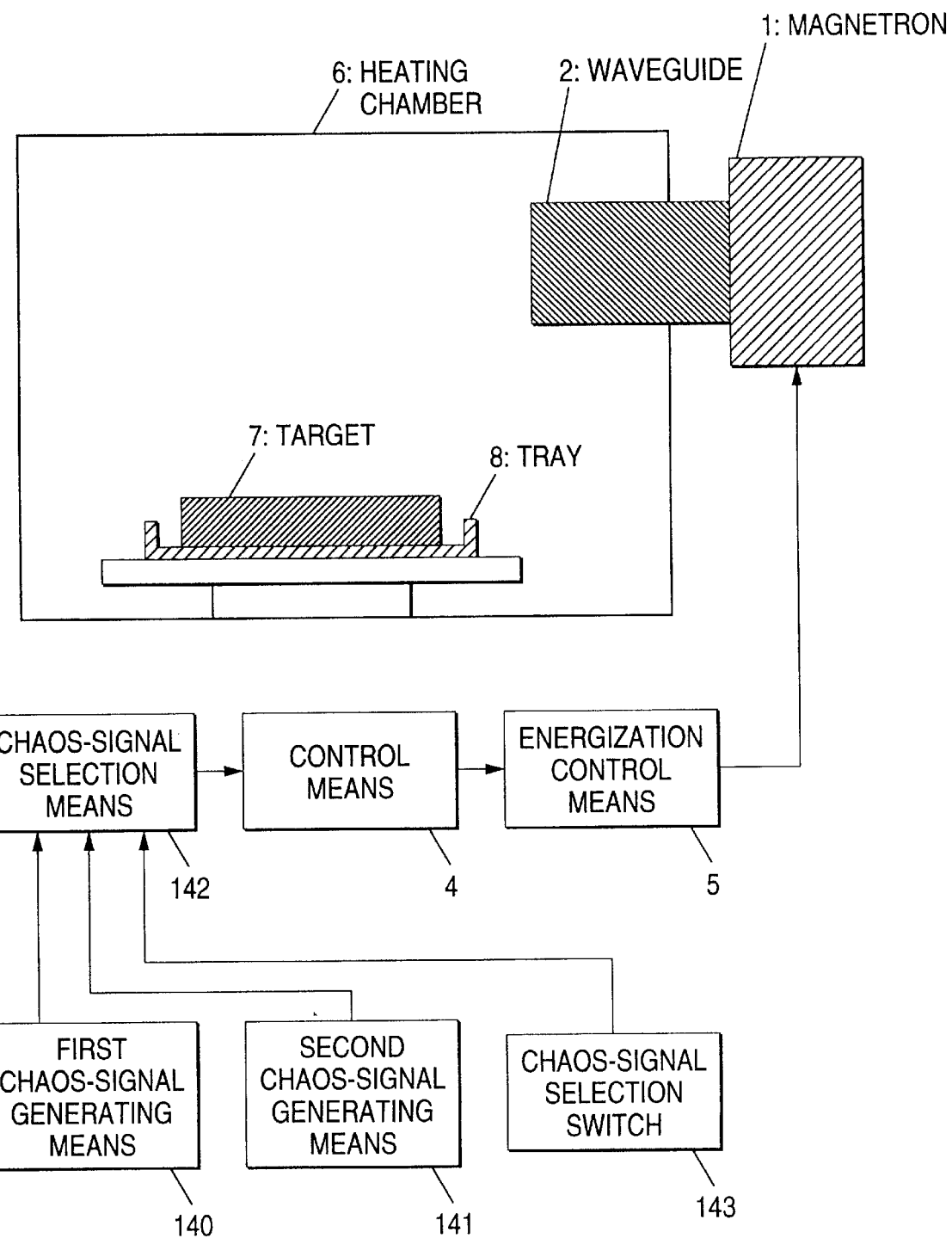
FIG. 38 is a block diagram showing a microwave oven according to an eleventh embodiment of the present invention.

Referring to FIG. 38, reference numeral 140 represents a first chaos-signal generating means for calculating a chaos signal and transmitting the chaos signal to a chaos-signal selection means 142 as a first chaos signal. Reference numeral 141 represents a second chaos-signal generating means for calculating a chaos signal, which is different from that generated by the first chaos-signal generating means, so as to transmit the different chaos signal to a chaos-signal selection means 142.

The chaos-signal selection means 142 selects either of the first chaos signal generated by the first chaos-signal generating means 140 or the second chaos signal generated by the second chaos-signal generating means 141 in accordance with information supplied from a chaos-signal selection switch 143 so as to transmit the selected chaos signal to the control means 4.

The operation of the eleventh embodiment will now be described with mainly reference to FIG. 39.

Figure 39:
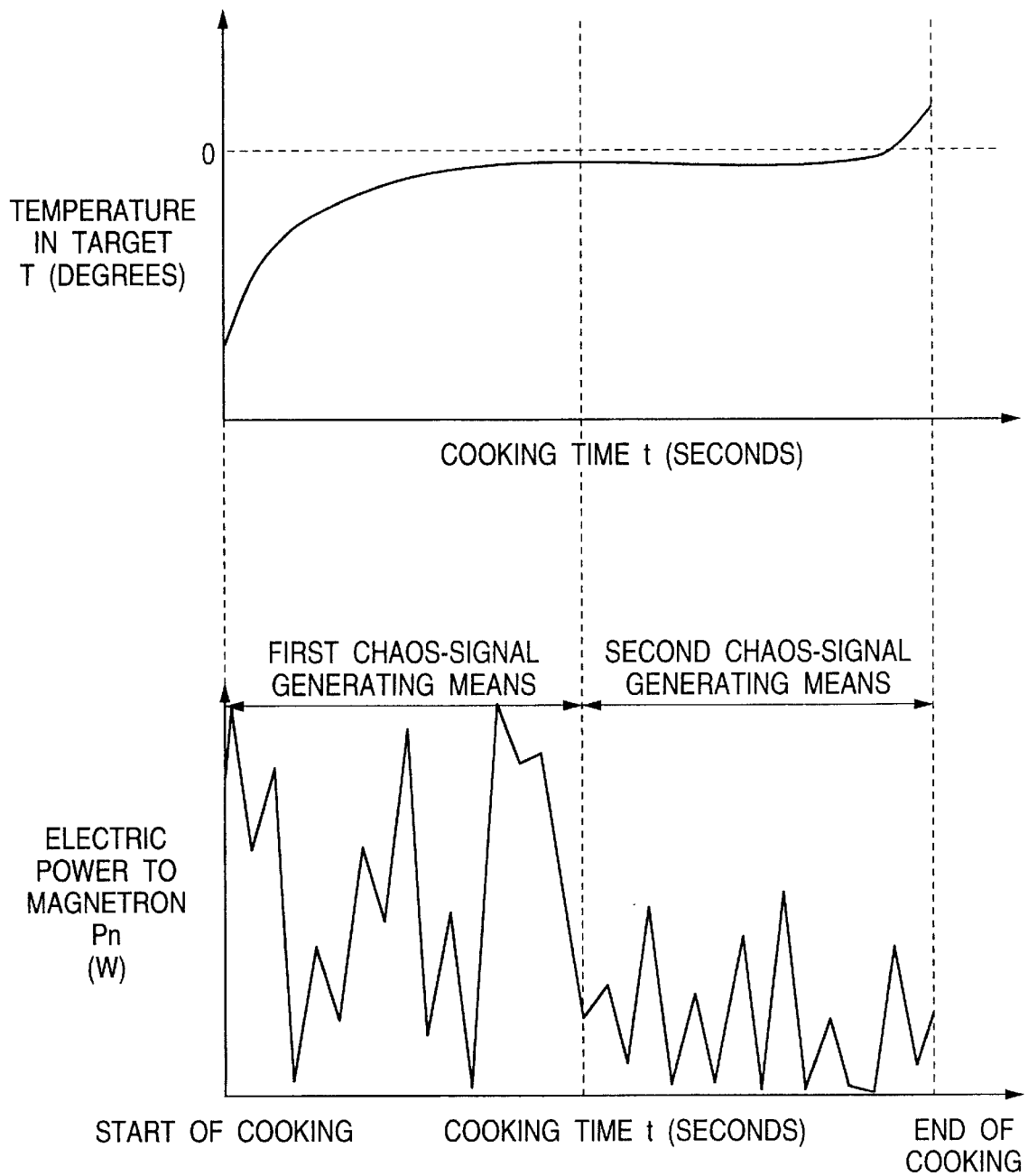
FIG. 39 is a graph showing the relationship among first and second chaos signals and temperatures in a target which must be heated.

FIG. 39 is a graph showing the relation5hip among first chaos signals X1n, second chaos signals X2n and temperatures T in the target which must be heated in such a manner that the axis of abscissa stands for cooking time t.

In a state in which the overall body of the target which must be heated is frozen, microwaves generated by the magnetron 1 are not attenuated and allowed to uniformly impinge on the overall body of the target which must be heated. As a result, the temperatures of the target which must be heated are uniformly raised. If a portion of the target is first defrosted, energy of the microwaves is concentrated to the first defrosted portion. Thus, the temperature of the portion is rapidly raised. Accordingly, the first chaos signal for enlarging average electric power which must be supplied to the magnetron is selected when the temperature of the target which must be heated in low so that the defrosting time is made to be is the shortest possible time. Then, the second chaos signal for reducing average electric power which must be supplied to the magnetron is selected so that rapid rise in the temperature of the first defrosted portion is prevented. As a result, temperature distribution in the target which mast be heated is furthermore uniformed during the defrosting process.

The chaos-signal selection means 142 initially selects the first chaos signal for supplying large average electric power which must be supplied to the magnetron 1, and then selects the second chaos signal for supplying small electric power which must be supplied to the magnetron 1, as shown in FIG. 39.

The eleventh embodiment has the structure that change is performed in accordance with the chaos state selected from a plurality of chaos statcs. Since the electric power which must be supplied to the magnetron is adjusted in accordance with the selected chaos, dielectric heating can be controlled in an optimum chaos state for the state of the target. Thus, temperatures can furthermore satisfactorily be distributed in the target which must be heated during the defrosting process.

Twelfth Embodiment

A twelfth embodiment will now be described. In comparison to the second embodiment, the twelfth embodiment has a structure that a step for changing the chaos time sequence is changed in accordance with a heating condition in the microwave oven and the like. Therefore, only different portions from the structure and operation of the second embodiment will now be described. The other structures and operations are the same as those of the second embodiment.

Figure 77:
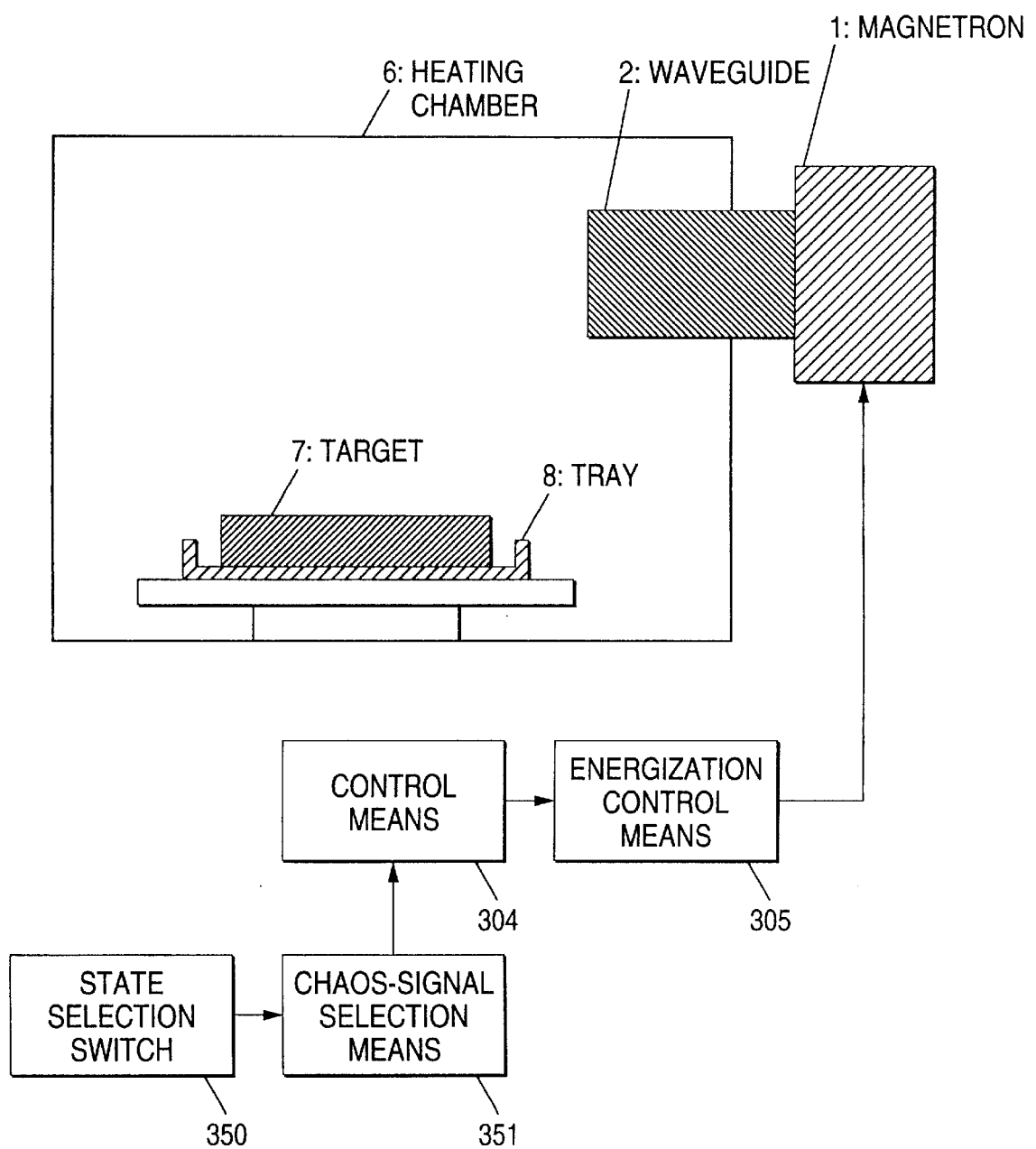
FIG. 77 is a diagram showing a microwave oven according to a twelfth embodiment of the present invention.

Tha twelfth embodiment will now be described with reference to FIG. 77. Referring to FIG. 77, reference numeral 350 represents a state selection switch for selecting heating conditions of a target which must be heated and the microwave oven and storing the same. A chaos-signal selection means 351 selects an optimum chaos signal optimum for the heating condition stored in the state selection switch 350 so as to transmit the selected chaos signal to a control means 304.

Figure 78:
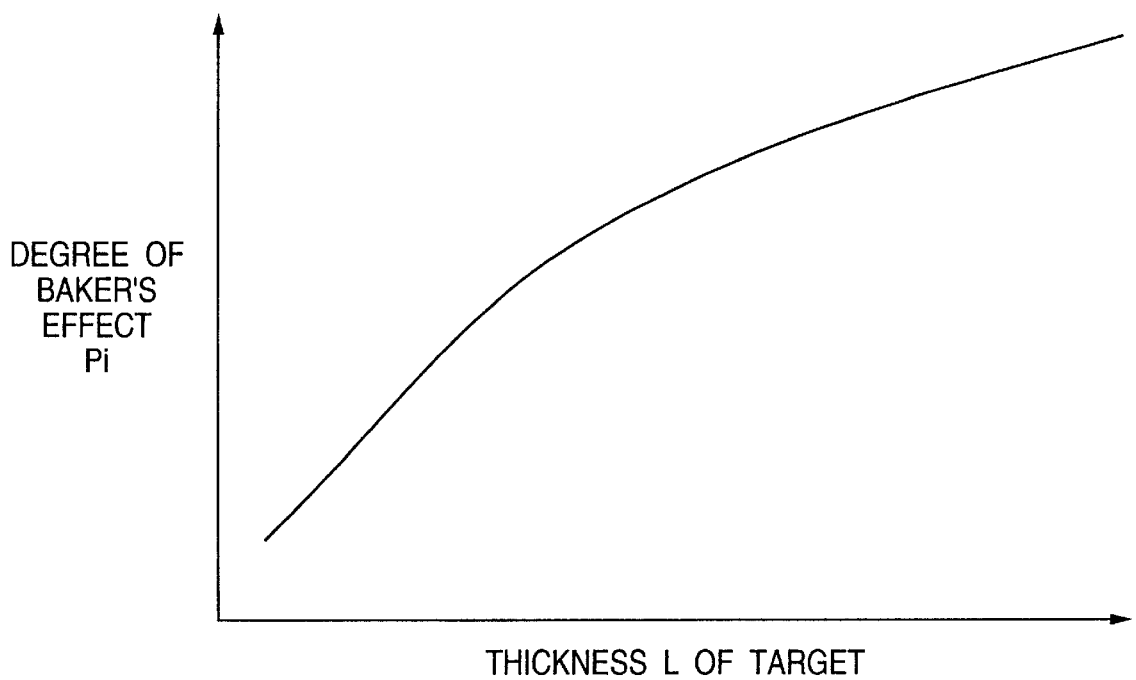
FIG. 78 is a graph showing the relationship between thicknesses of targets which must be heated and the baker's transformation effect.

An example of the twelfth embodiment will now be described with reference to FIG. 78. FIG. 78 is a graph showing the relationship between the thickness of a target which must be heated and the baker's transformation effect of the chaos signal.

The baker's transformation effect of the chaos signal is used to uniform a the temperature distribution in the target which must be heated. Since the transmission condition varies if the condition of a target which must be heated, for example, the thickness of the same varies, an optimum chaos signal is changed. That is, if the target which must be heated has a large thickness, heat cannot easily be transmitted. Therefore, a great baker's transformation effect is required to uniform the temperatures in the target. As described above, an optimum chaos signal exists depending on the condition of the target which must be heated. The foregoing fact is as well as applied to the condition of the microwave oven and the like.

The chaos-signal selection means 351 has the relational chart shown in FIG. 78 to select an optimum chaos signal to follow the heating condition selected by the state selection switch 350 so as to transmit the selected chaos signal to the control means 303.

The structure and operation of the twelfth embodiment arranged in such a manner that an optimum chaos signal for the heating condition is selected enable the defrosting process to realize a satisfactory grade of finishing even if the heating condition is different.

Thirteenth Embodiment

In addition to the structure according to the third embodiment, the thirteenth embodiment has a structure that the quantity of microwaves which must be emitted is changed to correspond to the defrosting environment including the size of the defrosting chamber and whether or not a reflecting plate is provided. The structure and operation of the thirteenth embodiment different from those of the third embodiment will mainly be described. The other structures and operations are the same as those of the third embodiment.

The structure of the thirteenth embodiment will now be described with mainly reference to FIG. 40.

Referring to FIG. 40, reference numeral 150 represents a defrosting-environment-state storage means having a defrosting environment including the size of the defrosting chamber and whether or not a reflecting plate is provided.

A first-maximum-electric-power setting means 151 follows the defrosting environment state stored on the defrosting-environment-state storage means 150 to determine the maximum electric power which must be supplied to the magnetron 1 and transmits a maximum electric power signal.

A control means 4 performs control to adjust electric power which must be supplied to the magnetron 1 in accordance with the chaos signal generated by the chaos-signal generating means 10 in such a manner that maximum electric power which must be supplied to the magnetron 1 does not exceed the maximum electric power determined by the first-maximum-electric-power setting means 151.

An example of the operation of the thirteenth embodiment will now be described with reference to FIGS. 41 and 42.

Figure 41:
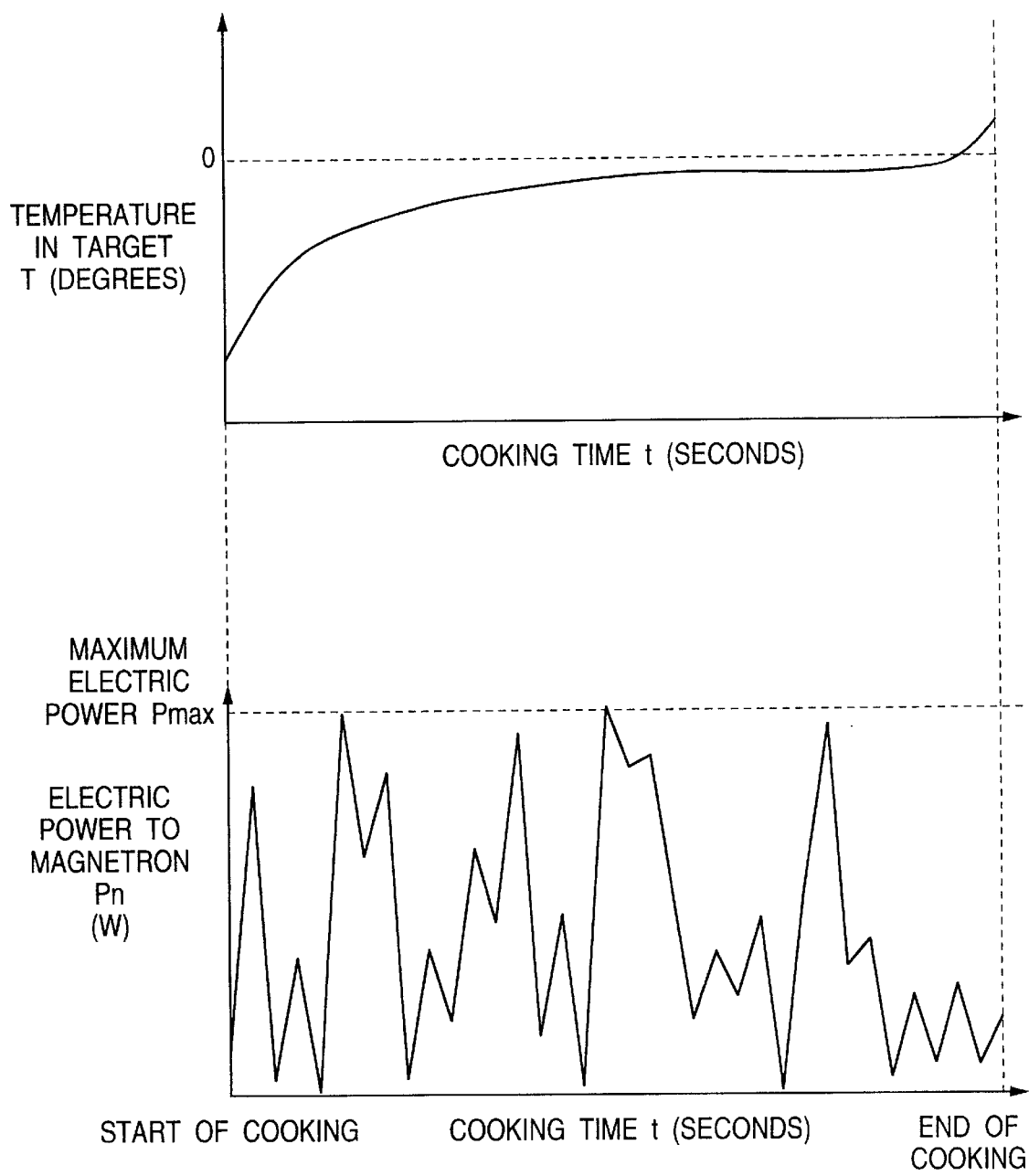
FIG. 41 is a graph showing the relationship between electric power which must be supplied to the magnetron and temperatures in a target which must be heated.

FIG. 41 is a graph showing the relationship between electric power Pn which must be supplied to the magnetron 1 and temperature T in the target which must be heated. Note that axis of abscissa of the graph stands for cooking time t.

If an excessively large cumulative electric power is, in the defrosting process, supplied to the magnetron 1 with respect to the size of the heating chamber or the like, a portion of a target which must be heated is first converted into water. Therefore, the target is sometimes heated excessively. To prevent the foregoing problem, the maximum electric power which must be supplied to the magnetron is set to be adaptable to the defrosting environment. Thus, the cumulative electric power is adjusted.

Figure 42:
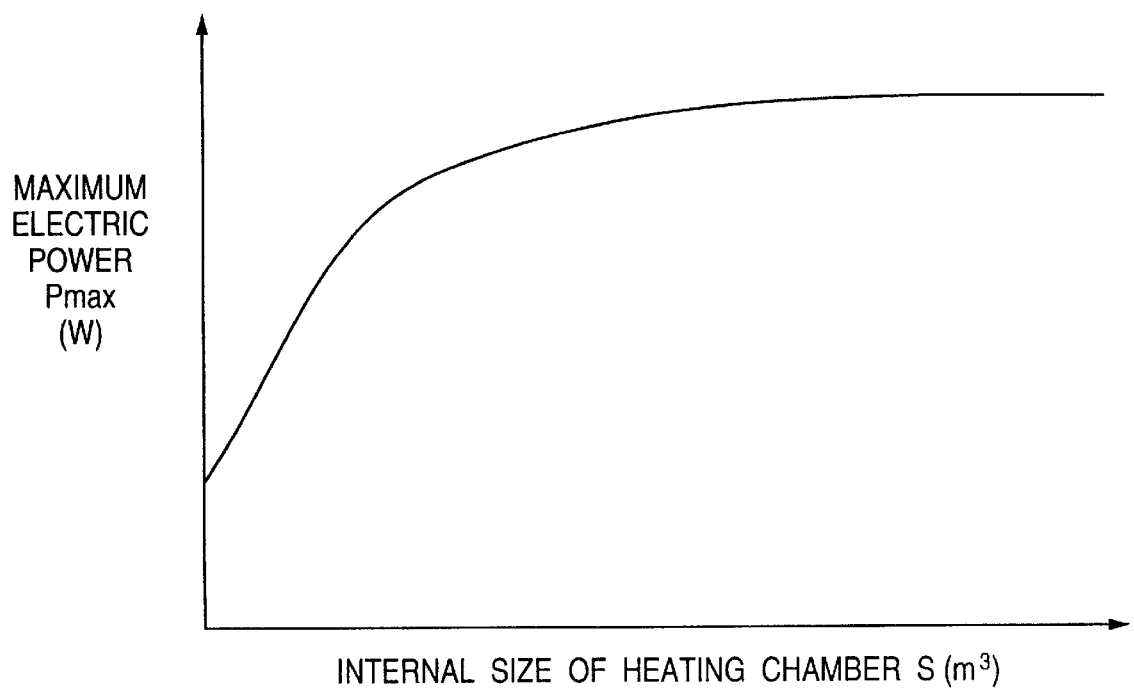
FIG. 42 is a graph showing the relationship between sizes of heating chambers and maximum electric power.

FIG. 42 is a graph showing the relationship between the sizes S of heating chambers and maximum electric power Pmax. If the heating chamber is small, the total electric power required to defrost a target can be reduced. If the thermal capacity is large, large total electric power is required to defrost a target which must be heated.

Therefore, as shown in FIG. 42, the maximum electric power Pmax which must be supplied to the magnetron 1 is determined with respect to the size S of a heating chmber. Thus, the temperature distribution in the target can furthermore be uniformed.

The first-maximum-electric-power setting means 151 has maximum electric power determined by the defrosting-environment-state storage means 150 and adaptable to the size of the heating chamber and whether or not a reflecting plate is provided. The first-maximum-electric-power setting means 151 transmits, to the control means 4, maximum electric power which must be supplied to the magnetron 1 to be adaptable to the defrosting environment state.

Although the size of the heating chamber is employed as an example of the defrosting environment state, another condition may be employed to obtain the same effect because the total electric power required to defrost a target is changed depending on the condition, for example, whother or not the reflecting plate is provided.

The thirteenth embodiment has the structure that the quantity of microwaves which must be applied is changed to be adaptable to the defrosting environment including the size of the thermal capacity and whether or not a reflecting plate is provided. Since the quantity required to defrost a target is determined to be adaptable to the defrosting environment, excessive application of energy of microwaves can be prevented when the defrosting process is performed.

Fourteenth Embodiment

The structure and operation of a fourteenth embodiment will now be described. The fourteenth embodiment in different from the twelfth embodiment in a step in which a value obtained by a sensor is used in place of the state selection switch 350 so as to select a chaos signal. The structures and operations different from the twelfth embodiment will mainly be described. The other structures and operations are the same as those of the twelfth embodiment.

Figure 79:
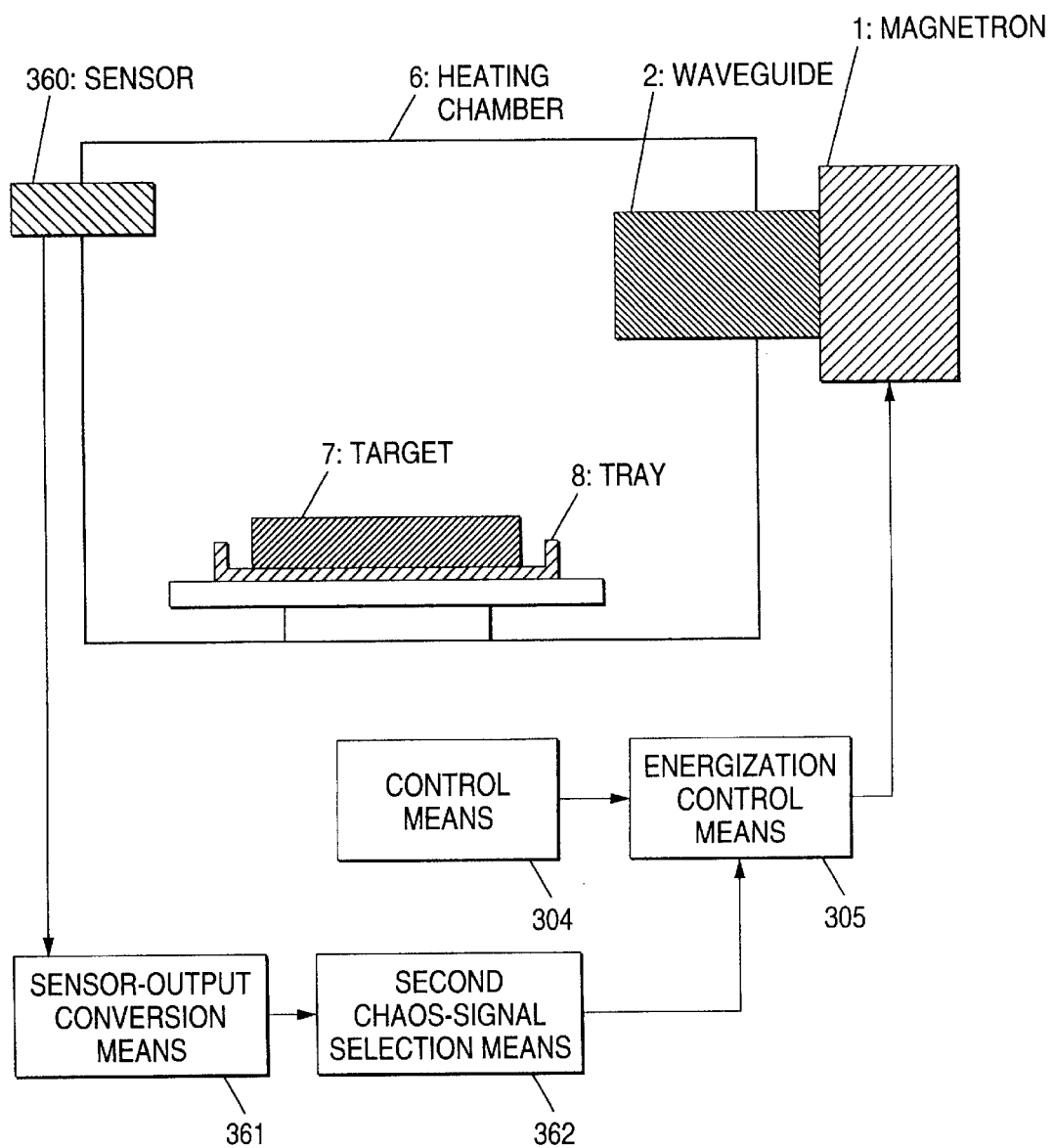
FIG. 79 is a block diagram showing a microwave oven according to a fourteenth embodiment of the present invention.

The structure of the fourteenth embodiment will now be described with reference to FIG. 79. Reference numeral 360 represents a sensor disposed in a heating chamber and arranged to measure the temperature in the heating chamber and the like. A sensor-value conversion means 361 receives an output from the sensor 360 to convert the output value from the sensor into data about the temperature or the like so as to transmit a result of the conversion to a second chaos-signal selection means 360 as a sensor value. The second chaos-signal selection means 360 determines an optimum chaos signal from the sensor value obtained from the sensor-value conversion means 361.

The operation of the fourteenth embodiment will now be described.

As described in the twelfth embodiment, a chaos signal optimum for cach heating condition exists. The fourteenth embodiment has the structure that a chaos signal optimum for the heating condition in the microwave oven is automatically selected by using the sensor.

The structure and operation of the fourteenth embodiment have the structure that a chaos signal optimum for the heating condition in the microwave oven is automatically selected when the defrosting process is performed. Therefore, even if the heating condition in the microwave oven is different, a user is not required to perform any operation to defrost a target with a satisfactory grade of finishing.

Fifteenth Embodiment

In addition to the structure according to the third embodiment, a fifteenth embodiment has a structure that the quantity of microwaves which must be applied is changed to be adaptable to the environment for a target, for example, the type, weight and the like of the target. The structures and operations different from the third embodiment will mainly be described. The other structures and opera&iQns are the same as those of the third embodiment.

The structure of the fifteenth embodiment will now be described with mainly reference to FIG. 43.

Figure 43:
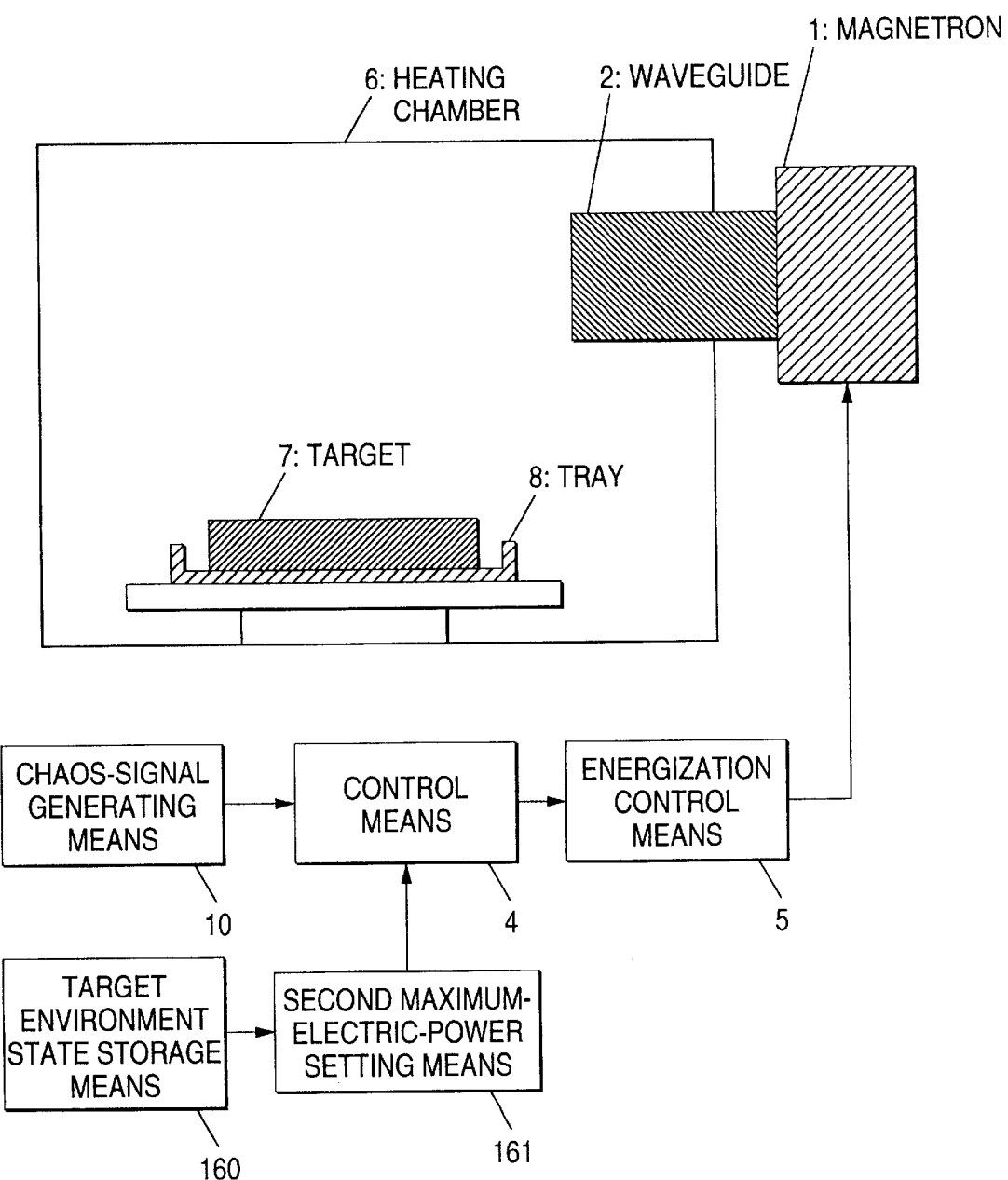
FIG. 43 is a block diagram showing a microwave oven according to a fifteenth embodiment of the present invention.

Referring to FIG. 43, reference numeral 160 represents a target-environment-state storage means on which the target environment including the type, weight and the like of the target is stored.

A second maximum-electric-power setting means 161 follows a target environment state stored in the target-environment-state storage means 160 to determine maximum electric power which must be supplied to the magnetron 1.

The control means 4 performs control to adjust electric power which must be supplied to the magnetron 1 in accordance with the chaos signal generated by the chaos-signal generating means 10 in such a manner that the maximum electric power which must be supplied to the magnetron 1 does not exceed the maximum electric power set by the second maximum-electric-power setting means 161.

An example of the fifteenth embodiment will now be described with reference to FIGS. 41 and 44.

FIG. 41 is a graph showing the relationship between electric power Pn which must be supplied to the magnetron 1 and temperature T in the target which must be heated. Note that axis of abscissa of the graph stands for cooking time t.

If the cumulative electric power which must be supplied to the magnetron 1 is too large with respect to the weight or the like of a target in the defrosting process, a portion of the target is first converted into water. Thus, the target which must be heated is sometimes heated excessively. To prevent this, the maximum electric power which must be supplied to the magnetron is determined to be adaptable to the environment state of the target so as to adjust the cumulative electric power which must be supplied to the magnetron.

Figure 44:
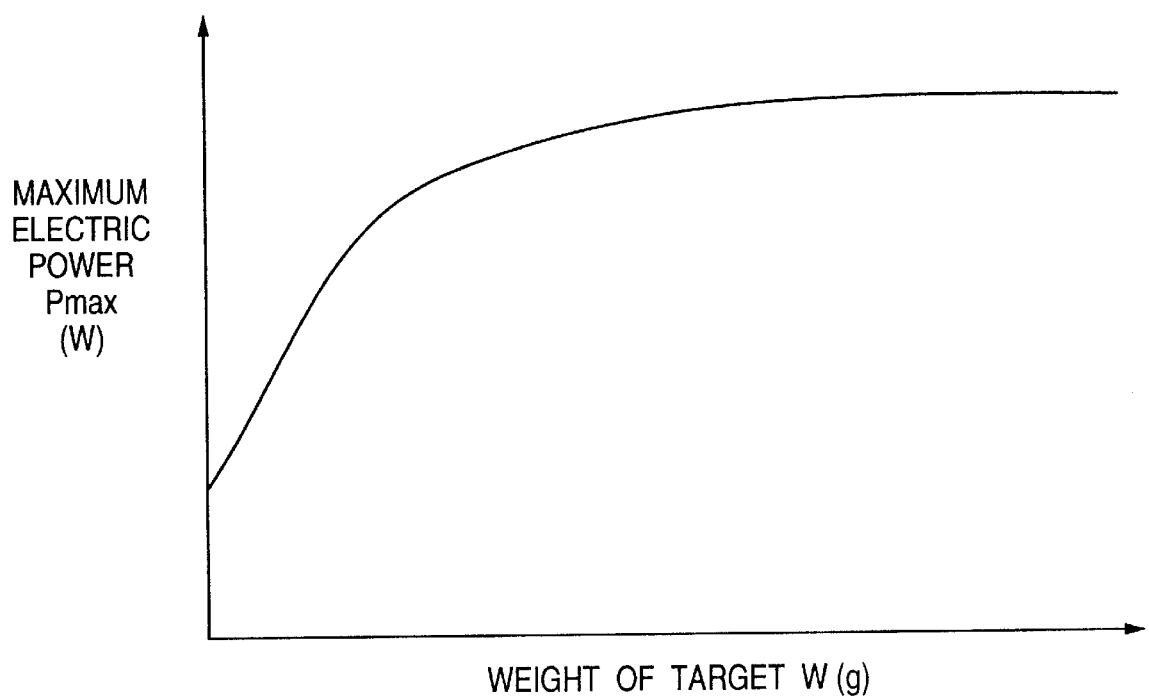
FIG. 44 is a graph showing the relationship between weights of targets which must be heated and maximum electric power.

FIG. 44 is a graph showing the relationship between the weight W of the targQt which must be heatQd and maximum electric power Pmax. In general, if the target which must be heated is light, total electric power required to defrost the target can be reduced. If the target is heavy, large total electric power required to defrost the target is required.

Therefore, maximum electric power Pmax which can be supplied to the magnetron 1 with respect to the weight W of a target which must be heated is determined, as shown in FIG. 44. Thus, the temperature distribution in the target is furthermore uniformed.

The second maximum-electric-power setting meant 161 has maximum electric power adaptable to the type or the weight of the target selected by the target-environment-state storage means 160 so as to communicate, to the control means 4, the maximum electric power which is adaptable to the environment state of the target and which must be supplied to the magnetron 1.

Although the weight of the target which must be heated is employed as the state of the environment of the target, the total electric power required to defrost a target is changed depending on the condition of the target, for example, the type of the target. Therefore, another condition may be employed to set the maximum electric power to obtain the same effect.

The fifteenth embodiment has the structure that the quantity of microwaves which must be supplied is changed to be adaptable to the environment of a target including the type and weight of the same. Since the quantity required to defrost the target is determined to be adaptable to the environment of the target, excessive application of energy of microwaves can be prevented to defrost the target.

Sixteenth Embodiment

A sixteenth embodiment will now be described. The sixteenth embodiment is different from the twelfth embodiment in a step in which a chaos signal is selected while the temperature of the target which must be heated is measured in place of the state selection switch 340. The structures and operations different from the twelfth embodiment will mainly be described. The other structures and operations are the same as those of the twelfth embodiment.

Figure 80:
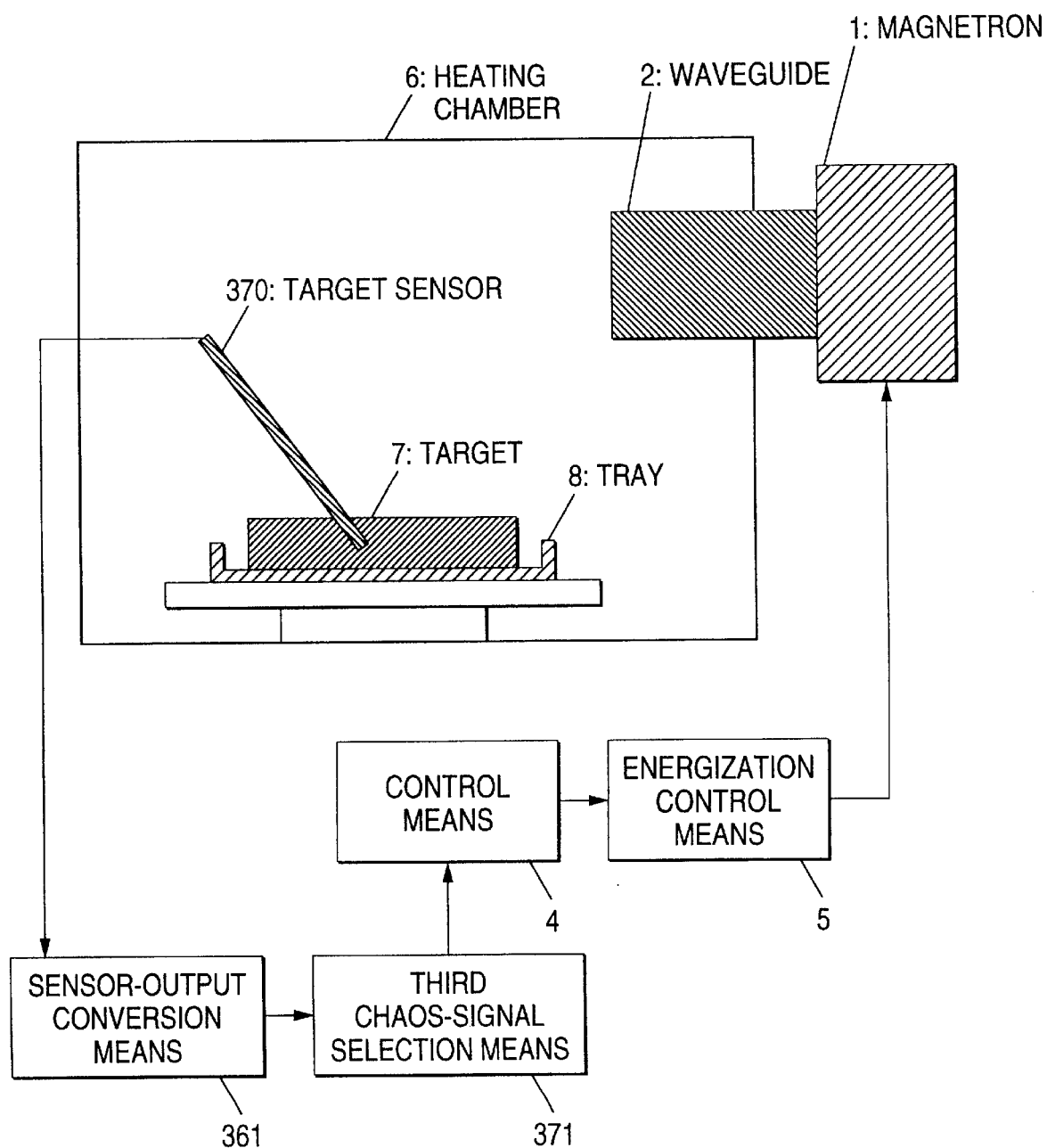
FIG. 80 is a block diagram showing a microwave oven according to a fifteenth embodiment of the present invention.

The structure of the sixteenth embodiment will now be described with reference to FIG. 80. Reference numeral 370 represents a target sensor for measuring the temperature in the target which must be heated. A sensor-value conversion means 361 converts the output of the target sensor 370 into a temperature so as to transmit the result as the temperature of the target. A third chaos-signal selection means 371 selects a chaos signal in accordance with the temperature of the target obtained from the sensor-output conversion means 361.

The operation of the sixteenth embodiment will now be described with reference to FIG. 81.

Figure 81:
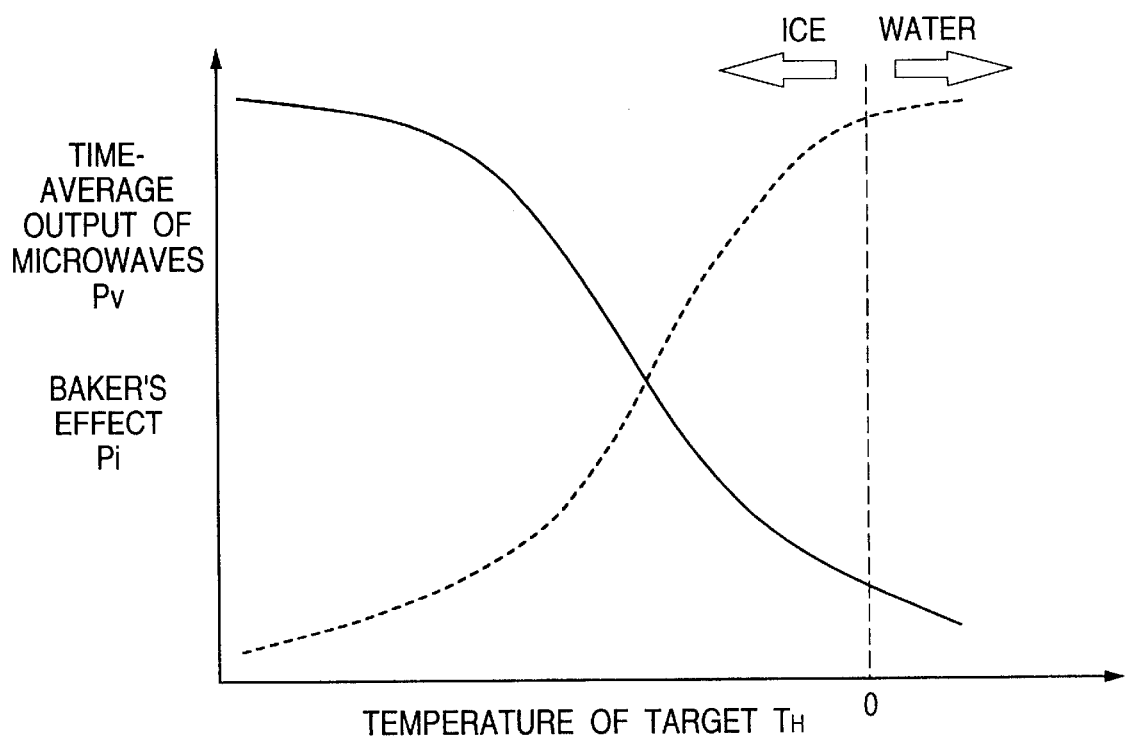
FIG. 81 is a graph showing the relationship between temperatures of targets which must be heated and time-average outputs of waves.

FIG. 81 is a graph showing the relationship between the temperature of a target which must be heated and output of microwaves per hour with a solid line and that between the temperature of the target and the required baker's transformation affect with a dashed line. If the temperature of the target which must be heated is low and the internal portion of the target is fully frozen, microwaves emitted from the magnetron are not substantially attenuated and uniformly transmitted through the target so that heat is generated. If the temperature of the target which must be heated is raised and defrosting starts to covert a portion of the target into water, microwaves are concentrated as described above. Thus, the temperature of the foregoing portion is rapidly raised. Therefore, the temperature distribution in the target is improved by using the baker's transformation effect of the chaos signal. Thus, a chaos signal having a great baker's transformation efect and causing average output of microwaves to be realized must be selected when the temperature of the target is near zero degree.

The third chaos-signal selection means 371 selects an optimum chaos signal in accordance with the temperature of a target obtained by the target sensor by a method shown in FIG. 81.

The structure and operation of the sixteenth embodiment have an arrangement that a chaos signal adaptable to the temperature of a target which must be heated is selected to defrost the target. Therefore, optimum microwaves can always be emitted to defrost the target.

Seventeenth Embodiment

The structure and operation of a seventeenth embodiment will now be described.

In addition to the structure according to the first embodiment, the seventeenth embodiment has a structure that a larger quantity of microwaves is regularly applied before the phase of water in a target which must be heated is converted from water to liquid, the larger quantity being larger than a quantity which is applied in a period after the phase has been changed. The structures and operations of the seventeenth embodiment different from the first embodiment will mainly be described. The other structures and operations are the same as those of the first embodiment.

The structure of the seventeenth embodiment will now be described with mainly reference to FIG. 45.

Figure 45:
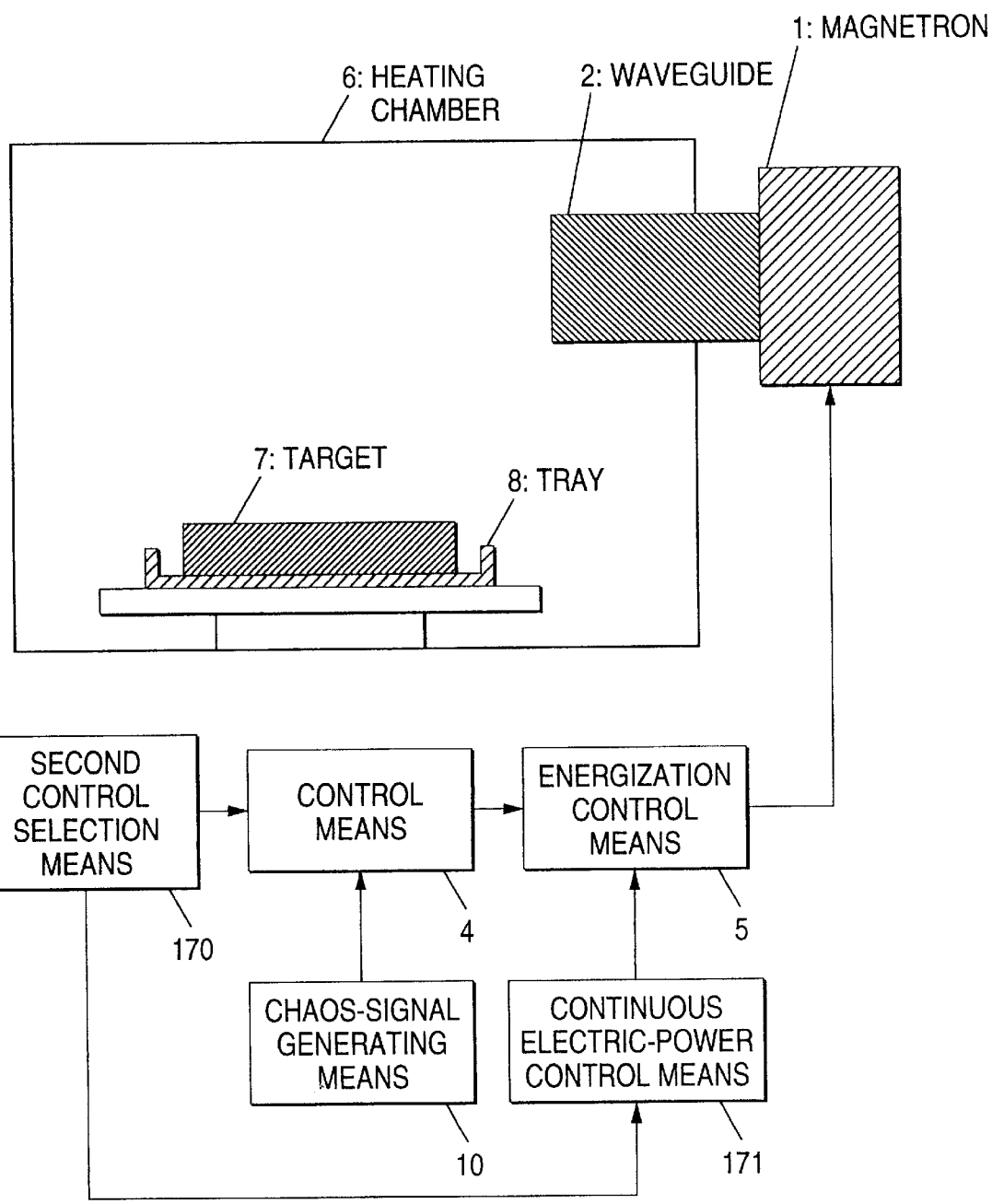
FIG. 45 is a block diagram showing a microwave oven according to a seventeenth embodiment of the present invention.

Referring to FIG. 45, reference numeral 170 represents a second control selection means for selecting either the control means 4 or the continuous electric-power control means 171 so as to transmit a second control selection signal to the selected control means.

When the continuous electric-power control means 171 is selected in accordance with the second control selection signal transmitted from the second control selection means 170, the continuous electric-power control means 171 transmits, to the energization control means 5, a control signal for continuously supplying electric power to the magnetron.

When the control means 4 is selected in accordance with the second control selection signal transmitted from the second control selection means 170, the control means 4 follows the chaos signal generated by the chaos-signal generating means 10 to transmit a chaos signal to the onergization control means 5 in order to adjust electric power which must be supplied to the magnetron 1.

Figure 46:
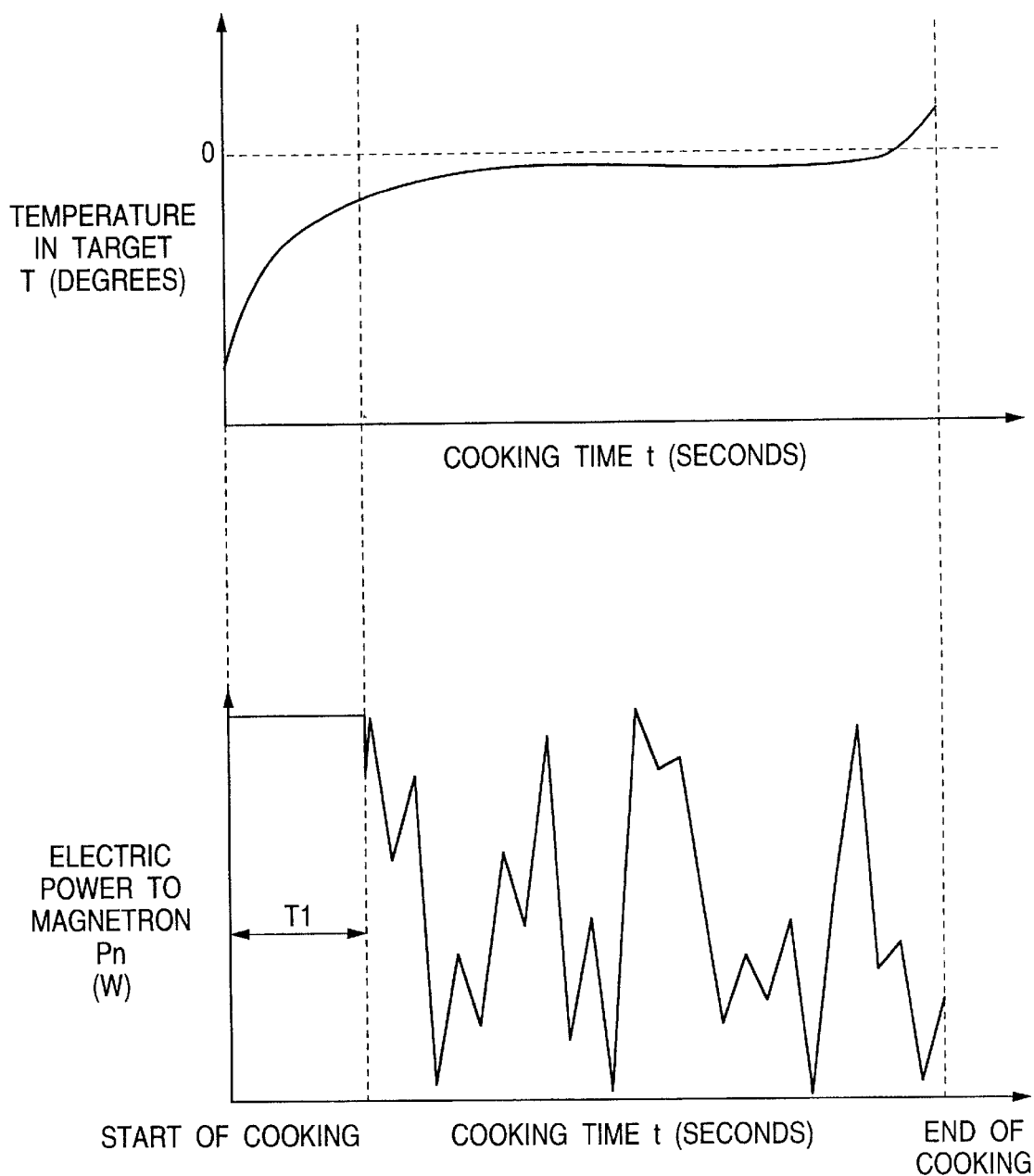
FIG. 46 is a graph showing the relationship between electric power which must be supplied to the magnetron and temperatures in a target which must be heated.

The operation of the seventeenth embodiment will now be described with mainly reference to FIG. 46.

If the internal portion of the target is fully frozen, microwaves emitted from the magnetron 1 are not substantially attenuated and uniformly transmitted through the target. Therefore, the temperature of the target is uniformly raised. Therefore, if the temperature of the target which must be heated is low and water in the target is in the form of a solid body, a large quantity of electric power may regularly be supplied to the magnetron 1 to heat the target. In this state, the grade of finishing of the defrosted target does not deteriorate and the time required to defrost a target can furthermore be shortened.

When the operation for defrosting a target which must be heated is started, the second control selection means 170 initially selects continuous electric-power control means 171 so that electric power in a large quantity in continuously supplied to the magnetron 1 for time T1. Then, the second control selection means 170 selects the control means 4 to adjust electric power which must be supplied to the magnetron 1 in accordance with the chaos signal generated by the chaos-signal generating means 10 so that the target which must be heated is defrosted.

The seventieth embodiment has the structure that a larger quantity of microwaves in regularly applied before the phasne of water in a target which must be heated in shifted from a solid body to liquid as compared with the quantity which is supplied in the following period of time. The structure and the operation of the seventeenth embodiment cause a target which must be heated to be regularly dielectrically heated with a large quantity of microwaves because the considerable affect of the chaos signal is not required immediatcly after the defrosting process has been started. Thus, the defrosting time can furthermore be shortened without deterioration in the grade of fishing of the target which muct be heated after it has been defrosted.

Eighteenth Embodiment

The structure and operation of an eighteenth embodiment will now be described. The eighteenth embodiment relates to a continuous electric-power supply step for continuously supplying electric power to the magnetron bofore a step for performing control to adjust the electric power to the magnetron in accordance with the chaos signal. The structure and operation of the eighteenth embodiment which are different from those of the second embodiment will mainly be described. The other structures and operations are the same as those of the second embodiment.

Figure 93:
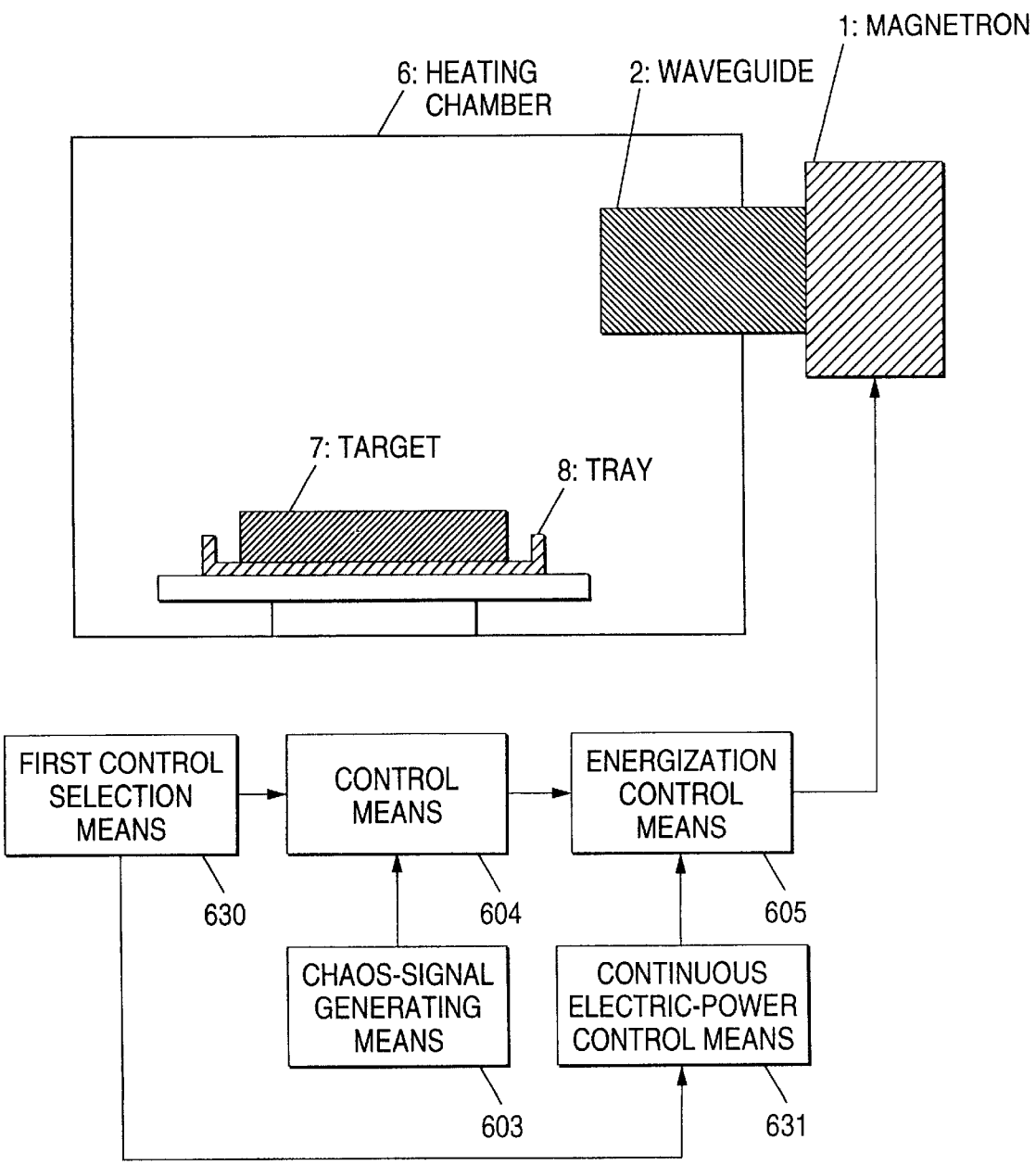
FIG. 93 is a block diagram showing a microwave oven according to an eighteenth embodiment of the present invention.

The structure of the eighteenth embodiment will now be described with reference to FIG. 93. Referring to FIG. 93, reference numeral 630 represents a first control selection means for selecting either the control means 604 or a continuos electric-power control means 631 to transmit a first control selection signal to the selected control means. When the continues electric-power control means 631 is selected in accordance with the first control selection signal transmitted from the first control selection means 630, the continuos electric-power control means 631 transmits, to the energization is control means 605, a control signal for continuously supplying electric power to the magnetron. When the control means 604 is shortened in accordance with the first control selection signal transmitted from the first control selection means 630, the control means 604 transmits, to the energization control means 605, a control signal for performing control to adjust electric power which must be supplied to the magnetron 1.

Figure 94:
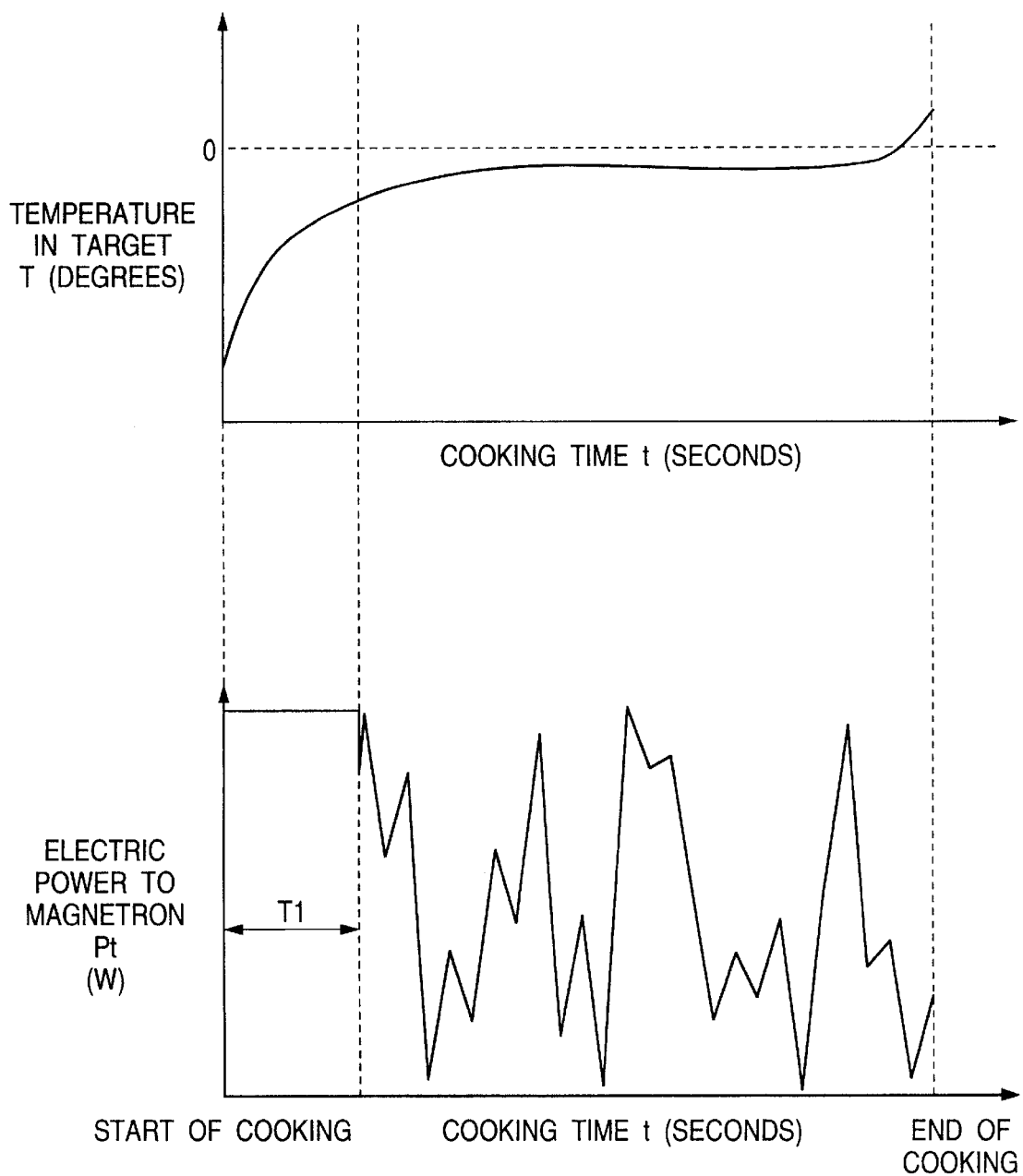
FIG. 94 is a graph showing the relationship between electric power which must be supplied to the magnetron and temperatures in a target which must be heated.

The operation of the eighteenth embodiment will now be described with reference to FIG. 94.

When the overall body of the target which must be heated is frozen, microwaves emitted from the magnetron are not substantially absorbed in the inside portion of the target and allowed to pass through the same. Therefore, the target is uniformly heated. Therefore, when the temperature of the target is low and the overall body of the target is in the form of ice, continuous supply of electric power to the magnetron to heat the target does not deteriorate the grade of finishing of the defrosted target and the defrosting time can furthermore be shortened.

When the operation for defrosting a target which must be heated is started, the first control means 630 initially selects continuous electric-power control means 631 so that electric power is continuously supplied to the magnetron for time T1. Then, the first control means 630 selects the control means 604 to adjust electric power which must be supplied to the magnetron in accordance with the chaos signal generated by the chaos-signal generating means 603 so that the target which must be heated is defrosted.

The eighteenth embodiment has the structure that the step for continuously supplying electric power to the magnetron is provided before the step for performing the control of dielectrical heating in accordance with the chaos signal.

Thus, the target can be dielectrically heated with large electric power because the considerable effect of the chaos signal is not required immediately after the defrosting process has been started. Thus, the defrosting time can furthermore be shortened without deterioration in the grade of finishing of the target which must be heated after it has been defrosted.

Nineteenth Embodiment

A nineteenth embodiment will now be described. In addition to the structure according to the second embodiment, the nineteenth embodiment has a large-electric-power supply time for which large electric power is supplied to the magnetron in accordance with the states of the microwave oven and the target which must be heated. The structure and the operation according to the nineteenth embodiment which are different from those of the second embodiment will mainly be described. The other structures and operations are the same as those of the second embodiment.

Figure 108:
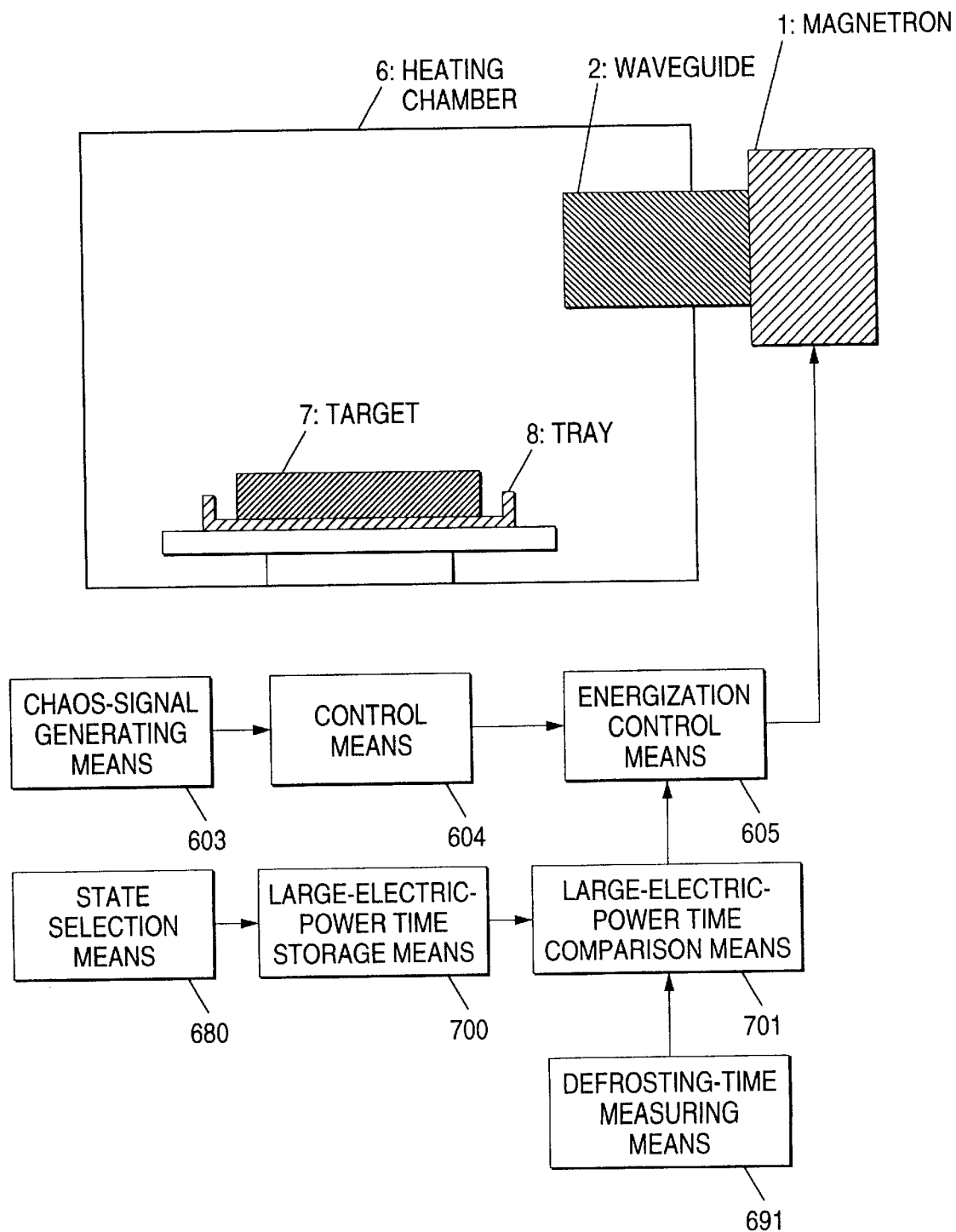
FIG. 108 is a block diagram showing a microwave oven according to a nineteenth embodiment of the present invention.

The structure of a nineteenth embodiment will now be described with reference to FIG. 108. Referring to FIG. 108, reference numeral 680 represents a state switch for selecting a state of the microwave oven and the target which must be heated. Thus, a user is permitted to select the state of the microwave oven and the target which must be heated. Reference numeral 701 represents a large-electric-power time storage means on which large-electric-power time corresponding to the states of the microwave oven and the target which must be heated to determine large-electric-power time from the state of the microwave oven and the target selected by the state switch 680. The large-electric-power-time comparison means 701 subjects the cooking time measured by a cooking-time measuring means 691 and large-electric-power time stored on the large-electric-power time storage means 700 to a comparison to determine a maximum value of electric power which must be supplied to the magnetron. In accordance with the control signal transmitted from the control means 604, the energization control means 605 adjusts the electric power which must be supplied to the magnetron to cause maximum electric power determined by the large-electric-power-time comparison means 693 to be supplied.

Figure 109:
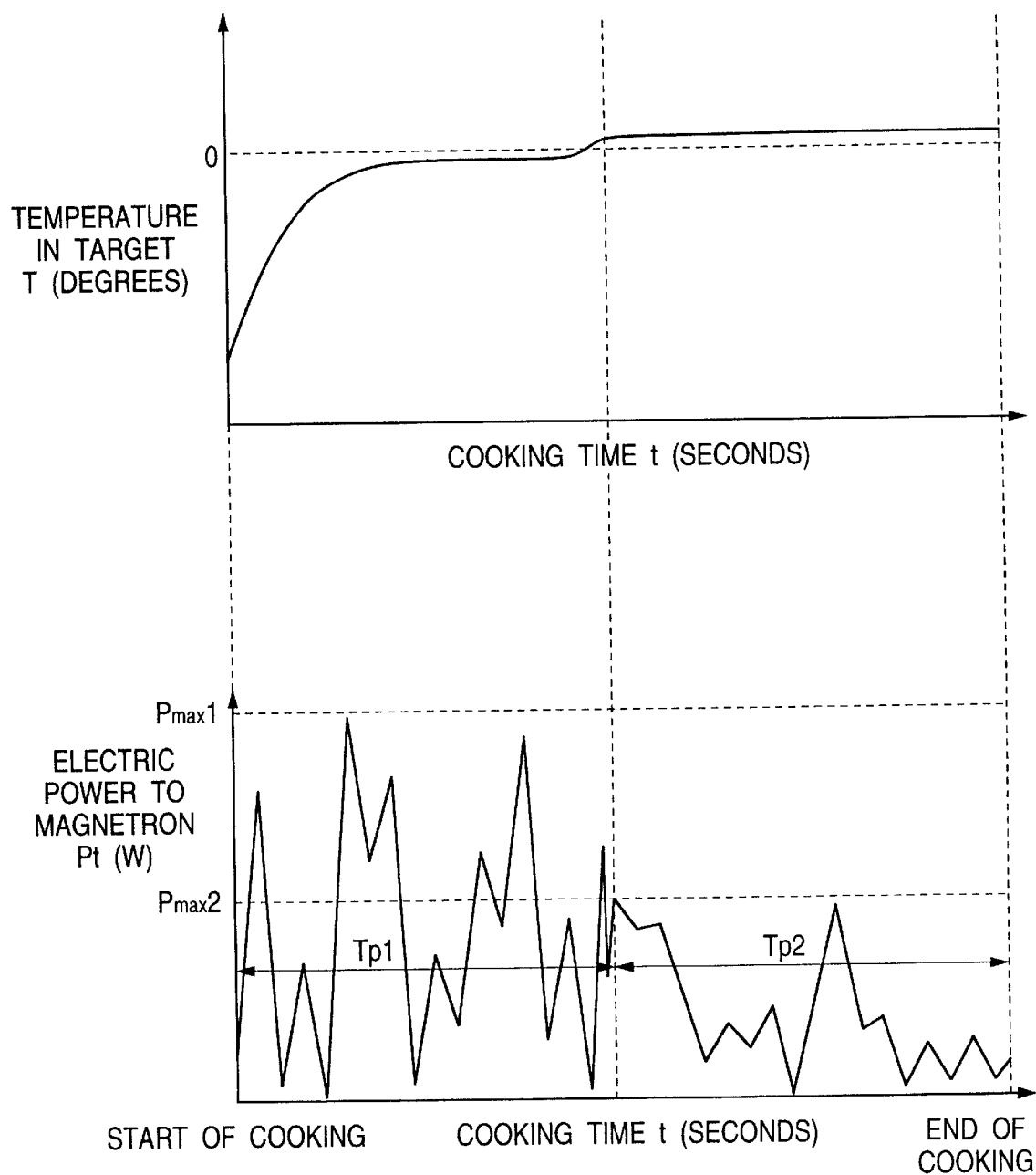
FIG. 109 is a graph showing the relationship between electric power which must be supplied to the magnetron and temperatures in a target which must be heated.

An example of the operation of the nineteenth embodiment will now be described with reference to FIG. 109. FIG. 109 is a graph showing the relationship between electric power Pt which must be supplied to the magnetron and temperature T in the target which must be heated.

The characteristic of microwaves in a microwave oven causes nonuniformity of the degree of heating of a target which must be heated to take place depending upon the portion because of the difference in the intensity of the microwaves and because energy of the microwaves can easily be concentrated to an end of the target. If a portlon of the target in which ice has been changed to water appears, concentration of energy of the microwaves to the foregoing portion cannot easily be prevented by the control of the electric power of the microwaves in accordance with the chaos signal. Therefore, electric power which must be supplied to the magnetron must be reduced to uniform the temperature distribution in the target which must be heated after defrosting of a portion of the target has been started.

Figure 110:
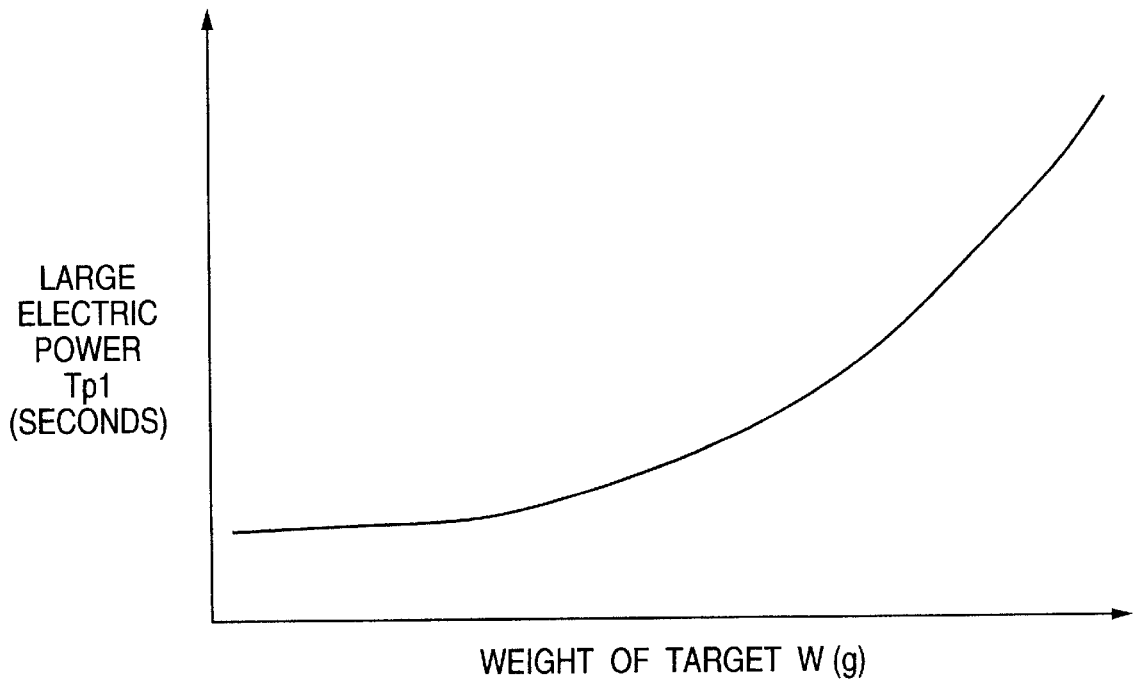
FIG. 110 is a graph showing the relationship between weights of targets which must be heated and large-electric-power time.

FIG. 109 is a graph showing a state in which overheating of a target which must be heated is prevented by changing electric power which must be supplied to the magnetron from large electric power Pmax1 to small electric power Pmax2 at cooking time Tp1 if a portion of the target is changed to water during the defrosting process. The time Tp1 at which electric power is changed depends upon the states of the microwave oven and the target which must be heated, for example, the weight of the target. As an example of the time Tp1, a relational equation between the weight W of the target which must be heated and large-electric-power time Tp is shown in FIG. 110.

The large-electric-power comparison means 701 subjects the cooking time stored on the cooking-time measuring means 691 and the large-electric-powar time stored on the large-electric-power time storage means 700 to a comparison. If the cooking time is shorter than the large-electric-power time, the large-electric-power comparison means 701 employs the large electric power Pmax1 which must be supplied to the magnetron. If the cooking time is longer than the large-electric-power time, the large-electric-power comparison means 701 employs the small electric power Pmax2 which must be supplied to the magnetron.

The nineteenth embodiment has the time for which large electric power is supplied to the magnetron to correspond to the states of the microwave oven and the target which must be heated. Since the maximum electric power which must be supplied to the magnetron is reduced after defrosting of a portion of the target has been started because of the characteristic or the like of the microwaves, the temperature distribution in the target which must be heated can be uniformed.

Although this embodiment is arranged to have the maximum electric power consisting of the large electric power and the small electric power which must be supplied to the magnetron, an intermediate-quantity of electric power or the like may be added to further precisely control the operation.

Twentieth Embodiment

A twentieth embodiment will now be described. As compared with the second embodiment, the twentieth embodiment has large-electric-power time for which large electric power is supplied to the magnetron in accordance with the value obtained from a sensor for detecting the states of the microwave oven and a target which must be heated. The structure and operation of the twentieth embodiment which are different from those of the second embodiment will mainly be described. The other structures and operations are the same as those of the second embodiment.

Figure 112:
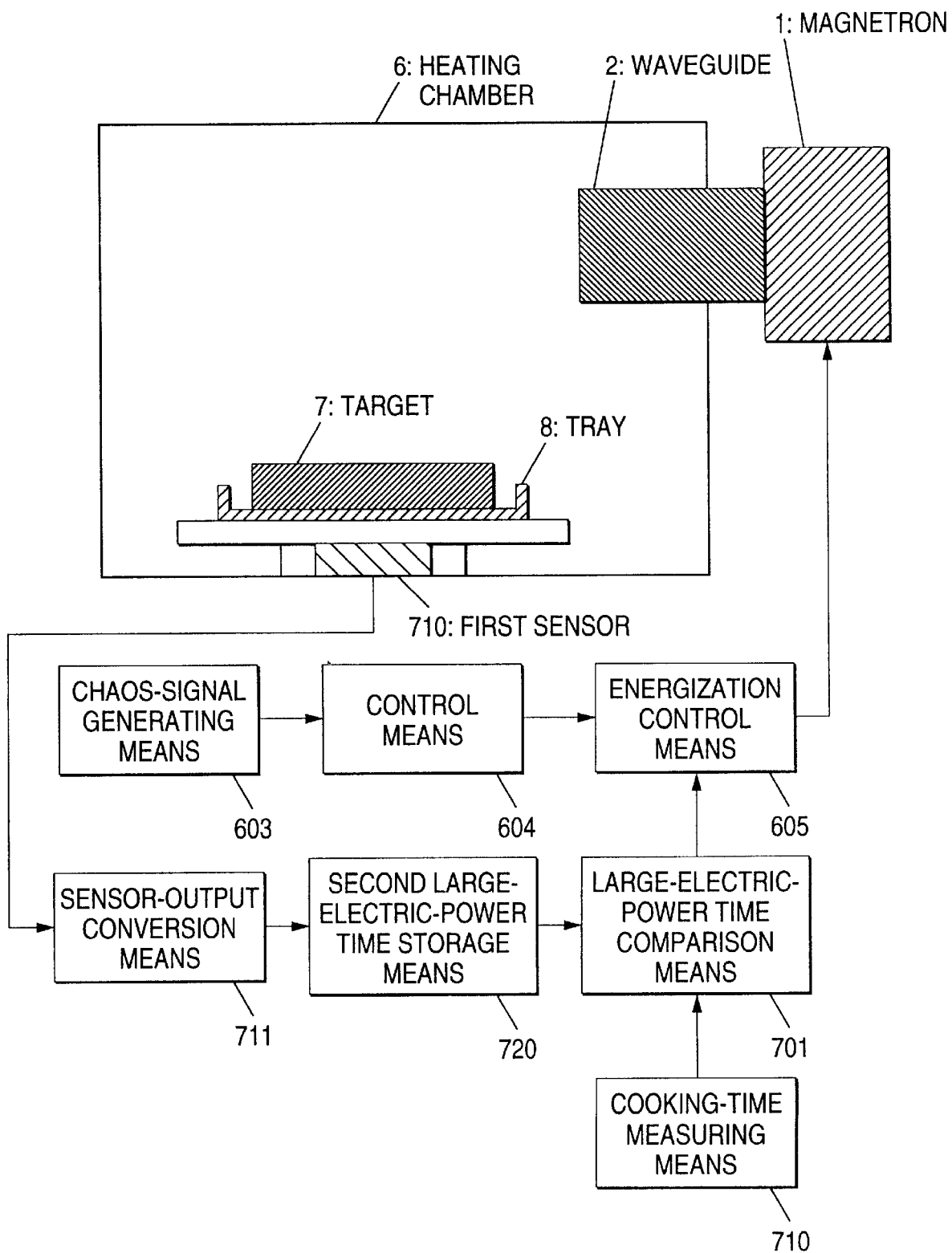
FIG. 112 is a block diagram showing a microwave oven according to a twentieth embodiment of the present invention.
Figure 113:
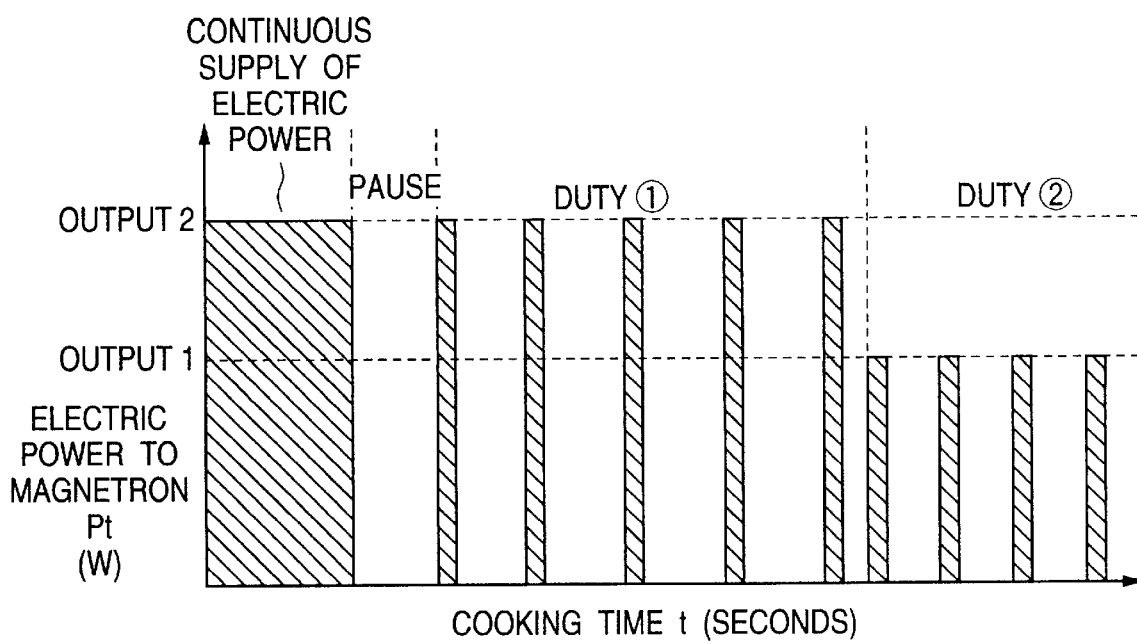
FIG. 113 is a diagram showing a conventional defrosting sequence.
Figure 114:
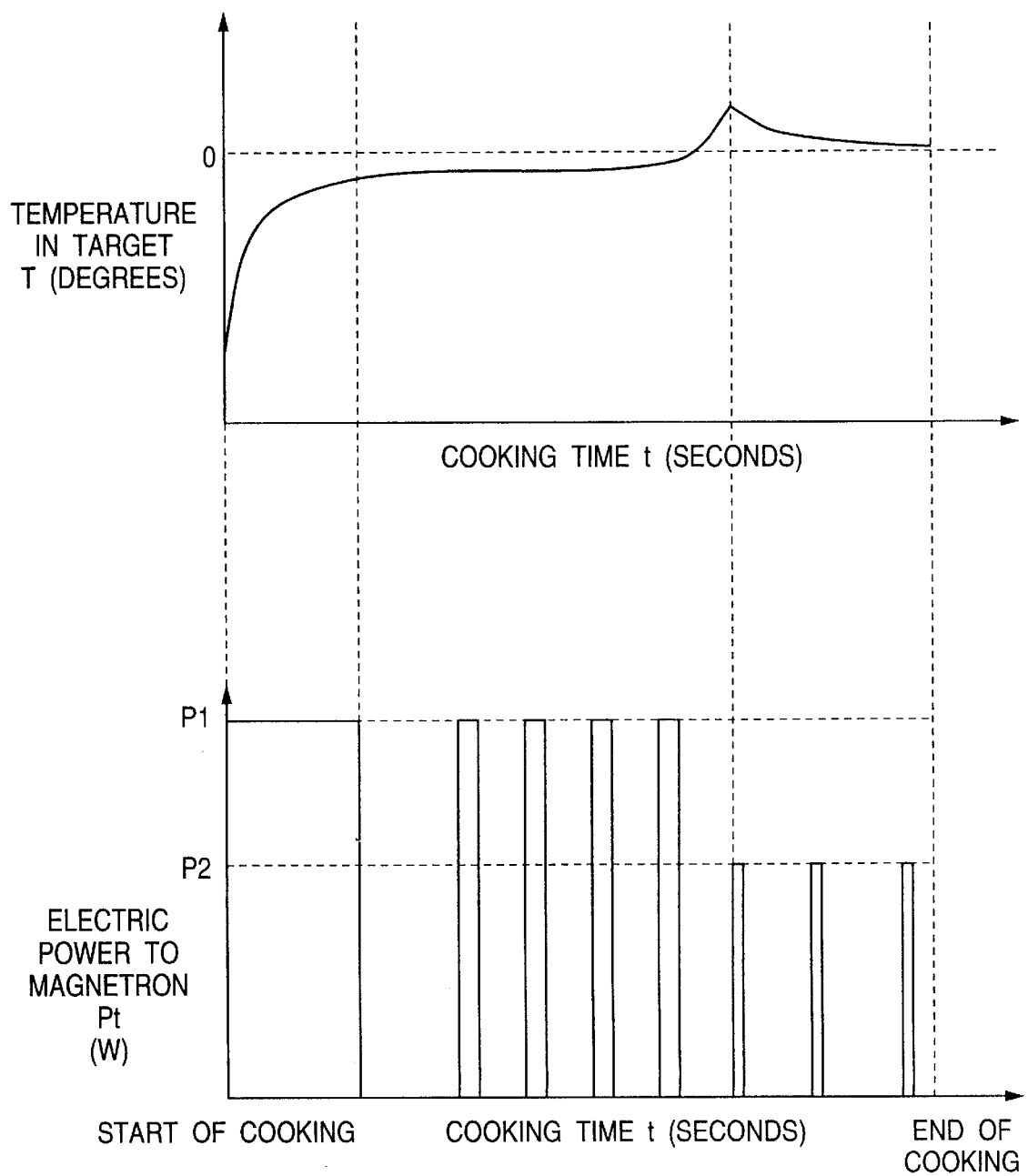
FIG. 114 is a graph showing the relationship between electric power which must be supplied to the magnetron and temperatures in a target which must be heated.

The structure of the twentieth embodiment will now be described with reference to FIG. 112. Referring to FIG. 112, reference numeral 710 represents a first sensor for measuring the states of the microwave oven and a target which must be heated to transmit a result to a sensor-output conversion means 711. The sensor-output conversion means 711 converts the output of the first sensor 710 into a value indicating the states of the microwave oven and a target which must be heated so as to transmit a sensor value.

Reference numeral 720 represents a second large-electric-power storage means on which a sensor value obtained by the sensor-output conversion means 711 and a relational equation for large-electric-power time for which large electric power is supplied to the magnetron are stored.

The large-electric-power-time comparison means 701 subjects the cooking time measured by the cooking-time measuring means 710 and the large-electric-power time communicated from the large-electric-power comparison means 720 to a comparison to determine whether or not large electric power is supplied to the magnetron so as to commununicate a result to the energization control means 605.

The energization control means 605 adjusts electric power which must be supplied to the magnetron in accordance with the control signal transmitted from the control means 604 in such a manner that electric power which is supplied to the magnetron does not exceed the maximum electric power determined by the large-electric-power-time comparison means 701.

An example of the operation of the twentieth embodiment will now be described with reference to FIGS. 109 and 110.

The characteristic of microwaves emitted from the magnetron sometimes causes the temperature distribution in the target to be nonuniformed because and portions of the target are first defrosted as coimpared with other portions. To prevent overheating of a portion of the target, electric power which is supplied to the magnetron is reduced during the defrosting process.

FIG. 109 is a graph showing the relationship between electric power Pt which must be supplied to the magnetron 1 and temperature T in the target which must be heated. Note that axis of abscissa of the graph stands for cooking time t.

As shown in FIG. 109, an assumption is made that the phase of a portion of a target which must be heated has first been converted from ice to water at cooking time Tp1 during the process for defrosting the target in accordance with the chaos signal as described above. If large electric power Pmax1 is supplied to the magnetron to defrost the target, the temperatur distribution in the target becomes nonuniform. Therefore, the maximum electric power is changed from large electric power Pmax1 to small electric power Pmax2 at cooking time Tp1 to prevent overheating of a portion of the target. Since the states of the microwave oven and the target which must be heated are measured by the sensor, the user is not required to perform any operation to automatically set large-electric-power time Tp1.

FIG. 110 shows the relationship between weight W of a target which must be heated and large-electric-power time Tp1. Since long time is required to raise the temperature in proportion to the weight of the target, the relational equation shown in FIG. 110 is realized.

The second large-electric-power comparison means 720 is a means on which a relational equation between the weight W of a target shown in FIG. 110 and the large-electric-power time Tp1 is stored to determine large-electric-power time Tp1 in accordance with the weight of the target measured by the sensor 710.

The large-electric-power-time comparison means 701 subjects cooking time t measured by the cooking-time measuring means 710 and large-electric-power time Tp1 stored on the second large-electric-power comparison means 720 to a comparison. The large-electric-power-time comparison means 701 causes large electric power Pmax1 to be supplied to the magnetron until cooking time t elapses large-electric-power time Tp1. If cooking time t elapses large-electric-power time Tp1, the large-electric-power-time comparison means 701 causes small electric power Pmax2 to be supplied.

Although the weight of the target which must be heated is employed as the states of the microwave oven and the target, a variety of factors, for example the internal size of the microwave oven and the volume of the target, affect the large electric power. The cesential portion licn in that the large-electric-power time can be determined in accordance with the states of the microwave oven and the target. Therefore, another factor may be employed to obtain the same effect.

The twentieth embodiment has the structure that the states of the microwave oven and the target which must be heated are measured by the sensor to determine large-electric-power time. The structure and operation of the twentieth embodiment are able to prevent overheating of a portion which has first been converted into water attributable to the characteristic of microwaves. As a result, the user is not required to perform any labor to improve the grade of finishing of a defrosted target.

Twenty-First Embodiment

A twenty-first embodiment will now be described.

The twenty-first embodiment has a structure that microwaves in a smaller quantity are regularly applied before the phase of water in a target which must be heated is shifted from a solid body to liquid, the smaller quantity being smaller than the quantity which is supplied in the following period of time. The structures and operations of the twenty-first embodiment different from those of the first embodiment will mainly be described. The other structures and operations are the same as those of the first embodiment.

Figure 47:
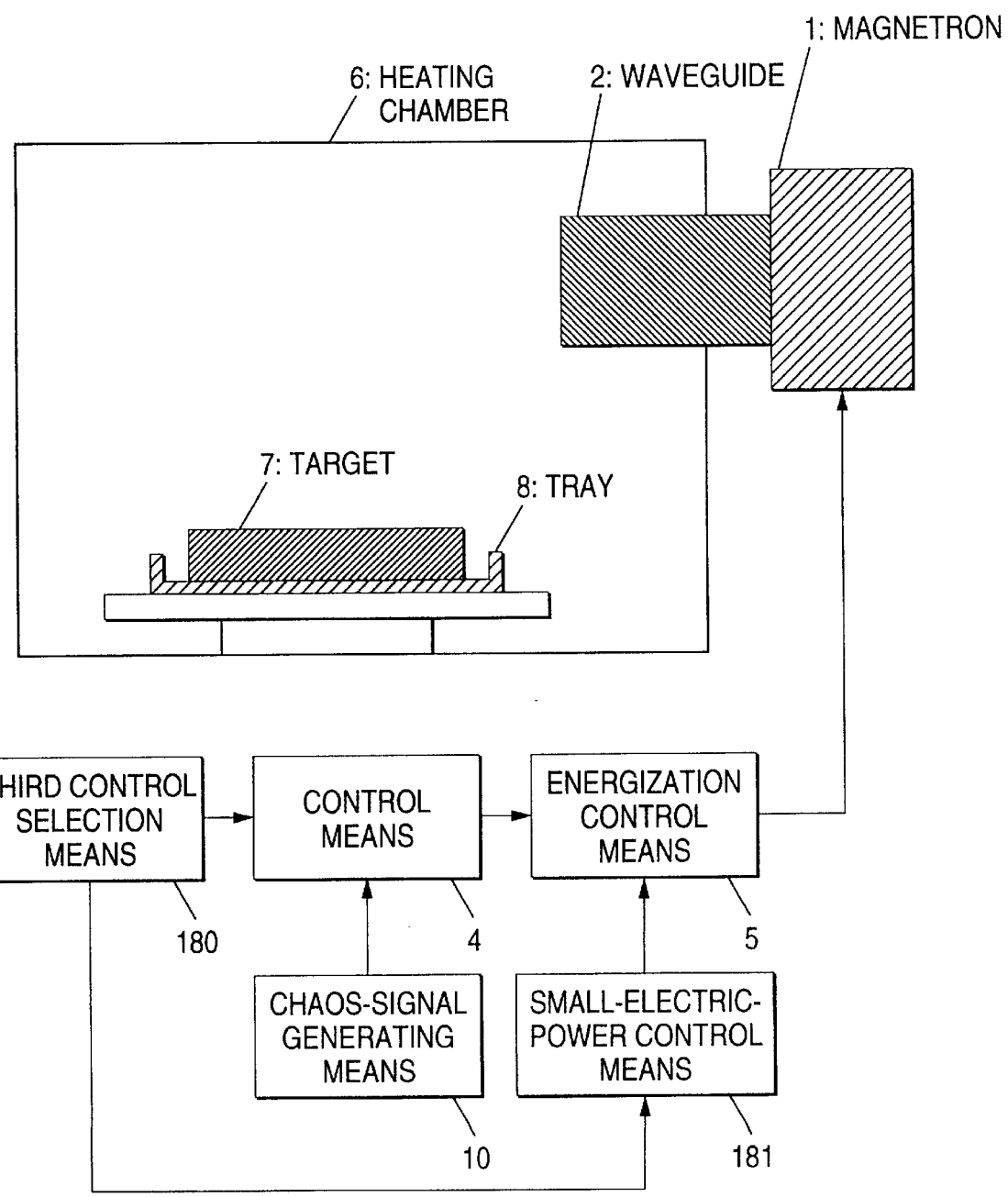
FIG. 47 is a block diagram showing a microwave oven according to a twenty-first embodiment of the present invention.

The structure of the twenty-first embodiment will now be described with mainly reference to FIG. 47.

Reference numeral 180 represents a third control selection means for selecting either the control means 4 or a small-electric-power control means 181 to transmit a third control selection signal to the selected control means.

When the small-electric-power control means 181 is selected by the third control selection means 180, the small-electric-power control means 181 transmits, to the energization control means 5, a control signal for supplying regular electric power in a small quantity to the magnetron 1.

When the control means 4 is selected by the third control selection means 180, the control means 4 follows the chaos signal generated by the chaos-signal generating means 10 to transmit, to the energization control means 5, a control signal for changing electric power which must be supplied to the magnetron 1.

The operation of the twenty-first embodiment will now be described with mainly reference to FIG. 48.

Figure 48:
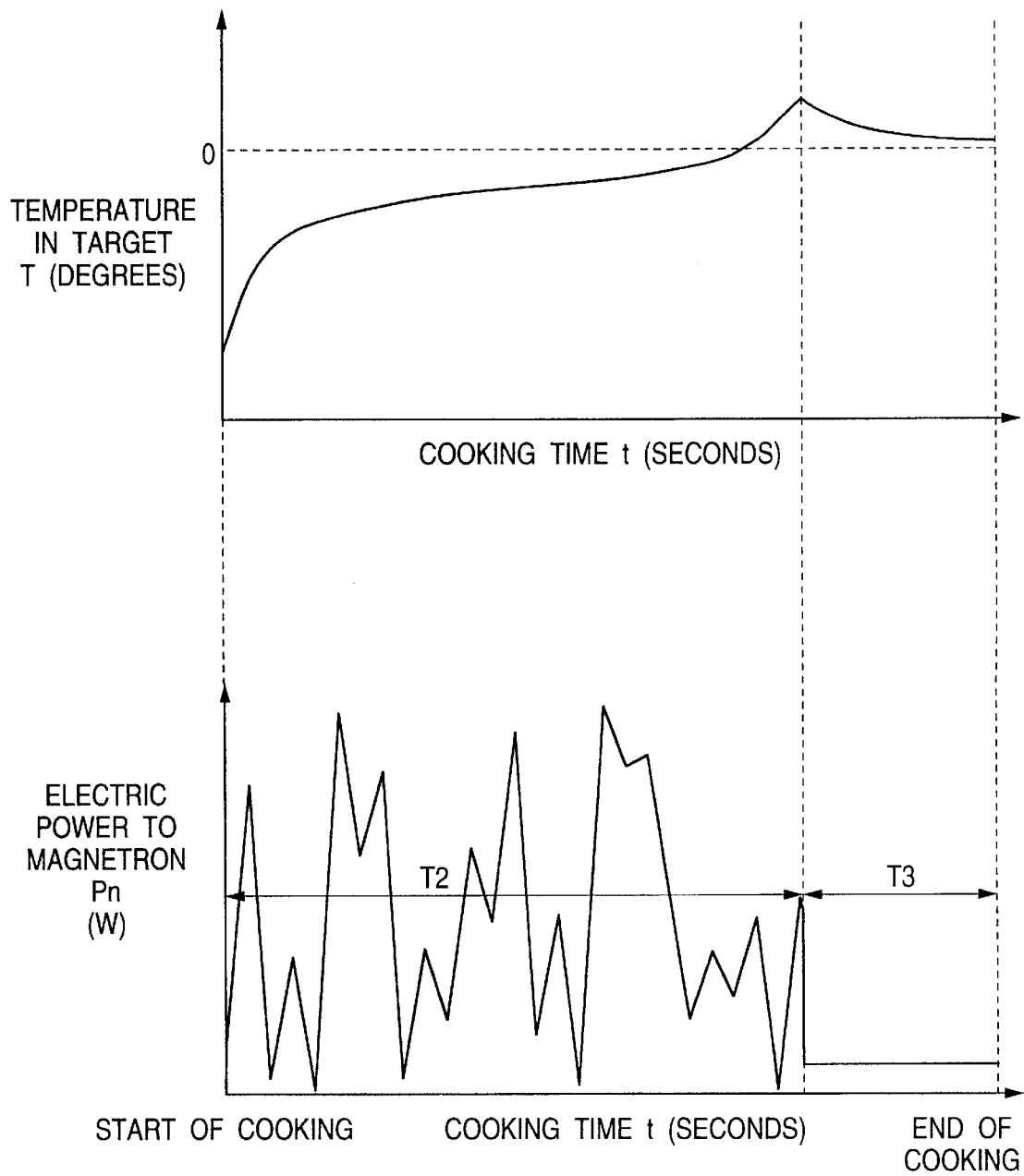
FIG. 48 in a graph showing the relationship between electric power which must be supplied to the magnetron and temperatures in a target which must be heatedy FIG. 49 in a block diagram ahowing a microwave oven according to a twenty-first embodiment of the preient invention.

FIG. 48 is a graph showing the ralationohip between electric power Pn which must be supplied to the magnetron 1 and temperature T in the target which must be heated. Note that axis of abscissa of the graph stands for cooking time t.

The characteristic of microwaves in a microwave oven sometimes causes a portion of a target which must be heated to first be defrosted because of the difference in the intensity of the microwaves and because energy of the microwaves can easily be concentrated to an end of the target. If a portion of a target which must be heated in first defrosted during the process for defrosting the target, the temperature of the portion converted into water is raised excessively. Thus, the temperature distribution in the target becomes nonuniform during the defrosting process. Therefore, a step in which dielectric heating is performed in accordance with the chaos signal for time T2, and then dielectric heating with small average electric power which is supplied to the magnetron is performed for time T3. Thus, heat in the target which must be heated is dispersed to uniform the temperature distribution in the target so that the grade of finishing of the defrosted target is improved.

When the process for defrosting a target which must be heated is started, the third control selection means 180 selects the control means 4 to perform a control to adjust electric power which must be supplied to the magnetron 1 in accordance with the chaos signal generated by the chaos-signal generating means 10. After time T2 has elapsed from start of the defrosting process, the third control selection means 180 selects the small-electric-power control means 181 to dielectrically heat the target with electric power having a small average value for time T3.

The twenty-first embodiment will furthermore be described.

In addition to the structure according to the third embodiment, this embodiment has a structure that a step in which large quantity of electric power in a large quantity is regularly supplied to the magnetron is performed. After the foregoing step, a step for performing dielectric heating in accordance with the chaos signal is performed. Therefore, the structure and operation of the twenty-first embodiment which are different from those of the third embodiment will mainly be described. The other structures and operations are the same as those of the third embodiment.

The structure of the twenty-first embodiment will now be described with mainly reference to FIG. 49.

Referring to FIG. 49, reference numeral 190 represents a fourth control selection means for selecting any one of the control means 4, the continuous electric-power control means 171 and the small-electric-power control means 181 to transmit a fourth control selection signal to the selected control means.

When the continuous electric-power control means 171 is selected by the fourth control selection means 190, the continuous electric-power control means 171 transmits, to the energization control means 5, a control signal for regularly supplying electric power in a large quantity to the magnetron 1.

When the small-electric-power control means 181 is selected by the fourth control selection means 190, the small-electric-power control means 181 transmits, to the energization control means 5, a control signal for regularly supplying electric power in a small quantity to the magnetron 1.

When the control means 4 in selected by the fourth control selection means 190, the control means 4 transmits, to the energization control means 5, a control signal for changing electric power which must be supplied to the magnetron 1 in accordance with the chaos signal generated by the chaos-signal generating means 10.

Figure 50:
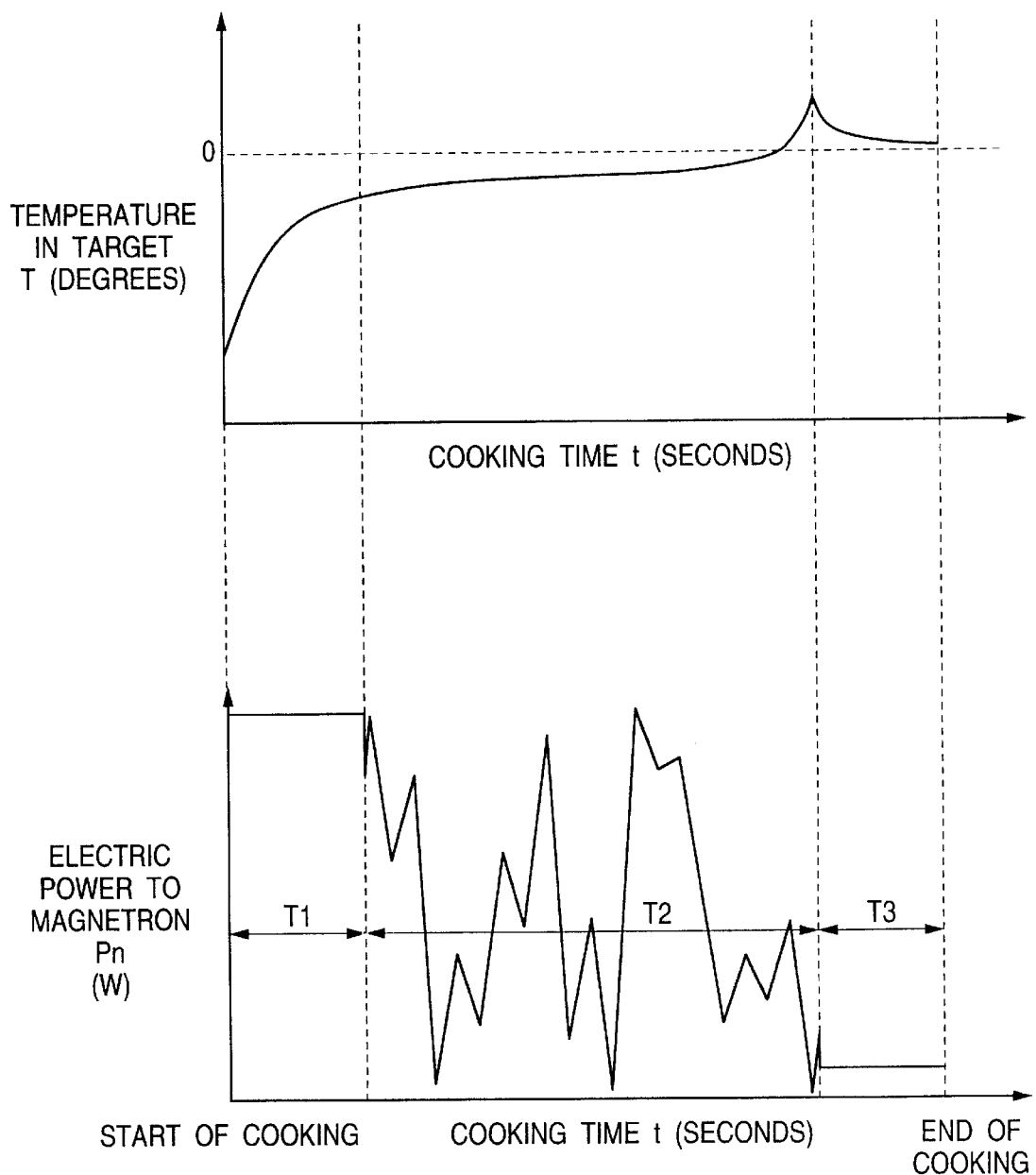
FIG. 50 is a graph showing the relationship between electric power which must be supplied to the magnetron and temperatures in a target which must be heated.

The operation of the twenty-first embodiment will now be described with mainly reference to FIG. 50.

Even if electric power in a large quantity is regularly supplied to the magnetron when the temperature of the target which must be heated is low, the time required to defrost a target can furthermore be shortened without deterioration in is the grade of finishing of the target as described above. Even if a portion of the target is converted into water and overheating takes place in the step in which the dielectric heating is performed in accordance with the chaon signal, heat in the target can be dispersed when the control of dielectric heating with small quantity of electric power which is regularly supplied to the magnetron is performed. Thus, the temperature distribution in the target which must be heated can be uniformed and the grade of finishing of the defrosted target can furthermore be improved.

When the process for defrosting a target is started, the fourth control selection means 190 reqularly supplies electric power in a large quantity to the magnetron 1 for time T1. Then, the fourth control selection means 190 selects the control means 3 to perform control to adjust electric power which must be supplied to the magnetron 1 in accordance with the chaos signal generated by the chaos-signal gencrating means 3 so that the target is defrosted for time T2.

After the control of dielectric heating in accordance with the chaos signal has been completed, the fourth control selection means 190 selects the small-electric-power control means 131 to perform control of dielectric heating with regular and small quantity electric power for time T3.

The twenty-first embodiment will furthermore be described.

In addition to the structure according to the embodiment shown in FIG. 49, this embodiment has a structure that electric power which is supplied to the magnetron in the small electric power supply step is made to be smaller than electric power which is supplied to the magetron in the continuous electric power supply step. The structure and operation of this embodiment which are different from those of the embodiment shown in FIG. 49 will mainly be described. The other structures and operations are the same as those of the embodiment shown in FIG. 49.

The structure of the twenty-first embodiment will now be described with mainly reference to FIG. 51.

Referring to FIG. 51, reference numeral 200 represents a large-electric-power storage means on which large electric power which must be supplied to the magnetron 1 in the continuous electric power supply step in stored. Reference numeral 201 represents a sm1ll-electric-power storage means on which small electric power which must be supplied to the magnetron 1 in the small electric power supply step is stored.

When the continuous electric-power control means 171 in selected in accordance with the fourth control signal transmitted from the fourth control selection means 190, the continuous electric-power control means 171 transmits, to the enargization control means 5, a control signal for regularly supplying, to the magnetron, large electric power stored in the large-electric-power storage means 200.

When the small-electric-power control means 181 is selected in accordance with the fourth control signal transmitted from the fourth control selection means 190, the small-electric-power control means 181 transmits, to the energization control means 5, a control signal for supplying, to the magnetron 1, small electric power stored in the small-electric-power storage means 201.

The operation of the twenty-first embodiment will now be described with mainly reference to FIG. 52

Figure 52:
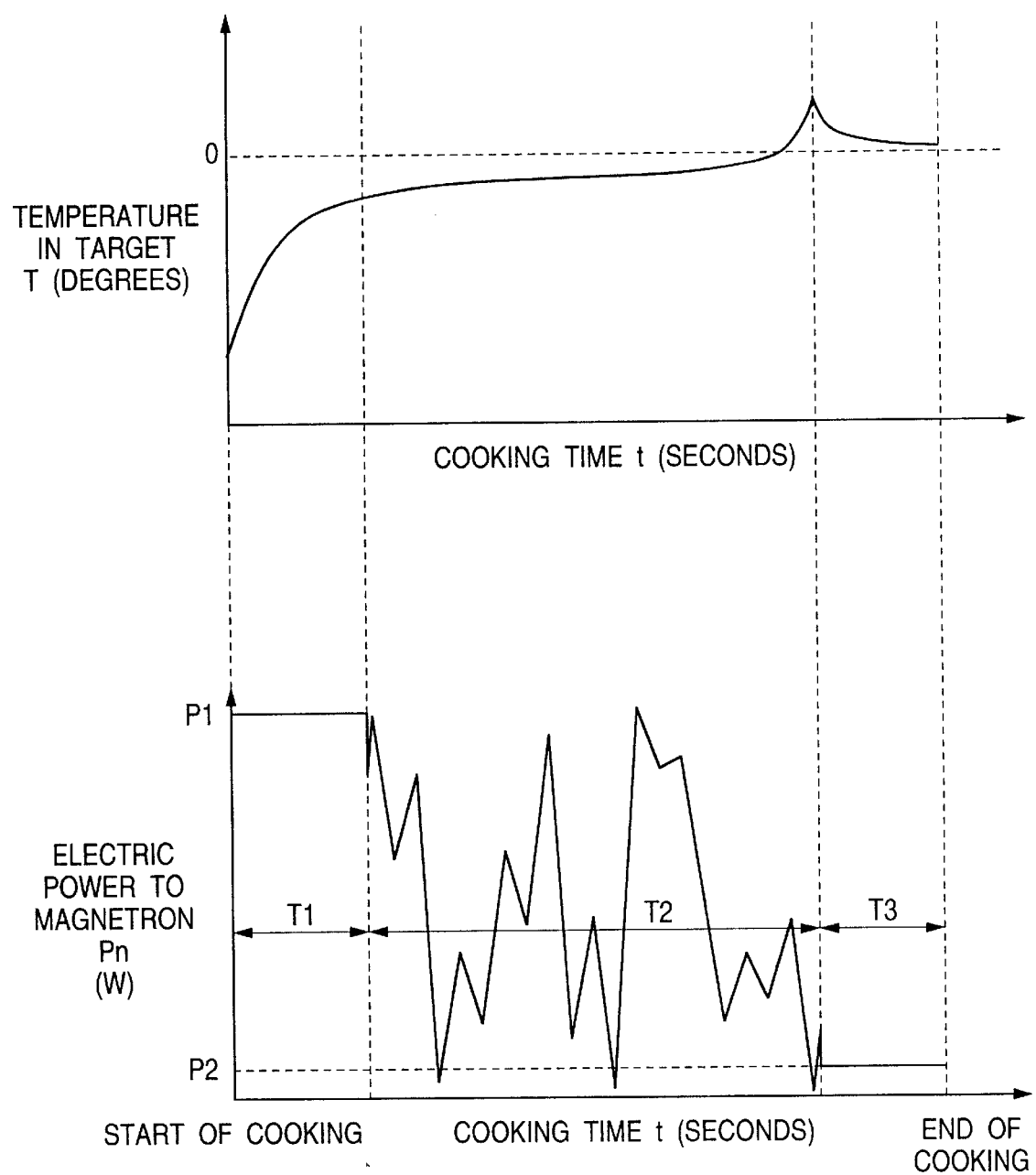
FIG. 52 is a graph showing the relationship between electric power which must be supplied to the magnetron and temperatures in a target which must be heated.

FIG. 52 is a graph showing the relationship between electric power which must be supplied to the magnetron and temperature T in the target which must be heated. Note that axis of abscissa of the graph stands for cooking time t.

If the temperature of the target which must be heated is low in the continuous electric power supply step, regular supply of a large quantity of electric power to the magnetron 1 and heating of the target do not deteriorate the grade of finishing of the defrosted target because the temperature of the target is raised uniformly. Moreover, time required to defrost a target can be shortened.

The temperature in the target is uniformly raised in the continuous electric power supply step even if electric power which is supplied to the magnetron 1 is enlarged. Therefore, time required to defrost a target can furthermore be shortened even if electric power which must be supplied to the magnetron 1 is enlarged.

If a portion of a target which must be heated is converted into water and thus overheating takes place in the step for controlling dielectric heating in accordance with the chaos signal, control of dielectric heating with regular and small quantity electric power which in supplied to the magnetron 1 enables heat in the target to be dispersed. As a result, the temperature distribution in the target can be uniformed. Moreover, the grade of finishing of the defrosted target can furthermore be improved.

Since the small electric power supply step must be performed in such a manner that overheating of the target which must be heated in prevented and heat in the target is dispersed, electric power in a quantity smaller than electric power which is supplied in the continuous electric power supply step is supplied to the magnetron 1. Thus, overheating of the target is prevented.

When the process for defrosting a target which must be heated is started, the fourth control selection means 190 selects the continuous electric-power control means 121 so that large electric power P1 stored in the large-electric-power storage means 200 is regularly supplied to the magnetron 1 for time T1. Then, the fourth control selection means 190 selects the control means 3 so that a control is performed to adjust electric power which must be supplied to the magnetron 1 in accordance with the chaos signal generated by the chaos-signal generating means 3 to defrost the target for time T2. After the control of dielectric heating in accordance with the chaos signal has been completed, the fourth control selection means 190 selects the amall-clectric-power control means 131 to perform control of dielectric heating of the target with small electric power P2 stored in the second maximum-electric-power setting means 161 for time T3.

The twenty-first embodiment has the structure that irradiation of microwaves in a smaller quantity as compared with the following period of time is regularly performed in a latter stage in which the phase of water in the target which must be heated is shifted from a solid body to liquid. Since the temperature of the portion which has first converted into water is not excessively raised and the temperature distribution of the target can furthermore be uniformed, the grade of finishing of the defrosted target can furthermore be improved.

Twenty-Second Embodiment

The structure and operation of a twenty-second embodiment will now be described. The twenty-second embodiment has a structure that a small-electric-power supply step for supply electric power having a small average value to the magnetron is provided after the step for performing the control of dielectric heating in accordance with the chaos signal. The structure and operation of the twenty-second embodiment which are different from those of the second embodiment will mainly be described. The other structures and operations are the same as those of the second embodiment.

Figure 95:
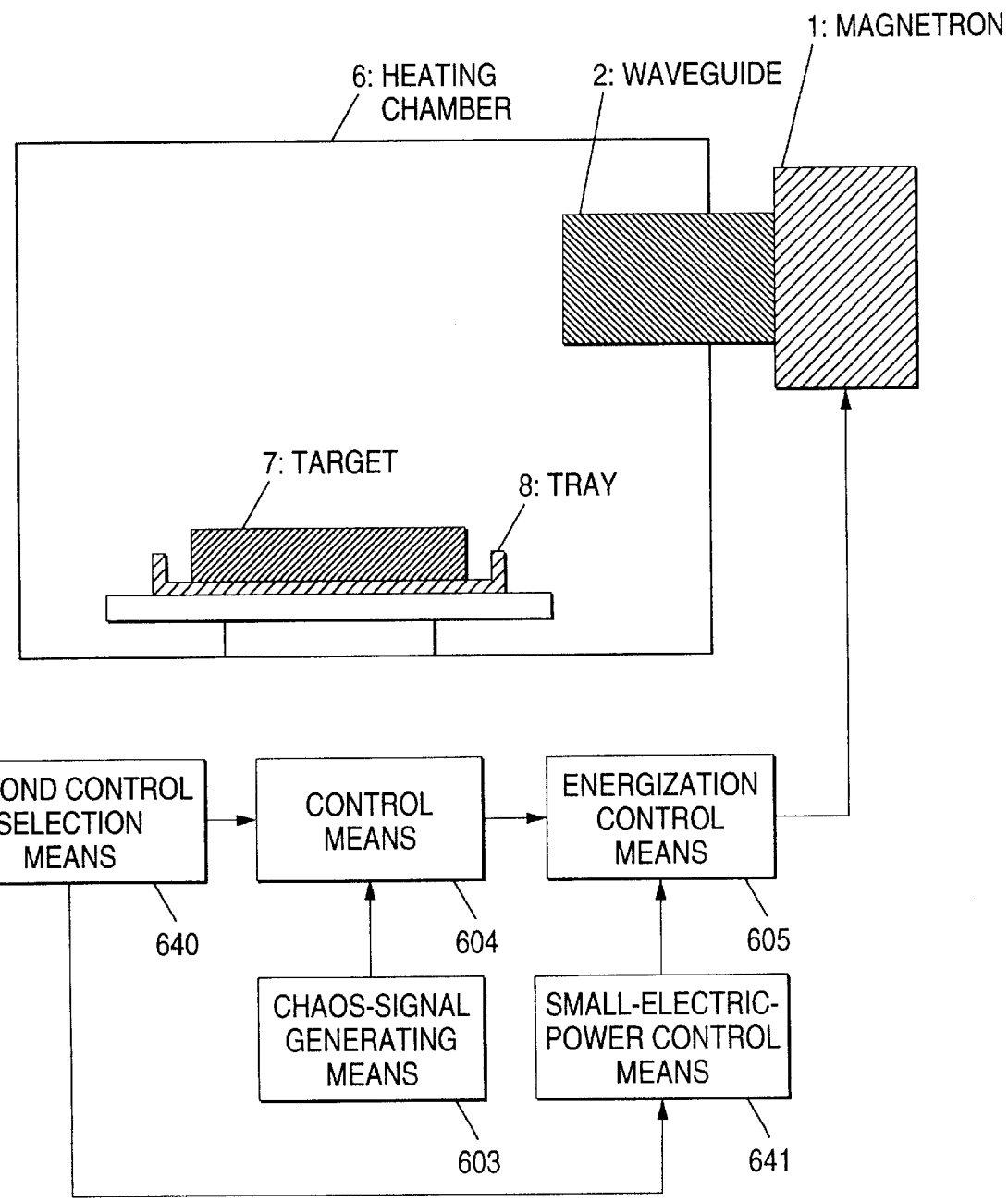
FIG. 95 is a block diagram showing a microwave oven according to a twenty-second embodiment of the present invention.

The structure of the twenty-second embodiment will now be described with reference to FIG. 95.

Reference numeral 640 represents a second control selection means for selecting either of the control means 604 or a small-electric-power control means 641 to transmit a second control selection signal to the selected control means. When the small-electric-power control means 641 is selected by the second control selection means 640, the small-electric-power control means 641 transmits, to the energization control means 605, a control signal for supplying electric power having a small average value to the magnetron.

Figure 96:
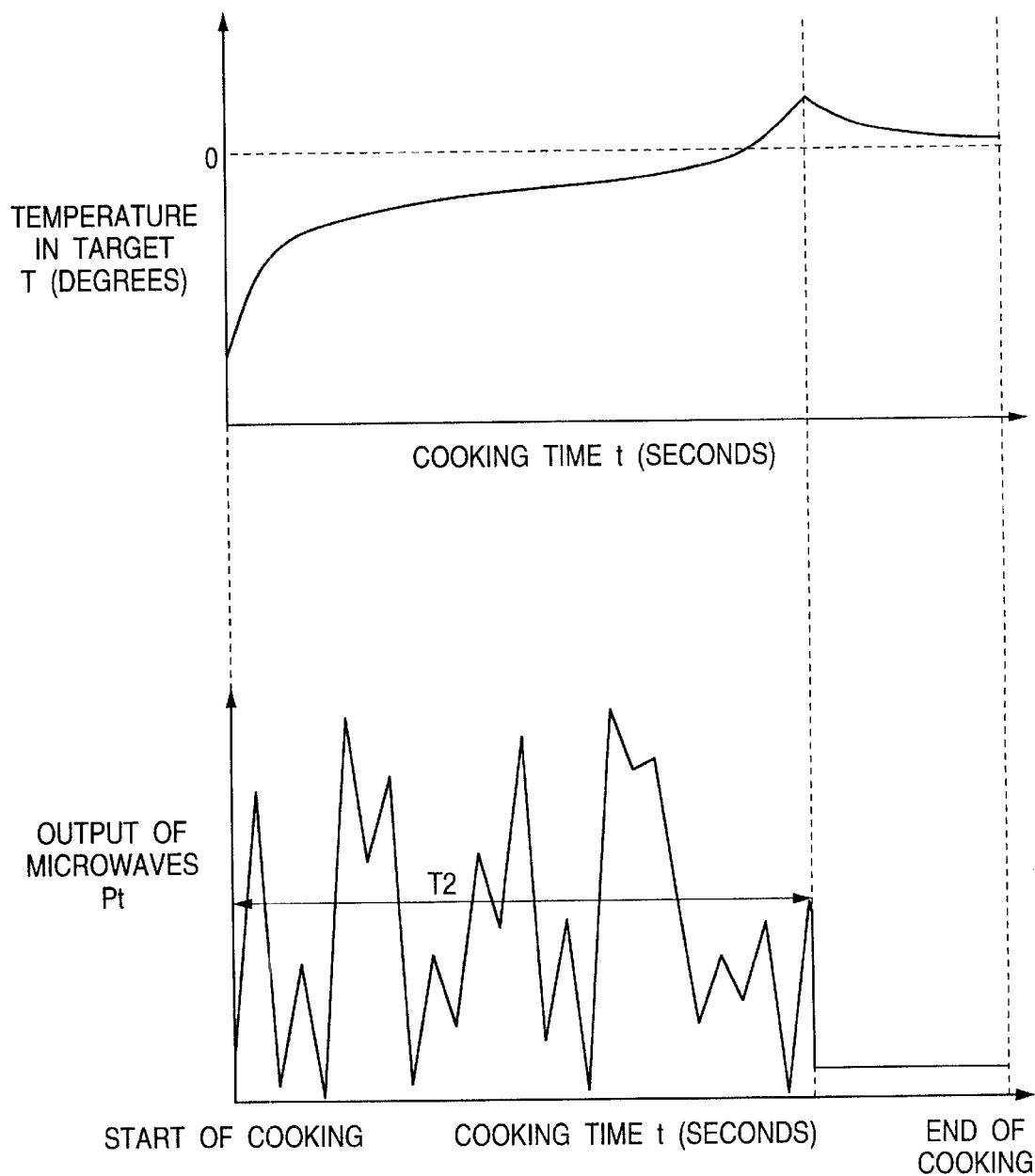
FIG. 96 is a graph showing the relationship between outputs of microwaves and temperatures in targets which must be heated.

The operation of the twenty-second embodiment will now be described with reference to FIG. 96.

The characteristic of microwaves emitted from the magnetron in a microwave oven sometimes causes a portion of a target which must be heated to first be converted from ice to water because of the difference in the intensity of the microwaves depending on portions and because energy of the microwaves can easily be concentrated to an end of the target. If a portion of a target which must be heated is first defrosted as compared with other portions during the process for defrosting the target, the temperature of the portion converted into water is raised excessively. Thus, the temperature distribution in the target becomes nonuniform during the defrosting process. Therefore, a step in which dielectric heating is performed in accordance with the chaos signal for time T2, and then dielectric heating with small average electric power which is supplied to the magnetron is performed. Thus, heat in the target which must be heated is dispersed to always uniform the temperature distribution in the target so that the grade of finishing of the defrosted target is improved.

When the process for defrosting the target which must be heated is started, the second control selection means 640 selects the control means 604 so at to perform the control to adjust electric power which must be supplied to the magnetron in accordance with the chaos signal generated by the chaos-signal generating means 603. After time T2 has elapsed from start of the defrosting operation, the second control selection means 640 selects the small-electric-power control means 641 to control dielectric heating to supply, to the magnetron, electric power having a small average value.

The structure and operation of the twenty-second embodiment have the small-electric-power supply step for supply electric power having a small average value to the magnetron after the step has been performed in which the control of dielectric heating is performed in accordance with the chaos signal. Thus, the portion which has been first converted into waver is not heated excessively and the temperatures in the target can furthermore be uniformed. Therefore, the grade of finishing of the defrosted target can furthermore be improved.

Twenty-Third Embodiment

A twenty-third embodiment will now be described. In addition to the structure of the second embodiment, the twenty-third embodiment has a structure that a step for controlling dielectric heating in accordance with the chaos signal is provided after the step for continuously supplying electric power to the magnetron. Moreover, a small electric power supply step is provided in which electric power having a small average value is supplied to the magnetron. Therefore, the structure and operation of the twenty-third embodiment which are different from the second embodiment will mainly be described. The other structures and operations are the same as those of the second embodiment.

Figure 99:
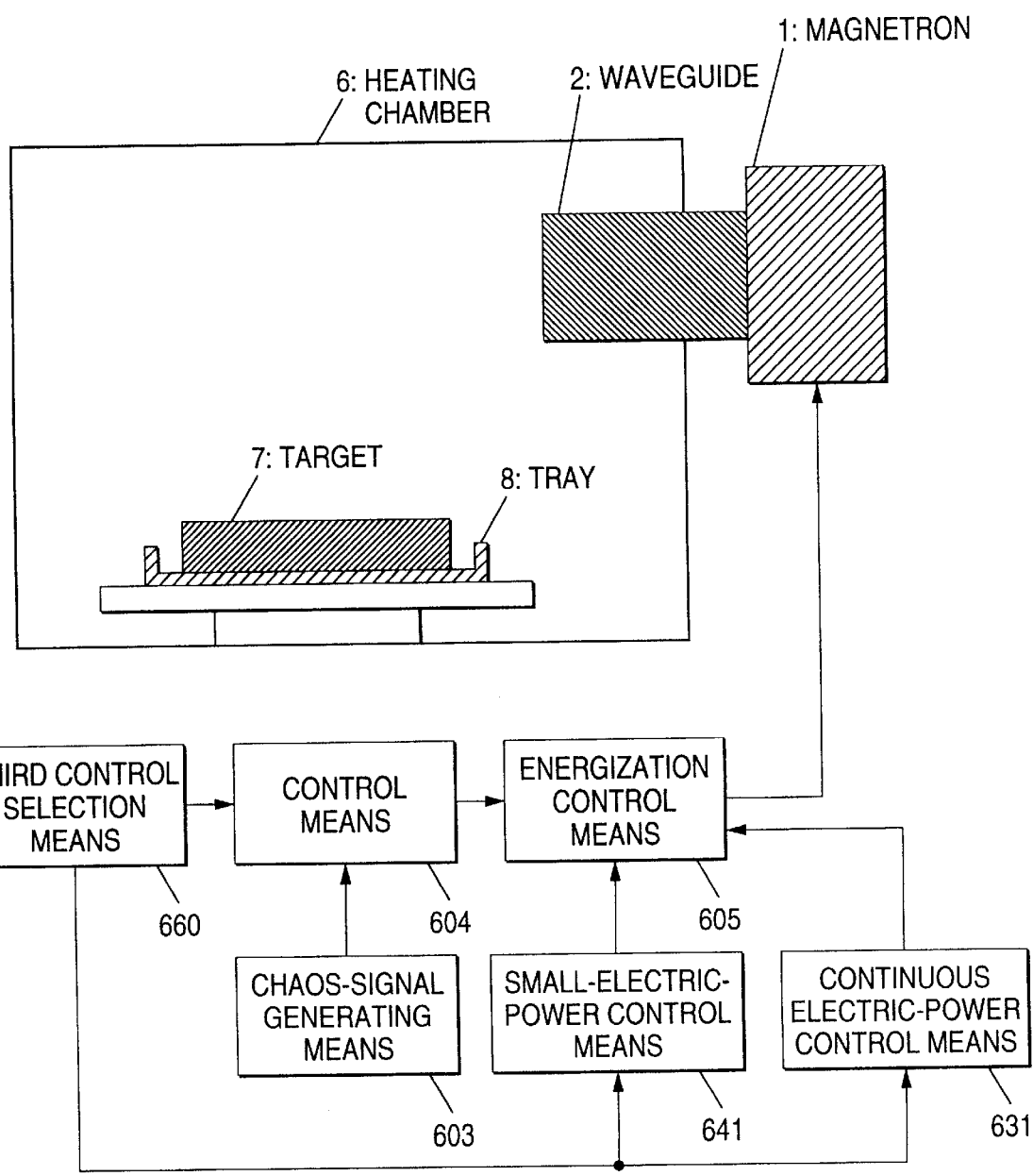
FIG. 99 is a block diagram showing a microwave oven according to a twenty-third embodiment of the present invention.

The structure of the twenty-third embodiment will now be described with reference to FIG. 99. Referring to FIG. 99, reference numeral 660 represents a third control selection means for selecting either of the continues electric-power control means 631 or the small-electric-power control means 641 to transmit a third control selection signal to the selected control means. When the continues electric-power control means 631 is selected by the third control selection means 660, the continuos electric-power control means 631 transmits, to the energization control means 605, a control signal for continuously supplying electric power to the magnetron. When the small-electric-power control means 641 is selected by the third control selection means 660, the small-electric-power control mans 641 transmits, to the energization control means 605, a control signal for supplying, to the magnetron, electric power having a small average value.

Figure 100:
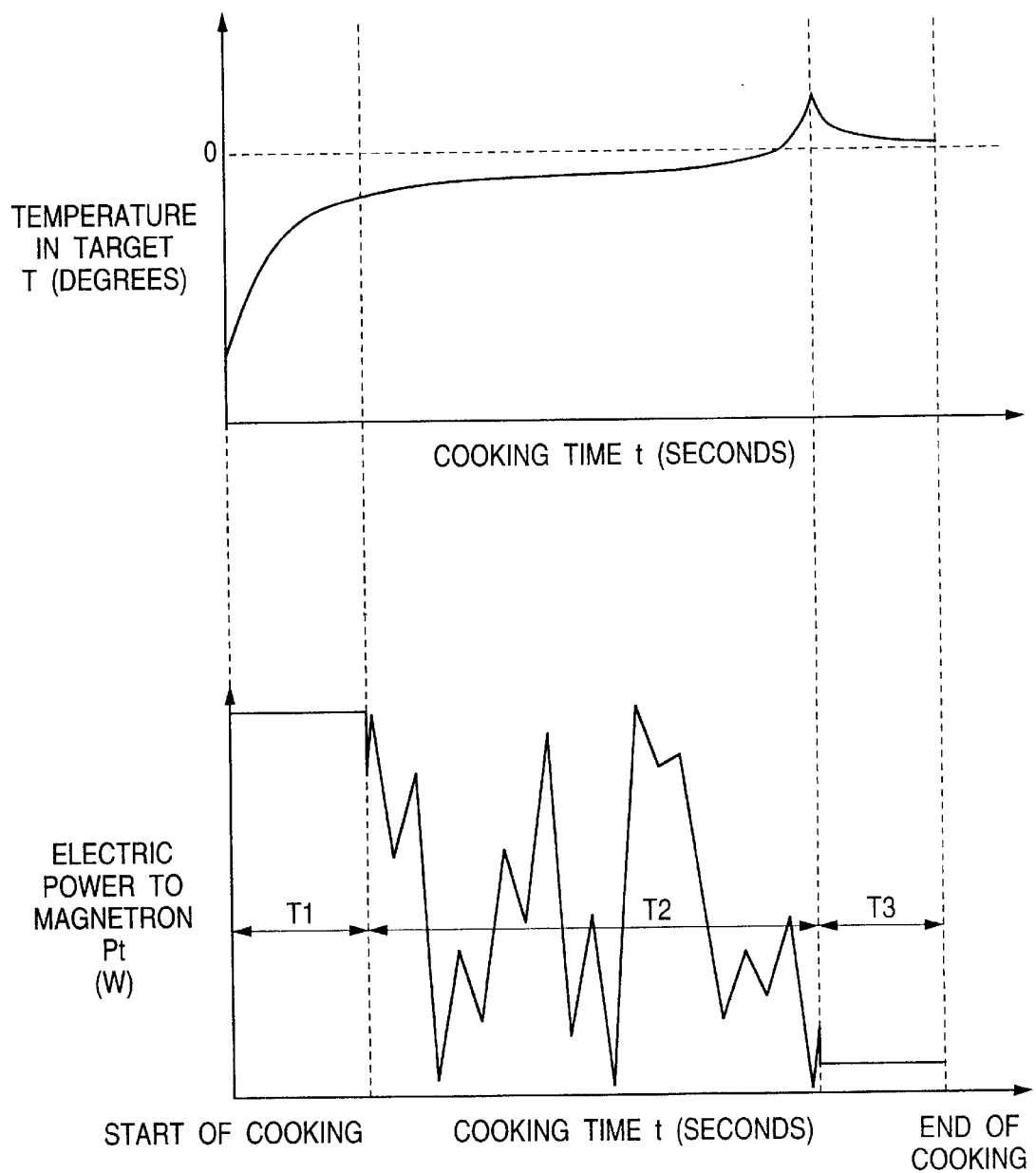
FIG. 100 is a graph showing the relationship between electric power which must be supplied to the magnetron and temperatures in a target which must be heated.

The operation of the twenty-third embodiment will now be described with reference to FIG. 100.

As described above, continuous supply of electric power to the magnetron to heat the target does not deteriorate the grade of finishing of the defrosted target and the time required to defrost a target can furthermore be shortened if the temperature of the temperature is low. Even if a portion of the target which must be heated is first converted into water and overheating takes place in the step for controlling dielectric heating in accordance with the chaos signal, execution of the control of dielectric heating with electric power having a small average value in the next step enables heat in the target to be dispersed. Thus, the temperature distribution in the target can always be uniformed and the grade of finishing of the defrosted target can furthermore be improved.

When the process for defrosting a target is started, the third control selection means 660 selects the continuos electric-power control means 631 to continuously supply electric power to the magnetron for time T1. Then, the third control selection means 660 selects the chaot-signal generating means 603 to perform the control of dielectric heating in accordance with the chaos signal generated by the chaos-signal generating means 3 to adjust electric power which must be supplied to the magnetron so that the target is defrosted for time T2. After the control of dielectric heating in accordance with the chaos signal has been completed, the third control selection means 660 selects the small-electric-power control means 641 to control dielectric heating to supply electric power having a small average value to the magnetron for time T3.

The structure and operation of the twenty-third embodiment have the step of continuously supplying electric power to the magnetron before the step of controlling dielectric heating in accordance with the chaos signal. Since the effect of the chaos signal is not considerably required immediately after the defrosting process has been started, the target can be dielectrically heated with large electric power. Thus, the time required to defrost a target can furthermore be shortened without deterioration in the grade of finishing of the defrosted target. Since the small electric power supply step is performed after the step for controlling dielectric heating in accordance with the chaos signal, the portion which has been first converted into water is not heated excessively and the temperatures in the target can furthermore be uniformed. As a result, the grade of finishing of the defrosted target can furthermore be improved.

Twenty-Fourth Embodiment

A twenty-fourth embodiment will now be described. In addition to the structure according to the twenty-third embodiment, the twenty-fourth embodiment has a structure that electric power which must be supplied to the magnetron in the small electric power supply step is made to be smaller than electric power which is supplied to the magnetron in the continuous electric power supply step. The structures and operations different from the twenty-fourth embodiment different from those of the twenty-third embodiment will mainly be described. The other structures and operations are the same as those of the twenty-third embodiment.

The structure of the twenty-fourth embodiment will now be described with reference to FIG. 101. Referring to FIG. 101, reference numeral 670 represents a large-electric-power storage means on which large electric power which must be supplied to the magnetron in the continuous electric power supply step is stored. Reference numeral 671 represents a small-electric-power storage means on which small electric power which must be supplied to the magnetron in the small electric power supply step is stored.

When the continuos electric-power control means 631 is selected in accordance with the third control signal transmitted from the third control selection means 660, the continuos electric-power control means 631 transmits, to the energization control means 605, a control signal for continuously supplying, to the magnetron, large electric power stored on the large-electric-power storage means 670.

When the small-electric-power control means 641 is selected in accordance with the third control signal transmitted from the third control selection means 660, the small-electric-power control means 641 transmits, to the energization control means 605, a control signal for supplying, to the magnetron, small electric power stored on the small-electric-power storage means 671.

Figure 102:
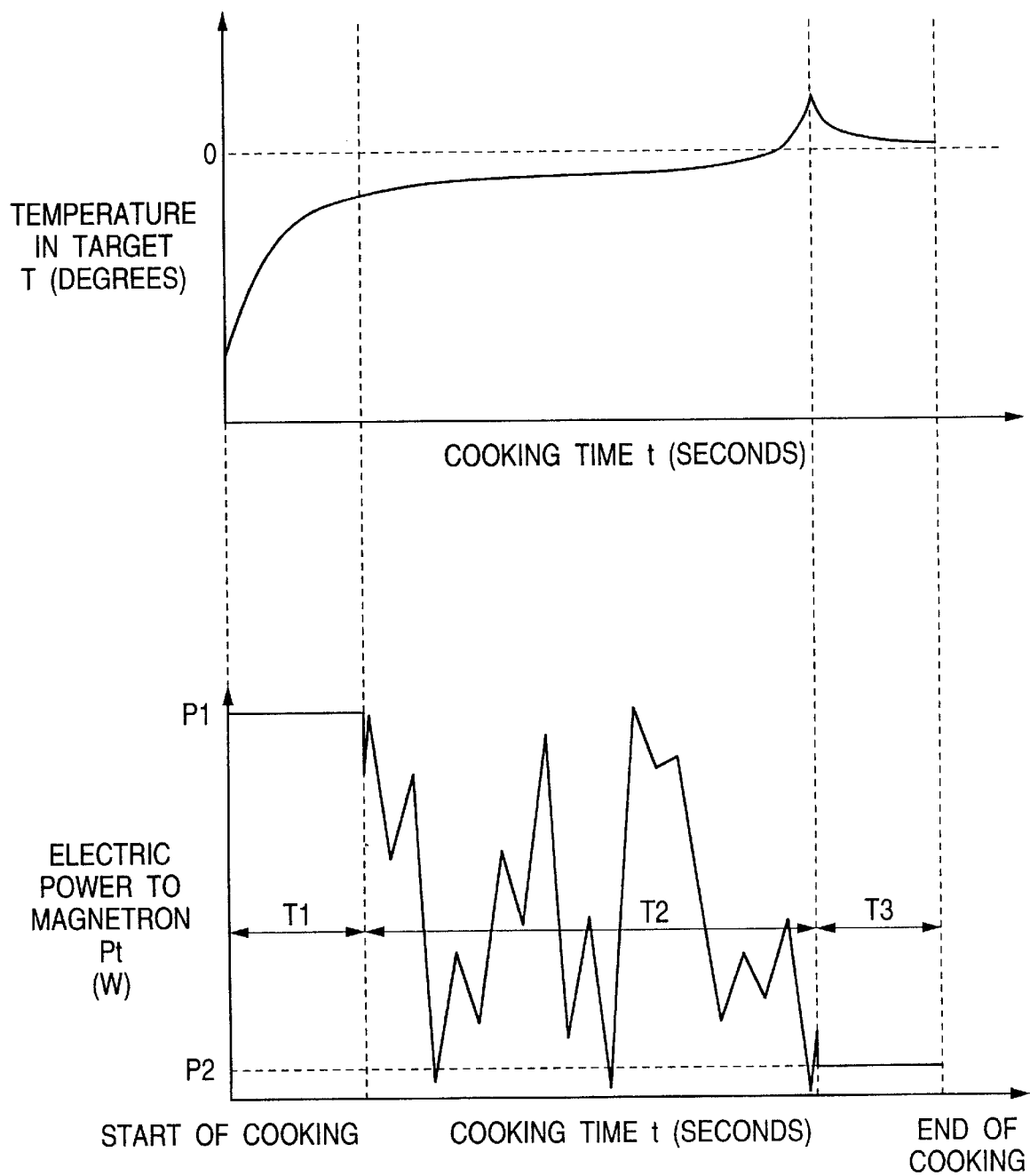
FIG. 102 is a graph showing the relationship between electric power which must be supplied to the magnetron and temperatures in a target which must be heated.

The operation of the twenty-fourth embodiment will now be described with reference to FIG. 102.

If the temperature of a target which must be heated is low in the continuous electric power supply step, continuous supply of electric power to the magnetron to heat the target results in the temperature in the target being raised uniformly. Therefore, the grade of finishing of the defrosted target does not deteriorate and time required to defrost the target can be shortened. Since the temperature in the target is uniformly raised even if large electric power is supplied to the magnetron, electric power which must be supplied to the magnetron is enlarged in the continuous electric power supply step to furthermore shorten time required to defrost the target.

If a portion of a target is first converted into water and overheating takes place in the step for controlling dielectric heating in accordance with the chaos signal, execution of control of dielectric heating to supply electric power having a small average value to the magnetron causes heat in the target to be dispersed. Thus, the temperature distribution in the target can always be uniformed and the grade of finishing of the defrosted target can furthermore be improved. Since the small electric power supply step must be performed in such a manner that overheating of the target in prevented and heat in the target is dispersed, electric power smaller than electric power which is supplied in the large-electric-power supply step is supplied to the magnetron to prevent overheating of the target.

When the process for defrosting the target is started, the third control selection means 660 selects the cooking-time measuring means 691 to supply large electric power P1 stored in the large-electric-power storage means 670 to the magnetron. Then, the third control selection means 660 selects the chaos-signal generating means 603 to perform the control to adjust electric power which must be supplied to the magnetron in accordance with the chaos signal generated by the chaos-signal generating means 603 so that the target is defrosted for time T2. After the control of dielectric heating in accordance with the chaos signal has been completed, the third control selection means 660 selects the small-electric-power control means 641 to control dielectric heating of the target to supply small electric power P2 stored in the small-electric-power storage means 671 for time T3.

The twenty-fourth embodimont has the structure in addition to the structure according to the twenty-third embodiment. That is, electric power which must be supplied to the magnetron in the small electric power supply step is made to be smaller than electric power which must be supplied to the magnetron in the continuous electric power supply step. Since electric power which must be supplied to the magnetron in the continuous electric power supply step is enlarged, the time required to defrost a target can furthermore be shortened. Since the target is dielectrically heated with small electric power in the small electric power supply step, the temperature distribution in the target can furthermore be uniformed.

Twenty-Fifth Embodiment

A twenty-fifth embodiment will now be described.

In addition to the structures according to the twelfth and thirteenth embodiments, the twenty-fifth embodiment has a structure that time for which microwaves are regularly applied is changed to be adaptable to the state of shift of the phase of a target, the defrosting environment or the environment of the target. The structures and operations different from the twelfth and thirteenth embodiments will mainly be described. The other structures and operations are the same as those of the twelfth and thirteenth embodiments.

A first example of the twenty-fifth embodiment will now be described with mainly reference to FIGS. 53 and 54.

In this embodiment, the defrosting time is determined to be adaptable to the state of shift of the phase of a target which must be heated, the defrosting environment and the environment of the target.

The structure according to the twenty-fifth embodiment will now be described with mainly reference to FIG. 53.

Figure 53:
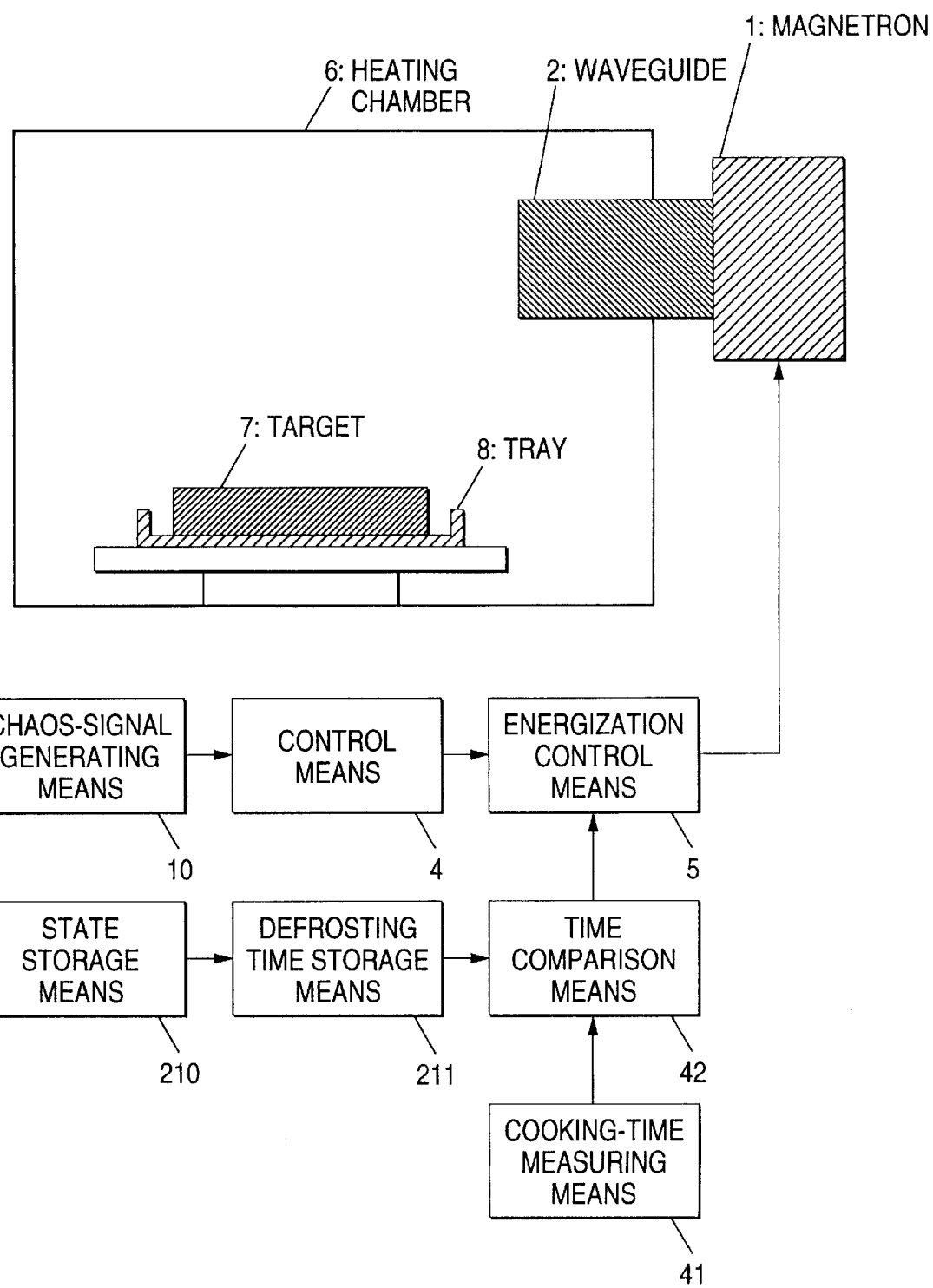
FIG. 53 is a block diagram showing a microwave oven according to a twenty-fifth embodiment of the present invention.

Referring to FIG. 53, reference numeral 211 represents a defrosting-time storage means on which defrosting time adaptable to the state of shift of the phase of a target which must be heated, the defrosting environment and the environment of the target is stored to determine defrosting time in accordance with the state of shift of the phase of a target which must be heated, the defrosting environment and the environment of the target stored on a state storage means 210. Reference numeral 41 represents a cooking-time measuring means on which cooking time elapsed from start of the defrosting process is stored.

A time comparison means 42 subjects the defrosting time stored on the defrosting-time storage means 211 and the cooking time stored on the cooking-time measuring means 41 to a comparison so an to determine whether or not the defrosting operation has been completed.

When the time comparison means 42 has determined that the defrosting process has been ended, the energization control means 5 completes the process for defrosting the target.

An example of the twenty-fifth embodiment will now be described with reference to FIG. 54. FIG. 54 is a graph showing the relationship between weight W of the target which must be heated and defrosting time Ttotal.

Figure 54:
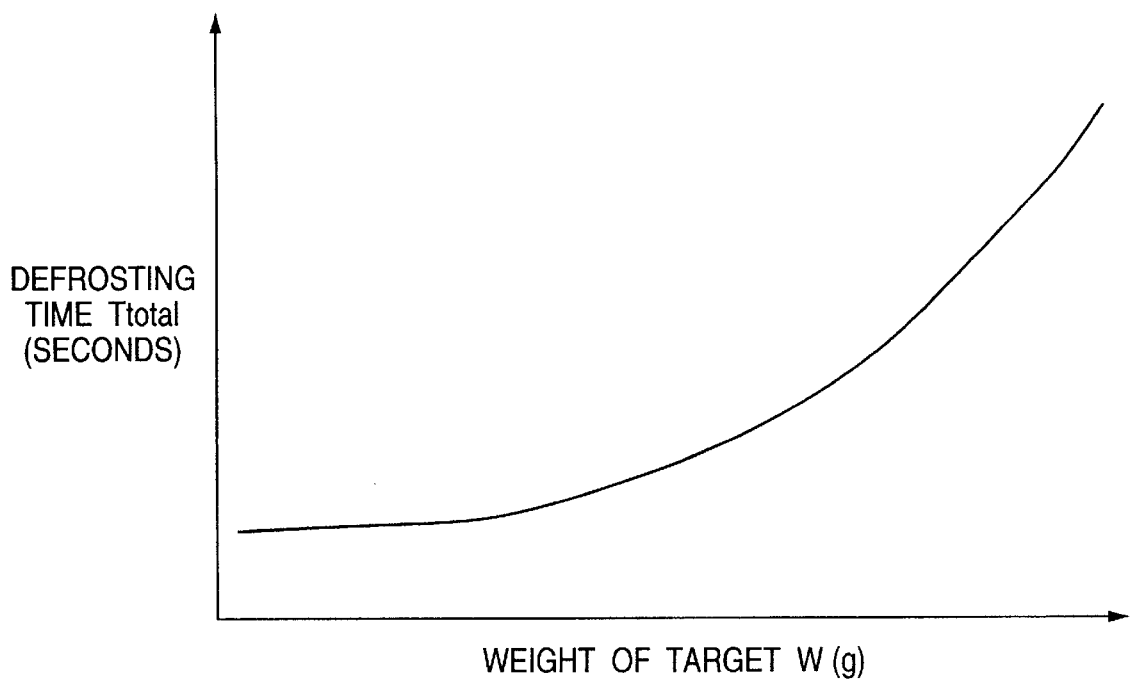
FIG. 54 is a graph showing the relationship between weights of targets which must be heated and defrosting time.

Since total electric power required to defrost a target is enlarged if the weight W of the target is heavy as shown in FIG. 54, time required to defrost the target is elongated. If the weight W of the target which must be heated is light, the total electric power required to defrost the target is reduced. Thus, time required to defrost the target is shortened.

Since the defrosting time corresponding to the weight of the target which must be heated can be determined if the relational equation shown in FIG. 54 is used, excessive supply of energy of microwaves to the target which must be heated can be prevented. As a result, the grade of finishing of the defrosted target can furthermore be improved.

The defrosting-time storage means 211 has the stored relational equation between the weight W of the target which must be heated and defrosting time Ttotal shown in FIG. 54. When the weight W of the target which must be heated is communicated to the defrosting-time storage means 211 from the state storage means 210, the defrosting-time storage means 211 transmits defrosting time Ttotal required for the target.

Although the relational equation between the weight of the target which must be heated and the defrosting time is employed as an example of the state of shift of the phase of a target which must be heated, the defrosting environment and the environment of the target, another condition may be employed an the relational equation which must be stored on the first maximum-electric-power setting means 2110 because the defrosting time is affected by the type of the target and the size of the heating chamber in the microwave oven. Even if the other condition is employed, a similar effect can be obtained.

Another example of the twenty-fifth embodiment will now be described.

This embodiment has continuous large-electric-power supply time for which large electric power is regularly supplied to the magnetron to correspond to the state of shift of the phase of a target which must be heated, the defrosting environment and the environment of the target.

The structure of the twenty-fifth embodiment will now be described with mainly reference to FIG. 55.

Figure 55:
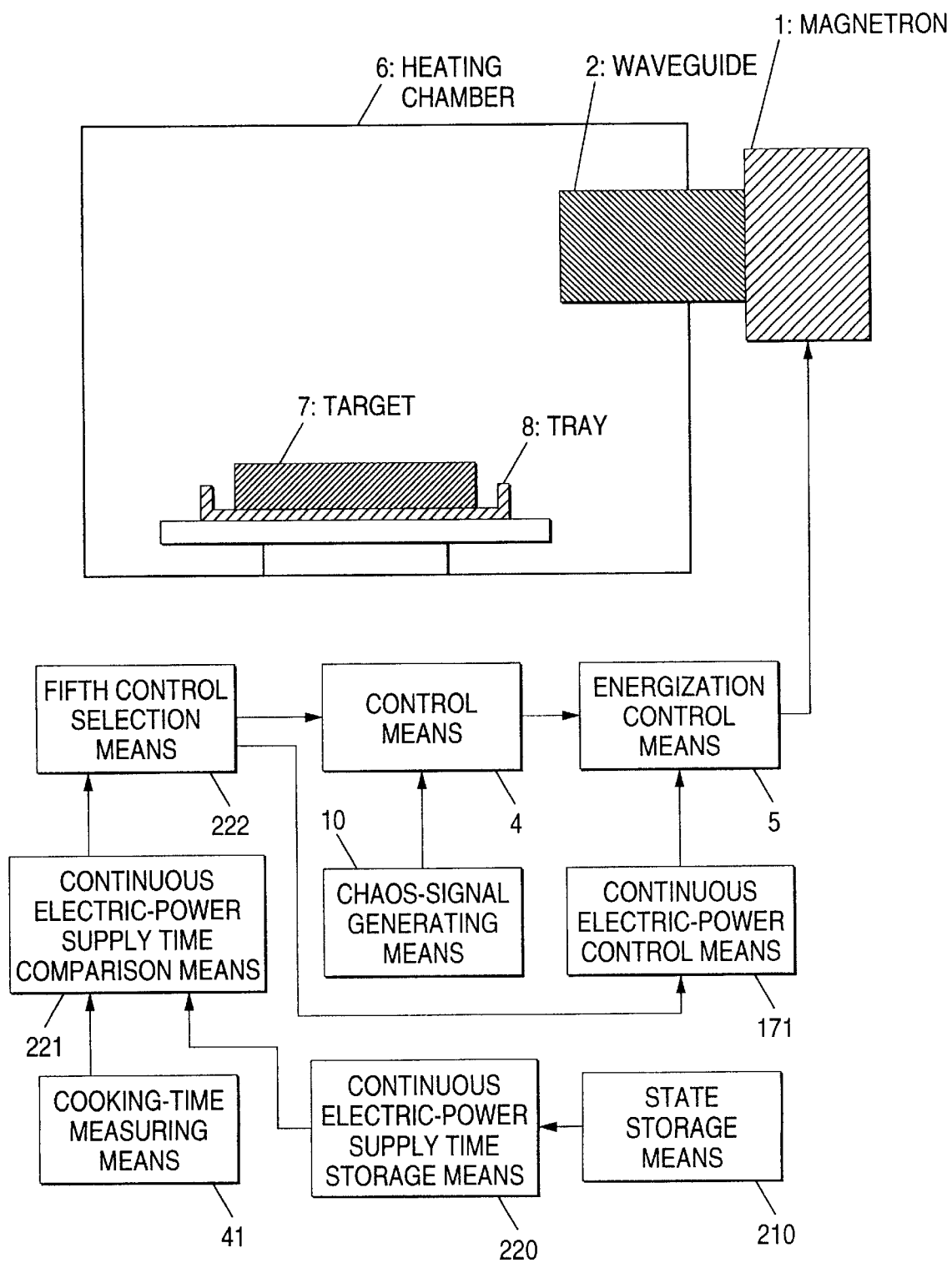
FIG. 55 is a block diagram showing the microwave oven according to the twenty-fifth embodiment of the present invention.

Referring to FIG. 55, reference numeral 220 represents a continuos electric-power supply time storage means on which time for which electric power is continuously supplied to correspond to the state of shift of the phase of a target which must be heated, the defrosting environment and the environment of the target in stored. Thus, the continuos electric-power supply time storage means 220 transmits, to a continuous electric-power supply time comparison means 221, continuous electric power supply time stored on the state storage means 210 and corresponding to the state of shift of the phase of a target which must be heated, the defrosting environment and the environment of the target.

The continuous electric-power supply time comparison means 221 subjects the continuous electric power supply time stored on the continues electric-power supply time storage means 220 and the cooking time stored on the cooking-time measuring means 41 to a comparison to determine whether or not electric power is continuously supplied to the magnetron 1. Then, the continuous electric-power supply time comparison means 221 transmits a result of the determination to a fifth control selection means 222.

In accordance with the determination made by the continuous electric-power supply time comparison means 221, the fifth control selection means 222 selects either of the continuous electric-power control means 111 for regularly supplying large electric power to the magnetron 1 or the control means 4 for dielectrically heating the target in accordance with the chaos signal. Then, the fifth control selection means 222 transmits a fifth control selection signal to the selected control means.

When the continuous electric-power control means 171 receives the fifth control selection signal from the fifth control selection means 222, the continuous electric-power control means 171 transmits, to the energization control means 5, a continuous electric power signal for the purpose of regularly supplying electric power to the magnetron 1.

When the control means 4 roceived the fifth control selection signal from the fifth control selection means 222, the control means 4 transmits, to the energization control means 5, a control signal for the purpose of controlling electric power which must be supplied to the magnetron 1 in accordance with the chaos signal generated by the chaos-signal generating means 3.

The operation of the twenty-fifth embodiment will now be described with reference to FIGS. 56 and 57.

Figure 56:
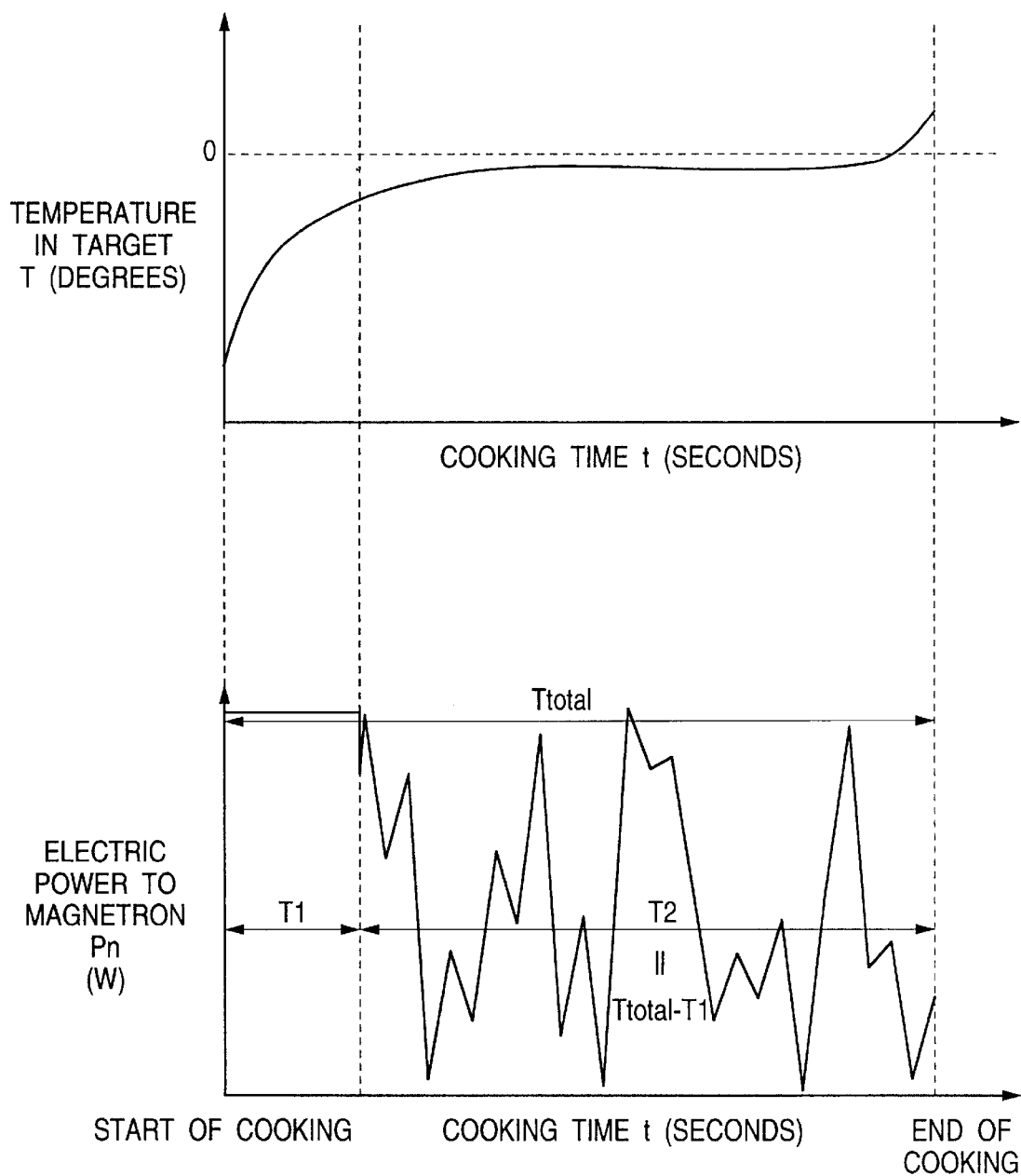
FIG. 56 is a graph showing the relationship between electric power which must be supplied to the magnetron and temperatures in a target which must be heated.

FIG. 56 is a graph showing the relationship between electric power Pn which must be supplied to the magnetron 1 and temperatures T in the target which must be heated. Note that the defrosting time is indicated with Ttotal, time for which electric power is continuously supplied is indicated with T1 and chaos time is indicated with T2.

As described above, energy of microwaves emitted from the magnetron 1 in not substantially attenuated in the target which must be heated in the state where the overall body of the target is frozen. Thus, the energy is uniformly distributed in the overall body of the target which must be heated. As a result, the temperatures in the target which must be heated are uniformly rained. In this case, microwaves in a large quantity are regularly supplied to uniform the temperature distribution in the target which must be heated, and to shorten defrosting time. If large electric power is regularly supplied to the magnetron 1 for a long time, the energy of the microwaves is concentrated to portion of the target which has been first defrosted. As a result, the temperature distribution in the target which must be heated is made to be nonuniform. Accordingly, time T1 for which large electric power is regularly supplied to the magnetron 1 is determined in accordance with the state of shift of the phase of a target which must be heated, the defrosting environment and the environment of the target to improve the temperature distribution in the target which must be heated during the defrosting process.

Figure 57:
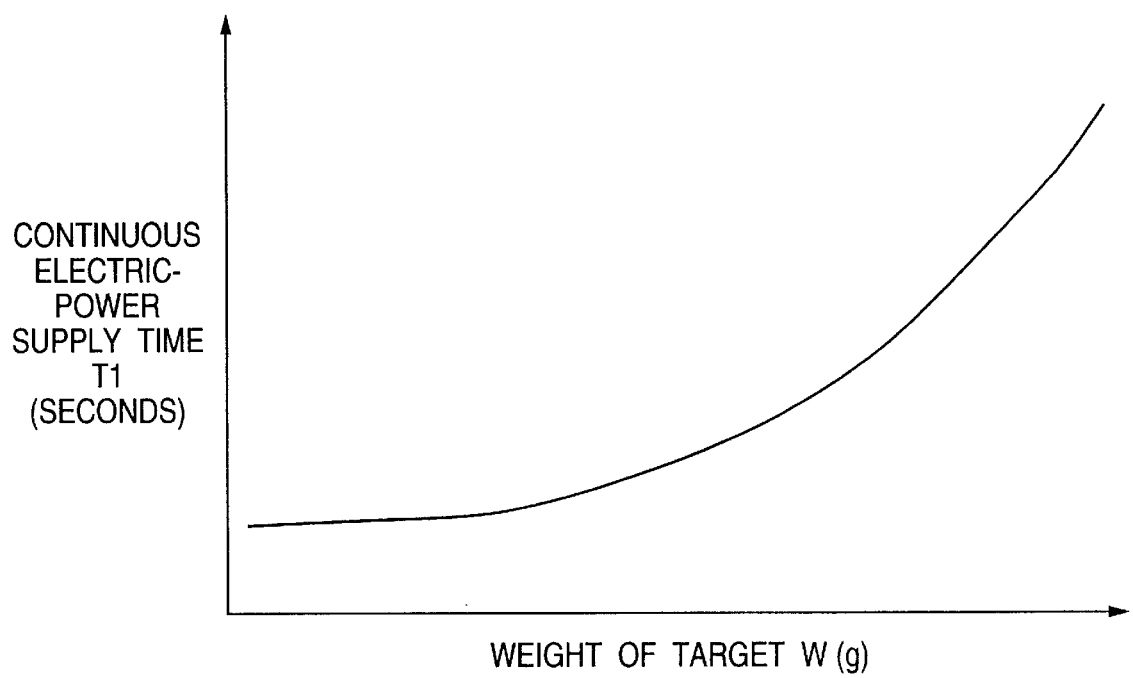
FIG. 57 is a graph showing the relationship between weights of targets which must be heated and continuous power supplying time.

FIG. 57 is a graph showing the relationship between the weight W of the target which must be heated and time T1 for which electric power is continuously supplied. As shown in FIG. 57, great energy is required to defrost a target when the weight of the target is heavy. Therefore, time T1 for which electric power is continuously supplied must be elongated If the weight of the target which must be heated is small, time T1 for which electric power is continuously supplied must be shortened.

The continuos electric-power supply time storage means 220 has stored relational equations between the weight W of the target which must be heated and time T1 for which electric power is continuously supplied an shown in FIG. 57. In accordance with the weight of the target stored on the state storage means 210, the continues electric-power supply time storage means 220 determines the time T1 for which electric power is continuously supplied.

Although the weight of the target which must be heated is employed as an example of the state of shift of the phase of a target which must be heated, the defrosting environment and the environment of the target, another state for determining the time for which electric power is continuously supplied may be employed because a multiplicity of states exist which include the temperature in the heating chamber, the shape of the target as the state of shift of the phase of a target which must be heated, the defrosting environment and the environment of the target. Even if the other state is employed, a similar effect can be obtained.

The twenty-fifth embodiment will now be described.

This embodiment has a structure that dielectric heating time is set in which small electric power is regularly supplied to the magnetron to be adaptable to the environment of the target which must be heated.

Figure 58:
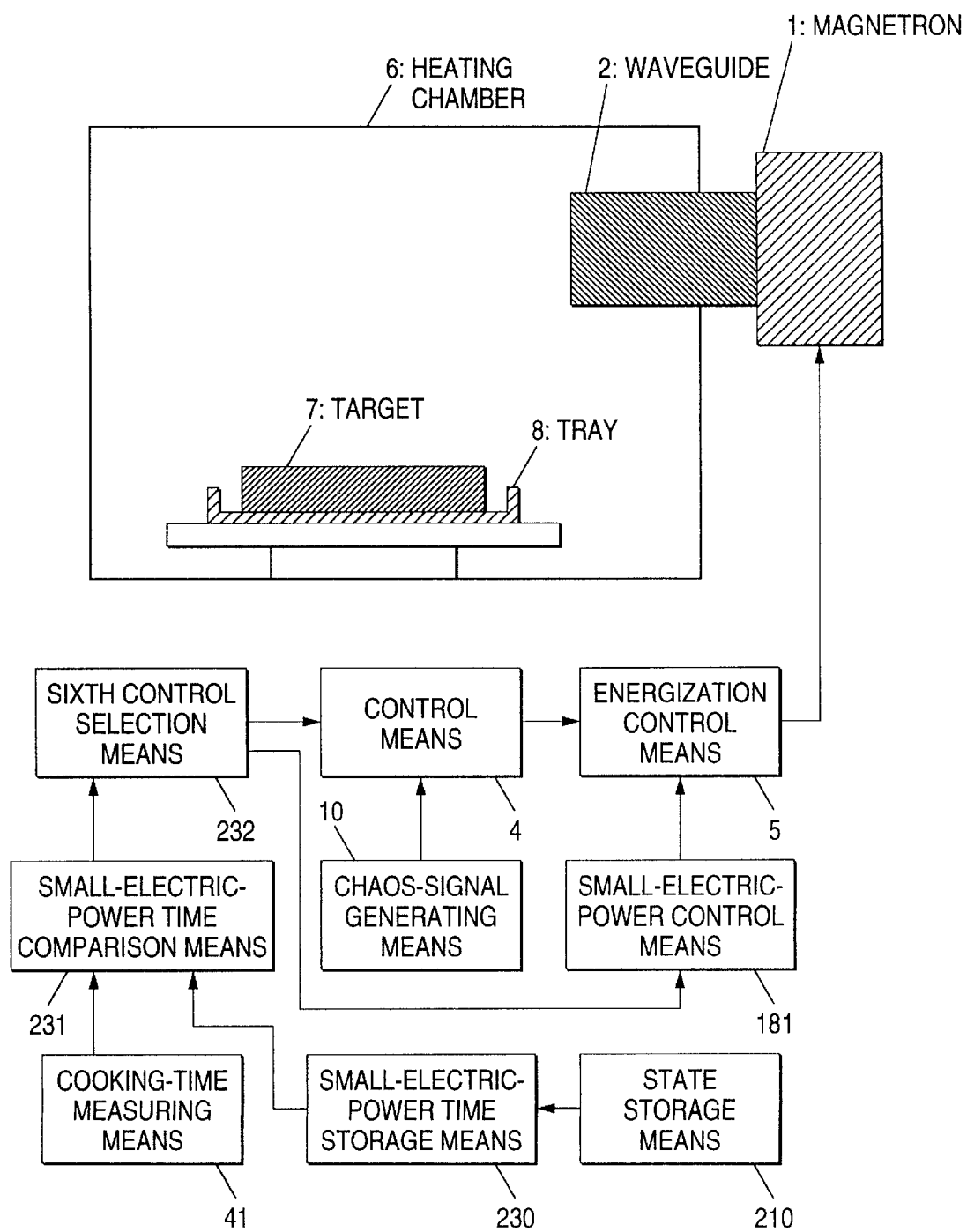
FIG. 58 is a block diagnam showing the microwave oven according to the twenty-fifth embodiment of the present invention.

The structure of the twenty-fifth embodiment will now be described with reference to FIG. 58.

Reference numeral 230 represents a small-electric-power supply time storage means on which dielectrical heating time, that is, small electric-power supply time is stored in which small electric power is regularly supplied to the magnetron 1 in accordance with the state of shift of the phase of a target which must be heated, the defrosting environment and the envirormgnt of the target. The small-electric-power supply time storage means 220 transmits, to a small electric-power supply time comparison means 221, optimum time for which small electric power is supplied in accordance with the state of shift of the phase of a target which must be heated, the defrosting environment and the environment of the target stored on the state storage means 170.

The small electric-power supply time comparison means 231 subjects time for which small electric power is supplied and which has been obtained from the small-electric-power supply time storage means 230 and cooking time stored on the cooking-time measuring means 41 to a comparison so as to transmit a result of the comparison to a sixth control selection means 232.

The sixth control selection means 232 follows the determination made by the small electric-power supply time comparison means 231 to select either of the control means 4 for performing dielectrical heating in accordance with a chaos signal or the small electric power control means 181 for regularly supplying small electric power to the magnetron 1. Then, the sixth control selection means 232 transmits a sixth control signal to the selected control means.

When the small electric-power supply time comparison means 231 receives the sixth control selection signal transmitted from the sixth control selection means 232, the small electric-power supply time comparison means 231 transmits to the energization control means 5, a small-electric-power signal for regularly supplying small electric power to the magnetron 1.

When the control means 4 receives the sixth control selection signal from the sixth control selection means 232, the control means 4 transmits, to the energization control means 5, a control signal for controlling electric power which must be supplied to the magnetron 1 in accordance with the chaos signal generated by the chaos-signal generating means 10.

The operation of the twenty-fifth embodiment will now be described with reference to FIGS. 59 and 60.

Figure 59:
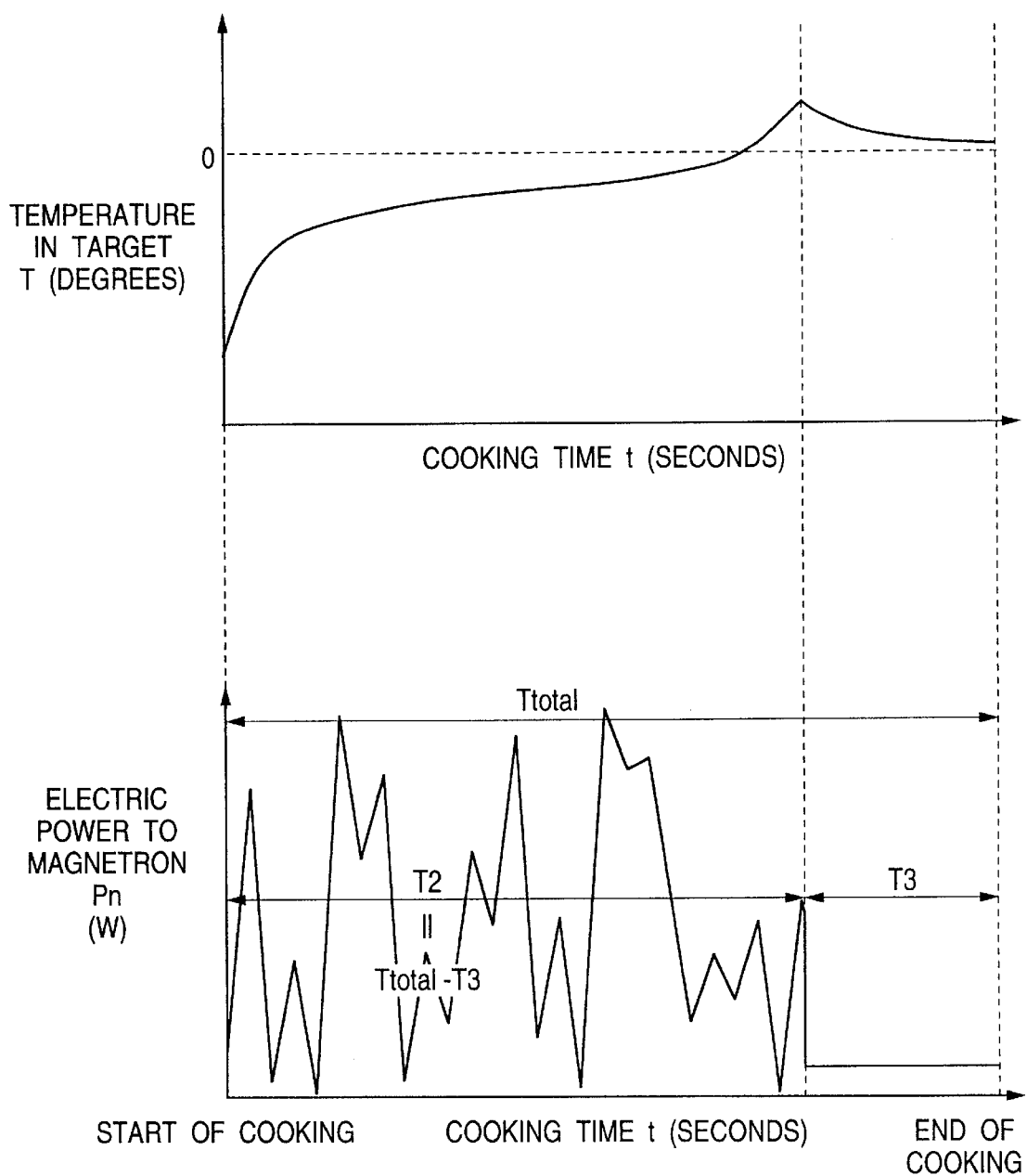
FIG. 59 is a graph showing the relationship between electric power which must be supplied to the magnetron and temperatures in a target which must be heated.

FIG. 59 shows the relational equation between electric power Pn which must be supplied to the magnetron 1 and temperatures T in the target which must be heated. Note that the axis of abscissa of the graph stands for cooking time t.

In FIG. 59, defrosting time is indicated with Ttotal, time for which small electric power is supplied is indicated with T3 and chaos time is indicated with T2.

As described above, when a target which must be heated is defrosted by dielectrical heating in accordance with a chaos signal, a portion of the target is sometimes first defrosted for some reason or other, as described above. Since energy of microwaves emitted from the magnetron 1 is concentrated to the portion which has first been defrosted in the above-mentioned case, the temperature of the portion is rapidly raised. To uniform the temperature distribution in the target which must be heated, the small-electric-power supply step in which small electric power is regularly supplied to the magnetron 1 is provided. Time in which the temperature distribution in the target which must be heated is uniformed in the small-electric-power supply step varies depending upon the state of shift of the phase of a target which must be heated, the defrosting environment and the environment of the target. Accordingly, small-electric-power supply time T3 is provided which corresponds to the state of shift of the phase of a target which must be heated, the defrosting environment and the environment of the target, as shown in FIG. 59.

Figure 60:
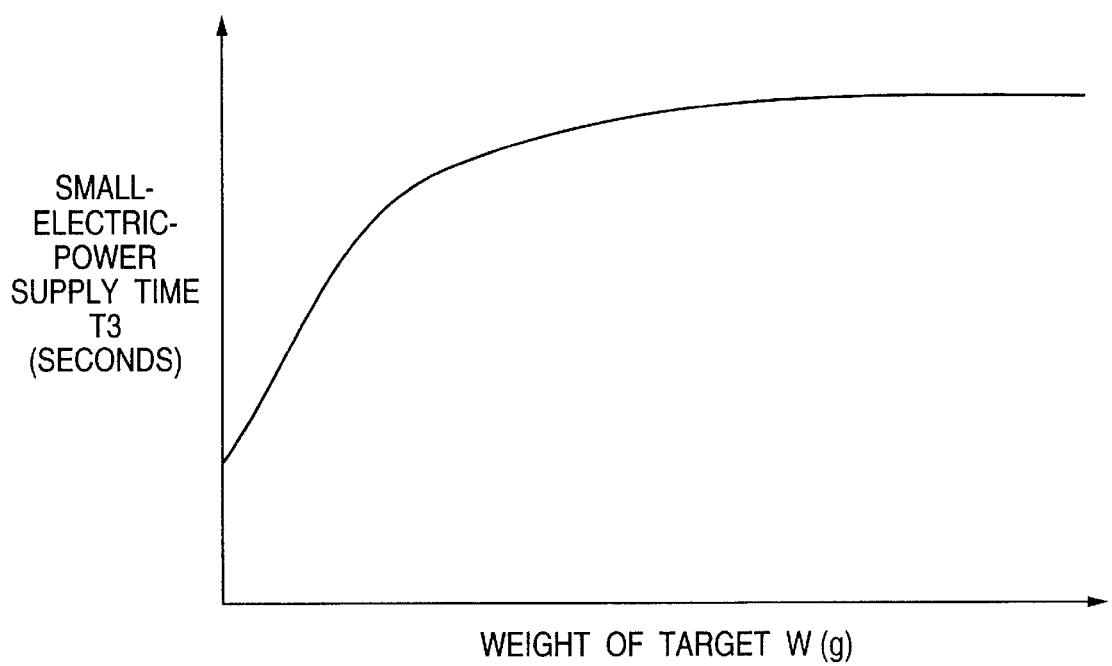
FIG. 60 is a graph showing the relationship between weightsi of targets which must be heated and small-power supplying time.

FIG. 60 shows a relational equation between the weight W of the target which must be heated and the small-electric-power supply time T3. As shown in FIG. 60, when the weight W of the target which must be heated is heavy, long time is required for the temperatures to uniformly be distributed in the target. Therefore, the small-electric-power supply time T3 must be elongated. If the weight W of the target which must be heated in small, the small-electric-power supply time T3 can be shortened.

The small-electric-power supply time storage means 230 has stored relational equations between the weight W of the target which must be heated and the small-electric-power supply time T3, as shown in FIG. 60. Thus, the small-electric-power supply time storage means 230 determines the small-electric-power supply time T3 in accordance with the state of shift of the phase of a target which must be heated, the defrosting environment and the environment of the target stored on the state storage means 210.

Although the weight of the target which must be heated in employed as an example of the state of shift of the phase of a target which must be heated, the defrosting environment and the environment of the target, another state for determining the small electric power supply time may be employed because a multiplicity of states exist which include the temperature in the heating chamber, the shape of the target as the state of shift of the phase of a target which must be heated, the defrosting environment and the environment of the target. Even if the other state is employed, a similar effect can be obtained.

The twenty-fifth embodiment will now be described.

This embodiment has large electric-power supply time for which large electric power is supplied to the magnetron to correspond to the state of shift of the phase of a target which must be heated, the defrosting environment and the environment of the target.

The structure of the twenty-fifth embodiment will now be described with mainly reference to FIG. 61.

Figure 61:
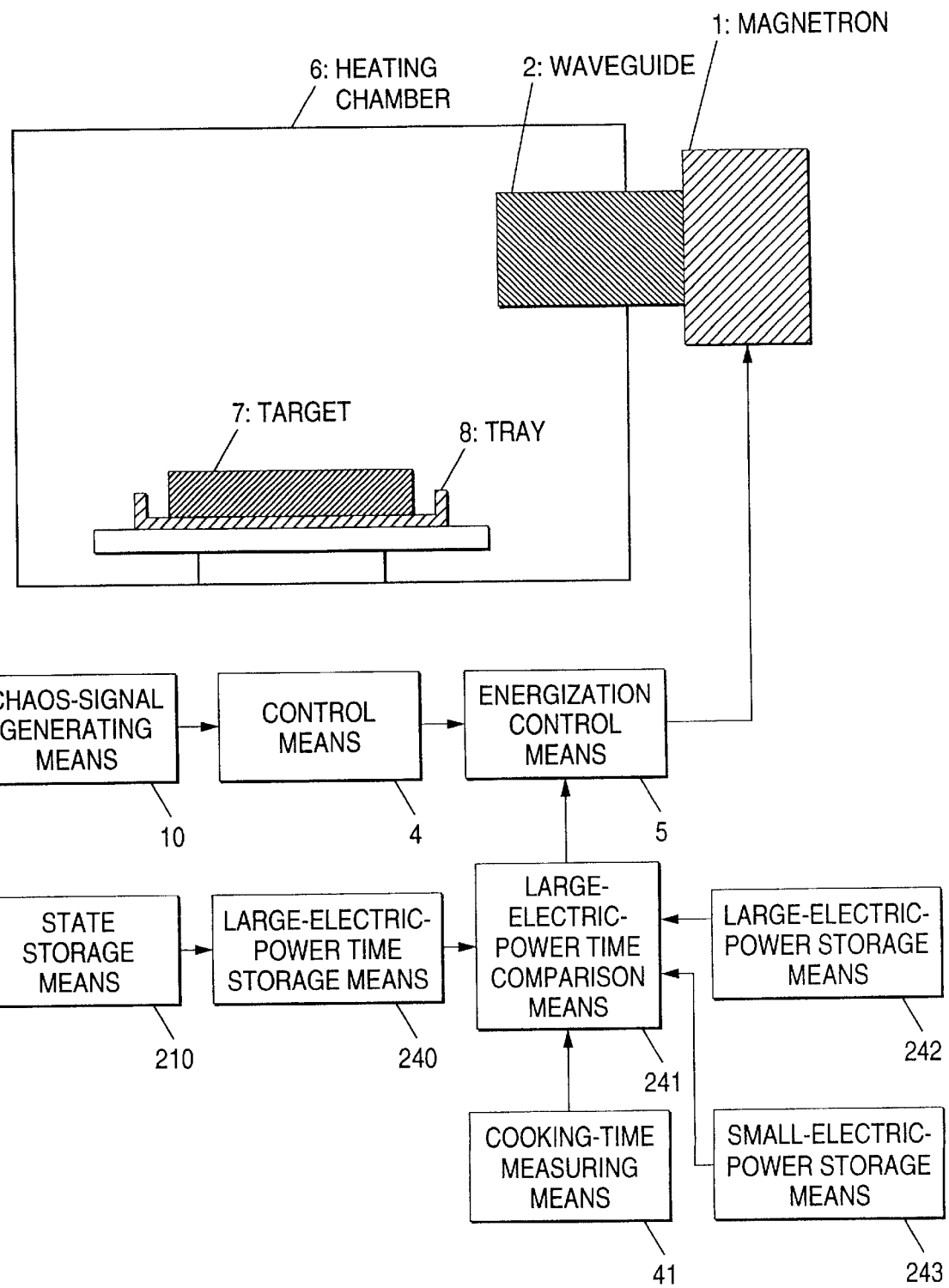
FIG. 61 is a block diagram showing the microwave oven according to the twenty-fifth embodiment of the present invention.

Referring to FIG. 61, reference numeral 240 represents a state storage means for selecting the state of shift of the phase of a target which must be heated, the defrosting environment and the environment of the target.

Reference numeral 240 represents a large-electric-power time storage means on which large-electric-power time corresponding to the state of shift of the phase of a target which must be heated is stored. The large-electric-power time storage means 240 determines large-electric-power time for which large electric power is used to dielectrically heat a target in accordance with the state of shift of the phase of a target which must be heated, the defrosting environment and the environment of the target stored on the state storage means 210.

A large-electric-power comparison means 241 subjects cooking time stored on the cooking-time measuring means 41 and the large-electric-power time stored on the large-electric-power time storage means 240 to a comparison. In accordance with a result of the comparison, the large-electric-power comparison means 241 selects either of the large electric power stored on the large-electric-power storage means 242 or the small electric power stored on a small-electric-power storage means 243 to transmit the selected electric power to the energization control means 5.

In accordance with the control signal supplied from the control means 4, the energization control means 5 adjusts the is electric power which must be supplied to the magnetron 1 to be the electric power determined by the large-electric-powar comparison means 241.

The operation of the twenty-fifth embodiment will now be described with mainly reference to FIGS. 62 and 63.

Figure 62:
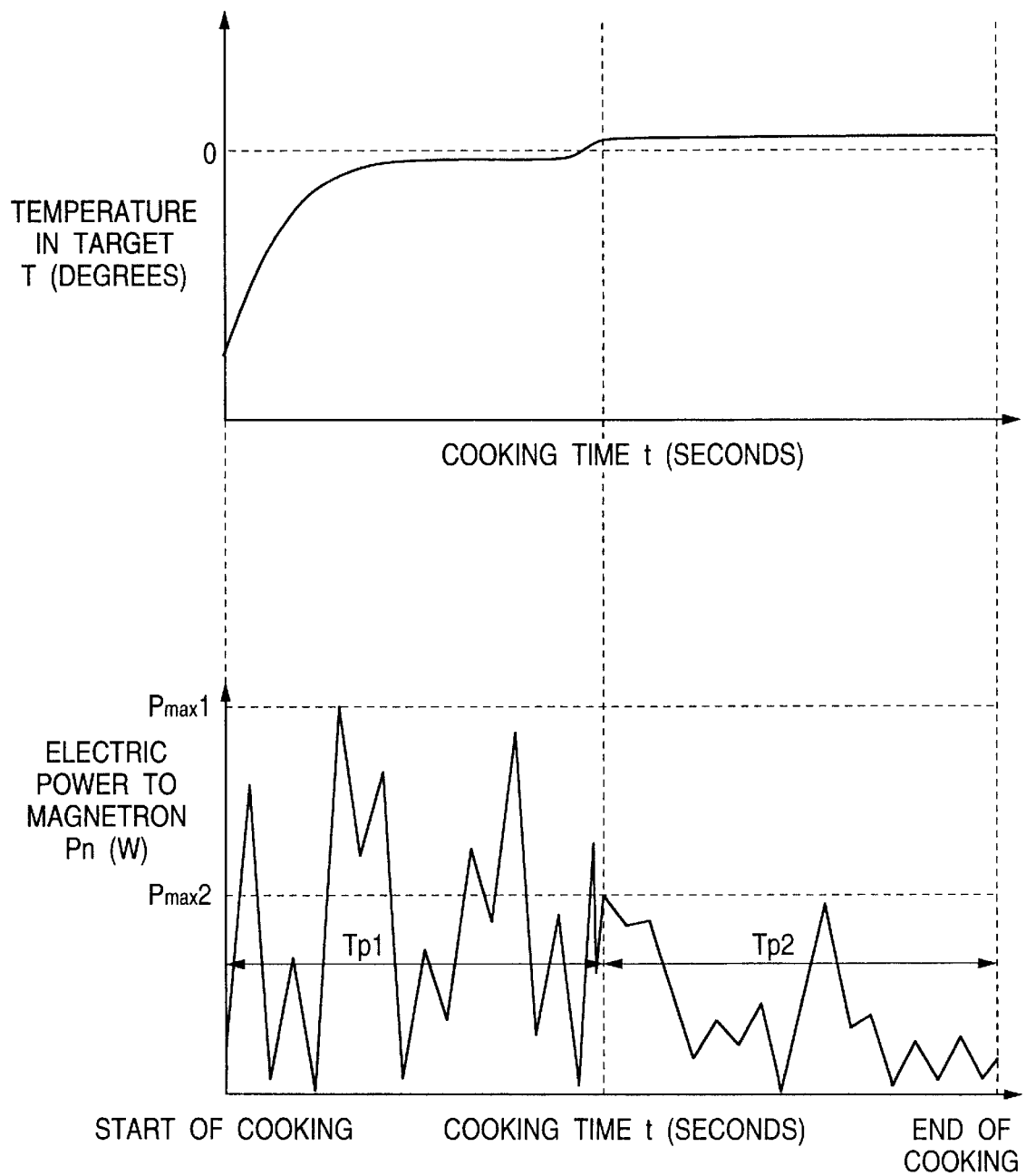
FIG. 62 is a graph showing the relationship between electric power which must be supplied to the magnetron and temperatures in a target which must be heated.
Figure 63:
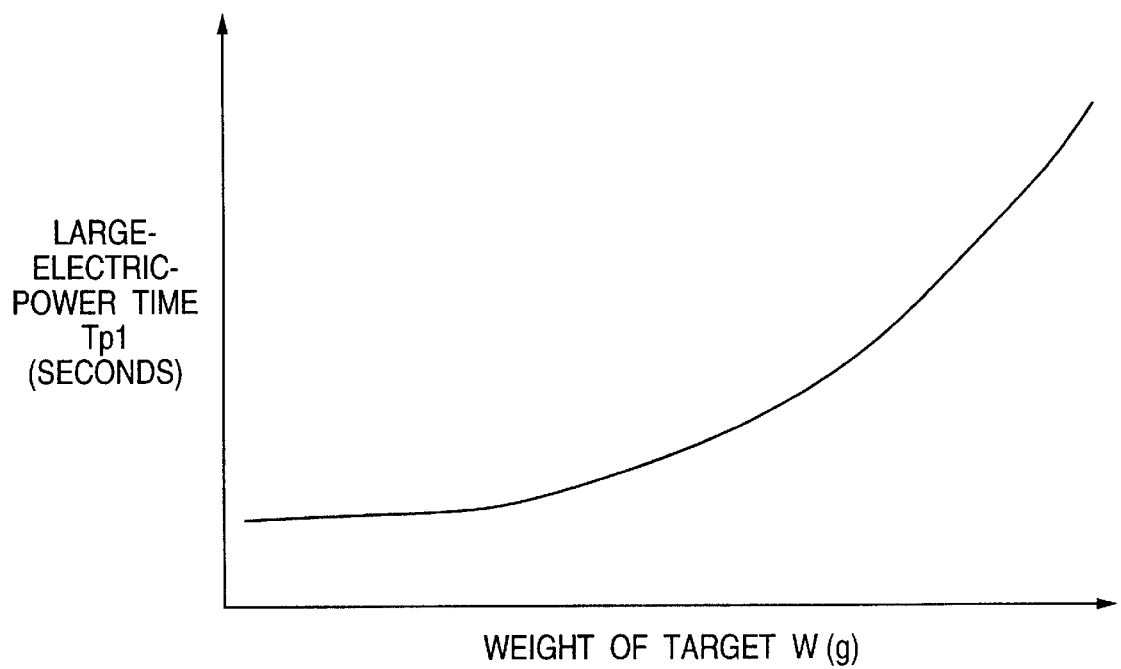
FIG. 63 is a graph showing the relationship between weights of targets which must be heated and large power time.

FIG. 62 is a graph showing the relationship between electric power Pn which must be supplied to the magnetron and the temperatures T in the target which must be heated.

As described above, the characteristic of microwaves in a microwave oven causes nonuniformity of the degree of heating of a target which must be heated to take place depending upon the portion because of the difference in the intensity and because energy of the microwaves can easily be concentrated to an end of the target. If a portion of the target in which change to water has occurred appearst concentration of energy of the microwaves to the foregoing portion cannot easily be prevented by the control of the electric power of the microwaves in accordance with the chaos signal. Therefore, electric power which must be supplied to the magnetron must be reduced to uniform the temperature distribution in the target which must be heated after defrosting of a portion of the target has been started.

FIG. 62 is a graph showing a state in which overheating of a target which must be heated in prevented by changing electric power which must be supplied to the magnetron from large electric power Pmax1 to small electric power Pmax2 at cooking time Tp1 if a portion of the target is changed to water during the defrosting process.

The time Tp1 at which electric power is changed depends upon the state of shift of the phase of a target which must be heated, the defrosting environment and the environment of the target, for example, the weight of the target. An example of a relational equation between the weight W of the target which must be heated and large-electrlc-power time Tp1 is shown in FIG. 62.

The large-electric-power comparison means 241 subjects the cooking time stored on the cooking-time measuring means 41 and the large-electric-power time stored on the large-electric-power time storage means 240 to a comparison. If the cooking time is shorter than the large-electric-power time, the large-electric-power comparison means 241 employs the large electric power Pmax1 which must be supplied to the magnetron. If the cooking time is longer than the large-electric-power time, the large-electric-power comparison means 241 employs the small electric power Pmax2 which must be supplied to the magnetron.

Although the weight of the target which must be heated is employed as an example of the state of shift of the phase of a target which must be heated, the defrosting environment and the environment of the target, another state for determining the electric power which must be supplied to the magnetron may be employed because a multiplicity of states exist which include the temperature in the heating chamber and the shape of the target as the state of shift of the phase of a target which must be heated, the defrosting environment and the environment of the target. Even if the other state is employed, a similar effect can be obtained.

The twenty-fifth embodiment will furthermore be described.

The twenty-fifth embodiment has defrosting time determined in accordance with a value detected by a sensor for measuring the state of shift of the phase of a target which must be heated, the defrosting environment and the environment of the target.

The structure of the twenty-fifth embodiment will now be described with mainly reference to FIG. 64.

Figure 64:
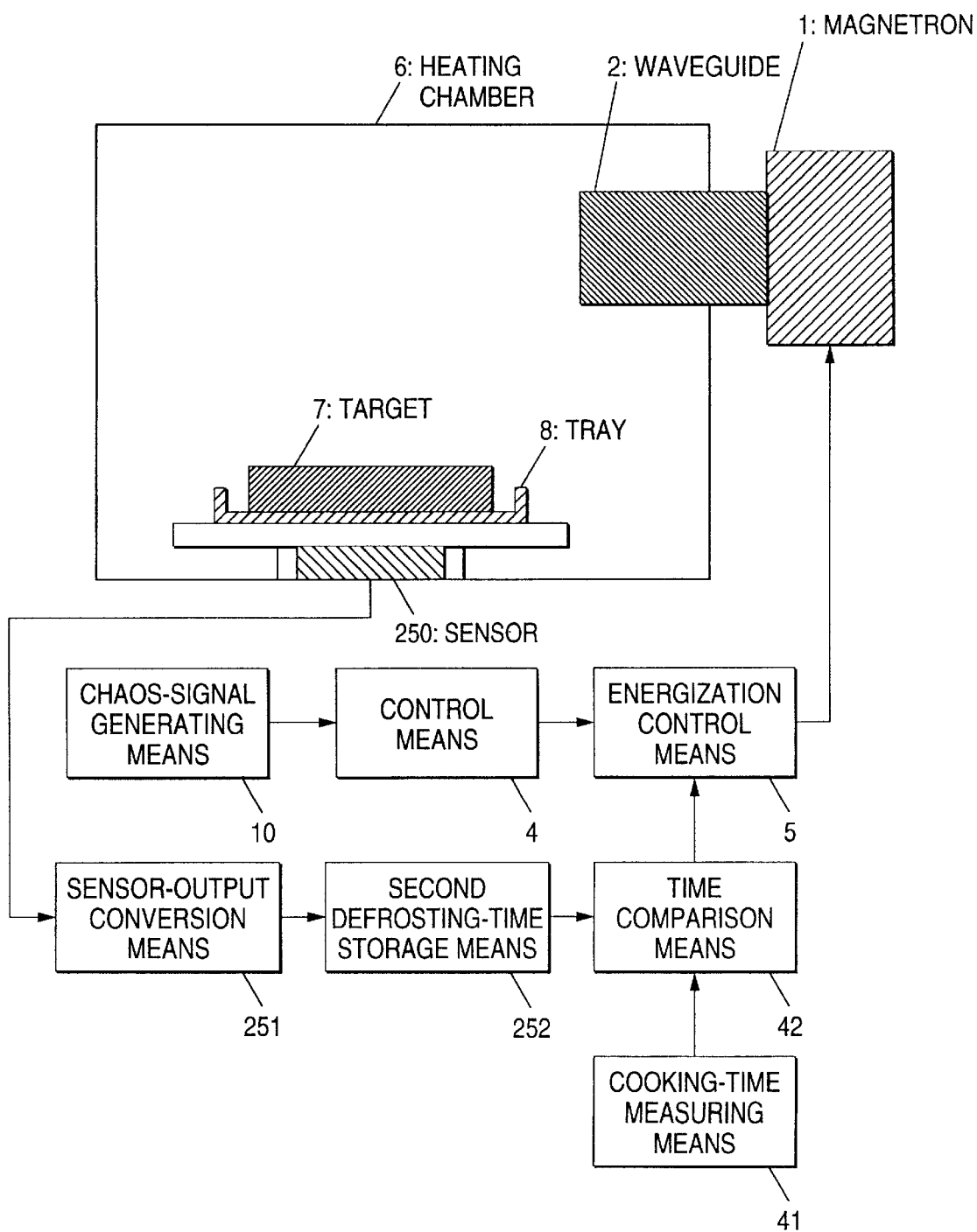
FIG. 64 is a block diagram showing the microwave oven according to the twenty-fifth embodiment of the present invention.

Referring to FIG. 64, reference numeral 250 represents a sensor for measuring the state of shift of the phase of a target which must be heated, the defrosting environment and the environment of the target. A value obtained by the sensor 250 is, by a sensor-output conversion means 251, converted into data about the state of shift of the phase of a target which must be heated, the defrosting environment and the environment of the target so as to be transmitted to a second defrosting-time storage means 252 as a sensor value.

The second defrosting-time storage means 252 calculates optimum defrosting time in accordance with the sensor value supplied from the sensor-output conversion means 251 so as to transmit the obtained defrosting time as second defrosting time.

The time comparison means 42 subjects the cooking time stored on the cooking-time measuring means 41 and the second defrosting time stored on the second defrosting-time storage means 252 to a comparison to determine whether or not the target which must be heated has been defrosted.

When the time comparison means 42 has determined that defrosting has been completed, the energization control means 5 interrupts supply of electric power to the magnetron 1 so that defrosting of the target which must be heated is completed.

The operation of the twenty-fifth embodiment will now be described with mainly reference to FIG. 54.

FIG. 54 is a graph showing the relationship between the weight W of the target which must be heated and defrosting time Ttotal required to defrost the targets As can be understood from FIG. 54, time required to defrost a target is elongated because the energy of microwaves required to defrost the target is enlarged if the weight of the target is heavy. The present invention is arranged in such a manner that the weight of the target which must be heated is measured by the sensor and the relational equation shown in FIG. 54 is used to calculate the defrosting time Ttotal required to defrost the target. The weight of the target which must be heated in automatically measured by the sensor to set the defrosting time required for the target so that defrosting of the target is automatically completed without the necessity of any operation which must be performed by a user. Since the defrosting time in set, optimum energy of microwaves is supplied to the target which must be heated. As a result, the grade of finishing of the target can furthermore be improved after the target has been defrosted.

The second defrosting-time storage means 252 has the stored relational equation between the weight W of the target which must be heated and defrosting time Ttotal shown in FIG. 54 and calculates the defrosting time Ttotal in accordance with the sensor value supplied from the sensor-output conversion means 251, for example, the weight W of the target.

The time comparison means 42 subjects the cooking time stored on the cooking-time measuring means 41 and the second defrosting time stored on the second defrosting-time storage means 252 to a comparison. Then, the time comparison means 42 perform dielectrical heating using microwaves until the cooking time exceeds the second defrosting time. When the cooking time reaches the second defrosting time, the time comparison means 42 completes the defrosting operation.

Although the weight of the target which must be heated is employed as an example of the state of shift of the phase of a target which must be heated, the defrosting environment and the environment of the target, a multiplicity of factors including the state of shift of the phase of a target which must be heated, the defrosting environment and the environment of the target affect the defrosting time required for a target. An essential portion lies in that the state of the target which must be heated can be measured by using the sensor and the defrosting time required for the target can be determined in accordance with the measured value. Even if the other state is employed, a similar effect can be obtained.

The twenty-fifth embodiment has the structure that the time for which a target regularly irradiated with microwaves is changed to be adaptable to the state of shift of the phase of a target which must be heated, the defrosting environment and the environment of the target. Since time adaptable to the state of the target or the environment is set, waste of time can be prevented to achieve the objects of the steps.

Twenty-Sixth Embodiment

A twenty-sixth embodiment will now be described.

The twenty-sixth embodiment has a DUTY step having a low DUTY ratio for reducing electric power which is regularly supplied to the magnetron. The structure and operation of the twenty-sixth embodiment which are different from the twenty-first embodiment will mainly be described. The other structures and operations are the same as those of the twenty-first embodiment.

Figure 65:
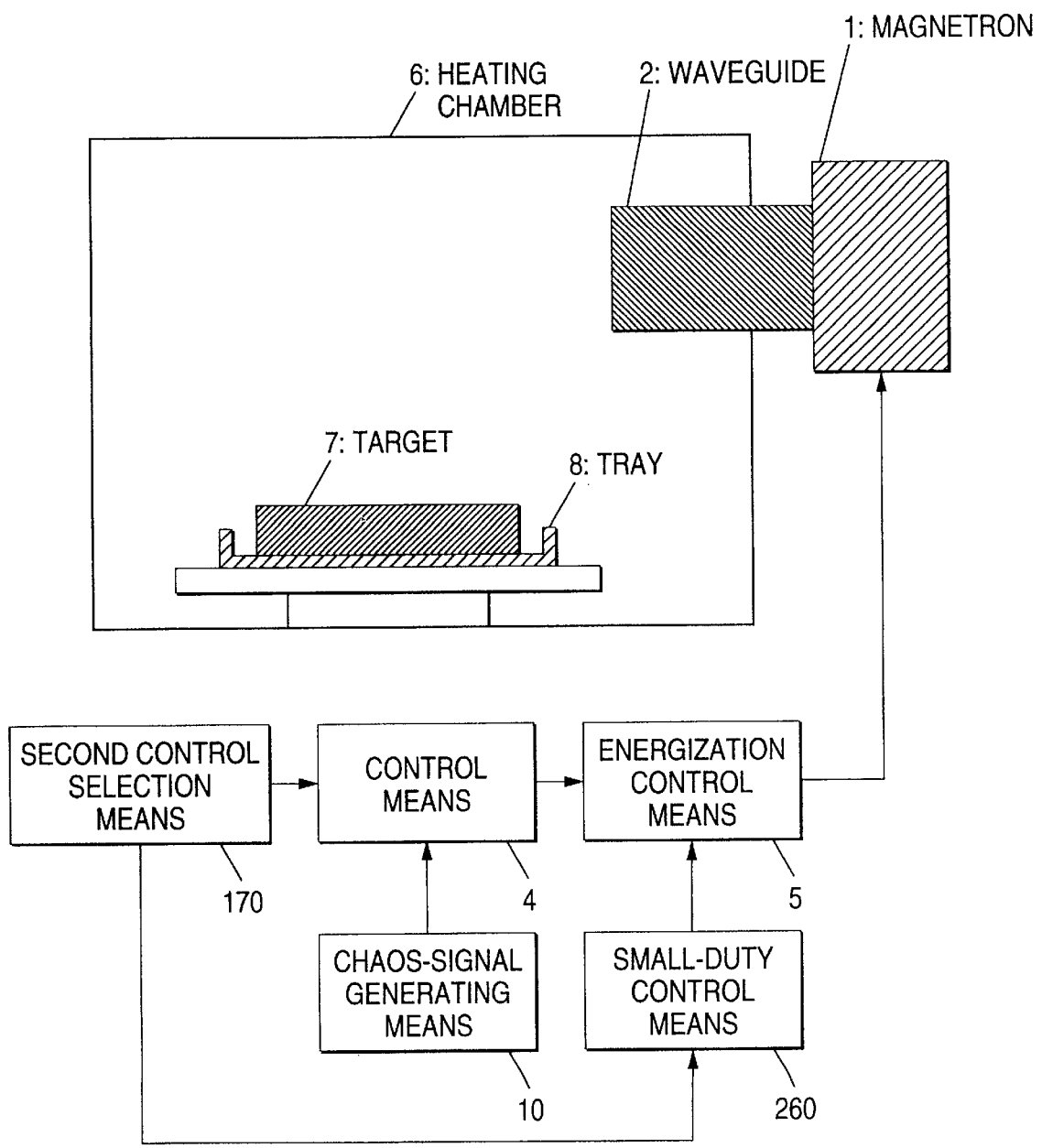
FIG. 65 is a block diagram showing a microwave oven according to a twenty-sixth embodiment of the present invention.

The structure of the twenty-sixth embodiment will now be described with reference to FIG. 65.

Reference numeral 260 represents a second control selection means which selects either of the control means 4 or a small-DUTY control means 140 so as to transmit a second control selection signal to the selected control means.

When the small-DUTY control means 260 is selected by the second control selection means 170, the small-DUTY control means 260 transmits, to the energization control means 5, a DUTY control signal for performing DUTY control in which time for which the supply of electric power is turned off is elongated.

When the control means 4 is selected by the second control selection means 170, the control means 4 transmits, to the energization control means 5, a control signal for changing electric power which must be supplied to the magnetron 1 in accordance with the chaos signal generated by the chaos-signal generating means 10.

The operation of the twenty-sixth embodiment will now be described with reference to FIG. 65.

Figure 66:
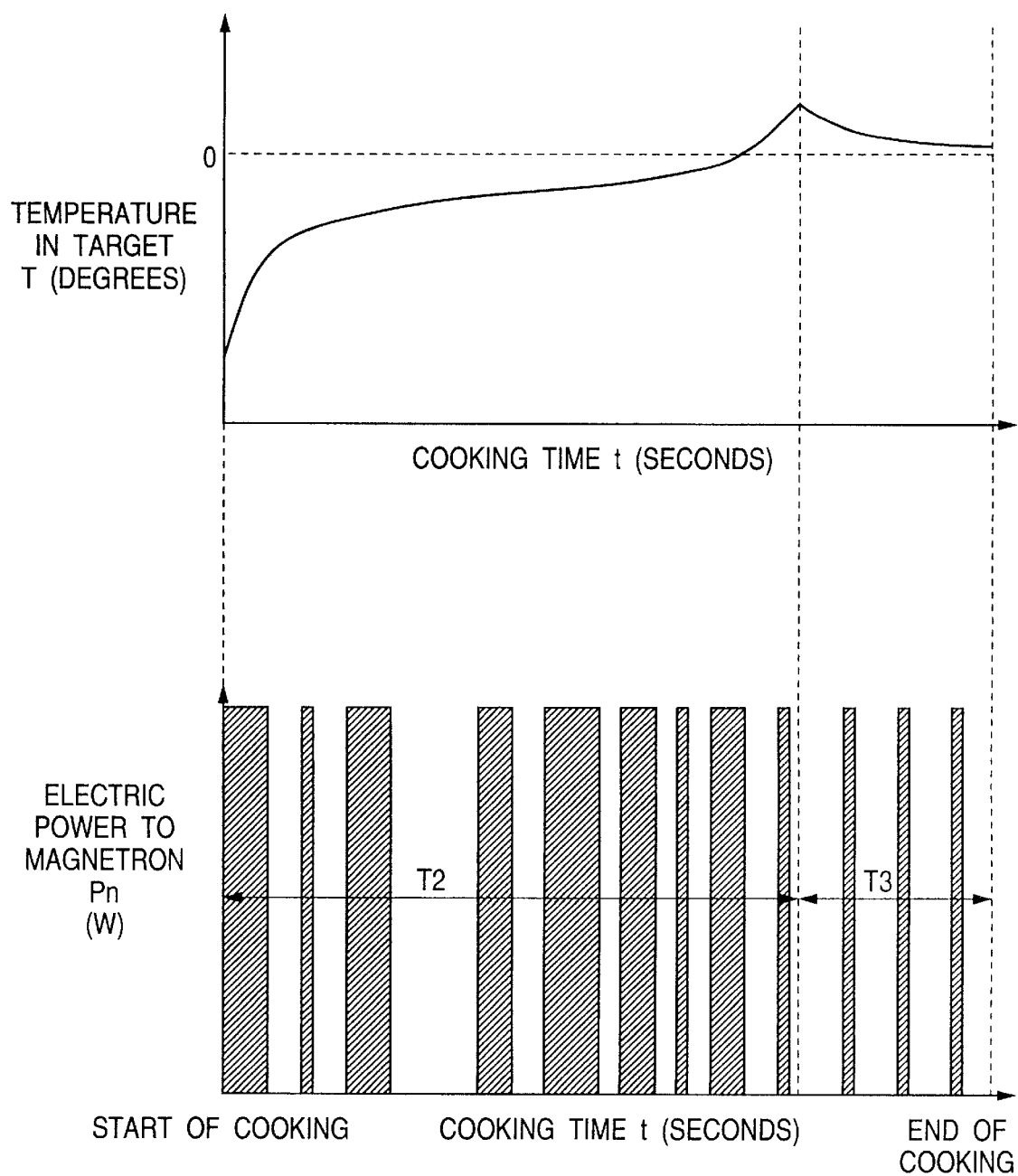
FIG. 66 is a graph showing the relationship between electric power which must be supplied to the magnetron and temperatures in a target which must be heated.

FIG. 66 shows the relationship between electric power Pn which must be supplied to the magnetron 1 and temperatures T in the target which must be heated in such a manner that the axis of abscissa stands for cooking time t.

As described above, there is apprehension that the characteristic of microwaves emitted from the magnetron 1 sometimes causes a portion of the target which must be heated to be first formed into water. Thus, the temperature distribution in the target which must be heated is made to be nonuniform. Accordingly, electric power is DUTY-controlled with a long off time so that average electric power is reduced. Thus, the temperature distribution in the target which must be heated is uniformed. Since the DUTY control in performed by only two values which indicate on and off respectively, the foregoing arrangement can be realized by a simple structure.

When the small-DUTY control means 260 is selected by the second control selection means 170, the small-DUTY control means 260 transmits, to the energization control means 5, a DUTY control signal for performing the DUTY control having a long off time so as to furthermore uniform the temperature distribution in the target which must be heated.

The twenty-sixth embodiment has the structure that microwaves are regularly emitted as a result of the on/off output. Even if the quantity of microwaves cannot be changed to have continuous values because of the structure of the microwave oven, control of the quantity of microwaves with binary values indicating on and off is able to realize the effect of the chaos in the defrosting process. Even if the output of microwaves in a microwave oven cannot continuously be controlled, only a simple change of the structure is required to realize a step of regularly emitting microwaves in a small quantity.

Twenty-Seventh Embodiment

A twenty-seventh embodiment will now be described. The twenty-seventh embodiment has a DUTY step having a low DUTY ratio in order to reduce the average electric power which must be supplied to the magnetron. The structure and operation of the twenty-seventh embodiment which are different from those of the fourth embodiment will mainly be described. The other structures and operations are the same as those of the fourth embodiment.

Figure 97:
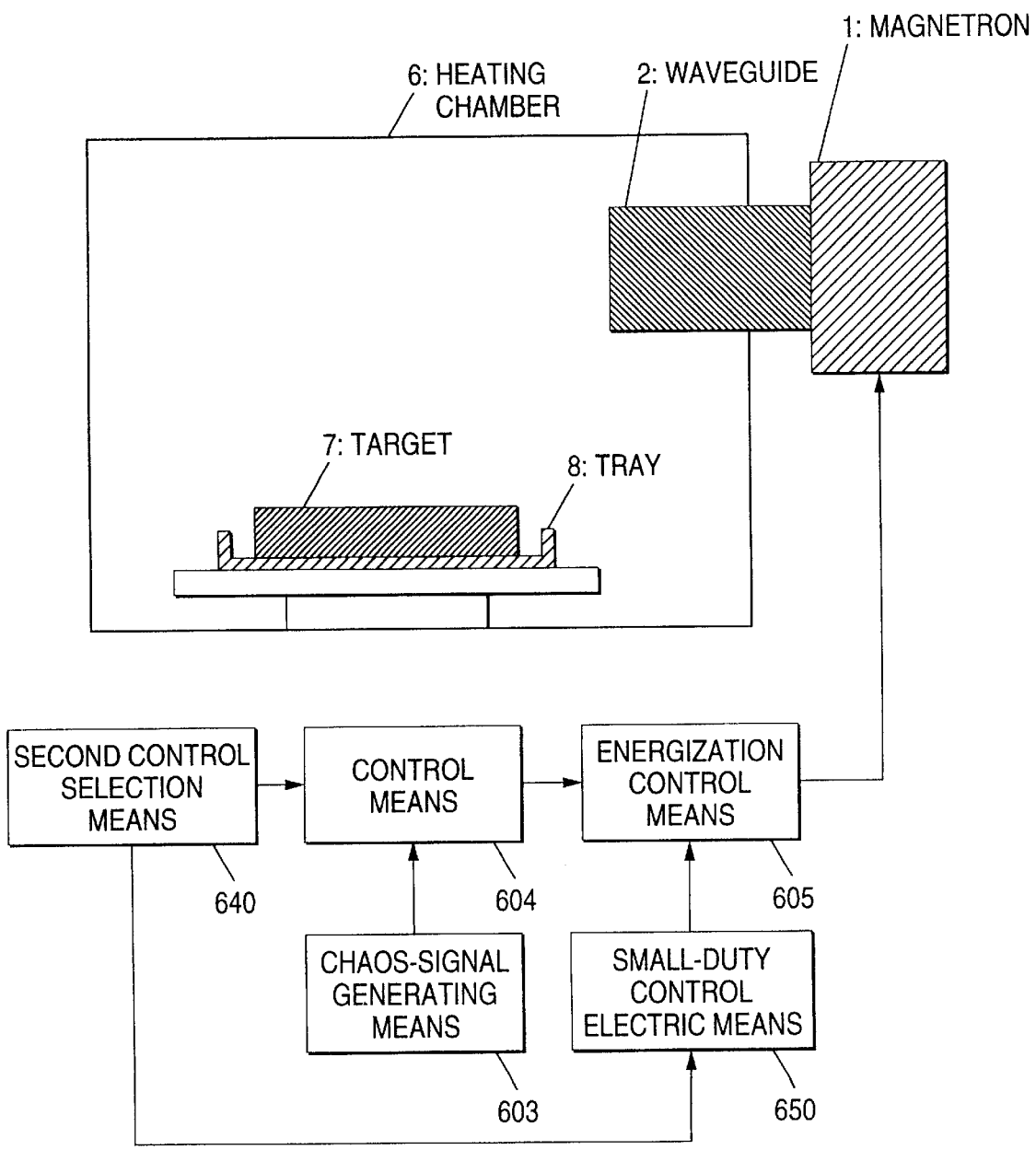
FIG. 97 is a block diagram showing a microwave oven according to a twenty-seventh embodiment of the present invention.

The structure of the twenty-seventh embodiment will now be described with reference to FIG. 97. Reference numeral 640 represents a second control selection means which selects either of the control means 604 or a small-DUTY control means 650 so as to tranmsit a second control selection signal to the selected control means. When the small-DUTY control mean 650 is selected by the second control selection means 640, the small-DUTY control means 650 transmits, to the energization control means 605, a DUTY control signal for performing DUTY control in which time for which the supply of electric power is turned off is elongated.

Figure 98:
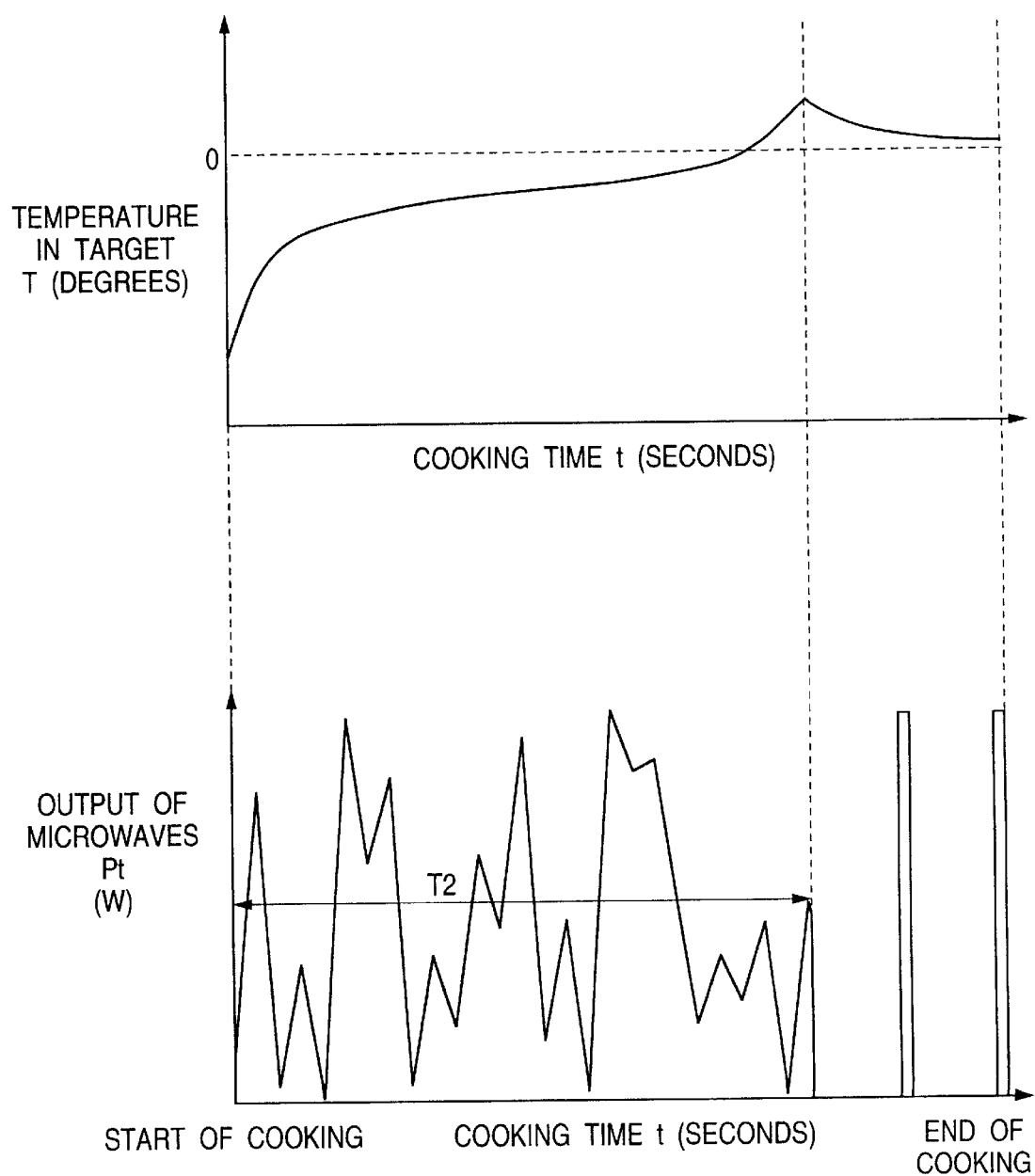
FIG. 98 is a graph showing the relationship between electric power which must be supplied to the magnetron and temperatures in a target which must be heated.

The operation of the twenty-seventh embodiment will now be described with reference to FIG. 98. FIG. 98 shows the relationship between outputs Pt of microwaves and temperatures T in the target which must be heated. Note that the axis of abscissa of FIG. 98 stands for cooking time t.

As described above in twenty-second embodiment, there is apprehension that the characteristic of microwaves emitted from the magnetron sometimes causes a portion of the target which must be heated to be first formed into water. Thus, overheating takes place. As a result, the temperature distribution in the tarqet which must be heated in made to be nonunifonm. Accordingly, electric power is DUTY-controlled with a long off time so that average electric power is reduced. Thus, the temperature distribution in the target which must be heated is uniformed. Since the DUTY control is performed by only two values which indicate on and off respectively, the foregoing arrangement can be realized by a simple structure.

When the small-DUTY control means 650 is selected by the second control selection means 640, the small-DUTY control means 650 transmits, to the energization control means 605, a DUTY control signal for performing the DUTY control having a long off time so an to furthermore uniform the temperature distribution in the target which must be heated.

The twenty-seventh embodiment has the structure that the DUTY control having a long off time is performed in addition to the structure according to the twenty-second embodiment. The grade of finishing of the defrosted target can furthermore be improved with a simple structure.

Twenty-Eighth Embodiment

A twenty-eighth embodiment will now be described.

The twenty-eighth embodiment has a structure that control of heating is performed by using a heater. The structure and operation of the twenty-eighth embodiment which are different from those of the first embodiment will mainly be described. The other structures and operations are the same as those of the first embodiment.

The structure of the twenty-eighth embodiment will now be described with reference to FIG. 67.

Figure 67:
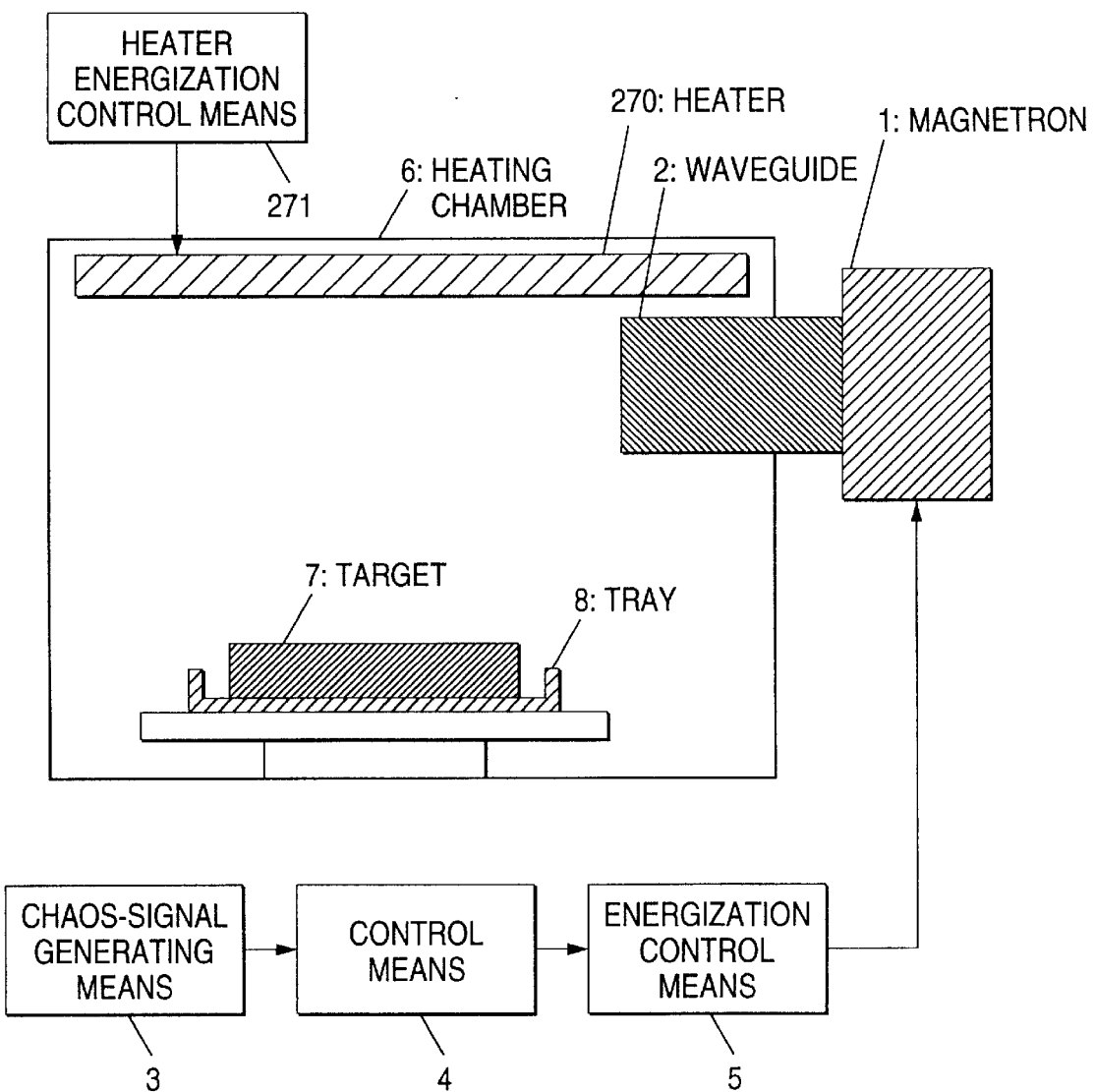
FIG. 67 is a block diagram showing a microwave oven according to a twenty-eighth embodiment of the present invention.

Referring to FIG. 67, reference numeral 270 represents a heater for heating the inside potion of the heating chamber. A heater energization control means 271 supplies, to the heater 270, electric power required for the heater 270 to heat a target which must be heated.

The operation of the twenty-eighth embodiment will now be described.

When a target which must be heated is defrosted by performing dielectrical heating using microwaves emitted from the magnetron in accordance with the chaos signal, the temperature distribution in the target can be uniformed during the defrosting operation. However, frost allowed to adhere to the surface of the target which must be heated cannot sometimes be defrosted. Therefore, radiant heat generated by the heater is used to malt frost to improve the appearance of the defrosted target.

The twenty-eighth embodiment is arranged to control heating by using the heater. Since frost on the surface of a target which must be heated can be melted by using the heater, the appearance of the defrosted target can furthermore be improved.

Twenty-Ninth Embodiment

A twenty-ninth embodiment will now be described. The twenty-ninth embodiment is different from the second embodiment in that a step is added in which the defrosting time is determined to be adaptable to heating conditions including the size of the microwave oven and the type of a target which must be heated. The structure and operation of the twenty-ninth embodiment which are different from the second embodiment will mainly be described. The other structures and operations are the same as those of the second embodiment.

Figure 84:
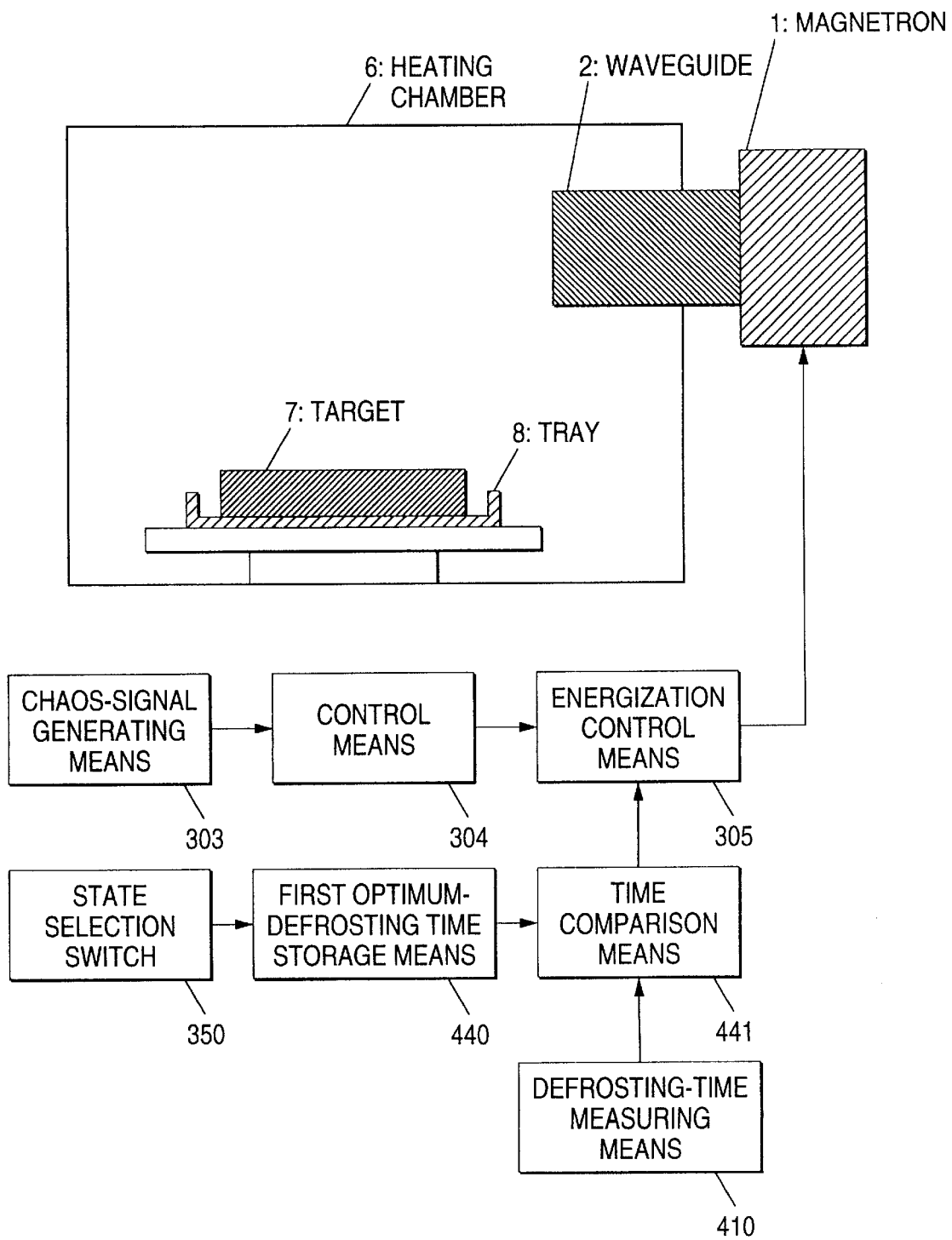
FIG. 84 is a block diagram showing a microwave oven according to a twenty-ninth embodiment of the present invention.

The twenty-ninth embodiment will now be described with reference to FIG. 84. Reference numeral 350 represents a state selection switch with which heating conditions, including the type and weight of a target which must be heated, can be input.

A first optimum-defrosting-time storage means 440 determines optimum defrosting time in accordance with heating conditions input by using the state selection switch 350 to transmit it to a time comparison means 441 as first optimum defrosting time.

A time comparison means 441 subjects the defrosting time measured by the defrosting-time measuring means 410 and the optimum defrosting time stored on the first optimum-defrosting-time storage means 440 to a comparison. If the defrosting time is longer than the first optimum defrosting time, the time comparison means 441 transmits, to an energization control means 305, a defrosting completion signal for completing defrosting.

The operation of the twenty-ninth embodiment will now be described.

Figure 85:
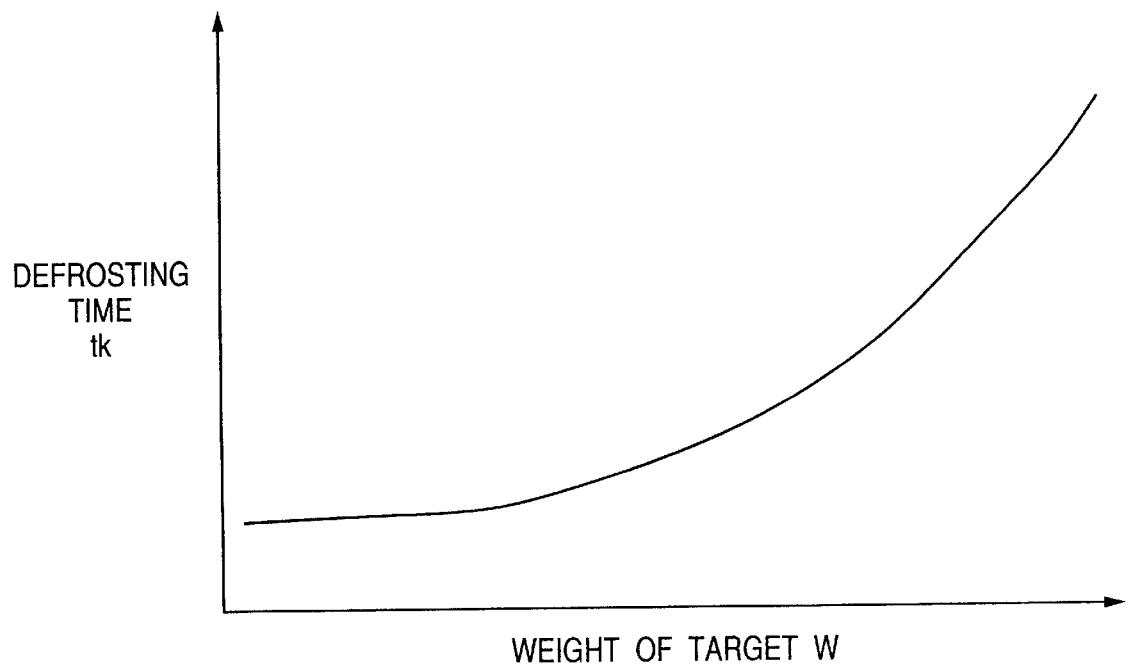
FIG. 85 is a graph showing weights of targets which must be heated and defrosting time.

An example of the first optimum-defrosting-time storage means 440 will now be described with reference to FIG. 85. If the target which must be heated is heavy, the quantity of heat required to defrost the target is enlarged. Since output of microwaves per hour is limited, the defrosting time is elongated if the weight of the target which must be heated in heavy. Therefore, the defrosting time is changed in accordance with the heating condition. The first optimum-defrosting-time storage means 440 has defrosting time corresponding to the heating condition. When a heating condition is supplied, the first optimum-defrosting-time storage means 440 transmits optimum defrosting time, The structure and operation of the twenty-ninth embodiment have the structure that defrosting time corresponding to the state is determined. Thus, defrosting time corresponding to change in the state can be set. Moreover, time at which the defrosting process will be ended can previously been known.

Thirtieth Embodiment

A thirtieth embodiment will now be described. The thirtieth embodiment relates to an aspect in which defrosting time corresponding to the temperature of a target which must be heated is determined. The structure and operation of the thirtieth embodiment which are different from those of the second embodiment will mainly be described. The other structures and operations are the same as those of the second embodiment.

Figure 86:
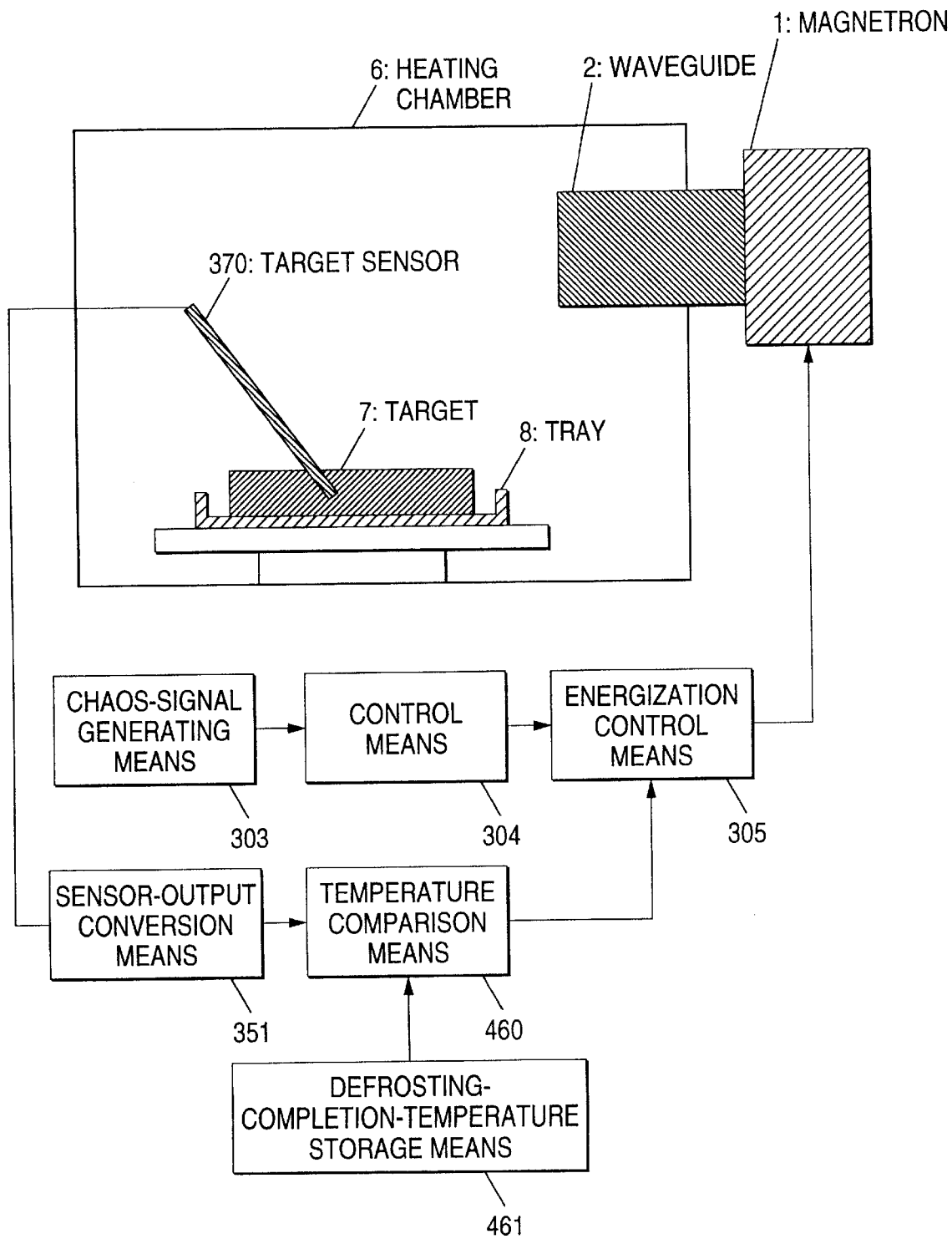
FIG. 86 is a block diagram showing a microwave oven according to a thirtieth embodiment of the present invention.

The structure of the thirtieth embodiment will now be described with reference to FIG. 86. Reference numeral 370 represents a target sensor for measuring internal temperature of a target which must be heated. A sensor-output conversion means 351 calculates an output from the target sensor 370 to obtain temperature required for a target which must be heated so as to transmit an obtained value.

A defrosting-completion-temperature storage means 461 has temperature of a target when the defrosting process is completed. Reference numeral 460 represents a temperature comparison means for subjecting defrosting completion temperature stored on the defrosting-completion-temperature storage means 461 and a sensor value transmitted from the sonsor-output conversion means 351 to a comparison so as to determine whether or not defrosting has been completed. Then, the defrosting-completion-temperature storage means 461 transmits a result of determination to an energization control means 305.

The operation of the thirtieth embodiment will now be described.

When defrosting of a frozen target is completed, the temperature of the target exceeds zero degree. Therefore, the internal temperature of the target which must be heated is measured to complete defrosting when the temperature has exceeded zero degree.

The temperature comparison means 460 monitors whether or not the temperature of a target exceeds the defrosting completion temperature, which is zero degree in this structure, and which is stored on the defrosting-completion-temperature storage means 460. If the temperature exceeds zero degree, the temperature comparison means 460 determines that defrosting has been completed and thus commands the energization control means 5 to complete defrosting.

When the energization control means 5 is commanded to complete defrosting, the energization control means 5 completes defrosting.

As described above, the thirtieth embodiment has the structure that the temperature of a target which must be heated is measured to determine time at which defrosting is completed. Thus, time at which defrosting is completed can accurately be detected.

Thirty-First Embodiment

A thirty-first embodiment will now be described. In addition to the structure according to the second embodiment, the thirty-first embodiment has a structure that defrosting time is set to be adaptable to the states of the microwave oven and a target which must be heated. The structure and operation of the thirty-first embodiment which are different from those of the second embodiment will mainly be described. The other structures and operations are the same an those of the second embodiment.

Figure 10:
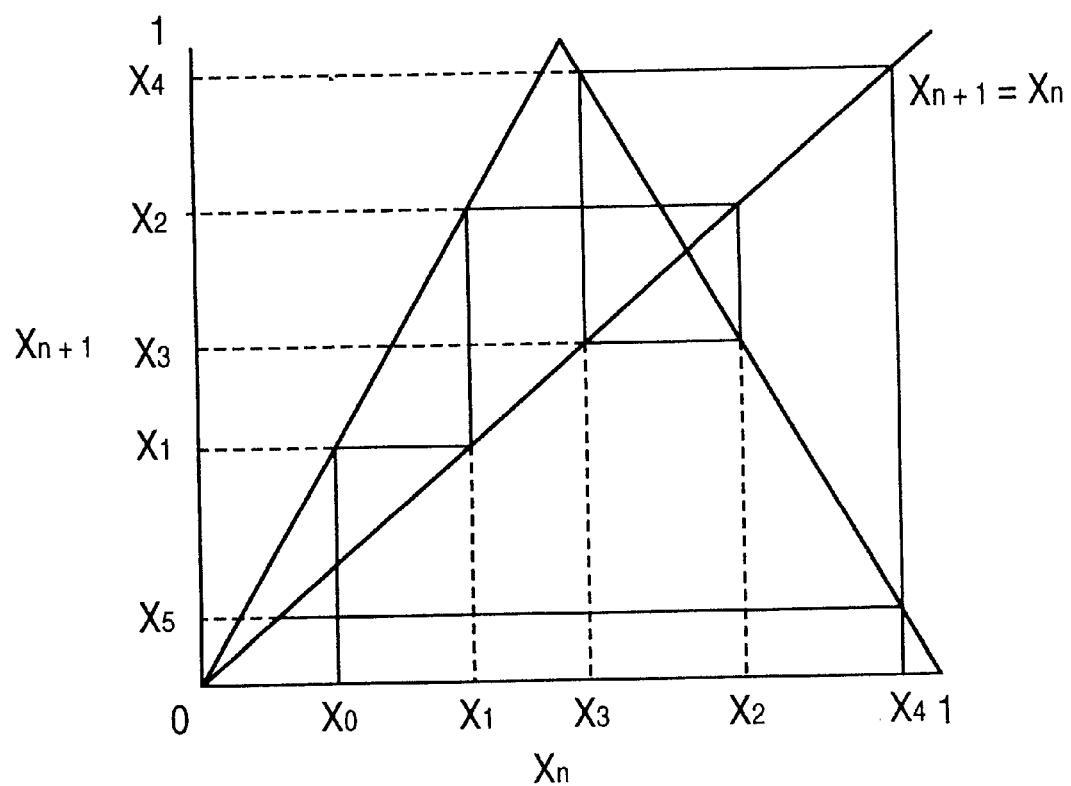
FIG. 10 shows a method of calculating chaos signals.
Figure 105:
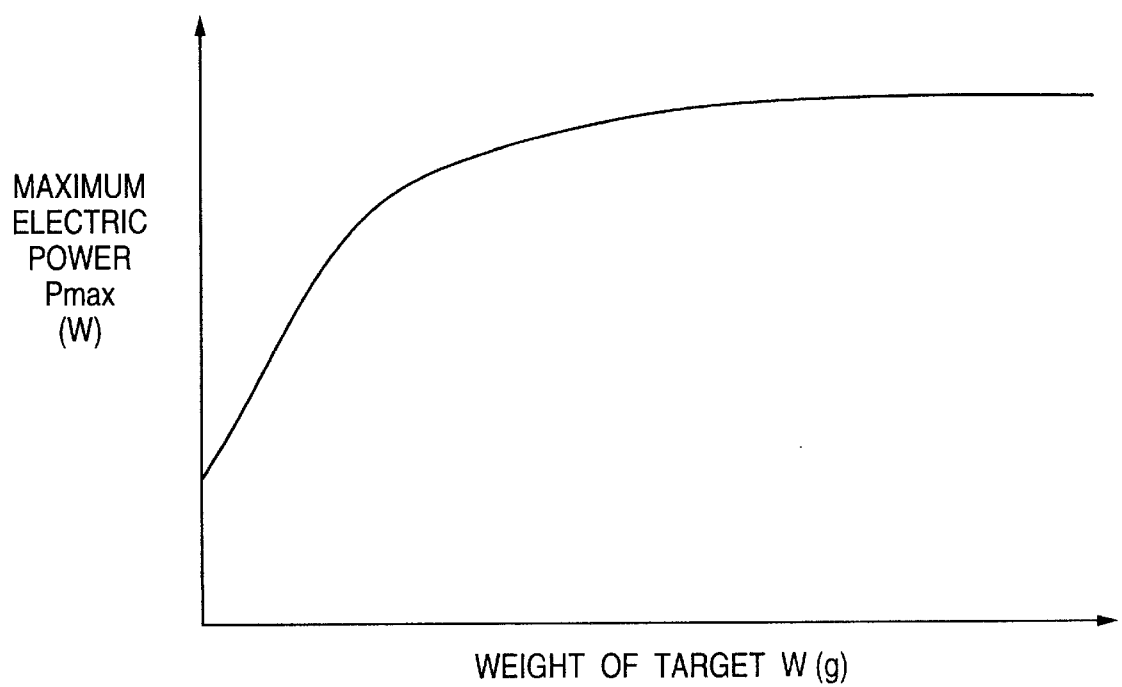
FIG. 105 is a graph showing the relationship between weights of targets which must be heated and maximum electric power.

The structure of the thirty-first embodiment will now be described with reference to FIG. 10. Referring to FIG. 105, reference numeral 690 represents a defrosting time storage means on which defrosting time adaptable to the state is stored. The state switch 680 determines defrosting time in accordance with the states of the microwave oven and the target which must be heated communicated from a state switch 680. Reference numeral 691 represents a cooking-time measuring means on which cooking time elapved from start of defrosting is stored. A time comparison means 692 subjects the defrosting time stored on the defrosting time storage means 690 and the cooking time measured by the cooking-time measuring means 691 to a comparison so an to determine whether or not defrosting has been completed. When the time comparison means 692 has determined that defrosting has been completed, an energization control means 605 completes defrosting of the target which must be heated.

Figure 107:
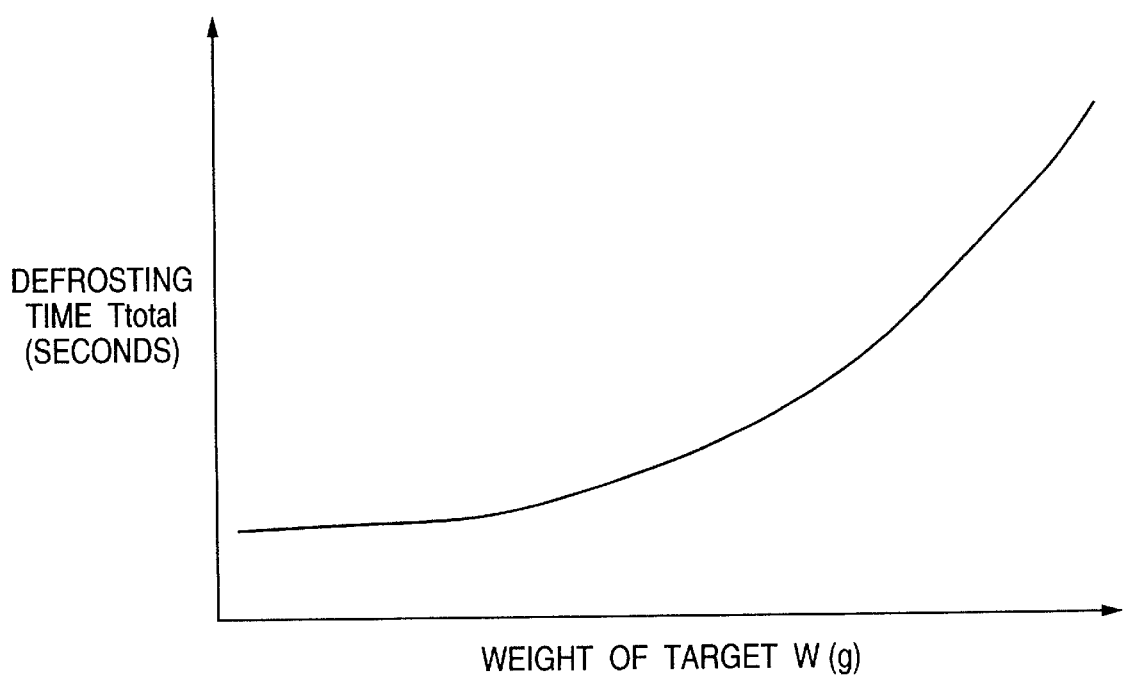
FIG. 107 is a graph showing the relationship between weights of targets which must be heated and defrosting time.

An example of the operation of the thirty-first embodiment will now be described with reference to FIG. 107. FIG. 107 is a graph showing a relational equation between weight W of a target which must be heated and defrosting time tk.

As can be understood from FIG. 107, when the weight of a target which must be heated is heavy, total electric power required to defrost the target is enlarged. Thus, time required to defrost the target is elongated. When defrosting time is determined in accordance with the relational equation shown in FIG. 107, defrosting time adaptable to the weight of the target which must be heated can be determined. Therefore, excessive application of energy of microwaves to the target can be prevented and the grade of finishing of the defrosted target can furthermore be improved.

Figure 106:
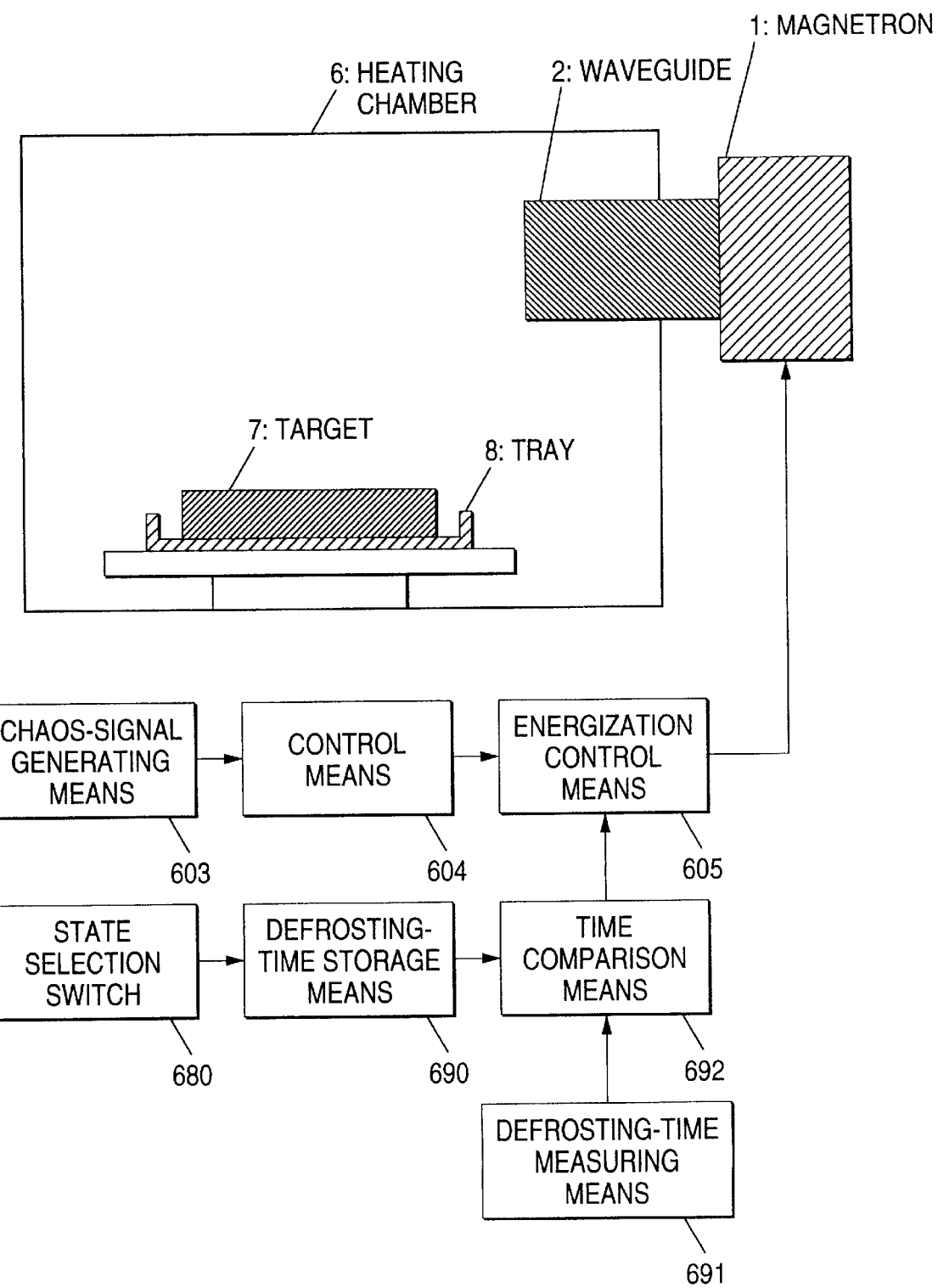
FIG. 106 is a block diagram showing a microwave oven according to a thirty-first embodiment of the present invention.

The defrosting time storage means 690 has the relational equation between the weight of a target which must be heated and defrosting time shown in FIG. 106. When the weight of the target is input from the state switch 680, the defrosting time storage means 690 transmits defrosting time required for the target.

Although the relational equation between the weight of a target which must be heated and defrosting time is employed as an example of the states of the microwave oven and the target, a variety of conditions affect the determination of defrosting time including the contents of the target and the size of the heating chamber of the microwave oven. Any condition may be employed as the relational equation which is stored on the defrosting time storage means 690 to obtain the same effect.

The structure and operation of the thirty-first embodiment are arranged in such a manner that defrosting time is determined in accordance with the states of the microwave oven and the target which must be heated. Thus, dielectric heating adaptable to the state of a target which must be heated can be performed. An a result, the grade of finishing of the defrosted target can furthermore be improved.

Thirty-Second Embodiment

A thirty-second embodiment will now be described. In addition to the structure of the second embodlment, the thirty-second embodiment has a structure that optimum defrosting time is determined in accordance with a value obtained by a sensor for measuring the states of the microwave oven and a target which must be heated. The structure and operation of the thirty-second embodiment which are different from the second embodiment will mainly be described. The other structures and operations are the same as those of the second embodiment.

Figure 111:
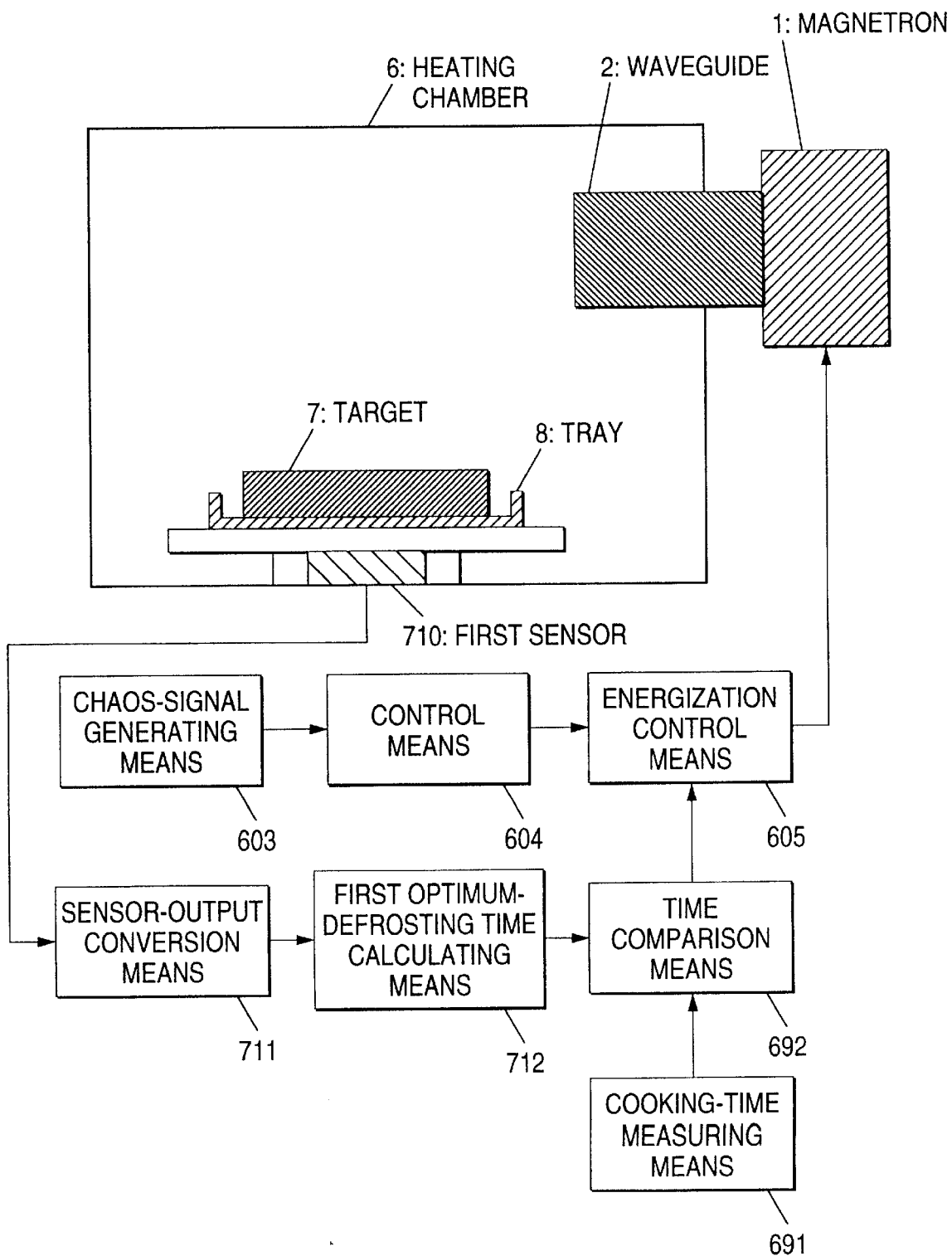
FIG. 111 is a block diagram showing a microwave oven according to a thirty-second embodiment of the present invention.

The structure of the thirty-second embodiment will now be described with reference to FIG. 111. Referring to FIG. 111, reference numeral 710 represents a first sensor for measuring the states of the microwave oven and a target which must be heated. A value obtained by the first sensor 710 is converted into data about the target by a sensor-output conversion means 711 so as to be transmitted to a first optimum-defrosting-time calculating means 712 as a value of the sensor.

A first optimum-defrosting-time calculating means 712 calculates optimum defrosting time in accordance with the value of the sensor obtained from the sensor-output conversion means 711 so as to transmit a result as first optimum defrosting time.

A time comparison means 692 subjects the cooking time measured by a cooking-time measuring means 691 and the first optimum-defrosting-time obtained by the first optimum-defrosting-time calculating means 712 to a comparison to determine whether or not defrosting of the target has been completed.

When the time comparison means 692 has determined that defrosting has been completed, the energization control means 605 interrupts supply of electric power to the magnetron and completes defrosting of the target.

An example of the operation of the thirty-second embodiment will now be described with reference to FIG. 107.

FIG. 107 is a graph showing the relationship between weight W of a target which must be heated and defrosting time tk required for the target. As can be understood from FIG. 107, when the target which must be heated is heavy, energy of microwaves required to defrost the target is enlarged. Thus, defrosting time required for the target is elongated. In the present invention, the weight of a target which must be heated is measured by a sensor and the relational equation shown in FIG. 107 is used to calculate the defrosting time required for the target. Since the weight of the target is automatically measured by the sensor and the defrosting time required for the target is Bet, any labor is required for a user to automatically complete the process for defrosting the target. Since optimum energy of microwave is supplied to the target by setting the defrosting time, the grade of finishing of the defrosted target can furthermore be improved.

The first optimum-defrosting-time calculating means 712 has the stored relational equation between the weight of a target and defrosting time shown in FIG. 107 to calculate defrosting time in accordance with the sensor value obtained from the sensor-output conversion means 711, for example, the weight of the target which must be heated.

The time comparison means 692 subjects the cooking time measured by the cooking-time measuring means 691 and first optimum defrosting time calculated by the first optimum-defrosting-time calculating means 712 to a comparison to perform dielectric heating with microwaves until the cooking time exceeds the first optimum defrosting time. When the cooking time reaches the first optimum defrosting timer the defrosting operation is completed.

Although the weight of the target which must be heated is employed as an example of the states of the microwave oven and the target for determing the defrosting time required for the target, a variety of factors, including the shape of the chamber in the microwave oven and the contents of the target, affect the defrosting time required for the target. The essential portion lies in a fact that the state of the target which must be heated can be measured by using the sensor and the defrosting time can be determined in accordance with the obtained value. If another factor may be determined the same effect can be obtained.

In addition to the second embodiment, the structure and operation of the thirty-second embodiment have a structure that optimum defrosting time is set in accordance with the value obtained by the sensor for measuring the states of the microwave oven and a target which must be heated. Thus, any labor is reqired for a user to automatically complete defrosting of the target. Since the defrosting time is set, optimum energy of microwaves is supplied to the target which must be heated and the grade of finishing of the defrosted target can furthermore be improved.

Thirty-Third Embodiment

A thirty-third embodiment will now be described. The thirty-third embodiment relates to a step for changing maximum output of microwaves as the cooking time elapses. The structure and the operation of the twelfth embodiment will be described about the foregoing step. The other structures and operations are the same as those of the foregoing embodiment.

The thirty-third embodiment will now be described with reference to FIG. 82. Reference numeral 410 represents a defrosting-time measuring means for measuring cooking time elapsed from start of the defrosting operation in the microwave oven. A microwave-output-function storage means 411 receives cooking time communicated from the defrosting-time measuring means 410 to transmit maximum output of microwaves which is optimum for the cooking time.

Figure 83:
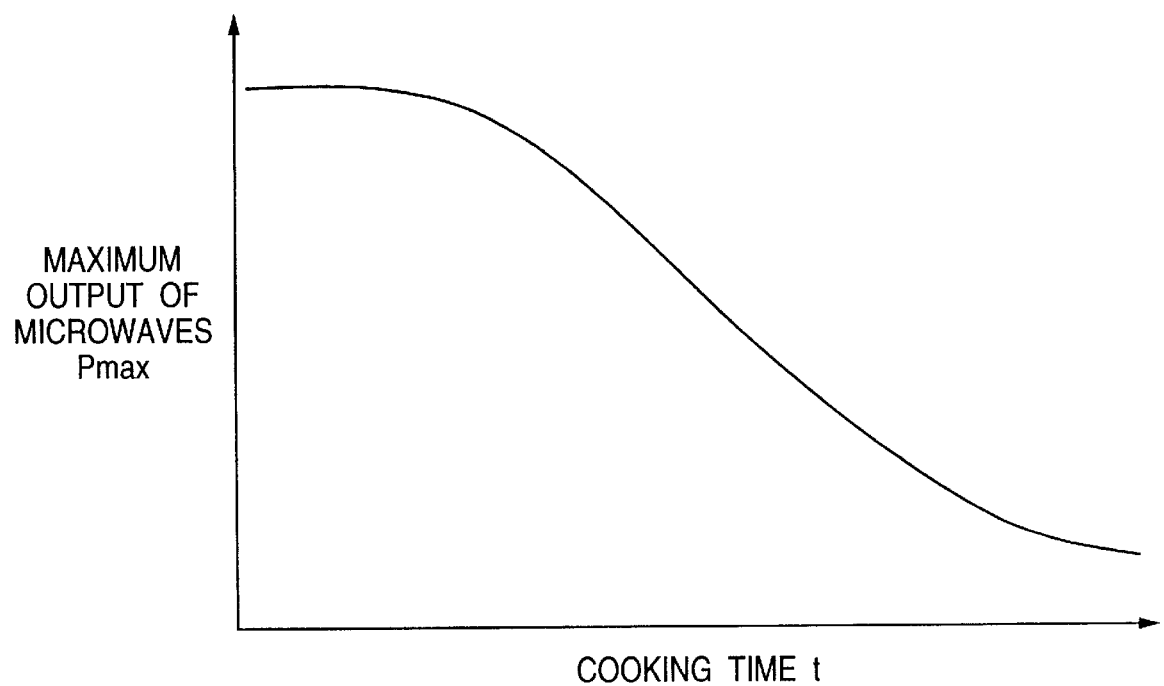
FIG. 83 is a graph showing the relationship between cooking time and maximum outputs of microwaves.

An example of the operation of the thirty-third embodiment will now be described with reference to FIG. 83. The relationship between cooking time t under condition that the defrosting time is short and a state of defrosting is satisfactory and maximum of Pmax of microwaves is shown in FIG. 83. As can be understood from FIG. 83, absorption of microwaves emitted from the magnetron 1 is unsatisfactory when the target which must be heated is in the ice state immediately after the defrosting process has been started. Therefore, defrosting is performed with maximum output of microwaves. When a portion of the target which must be heated starts defrosting an time elapses, the output of microwaves must be reduced to prevent excessive rise in the temperatures distributed in the portion which has been defrosted.

The microwave-output-function storage means 411 has the stored relational equation between cooking time t and maximum output Pmax of microwaves shown in FIG. 83 to determine maximum output of microwaves by collating supplied cooking time t with the relational equation.

The structure and operation of the thirty-third embodiment have the structure that maximum output of microwaves corresponding to the cooking time is always selected. Thus, the temperature distribution during the defrosting process can be improved.

Thirty-Fourth Embodiment

A thirty-fourth embodiment will now be described. In addition to the twenty-second embodiment, the thirty-fourth embodiment has a structure that maximum electric power which must be supplied to the magnetron in set to correspond to the states of the microwave oven and a target which must be heated. Therefore, the structure and operation of the thirty-fourth embodiment which are different from the fourth embodiment will mainly be described. The other structures and operations are the same as those of the fourth embodiment.

Figure 103:
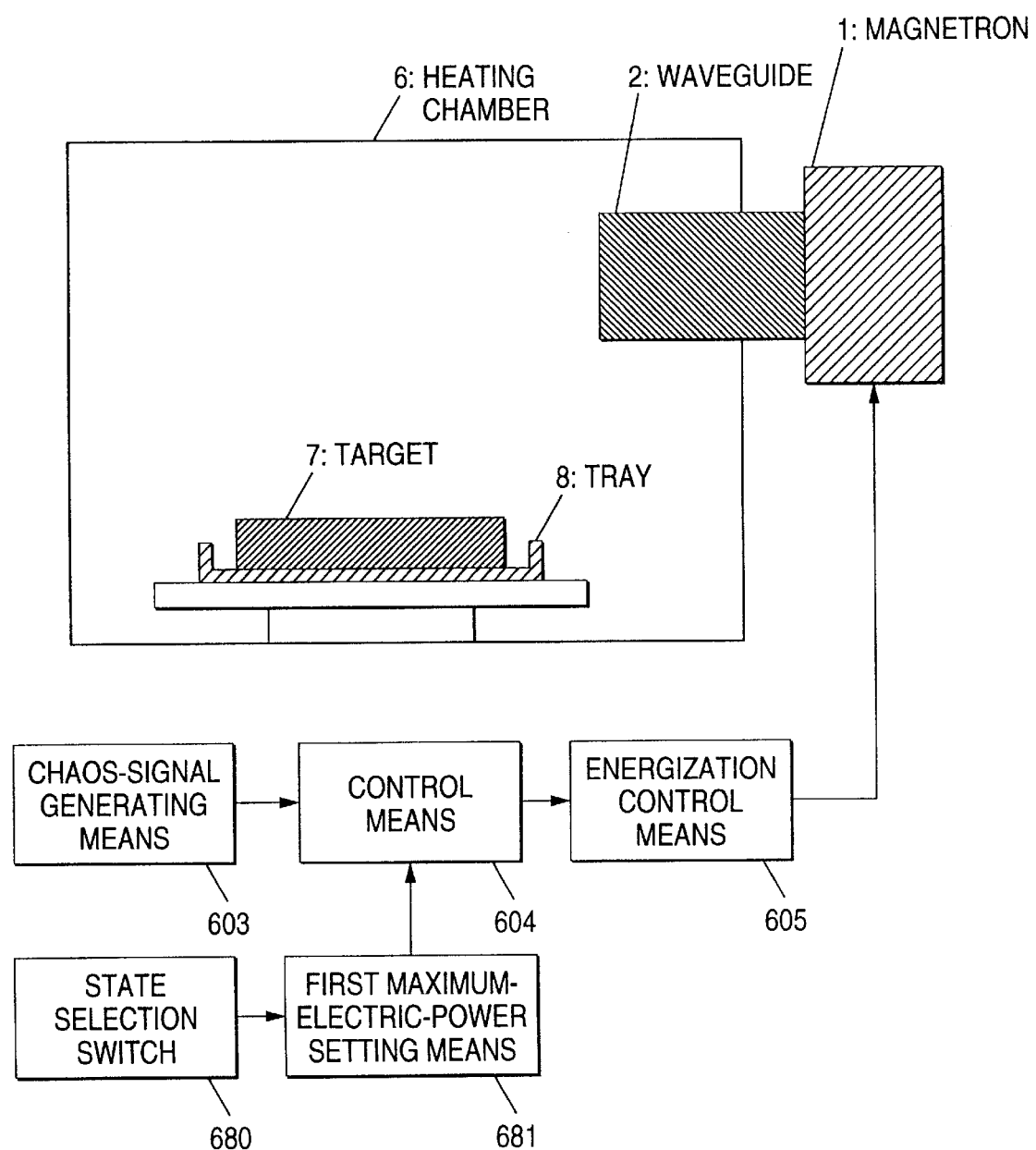
FIG. 103 is a block diagram showing a microwave oven according to a thirty-fourth embodiment of the present invention.

The structure of the thirty-fourth embodiment will now be described with reference to FIG. 103. Referring to FIG. 103, reference numeral 680 represents a state switch with which states of the microwave oven and a target which must be heated are input. A first maximum-electric-power setting means 681 sets maximum electric power which must be supplied to the magnetron in accordance with the states of the microwave oven and the target supplied from the state switch 680 to transmit it as a first maximum-electric-power signal to the control means 604. The control means 604 performs control to adjust electric power which is supplied to the magnetron in accordance with the chaos signal generated by the chaos-signal generating means 603 in such a manner that the maximum electric power which is supplied to the imagnetron does not exceed the maximum electric power set by the first maximum-electric-power setting means 681.

Figure 104:
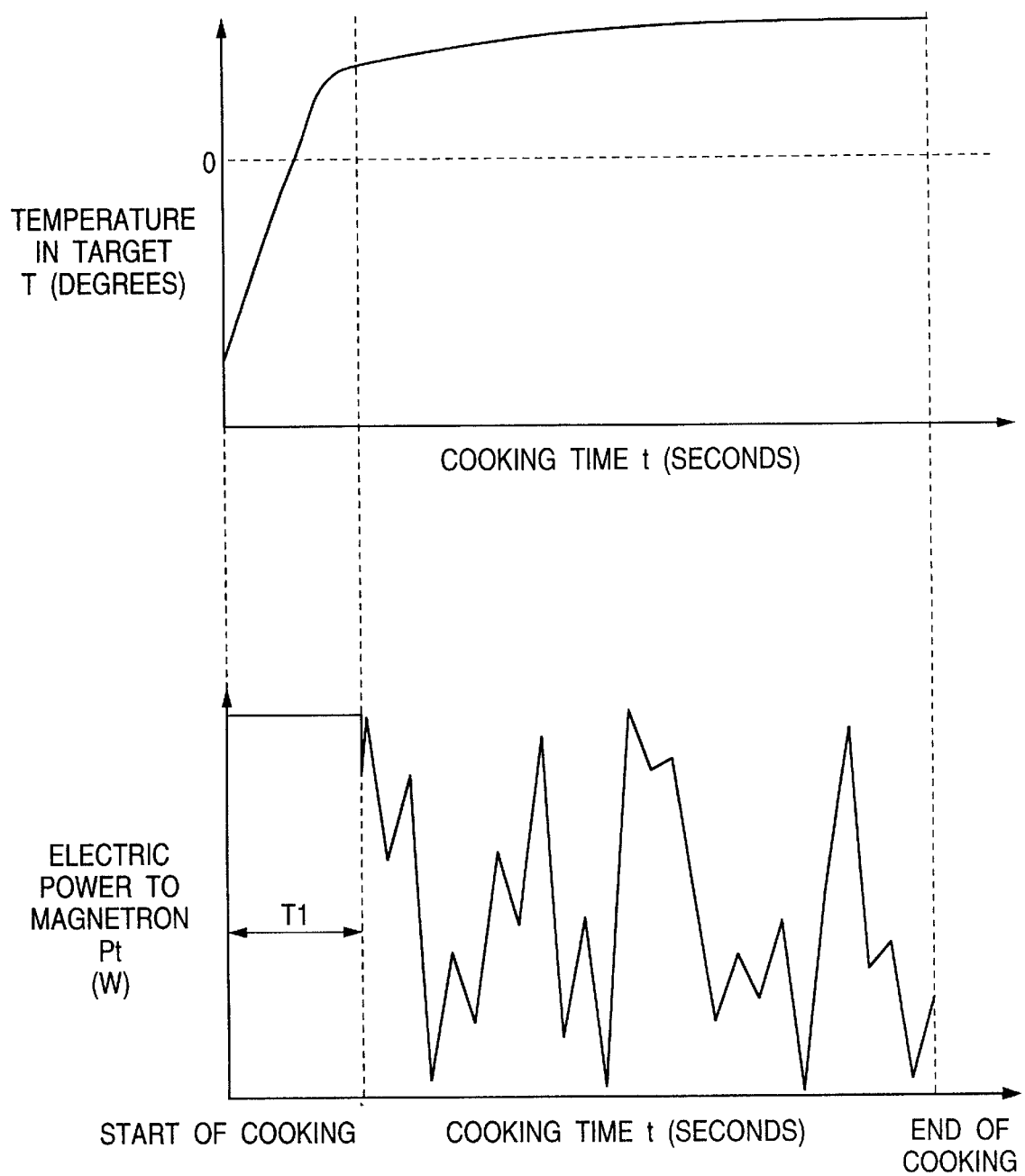
FIG. 104 is a graph showing the relationship between electric power which must be supplied to the magnetron and temperatures in a target which must be heated.

An example of the operation of the thirty-fourth embodiment will now be described with reference to FIGS. 104 and 105. FIG. 104 is a graph showing the relationship between electric power Pt which must be supplied to the magnetron and temperatures T in the target which must be heated in such a manner that the axis of abscissa stands for cooking time t.

In the continuous electric power supply step, microwaves emitted from the magnetron are not attenuated in the target which must be heated and uniformly dielectrically heat the inside portion of the target when the overall body of the target is frozen. The foregoing fact is used so that electric power is continuously supplied to the magnetron. If the cumulative electric power supplied to the magnetron with respect to the weight of the target which must be heated is too large in the continuous electric power supply step, a portion of the target is first converted into water and the target is somstimes overheated. To prevent the foregoing fact, maximum electric power which must be supplied to the magnetron is set to be adaptable to the state to adjust the cumulative electric power which must be supplied to the magnetron.

FIG. 105 is a graph showing the relationship between weight W of a target which must be heated and maximum electric power Pmax.

If the target which must be heated is light, total electric power required to defrost the target can be reduced. If the target which must be heated is heavy, a large total electric power in required to defrost the target. Therefore, maximum electric power Pt with respect to the weight W of the target which must be heated is set as shown in FIG. 105 so as to furthermore uniform the temperature distribution in the target.

Although the weight of the target which must be heated is employed as an example of the states of the microwave oven and the target, a variety of states including the shape of the chamber in the microwave oven and the type of the target change the total electric power required to defrost the target. Therefore, another condition may be employed to set the maximum electric power to obtain the same effect.

The first maximum-electric-power setting means 681 ham stored maximum electric power selected by the state switch 680 and corresponding to the states of the microwave oven and the target which must be heated to transmit, to the control means 604, maximum electric power which must be supplied to the magnetron and which corresponds to the structure.

The structure and operation of the thirty-fourth embodiment have the structure that maximum electric power corresponding to the states of the microwave oven and a target which must be heated and arranged to be supplied to the magnetron is set. Thus, the temperatures in the target can furthermore be uniformed.

Thirty-Five Embodiment

The structure and operation of a thirty-five embodiment will now be described. Only the difference of the thirty-five embodiment in the structure and operation from those of the second embodiment will now be described. The other structures and operations are the same as those of the second embodiment.

Figure 74:
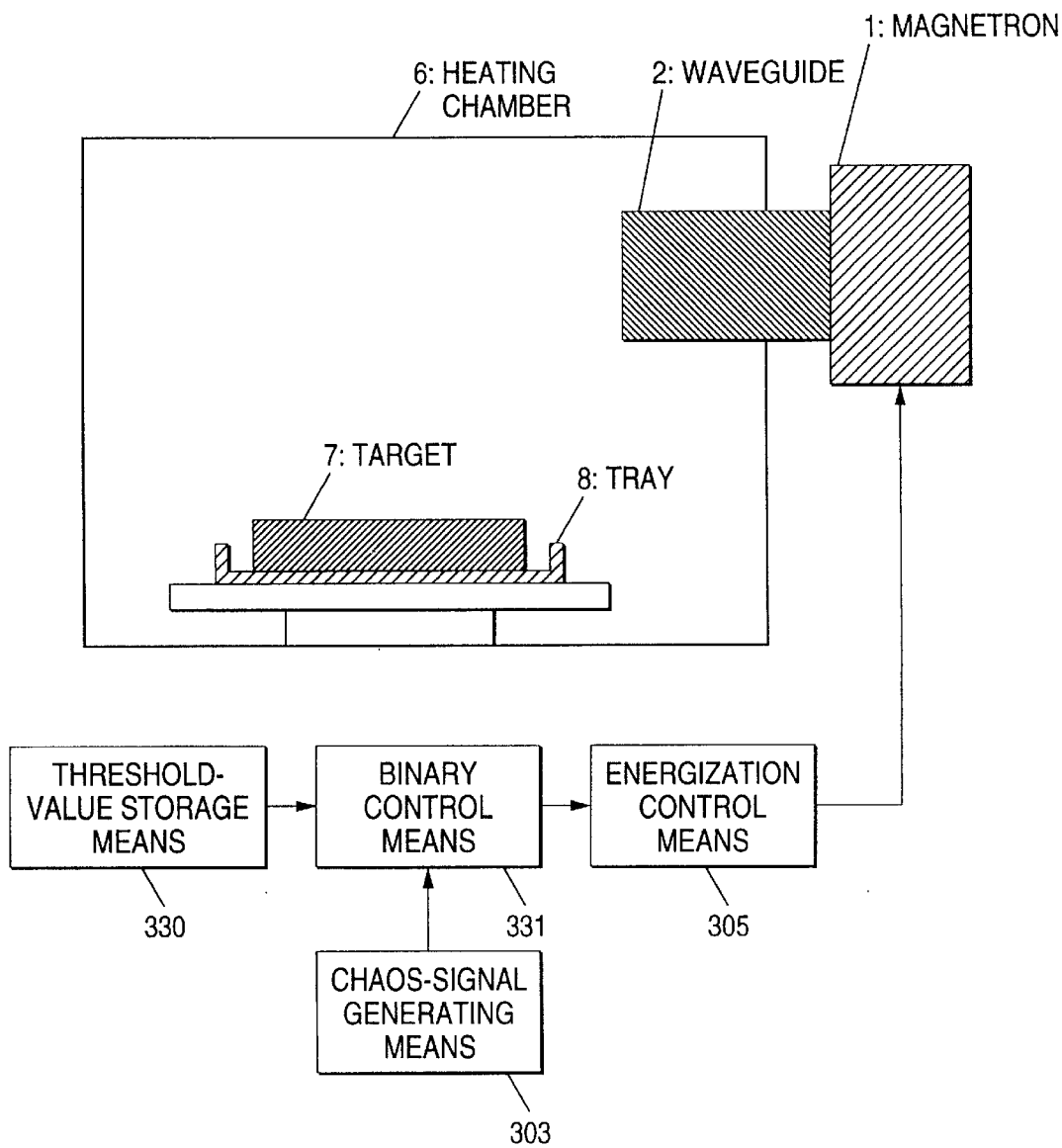
FIG. 74 is a block diagram showing a microwave oven according to a thirty-fifth embodiment of the present invention.

The structure of the thirty-five embodiment will now be described with reference to FIG. 74.

Reference numeral 330 represents a threshold-value storage means on which a threshold value for use to binary-control an output of microwaves is stored. A binary control means 331 subjects the threshold value stored on the threshold-value storage means 330 and the chaos signal calculated by a chaos-signal calculating means 303 to a comparison to determine a binary control signal which is supplied to an energizing means 305.

The operation of the thirty-five embodiment will now be described.

Figure 75:
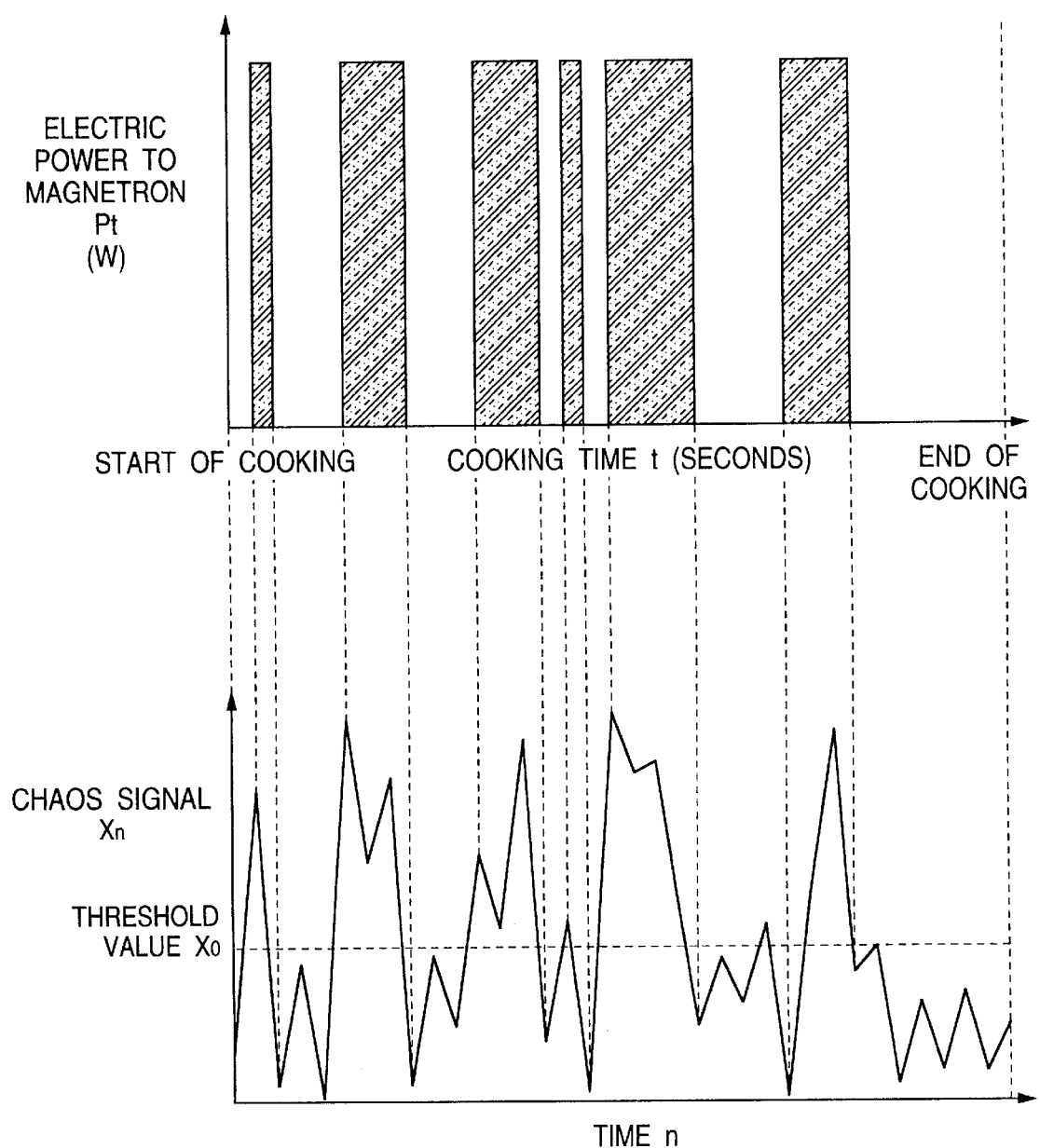
FIG. 75 is a graph showing the relationship between chaos signals and waves.

Referring to FIG. 75, the operations of the threshold-value storage means 330 and the binary control means 331 will now be described. FIG. 75 shows the relationship between the chaos signal and the output of microwaves. Note that the axis of abscissa shown in FIG. 110 stands for cooking time.

The threshold-valuo storage means 330 has stored threshold value X0 for determining a binary output of microwaves. The binary control means 331 subjects the chaos signal generated by the chaos-signal generating means 3 and the threshold value X0 to a comparison. If the chaos signal Xn is larger than the threshold value X0, the threshold-value storage means 330 transmits the output of microwaves. If the chaos signal is smaller, it does not transmit the output of microwaves. Thus, the chaos signal Xn and the threshold value X0 are subjected to a comparison to determine the binary output of microwaves.

The foregoing method is an example of a method of determining the binary output of microwaves by making a comparison between the chaos signal and the threshold value. The essential portion lies in that the binary output of microwaves can be determined by using the chaos signal. Therefore, any method capable of determining the binary output of microwaves may be employed.

The structure and operation of the thirty-five embodiment enable the binary output of microwaves to be determined by using the chaos signal. Therefore, a binary output of microwaves, for example, outputs indicating on and off are required to be transmitted. Therefore, a simple energization control means may be used to realize defrosting in a microwave oven by using a chaos signal.

Thirty-Sixth Embodiment

Figure 76:
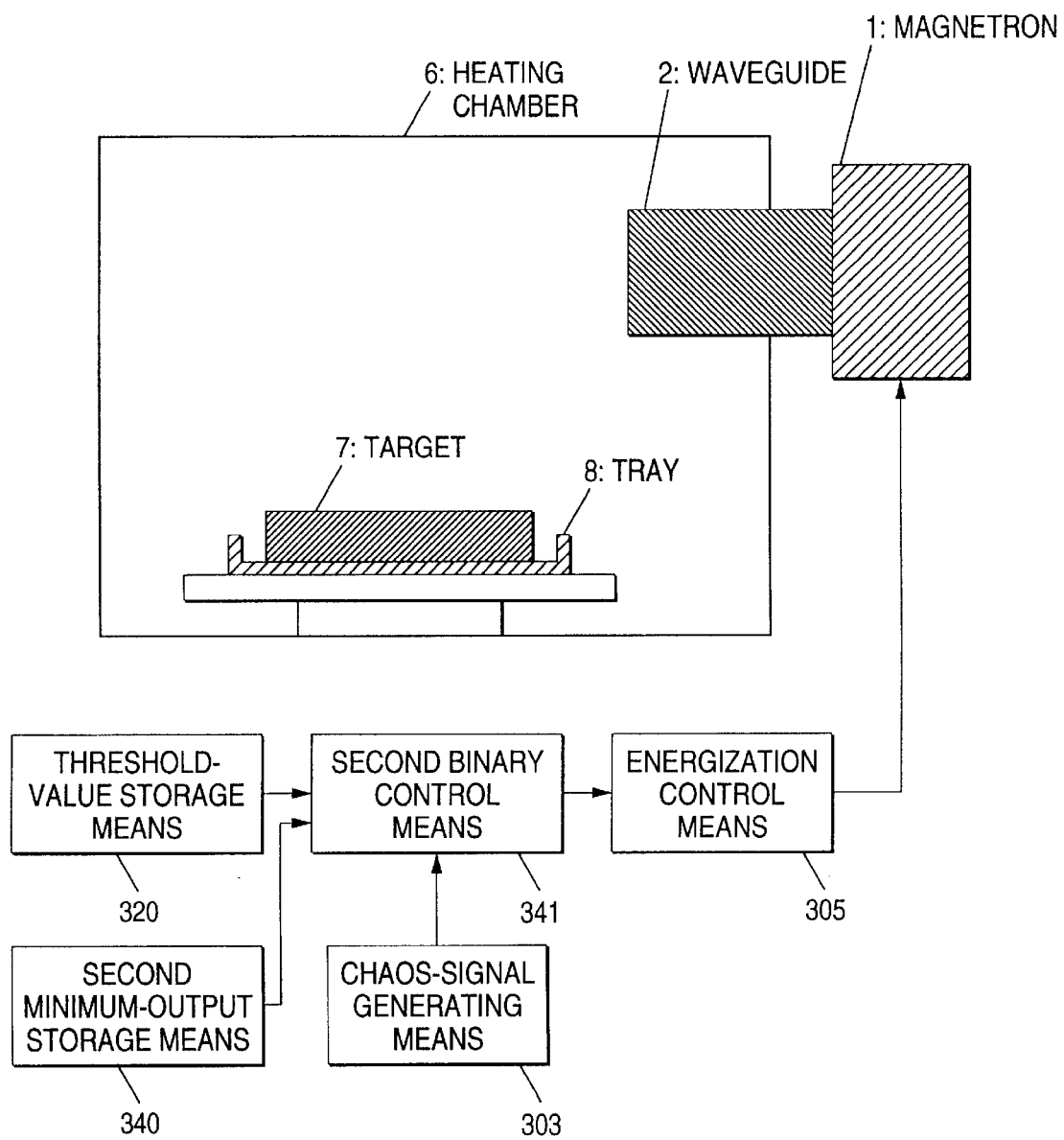
FIG. 76 is a block diagram showing a microwave oven according to a thirty-sixth embodiment of the present invention.

A thirty-sixth embodiment will now be described with reference to FIG. 76. Reference numeral 340 represents a minimum output storage means on which minimum output of microwaves in stored.

A second binry control means 341 subjects the chaos signal generated by the chaos-signal generating means 303 and the threshold value stored on the threshold-value storage means 20 to a comparison so as to transmit a binary control signal to the energization control means 5. If one of the binary chaos signals appears, the second binary control means 341 issues a command to the energization control means 305 in such a manner that the output of microwaves from the magnetron 1 is made to be the minimum output value stored on the second minimum output storage means.

The operation of the thirty-sixth embodiment will now be described.

The thirty-sixth embodiment has the structure that a minimum value is provided for the smaller output of microwaves of the binary outputs of microwaves in accordance with a chaos time sequence described in the thirty-five embodiment. Since the minimum value of the output of microwaves is provided, the target is always dielectrically heated. Thus, time can furthermore be shortened.

Since the minimum output of microwaves is determined in the thirty-sixth embodiment, time required to defrost a target can be shortened.

Thirty-Seventh Embodiment

An experiment for defrosting a target which must be heated in a microwave oven will now be described in a thirty-seventh embodiment.

Since the conventional defrosting sequence has been described in the prior art, it is omitted from description.

Figure 115:
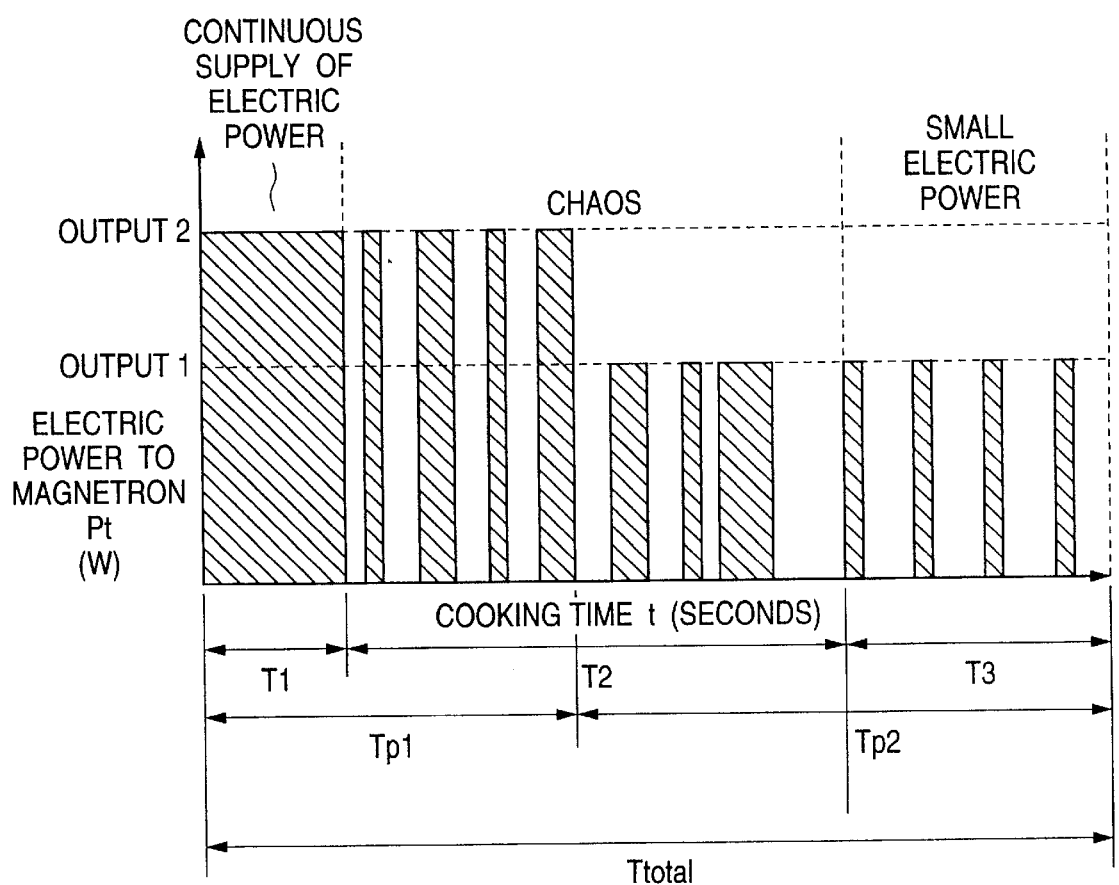
FIG. 115 is a diagram showing a defrosting sequence according to the present invention.

A defrosting sequence according to the present invention and using the chaos signal will now be described with reference to FIG. 115. To shorten the defrosting time in the defrosting process using the chaos signal, dielectrical heating of a target which must be heated is performed with microwaves applied continuously for time T1 immediately after defrosting has been started. After the dielectrical heating has been performed continuously, timing when electric power is supplied to microwaves in accordance with the chaos signal for time T2 is adjusted. Thus, the target which must be heated is defrosted in such a manner that the inside portion of the target is uniformed. Then, the target which must be heated is defrosted for time T3 with DUTY control having a long off time so that the temperatures in the target which must be heated are furthermore uniformed. Then, the defrosting process is ended. Also the defrosting operation using the chaos signal is performed in such a manner that electric power for the microwaves is changed after time Tp1 has elapsed so that heating is performed with two magnitudes of electric power which are large electric power and small electric power.

The reason why the electric power for the microwaves is changed and reason why the DUTY step is performed in the final stage of the process will now be described.

The degree of heating of a target which must be heated varies depending upon the position because of the characteristic of microwaves in an actual microwave oven including the difference in the intensity of the microwaves and a fact that energy of microwaves can easily be concentrated to ends of the target.

Therefore, if a portion changed into water appears, concentration of energy of microwaves into the foregoing portion cannot easily be prevented by the timing control using the chaos signal. To uniform the temperature distribution in the target which must be heated, control in performed in such a manner that average electric power which must be supplied to the magnetron is reduced after defrosting has been started. Therefore, electric power of microwaves is switched to small electric power after a lapse of time Tp1. Moreover, the DUTY heating step in provided in the final stage to perform dielectrical heating using small average electric power.

The constants in the defrosting sequence using the chaos signal including continuous heating step time T1, chaos heating step time T2 and DUTY heating step time T3 are functions of the weight of the target which must be heated. The targets were obtained by experiments.

Results of experiments of the conventional defrosting sequence and the defrosting sequence using the chaos signal will now be described.

Slices of beef, the initial temperature of which was −20° and the weight of each of which was 300 g were, in a microwave oven, defrosted by the conventional defrosting sequence and the defrosting sequence using the chaos signal, respectively. Results of the defrosting operation were as follows:

Time required to defrost the sample was 11 minutes by the conventional method, while time required by the defrosting operation using the chaos signal was halved to 5.5 minutes.

The temperatures in the target defrosted by the conventional sequence were ranged from −2.0° to 30°, while temperatures in the target defrosted by the sequence using the chaos signal were ranged from −1.0° to 15°. Therefore, a fact can be understood that the defrosting sequence using the chaos signal is able to furthermore uniformly defrost the target as compared with the conventional defrosting sequence.

As a result, the defrosting sequence using the chaos signal is able to shorten the defrosting time as compared with the conventional defrosting sequence. Moreover, the temperature distribution in the target which must be heated can be uniformed during the defrosting process. When the weight and contents of the target which must be heated were changed so as to be tested, the defrosting time can be shortened and the temperature distribution in the target which must be heated was uniformed during the defrosting process.

Thirty-Eighth Embodiment

Figure 68:
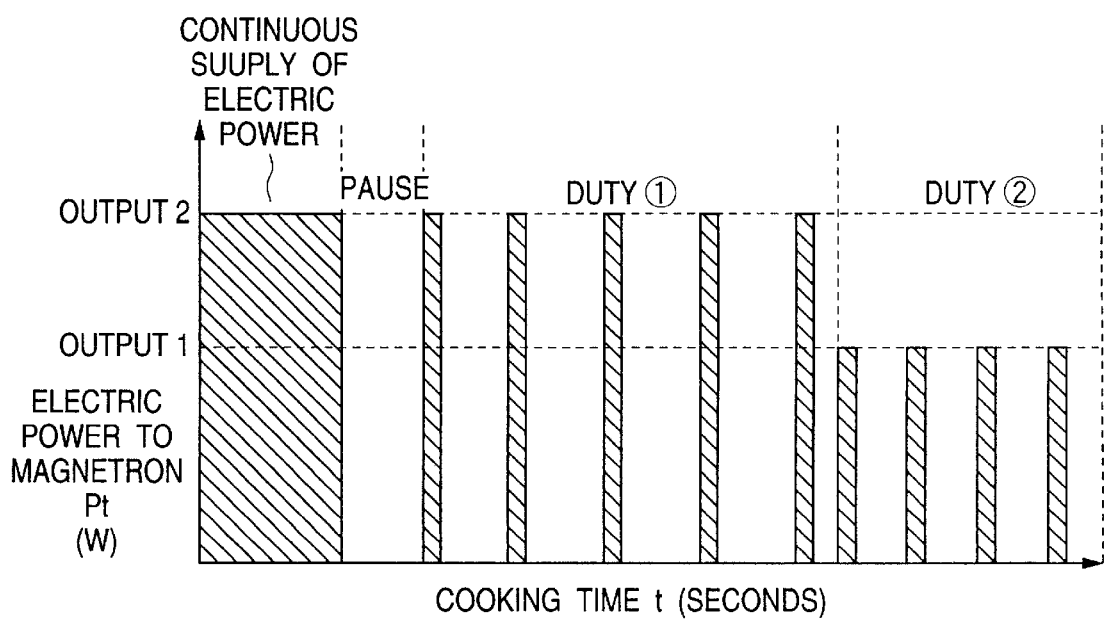
FIG. 68 is a diagram showing a conventional defrosting sequence.

An experiment for defrosting a target which nust be heated in a microwave oven will now be described in a thirty-eighth embodiment. Initially, a conventional defrosting sequence for a microwave oven will now be described. FIG. 68 is a graph showing the conventional defrosting sequence for a microwave oven. Referring to FIG. 68, the conventional defrosting sequence has four steps which are a continuous energization step, an interruption step, DUTY step 1 and DUTY step 2.

Figure 69:
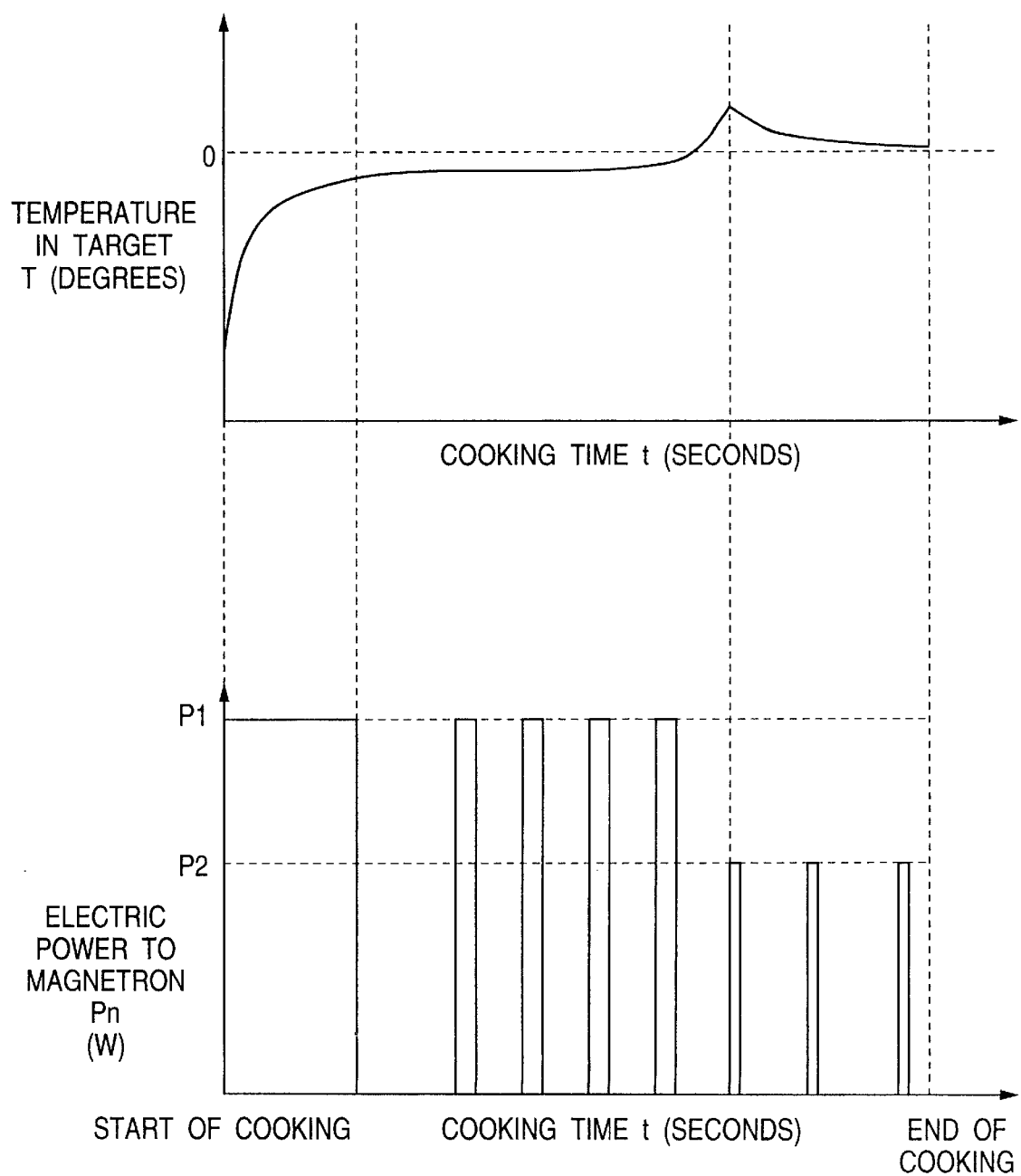
FIG. 69 is a graph showing the relationship between electric power which must be supplied to the magnetron and temperatures in a target which must be heated.

The conventional defrosting sequence will now be described with reference to FIG. 69.

Since the target taken out from a freezer or the like is perfectly frozen, microwaves continuously applied to a target immediately after defrosting of the target has been started are not attenuated in the inside portion of the target. Thus, the microwaves uniformly dielectrically heat the target which must be heated. When the phase of ice in the target which must be heated has been changed to water and defrosting is started, application of microwaves is interrupted for a predetermined time. Thus, the temperature distribution in the target which must be heated is furthermore uniformed. After the step for interrupting the apply of microwaves has been performed, partial overheating of the target which must be heated is prevented by performing control of dielectrical heating with a DUTY having a long off-time in DUTY step 1 and DUTY step 2. The conventional defrosting sequence has been arranged in such a manner that electric power which must be supplied to the magnetron is changed in each step. The dielectrical heating process in performed with large electric power in the continuous energization step and the DUTY step 1 and small electric power is used in DUTY step 2. Since a long off time is provided in each of the DUTY step 1 and DUTY step 2 to prevent partial overheating of the target which must be heated, there arises a problem in that an excessively long time is required to defrost the overall body of the target which must be heated. Moreover, the adjustment for determining time of each step and the on/off ratio is a very delicate operation. Thus, a multiplicity of experiments have been required to improve the grade of finishing of the defrosted target.

Figure 70:
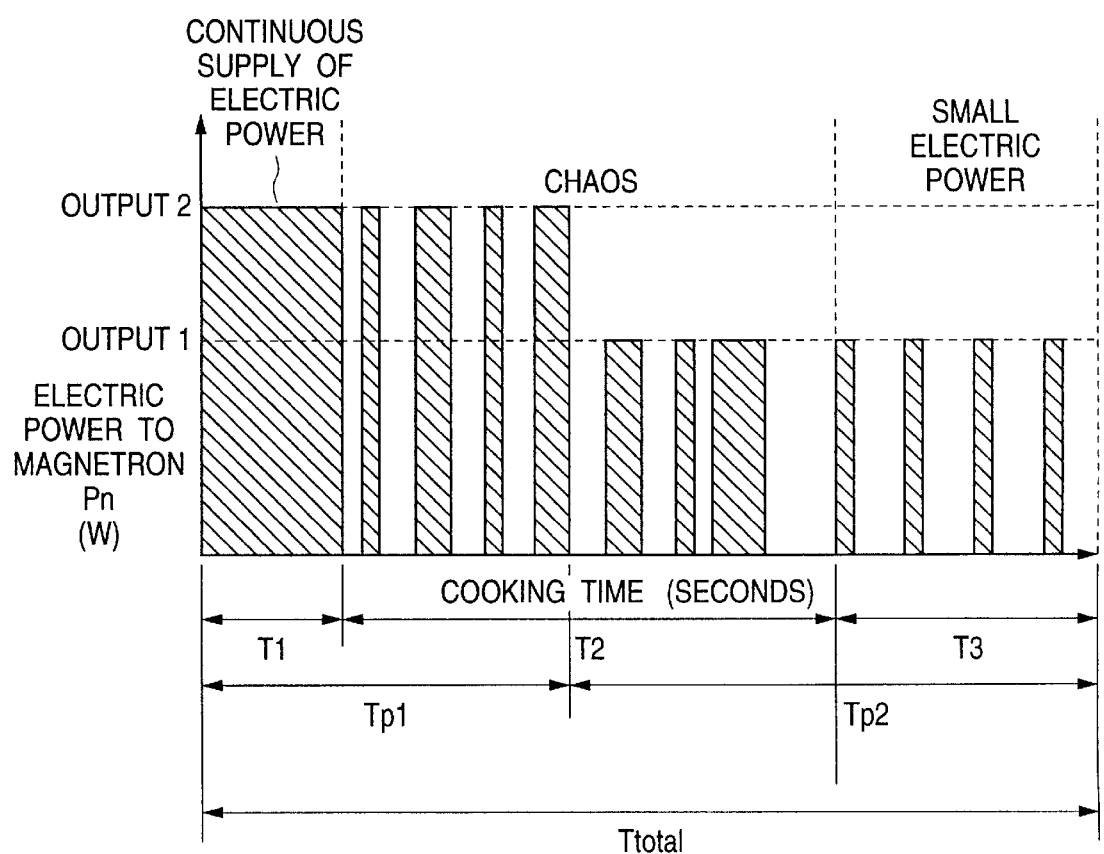
FIG. 70 is a diagram showing a defrosting sequence.
Figure 71:
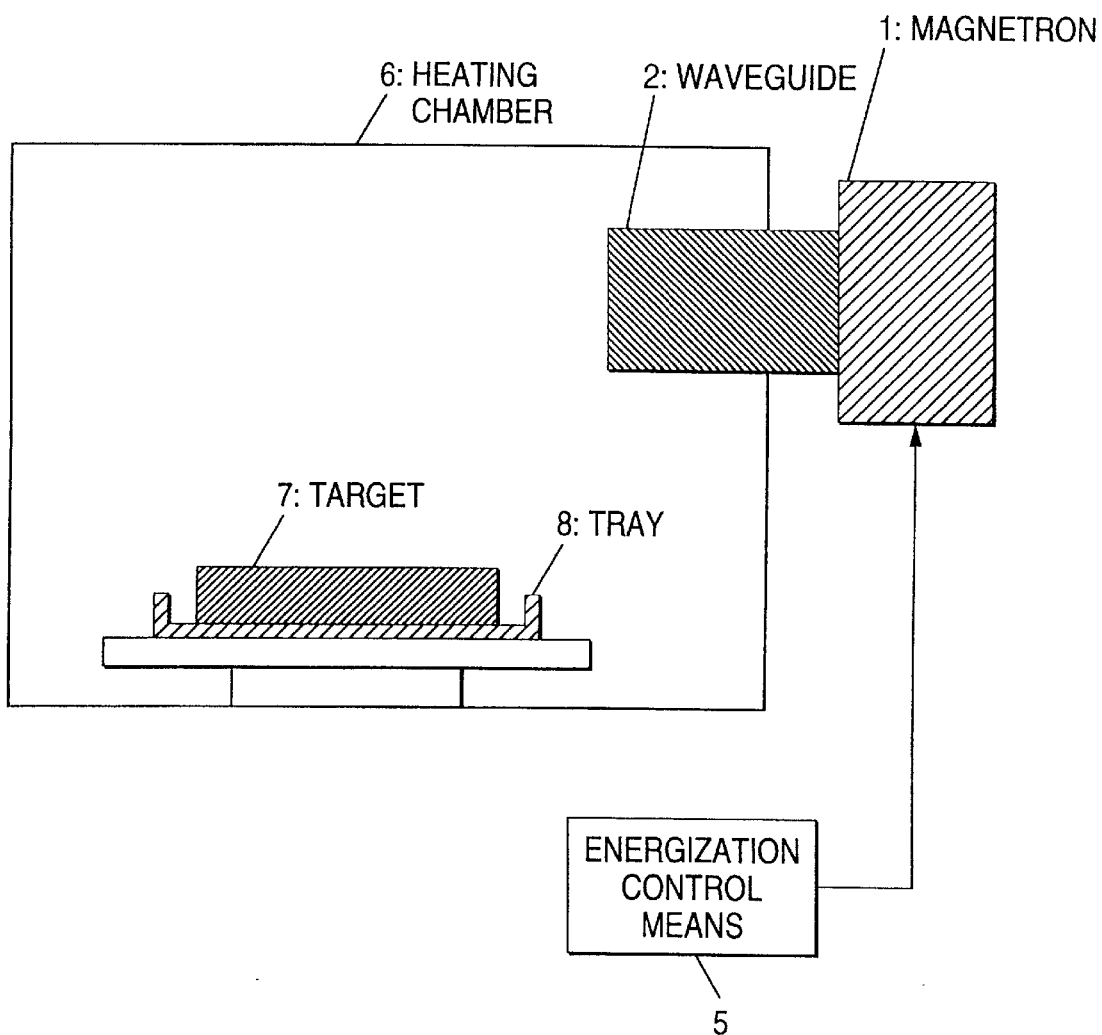
FIG. 71 is a block diagram showing a conventional microwave oven.

A defrosting sequence according to the present invention and using the chaos signal will now be described with reference to FIG. 70.

To shorten the defrosting time in the defrosting process using the chaos signal, dielectrical heating of a target which must be heated is performed with microwaves applied continuously for time T1 immediately after defrosting has been started. After the dielectrical heating has been performed continuously, timing when electric power is supplied to microwaves in accordance with the chaos signal for time T2 is adjusted. Thus, the target which must be heated is defrosted in such a manner that the inside portion of the target is uniformed. Then, the target which must be heated is defrosted for tine T3 with DUTY control having a long off time so that the temperatures in the target which must be heated are furthermore uniformed. Then, the defrosting process is ended. Also the defrosting operation using the chaos signal is performed in such a manner that electric power for the microwaves is changed after time Tp1 has elapsed so that heating is performed with two magnitudes of electric power which are large electric power and small electric power. The reason why the electric power for the microwaves is changed and reason why the DUTY step is performed in the final stage of the process will now be described. The degree of heating of a target which must be heated varies depending upon the position because of the characteristic of microwaves in an actual microwave oven including the difference in the intensity of the microwaves and a fact that energy of microwaves can easily be concentrated to ends of the target. Therefore, if a portion changed into water appears, concentration of energy of microwaves into the foregoing portion cannot easily be prevented by the timing control using the chaos signal. To uniform the temperature distribution in the target which must be heated, control in performed in such a manner that average electric power which must be supplied to the magnetron is reduced after defrosting has been started. Therefore, electric power of microwaves is switched to small electric power after a lapse of time Tp1. Moreover, the DUTY heating step is provided in the final stage to perform dielectrical heating using small average electric power.

The constants in the defrosting sequence using the chaos signal including continuous heating step time T1, chaos heating step time T2 and DUTY heating step time T3 are functions of the weight of the target which must be heated. The targets were obtained by experiments.

Results of experiment of the conventional defrosting sequence and the defrosting sequence using the chaos signal will now be described.

Slices of beef, the initial temperature of which was −20° C. and the weight of each of which was 300 g were, in a microwave oven, defrosted by the conventional defrosting sequence and the defrosting sequence using the chaos signal, respectively. Results of the defrosting operation were as follows: time required to defrost the sample was 11 minutes by the conventional method, while time required by the defrosting operation using the chaos signal was halved to 5.5 minutes. The temperatures in the target defrosted by the conventional sequence were ranged from −2.0° to 30°, while temperatures in the target defrosted by the sequence using the chaos signal were ranged from −1.0° to 15° C. Therefore, a fact can be understood that the defrosting sequence using the chaos signal is able to furthermore uniformly defrost the target as compared with the conventional defrosting sequence. As a result, the defrosting sequence using the chaos signal is able to shorten the defrosting time as compared with the conventional defrosting sequence. Moreover, the temperature distribution in the target which must be heated can be uniformed during the defrosting process. When the weight and contents of the target which must be heated ware changed so as to be tested, the defrosting time can be shortened and the temperature distribution in the target which must be heated was uniformed during the defrosting process.

As described above, the aspect claimed in claim 1 has the structure that the defrosting step is performed in such a manner that a target which must be heated is irradiated with microwaves which are irregular in terms of time at least when the phase of water in the target in shifted from a solid body to liquid. As a result, in the final stage of the defrosting process, the temperature of the target which must be heated can be set to be in a range from a temperature suitable to melt the target to an upper temperature for preventing boiling. Moreover, the temperature of the target which must be heated is made to be lower than the above-mentioned upper temperature during the defrosting process. Moreover, the target can quickly be defrosted in a period of time shorter than a predetermined period of time. To achieve the foregoing purposes, respective processes for microwave irradiation are combined with each other and microwaves are made to be irregular in terms of time. That is, the quantity of microwaves which are applied in each irradiation process is varied and also the intervals among the irradiation are varied. The above-mentioned irradiation processes are combined with each other to effectively dafrost the target which must be heated. As a result, the shift of the overall body of the target which must be heated can efficiently be performed in a short time.

Specifically, restraint, to a predetermined range, is performed, the restraint being restraint of the width between the temperature level to which the target which must be heated is heated with applied microwaves per each operation and the temperature level to which the target is cooled in each time in which irradiation is turned off. Moreover, the irradiating intervals of microwaves are combined with one another in such a manner that the overall upper and lower limits for the temperatures which are raised and lowered are in a predetermined range (in a range between the temperature suitable for malting the target and the temperature for preventing boiling). Thus, the target can efficiently be defrosted.

More specifically, if a regular quantity of heat is added as has been performed in the conventional method, the temperature of the target which must be heated can easily be raised in accordance with a substantially linear function. Therefore, even if any quantity of heat generated by a heating means which realizes the inclination of a linear function is used, the temperature of the target which must be heated cannot easily be controlled to be in a predetermined temperature range within a predetermined period of time. If signals, which are irregular in terms of time and which follow a non-linear function, are used to realize a state of temperature rise of a target which must be heated in a non-linear form having an upper limit, a target which must be heated can efficiently be heated so as to be defrosted in a short time, the non-linear forming being permitted to a parabola shape, an exponential curve or a curve moved vertically.

That is, the defrosting process has been performed in such a manner that the heating means is non-linearly controlled when the phase of water in the target which must be heated is converted from a solid body to liquid. Therefore, restraint of the temperature of the target which must be heated to satisfy the range from the malting temperature to the boiling level has been very difficult depending on the type of the target and a state in the heating chamber. On the other hands the control according to the present invention is performed in such a manner that the temperature of the target is restrained to satisfy a predetermined range within a predetermined time while the quantity of irradiation added in one irradiation process is non-linearly controlled and sometimes the temperature of the target which must be heated is changed. As compared with the conventional method in which the control is performed linearly, a large quantity of microwaves can be applied in a short time without a necessity of greatly considering the upper and lower limits of the temperatures of the target determined in accordance with the weight and type of the target. As compared with the conventional defrosting process, the defrosting time can be shortened with performance as well as or better than the performance of the conventional process.

An aspect claimed in claim 2 has the structure that chaos is employed as microwaves which are applied as microwaves which are irregular in terms of time. When a target which must be heated is irradiated with microwaves which conform chaos which is characterized by a baker's transformation effect, the temperature distribution in the target which must be heated can furthermore be uniformed. Moreover, nonuniformity of temperature in the defrosted target can furthermore be reduced. The fact that irradiation which in irregular in terms of time can be realized in accordance with a chaos state has bean achieved by the inventors of the present invention as a result of an effort of the inventors and a multiplicity of experiments.

An aspect claimed in claim 3 is characterized by the microwave oven comprising: the magnetron for generating microwaves for dielectrically heating a target which must be heated; and the waveguide through which microwaves generated by the magnetron are propagated into a heating chamber, wherein microwaves in the chaos state are propagated through the waveguide. The quantity of microwaves, which are applied in the state in the microwave oven, can be brought to the chaos state only by a simple change. Therefore, only a simple structure is required to shorten time required to defrost a target and the temperature distribution in the defrosted target can be improved.

An aspect claimed in claim 4 is structured in such a manner that microwaves are propagated through the waveguide by dint of electric power which is, in the chaos state, supplied to the magnetron. The target which must be heated can be irradiated with microwaves which are irregular in terms of time only by changing a program for a microcomputer without a necessity of changing the structures of the heating chamber and the waveguide of the microwave oven. Therefore, any change of the physical layout in the microwave oven and the structure of the same are not required to shorten time required to defrost a target. Moreover, the temperature distribution in the defrosted target can be improved. As a result of the above-mentioned structure any change in the physical layout of the mechanism and the operation is not required. A simple change of a program or the like in the microcomputer enables the quantity of output to the magnetron to easily be controlled. Thus, the serviceability can be improved. Heat generated by dint of microwaves with which the inside portion of a target is irradiated can uniformly be dispersed in the target and nonuniformity of temperatures in the target can be prevented. Since the quantity of electric power which is supplied to the target per hour can be enlarged, the defrosting time can be shortened.

An aspect claimed in claim 5 has the structure comprising the chaos-signal generating means for generating a chaos signal, wherein microwaves are emitted in accordance with DUTY-output having on or off period of time corresponding to the chaos signal generated by the chaos-signal generating means. Even if the quantity of microwaves cannot be changed to have continuous values attributable to the structure of the microwave oven, control of the quantity of microwaves with binary values indicating on and off enables the effect of the chaos to be attained in the defrosting process. As a result, even if the outputs of microwaves from the microwave oven are not continuously changed, only a simple change in the structure is required to shorten time required to defrost a target. Moreover, the temperature distribution in the defrosted target can be improved.

An aspect claimed in claim 6 has the structure that microwaves are emitted when the level of the chaos signal generated by the chaos-signal generating means is higher than a predetermined threshold value. Since the control method with which the operation is turned on or off in accordance with the level of the threshold value can considerably easily be realized, any great change of the conventional control means is not required to attain the effect of the chaos. The quantity of electric power which must be supplied to the magnetron is controlled with binary values indicating on and off by using a predetermined value of the chaos signal as a reference. Thus, the effect of the chaos signal can be obtained and the defrosting time can be shortened with a simple structure.

An aspect claimed in claim 7 has the structure that a limitation of a shortest on-type is provided. Since the limitation of the shortest on-time is provided, average electric power which must be supplied to the magnetron can be enlorged. Thus, the defrosting time can furthermore be shortened without deterioration in the grade of finishing of the defrosted target.

An aspect claimed in claim 8 has the structure that limitation of a longest on-time in provided. Since electric power which must be supplied to the magnetron is restrained, the portion which has been first converted into water is not excessively heated and the temperature distribution in the target which must be heated can be uniformed. therefore, the grade of finishing of the defrosted target can furthermore be improved.

An aspect claimed in claim 9 has the structure that the quantity of application of microwaves is changed in accordance with a state of the phase shift of the target which must be heated. Since the quantity of irradiation, which is performed by the chaos manner corresponding to the state of the target which must be heated, is determined, waste of time can be prevented and the effect of the chaos can be obtained in an optimum state for the target. If the maximum electric power which is supplied to the magnetron is determined in accordance with the state of the microwave oven and a target which must be heated, the maximum electric power adaptable to the state can be determined in the continuous electric power supply step. Thus, overheating of the target by dielectric heating can be prevented and defrosting time can be shortened.

An aspect claimed in claim 10 has the structure that change is performed in accordance with a result of a selection of a chaos state from a plurality of chaos states. In accordance with the selected chaos, electric power which must be supplied to the magnetron is adjusted. Thus, control of dielectric heating in a chaos state optimum for the state of a target which must be heated can be performed. Thus, the temperature distribution in the defrosted target can furthernmore be improved.

An aspect claimed in claim 11 has the structure that the quantity of microwaves which must be applied in changed in accordance with a defrosting environment including the size of a defrosting cheer and a fact whether or not a reflecting plate is provided. Since the quantity required to defrost a target is determined in accordance with the environment for the defrosting process, excessive energy of microwaves is not applied during the defrosting process.

An aspect claimed in claim 12 has the structure that the quantity of microwaves which must be applied is changed in accordance with an environment of a target which must be heated including the type and weight of the target. Since the quantity required to defrost a target is determined to correspond to the environment of the target, excessive energy of microwaves is not applied during the defrosting process. Since defrosting time adaptable to the states of the microwave oven and a target which must be heated is determined, determination of the defrosting time optimum for the target is able to prevent excessive supply of energy of microwaves to the target. As a result, the grade of finishing of a defrosted target can furthermore be improved. Large-electric-power time for which large electric power is supplied to the magnetron is determined which in adaptable to the states of the microwave oven and a target which must be heated. Reduction of the maximum quantity of electric power which is supplied to the magnetron after a portion of the target has started defrosting attributable to characteristics of microwaves enables excessive rise in the temperature of the target to be prevented. Thus temperature distribution in the target which must be heated can furthermore be uniformed. When optimum defrosting time is set in accordance with the value of the sensor for measuring the states of the microwave oven and the target which must be heated, the process for defrosting a target can automatically completed because the state of the target can be detected by the sensor. Since optimum energy of microwaves for a target which must be heated can be supplied because the defrosting time is set, the grade of finishing of the defrosted target can furthermore be improved. Large-electric power time for which large electric power is supplied to the magnetron in provided in accordance with the value obtained by the sensor for measuring the states of the microwave oven and the target. Thus, a step can be automated in which the maximum quantity of electric power which is supplied to the magnetron is reduced after a portion of the target has started defrosting attributable to characteristics of microwaves to prevent excessive rise in the temperature in the target and to furthermore uniform the temuperature distribution in the target.

An aspect claimed in claim 13 has the structure that microwaves are applied in a large quantity and regularly before the phase of water in the target which must be heated is shifted from a solid body to liquid as compared with microwaves which are applied after the shift of the phase. Since a great effect of the chaos signal is not required before the phase of water in the target which must be heated is shifted from a solid body to liquid, the target can dielectrically be heated with a large quantity of electric power. As a result, deterioration in the grade of finishing of the defrosted target can be prevented and the defrosting time can furthermore be shortened.

An aspect claimed in claim 14 has the structure that microwaves are applied in a small quantity and regularly in a latter period in which the phase of water in the target which must be heated is shifted from a solid body to liquid as compared with microwaves which are applied before the latter period. Since excessive heating of the portion which has been first converted into water can be prevented and the temperature distribution in the target which must be heated can furthermore be uniformed, the grade of finishing of the defrosted target can furthermore be improved. The foregoing structure enables a process to be provided in which control of dielectric heating is performed in accordance with a chaos signal after the continuous electric power supply step in which electric power is continuously supplied to the magnetron. Then, a small electric power supply step is performed in which electric power having a small average value is supplied to the magnetron. Thus, the target can dielectrically heated with large electric power. As a result, the grade of finishing of the defrosted target does not deteriorate and the defrosting time can furthermore be shortened. Moreover, the grade of finishing of the defrosted target can be improved.

An aspect claimed in claim 15 has the structure that time for which microwaves are applied in changed in accordance with the state of the shift of the phase of the target which must be heated, the defrosting environment or the environment of the target. Since time is determined in accordance with the state or the environment of the target which must be heated, waste of time can be prevented when a purpose of the process is achieved.

An aspect claimed in claim 16 has the structure that microwaves are regularly applied in accordance with on/off output. Even if the structure of the microwave oven does not permit change of the quantity of microwaves with continuous values, structure in which the quantity of microwaves is controlled with binary values indicating turning on and off enables the effect of the chaos to be realized in the defrosting process. Therefore, even if the output of microwaves in the microwave oven cannot continuously be controlled, only a simple structure is required to perform the process claimed in claim 14.

An aspect claimed in claim 17 has the structure that a heating procees using a heater is added. Since the heater in employed, frost on the surface of the target which must be heated can be melted, the appearance of the defrosted target can be improved.

What is claimed is:

1. A method for operating a microwave oven to defrost a frozen target food item, comprising the steps of:

irradiating said frozen target food item with microwaves to cause water within said target food item to change from a solid phase to a liquid phase, wherein said microwaves are irregular in terms of time at least after a portion of said water in the target food item is changed from said solid phase to said liquid phase.

2. A method for operating a microwave oven to defrost a frozen target food item, comprising the step of irradiating said target food item with irregular microwaves to cause water within said target food item to change from a solid phase to a liquid phase, wherein said irregular microwaves are in a chaos state at least when a portion of the water in the target food item has changed from said solid phase to said liquid phase.

3. A microwave oven which is operable to defrost a frozen target food item, comprising:

a magnetron for generating microwaves for dielectrically heating the frozen target food item to cause water within said target food item to change from a solid phase to a liquid phase; and a waveguide through which microwaves generated by said magnetron are propagated into a heating chamber that receives said target food item, wherein the microwaves generated by said magnetron and propagated through said waveguide are irregular in terms of time and are in a chaos state, said microwaves being propagated through said waveguide at least when a portion of the water in the target food item is changed from the solid phase to the liquid phase.

4. A microwave oven according to claim 3, wherein electric power is supplied to said magnetron in a chaos state and causes said magnetron to likewise generate microwaves having a chaos state.

5. A microwave oven according to claim 3, further comprising chaos-signal generating means for generating a chaos signal, said chaos signal being supplied to said magnetron, wherein microwaves are generated by said magnetron in accordance with a duty cycle having on and off periods of time corresponding to the chaos signal generated by said chaos-signal generating means.

6. A microwave oven according to claim 5, wherein microwaves are generated by said magnetron when a level of the chaos signal generated by said chaos-signal generating means is higher than a predetermined threshold value.

7. A microwave oven according to claim 5, wherein the duty cycle is regulated to have a relatively shorter on-time.

8. A microwave oven according to claim 5, wherein the duty cycle is regulated to have a relatively longer on-time.

9. A method for operating a microwave oven according to claim 1 or 2, comprising the further step of changing a quantity of microwaves applied to the target food item in accordance with the phase of the water in the target food item.

10. A method for operating a microwave oven according to claim 9, comprising the further step of chancing a quantity of microwaves applied to the target food item in accordance with a result of a selection of a chaos state from a plurality of chaos states.

11. A method for operating a microwave oven according to claim 1 or 2, comprising the further step of changing a quantity of microwaves applied to the target food item in accordance with a defrosting environment, said defrosting environment including a defrosting chamber size and whether or not a reflecting plate is provided.

12. A method for operating a microwave oven according to claim 1 or 2, comprising the further step of changing a quantity of microwaves applied to the target food item in accordance with characteristics of the target food item, said characteristics including type and weight of the target food item.

13. A method for operating a microwave oven according to claim 1 or 2, comprising the further step of applying microwaves to said target food item in a large quantity and regularly before the target food item water changes from a solid phase to a liquid phase as compared to the microwaves applied after the target food item water changes from solid to liquid phase.

14. A method for operating a microwave oven according to claim 1 or 2, comprising the further step of applving microwaves in a small quantity and regularly in a latter period, wherein the target food item water changes from said solid chase to said liquid phase, as compared to microwaves applied before the latter period.

15. A method for operating a microwave oven according to claim 13, comprising the further step of changing a time period of application of microwaves in accordance with at least one of the target food item water phase, a defrosting environments and characteristics of the target food item.

16. A method for operating a microwave oven according to claim 14, comprising the further step of regularly applying microwaves to said target food item in accordance with an on/off output.

17. A method for operating a microwave oven to defrost a frozen target food item, comprising the steps of:

irradiating said target food item with microwaves to cause water within said target food item to change from a solid phase to a liquid phase, said microwaves are irregular in terms of time, and heating said target food item with a heater at least when a portion of the target food item water has changed from solid phase to said liquid phase.

18. A method for operating a microwave oven according to claim 13, comprising the further step of changing a time period of application of microwaves in accordance with at least one of the target food item water phase, a defrosting environment, and characteristics of the target food item.

* * * * *

UNITED STATES PATENT AND TRADEMARK OFFICE
CERTIFICATE OF CORRECTION

PATENT NO. : 6,066,838
DATED : May 23, 2000
INVENTOR(S) : Koda et al.

It is certified that error appears in the above-indentified patent and that said Letters Patent is hereby corrected as shown below:

Column 76, Line 34, delete "chancing" and insert
--changing--.

Column 76, Line 66, delete "chase" and insert
--phase--.

Column 77, Line 5, delete "environments" and
insert --environment,--.

Signed and Sealed this

Twentieth Day of March, 2001

Attest:

NICHOLAS P. GODICI

*Attesting Officer*    *Acting Director of the United States Patent and Trademark Office*